US005528018A

United States Patent [19]

Burkett et al.

[11] Patent Number: 5,528,018

[45] Date of Patent: Jun. 18, 1996

[54] PROGRAMMABLE LOAD COMPENSATION METHOD AND APPARATUS FOR USE IN A FOOD

[75] Inventors: Douglas A. Burkett; Gary L. Mercer; Peter J. Koopman; Tim A. Landwehr, all of Eaton, Ohio

[73] Assignee: Henny Penny Corporation, Eaton, Ohio

[21] Appl. No.: 20,848

[22] Filed: Feb. 22, 1993

Related U.S. Application Data

[63] Continuation-in-part of Ser. No. 746,910, Aug. 19, 1991, Pat. No. 5,317,130.

[51] Int. Cl.[6] .......... H05B 1/02

[52] U.S. Cl. .......... 219/506; 219/483; 219/486; 219/501; 219/492; 219/413

[58] Field of Search .......... 219/490, 492, 219/497, 412–414, 499, 501, 506, 508, 483, 486; 307/117, 119; 235/145 R

[56] References Cited

U.S. PATENT DOCUMENTS

| | | | |
|---|---|---|---|
| 3,353,004 | 11/1967 | Alexander | 219/398 |
| 3,364,338 | 1/1968 | Holtkamp | 219/398 |
| 3,751,632 | 8/1973 | Kauranen | 219/492 |
| 3,855,452 | 12/1974 | Flasza et al. | 219/486 |
| 4,065,659 | 12/1977 | Yount et al. | 219/398 |
| 4,158,432 | 6/1979 | van Bavel | 235/304.1 |
| 4,188,520 | 2/1980 | Dills | 219/10.55 B |
| 4,227,062 | 10/1980 | Payne et al. | 219/10.55 B |
| 4,238,669 | 12/1980 | Huntley | 219/405 |
| 4,316,068 | 2/1982 | Tanabe | 219/10.55 B |
| 4,316,078 | 2/1982 | Mack et al. | 219/386 |
| 4,379,964 | 4/1983 | Kanazawa et al. | 219/492 |
| 4,396,817 | 8/1983 | Eck et al. | 219/10.55 M |
| 4,410,795 | 10/1983 | Ueda | 219/492 |
| 4,441,015 | 4/1984 | Eichelberger et al. | 219/411 |
| 4,447,692 | 5/1984 | Mierzwinski | 219/10.55 B |
| 4,454,501 | 6/1984 | Butts | 340/365 R |
| 4,467,184 | 8/1984 | Loessel | 219/506 |
| 4,496,827 | 1/1985 | Sturdevant | 219/399 |
| 4,538,049 | 8/1985 | Ryckman, Jr. | 219/386 |
| 4,554,437 | 11/1985 | Wagner et al. | 219/388 |
| 4,561,348 | 12/1985 | Halters et al. | 99/421 |
| 4,568,810 | 2/1986 | Carmean | 219/10.55 B |
| 4,575,616 | 3/1986 | Bergendal | 219/405 |
| 4,633,065 | 12/1986 | Takazume et al. | 219/400 |
| 4,634,843 | 1/1987 | Payne | 219/486 |
| 4,678,432 | 7/1987 | Teraoka | 432/12 |
| 4,723,068 | 2/1988 | Kusuda | 219/486 |
| 4,761,539 | 8/1988 | Carmean | 219/497 |
| 4,780,597 | 10/1988 | Linhart et al. | 219/404 |
| 4,849,597 | 7/1989 | Waigand | 219/414 |
| 4,862,225 | 8/1989 | Heiller et al. | 355/288 |
| 4,899,034 | 2/1990 | Kadwell et al. | 219/494 |
| 4,914,277 | 4/1990 | Guerin et al. | 219/506 |
| 4,918,293 | 4/1990 | McGeorge | 219/506 |

(List continued on next page.)

FOREIGN PATENT DOCUMENTS 0220119 10/1986 European Pat. Off. .

*Primary Examiner*—Mark H. Paschall
*Attorney, Agent, or Firm*—Baker & Botts

[57] ABSTRACT

A method and apparatus for programmably controlling a cooking appliance. In addition to PREHEAT, COOK, and HOLD modes, the control is operable in a PROGRAM, SPECIAL PROGRAM and TEST mode. In PROGRAM mode a user sets parameters for a plurality of products. In SPECIAL PROGRAM mode global or system oriented settings are made. In TEST mode, individual components may be tested under operation of a control panel. Data may be logged to record usage for individual components and system information. A door sensor override may be used to turn OFF desired components when a door is open. A vent may be opened to reduce humidity at various programmed times during a COOK cycle or based on sensed parameters (e.g. humidity in the cooking chamber. A speaker may provide alarms that are programmable in volume and frequency for different products or events. Restricted access to different program or test modes is disclosed.

25 Claims, 17 Drawing Sheets

U.S. PATENT DOCUMENTS

| | | | |
|---|---|---|---|
| 4,920,252 | 4/1990 | Yoshino | 219/497 |
| 4,924,073 | 5/1990 | Chiba | 219/413 |
| 4,943,706 | 7/1990 | Lyall et al. | 219/494 |
| 4,962,299 | 10/1990 | Duborper et al. | 219/492 |
| 4,994,652 | 2/1991 | Wolf et al. | 219/497 |
| 5,044,262 | 9/1991 | Burkett et al. | 99/327 |
| 5,111,028 | 5/1992 | Lee | 219/506 |
| 5,171,974 | 12/1992 | Koether et al. | 219/506 |
| 5,182,439 | 1/1993 | Burkett et al. | 219/412 |

PROGRAMMABLE LOAD COMPENSATION METHOD AND APPARATUS FOR USE IN A FOOD

CROSS-REFERENCES TO RELATED APPLICATIONS

This application is a continuation-in-part of U.S. application Ser. No. 07/746,910 filed Aug. 19, 1991 now U.S. Pat. No. 5,317,130 entitled "PROGRAMMABLE LOAD COMPENSATION METHOD AND APPARATUS FOR USE IN A FOOD OVEN" which is related by subject matter to commonly owned applications entitled "PREHEATING METHOD AND APPARATUS FOR USE IN A FOOD OVEN", Ser. No. 07/746,760 filed Aug. 19, 1991 now U. S. Pat. No. 5,296,683, and to "METHOD AND APPARATUS FOR OPERATING A FOOD OVEN", Ser. No. 07/748,200 filed Aug. 19, 1991 now U.S. Pat. No. 5,182,439. This application is related by subject matter to application Ser. No. (TBD), Attorney Docket No. 18853-0153, filed even date herewith, entitled "Rotisserie Oven".

REFERENCE TO MICROFICHE APPENDIX

Source code for the process performed by the present invention in a preferred embodiment is contained in the parent application Ser. No. 07/746,910 in 224 frames on 4 microfiche, in the microfiche appendix.

BACKGROUND OF THE INVENTION

1. Field of the Invention

This invention relates generally to the field of food ovens. More specifically, the present invention is directed to a food oven having at least one heating element whereby control means are provided for controlling heating element and includes a load compensation feature to efficiently cook a particular food item.

2. Description of the Relevant Art and Problem

Today, restaurants find it increasingly more desirable to efficiently cook food in order to provide fast service and to reduce the labor costs involved in the cooking process. Efficiency means that a particular food item is cooked in a short time and with minimal interaction required from an operator while not sacrificing food quality.

Many ovens currently in use contain a single heating element and the user must set the temperature and monitor the food item to determine when to remove it from the oven. Some ovens contain a timer which turns the heating element on and off to allow a food item to cook for a predetermined time.

U.S. Pat. No. 4,238,669 to Huntley, is directed to and entitled, an oven Having Dual Heating Means. This invention describes an oven having a base plate which is heated. Food items may be placed directly on the heated base plate. A second heating element, preferably a quartz lamp heating element, is placed above the base plate, in the oven's cavity. This quartz heater has a greater thermal intensity than the base heater. A timer is provided which allows the quartz heater to be turned on after a predetermined time, and remain on for a second predetermined time. This would allow, for example, the top of a pizza to be browned quickly after the pizza had almost fully cooked. Thus, the brief time but intense heat from the quartz heater permits a pizza to be rapidly cooked and the top browned without sacrificing food quality.

However, an operator must select a proper time for when the quartz heater should be operated, and also determine how long the quartz heater should be operated. These two time periods differ depending upon the current temperature of the oven and the type of food being cooked. Only an operator skilled with this type of oven having dual heating elements can accurately determine the most efficient time and method for cooking a particular food item. Consequently, there is a need to provide an automatic means for operating such a dual heating element oven which considers both the current temperature of the oven and the type of food being cooked.

Restating the problem, unless the food item is constantly monitored by the operator, it may become overcooked because of previous cooking cycles heating the oven which increases the latent heat stored in the air and oven structure. For example, an oven which uses quartz lamp bulbs as well as conducted and convected heat will overcook pizzas if pizzas are rapidly cooked in sequence.

SUMMARY OF THE INVENTION

These and other problems of the prior art are solved by the present invention. The present invention is capable of automatically preheating an oven having dual heating means. Additionally, the present invention provides a means of programming the oven to vary the on time of the quartz heating element depending upon the type of food item to be cooked. Furthermore, the present invention allows the oven to automatically adjust these quartz lamp on times depending upon the current temperature of the oven.

More specifically, the present invention preferably allows up to three cooking intervals to be programmed: brown, cooked and finish intervals. One cooking cycle may consist of each of these three intervals, each interval being set for a period of 0 to 15 minutes. However, while staying within the scope of the present invention, each interval could just as easily be longer than 15 minutes in length. The quartz lamps within the oven may be programmed to be switched either on or off during each interval. For example, the quartz lamp could be on briefly during the brown interval, off during the lengthier cook interval and on again briefly during the finish interval.

To ensure uniform consistency of a cooked food item, the present invention provides a method for programmable load compensation. This method consists of automatically compensating for variations in the temperature of the food product placed in the oven, as well as the amount of stored heat accumulated within the oven from previous use. That is, the effect of the food product temperature on the air temperature is measured by directly measuring the air temperature. Compensation is performed by varying the amount of time during which the quartz lamps are turned on during a specific interval as a function of preferably three factors: the actual air temperature within the oven cavity, the base temperature set point, and a programmable load compensation factor. First, regarding air temperature, when the air temperature increases, the actual on-time of the quartz lamp decreases. Thus, above a certain air temperature, no additional compensation takes place. Conversely, below a certain air temperature no load compensation takes place.

Second, the base temperature set point is a temperature value preferably predetermined and stored into non-volatile memory of the present invention. Like setting a thermostat, this value tells the oven at which temperature it should maintain itself. The set point may be set depending upon the particular food item to be cooked.

Third, load compensation factors are programmed into non-volatile memory of the present invention. These factors are used in conjunction with a difference between the actual temperature and the set point temperature to control the length of cooking time for different food items.

Additionally, the present invention allows for a method of automatically preheating the oven based upon its immediate usage history. This preheat function operates by regulating the base heating elements until they are within a specified temperature range from the program base set point temperature, and then turns the quartz lamps on until the air temperature within the oven cavity reaches a certain fixed preheat "exit" temperature. This preheat exit temperature need not be a fixed value, but can be a function of the base set point temperature or the air temperature before or during the preheat operation. In addition, the preheat function can be performed at various times during the oven's operation, and not necessarily upon power up of the oven.

The above descriptions of the present invention provide only a broad overview of preferred embodiments within the present invention. The details of certain aspects of the present invention will be more fully understood from the following specification and drawings.

DETAILED DESCRIPTION

The present invention preferably embodies a hardware controller which performs various functions on the oven. The hardware for the controller will first be described, with the functions and steps performed by the hardware described thereafter.

Hardware Description

Figure 1:
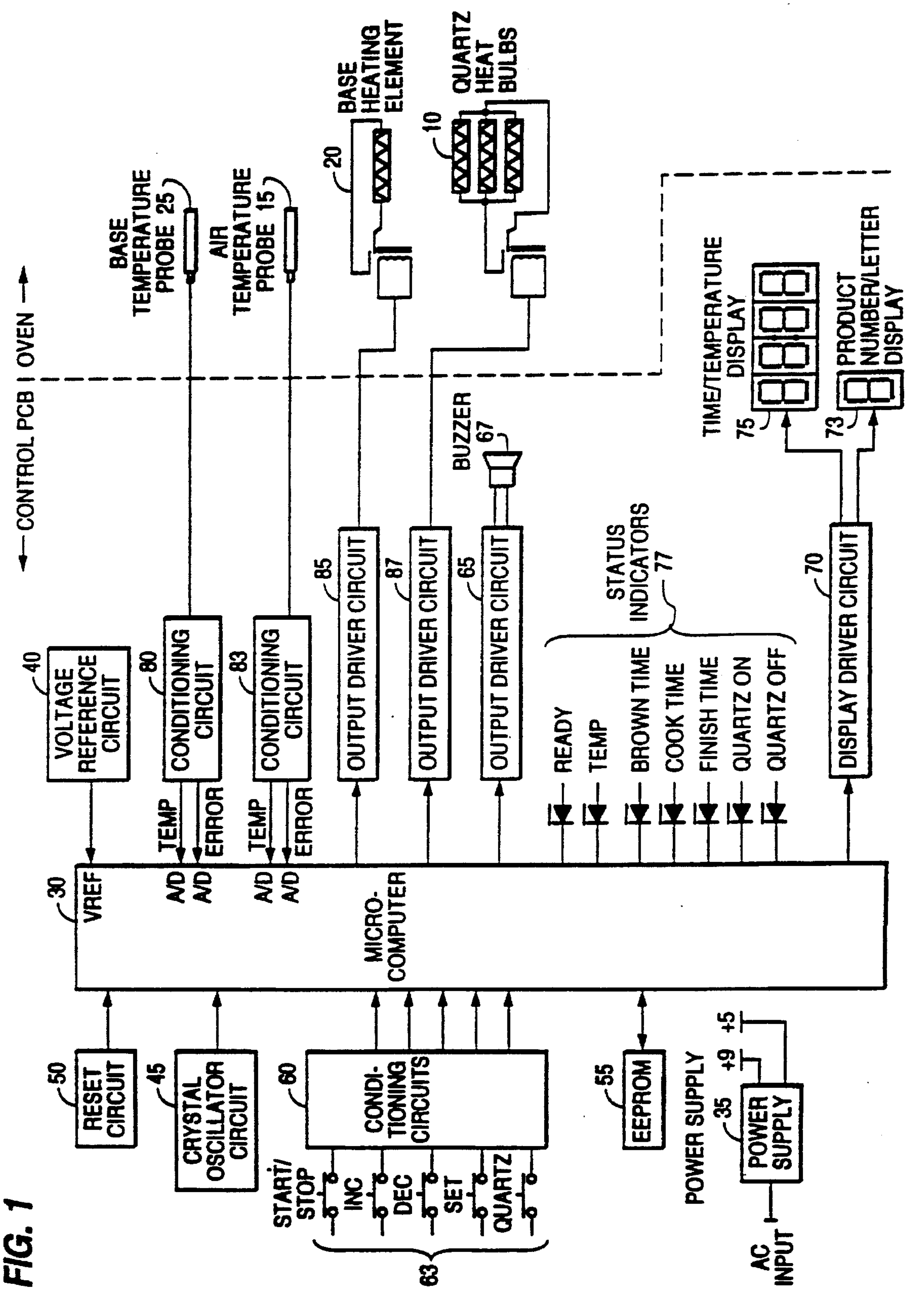
FIG. 1 shows a block diagram of the control hardware for the oven in the present invention.

Referring to FIG. 1, two heating elements 10 and 20 are disposed within an oven having a base and a cavity (not shown). Base heating element 20 is located preferably underneath a base plate, preferably the HTX TRANSITE II™ base by BNZ MATERIALS, INC. However, other base materials such as metal, compressed asbestos, ceramics or other materials on which food may directly be placed and which are able to withstand great temperatures may be used. Base heating element 20 could be a gas heater or other heating means, but preferably is a 3200 watt CALROD electric heating element.

Located within the oven's cavity and above the base plate, preferably near the roof of the cavity, is located the second heating means 10, preferably quartz heat bulbs. The quartz heat bulbs must be able to provide a higher thermal intensity for a substantially brief heating period as opposed to the base heating element 20. Base heating element 20 preferably provides conducting heat whereas the quartz heat bulbs 10 preferably provide radiant heat. Both heating means also have appropriate relays or other circuitry to properly switch or toggle them from a first state (on) or a second state (off).

Two temperature probes are provided within the oven to detect temperature within the cavity and base of the oven. Base temperature probe 25 is thus located within or proximate to the base while air temperature probe 15 is located within an air duct immediately outside the oven cavity. Base temperature probe 25 should be placed so as to receive approximately the mean temperature of the base. Similarly, air temperature probe 15 should be placed within the oven cavity, so that it may detect the mean temperature of the air within the oven cavity. Consequently, probes 15 and 25 should not be placed too far, nor too close to heating elements 10 and 20.

Microcomputer 30, which preferably is a Motorola MC68705R3L, provides the computing resources for the hardware, and specifically for the control board. This microcomputer includes a microprocessor and also includes a 4-channel, 8-bit A/D converter which is used to convert the temperature voltage signals from temperature probes 15 and 25 to digital values for computing and control. Microcomputer 30's internal non-volatile memory (ROM or PROM, or preferably EPROM) stores the program code described in detail below. Microcomputer 30 also contains internal random access (RAM) which is used for calculation purposes.

Power supply 35, located mainly on the control board in a preferred embodiment, also includes an off-board transformer which converts an AC power input into a proper power supply for the control board and microcomputer 30. Capacitors are provided in power supply 35 to provide EMI/RFI filtering. Additionally, fuses and metal oxide varistors (MOV) are included to provide surge protection. Power supply 35 also preferably includes a diode bridge to fully rectify an AC input voltage into a DC voltage. Additionally, an integrated circuit voltage regulator, as is commonly available in the market, is provided. All of the above elements and construction for power supply 35 are well known in the art.

Reset circuit 50 coupled to microcomputer 30 preferably comprises a capacitor. Crystal oscillator circuit 45 forms the system clock oscillator comprised of preferably a capacitor and a crystal oscillator oscillating at 4 megahertz. This results in an internal clock rate of *1 megahertz. Voltage reference circuit 40 establishes the reference voltages for the internal A/D converter.

EEPROM 55 is a non-volatile memory, preferably located on an integrated circuit capable of serial communications, for example, TS93C46. EEPROM 55 stores the product parameters: times, temperatures, quartz heating settings, and load compensation factors, all of which will be described in more detail below. Appropriate protection circuitry is preferably also connected with EEPROM 55 to insure that the contents of the non-volatile memory are not inadvertently changed during control power-up and power-down.

Microcomputer 30 also contains appropriate inputs 63 for user input located on the exterior of the oven and outputs for display devices described below. Protection circuitry to insure that noise does not generate false interrupts or corrupt control signal operation is included as well known to those in the art.

Conditioning circuit 60 provides preferably pull-down resistors which insure that switch input voltages from user input switches 63 do not float when no switch is pressed. Thus, circuit 60 results in preferably an output voltage of approximately 5 volts when a switch is pressed and approximately 0 volts when no switch is pressed.

LED status indicator 77 is provided to indicate the following states: ready, temperature, brown time, cook time, finish time, quartz lamp on, quartz lamp off. These states will be describe in more detail below. Signals from microcomputer 30 are coupled to status indicators 77, preferably, LEDS, but could be other indication means.

Display driver circuit 70 is preferably an integrated circuit such as MC14489. The display driver circuit 70 preferably is a multiplexing driver circuit to drive time/temperature display 75 and product number/letter display 73. Displays 73 and 75 are preferably seven segment LED displays, but could be other indicating means as are well known in the art. Displays 73 and 75 and indicator 77 are preferably physically located on the control panel on the front panel of the oven. Seven segment display 75 can display both time, numbers and limited alphanumeric messages of up to four characters. Display 73 is used to display the current selected product number from 1 to 9 or a letter from A through F.

Buzzer 67 is preferably a piezoelectric buzzer having a main feedback and ground connection. The buzzer is used to provide audible feedback to the operator of various control operation conditions. Output driver circuit 65 preferably is a modified Hartly oscillator which drives buzzer 67 circuit near its resonant frequency for maximum efficiency in terms of sound pressure level. Output driver circuit 65 preferably includes a switch or means to select a desired setting for the buzzer sound pressure level. Associated driver circuitry is also included in driver circuit 65 as is well known in the art.

Temperature sensor conditioning circuits 80 and 83 are preferably identical signal conditioning circuits connected to base temperature probe 25 and air temperature probe 15, respectively. Conditioning circuits 80 and 83 also preferably include circuitry to determine probe failure in either "open" or "shorted" failure modes and forward signals to microcomputer 30. Thus, two inputs, a temperature and error inputs, are provided from each conditioning circuit 80 and 83 into the A/D inputs of microcomputer 30. Associated capacitors are provided in conditioning circuits 80 and 83 to provide for EMI and other noise filtering functions, as are well known in the art.

Output driver circuits 85 and 87 are preferably two identical output circuits for driving base heating element 20 and quartz heat bulbs 10, respectively. Driver circuits 85 and 87 preferably include optoisolated triac driver integrated circuits such as MOC3041. Appropriate protection circuity is provided to prevent false turn-on as is well known in the art. Control signals are provided from microcomputer 30 into driver circuits 85 and 87 to turn on heating elements 20 and 10 at appropriate times, as will be discussed more fully below.

The present invention preferably also includes circuitry to provide for additional heating means in the oven should they be desired to provide even greater flexibility and control as the presently described embodiment. A fan fail circuit may also be provided to detect failure of the of off-board cooling fan and thus warn an operator or shut down the system to prevent further damage.

Overall Process Performed

The overall operation of the process of the present invention in a preferred embodiment is depicted in the flow diagram of FIG. 3, and will now be described in some detail below. The process is executed by microcomputer 30 (shown in FIG. 1) and resides in the internal non-volatile memory of microcomputer 30 (not specifically shown in FIG. 1).

Figure 3:
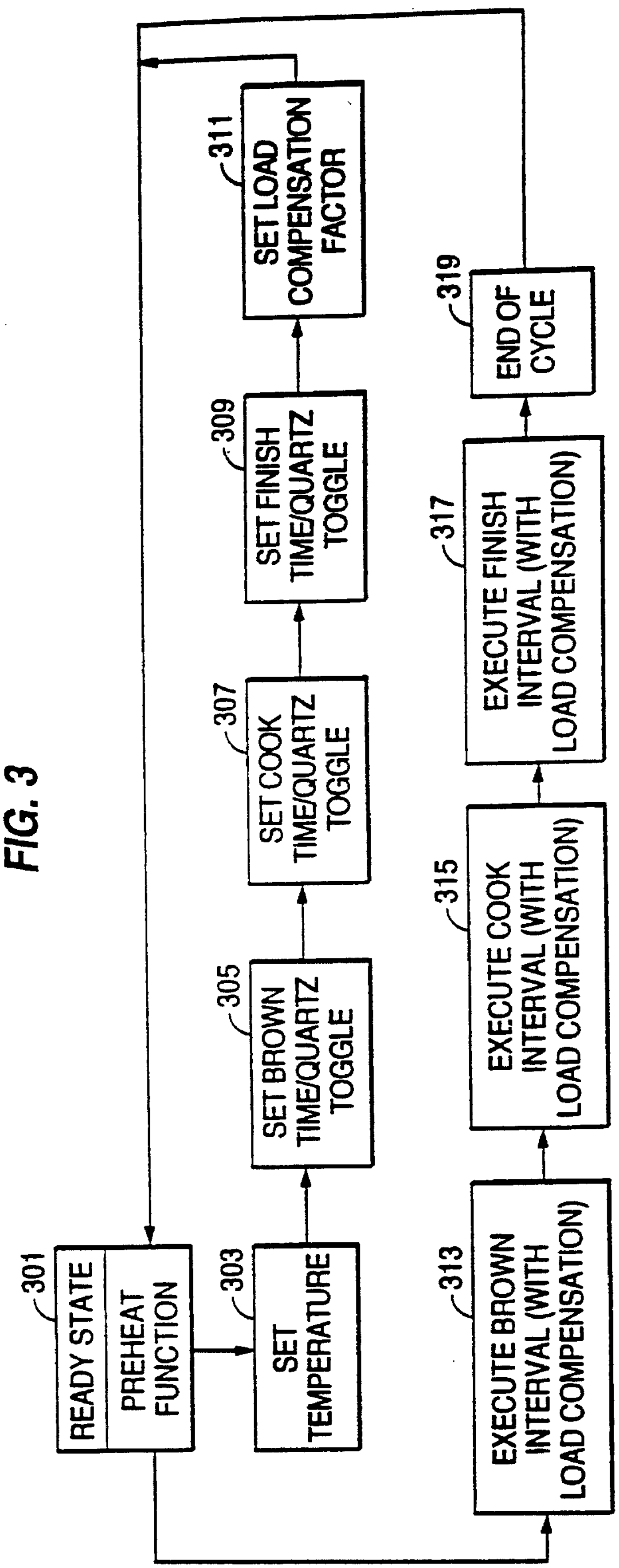
FIG. 3 shows a flowchart for the overall functioning of the present invention.

Referring to FIG. 3, the three aspects of the present invention are shown interacting with one another. Specifically. step 301, the ready state/preheat function is performed when the oven's operation is initially started, and is repeated as needed thereafter. This step generally consists, in part, of heating the base of the oven to a predetermined temperature by means of activating the base heating element (element 20 in FIG. 1) and thereafter heating the air in the oven's internal cavity to a predetermined temperature by means of the quartz heat bulbs (element 10 in FIG. 1). The automatic preheat steps are described in more detail in copending application entitled "PREHEATING METHOD AND APPARATUS FOR USE IN A FOOD OVEN" by the same inventors and incorporated herein by reference.

When a user of the present invention wishes to set the various parameters corresponding to the operation of the oven, he/she may press a "SET" switch (such as the "SET" switch of element 63 of FIG. 1). In a preferred embodiment, the present invention will thereafter prompt the user to enter the various parameters, examples of which are illustrated in steps 303–311. For example, in a preferred embodiment, the user may utilize the increment/decrement switches of element 63 (INC and DEC) to modify the parameters in steps 303–311. In another embodiment, the user may directly enter the desired parameters on a device such as a numeric keypad, etc.

Step 303 comprises setting the base setpoint temperature for the oven. This value represents the desired temperature of the base plate of the oven. This value is used during the preheat function (step 301) as well as the actual oven usage intervals as described below with respect to steps 313–317.

Steps 305–309 comprise setting the time for the "brown", "cook" and "finish" intervals as well as switching the quartz lamps to either be on or off during each interval according to one embodiment of the present invention. The selected values are stored in memory. In a preferred embodiment, the operator may select a time duration between 0–15 minutes for each cooking interval, where the total cooking time is the sum of the selected cooking interval times. The time of each interval may be displayed on display 75. After the time for a particular interval is selected, the operator sets heating element 10 to be on or off during that interval. A toggle switch may be provided to set heating element 10. The operator then selects the time for the next interval. However, the order in which the values are selected is not critical. For example, each of the interval times may be selected first, and then the heating element 10 may be set for the individual intervals. In addition, the structure used to select the interval times and to selectably set heating element 10 is not critical. One of skill in the art may recognize a variety of structures to accomplish these functions, including a numeric keyboard with an on/off button, individual buttons, dials, etc. In a preferred embodiment. LED status indicators prompt the operator to select a particular parameter.

The selected times and settings are stored within the control system of the present invention, and are thereafter utilized in steps 313–317 to determine the appropriate timing characteristics of the various cooking intervals and the operation of heating element 10. In a preferred embodiment, the first heating element 10 is set on during the "brown" interval, off during the "cook" interval, and on during the "finish" interval. These intervals and cooking steps are described in greater detail in copending application entitled "METHOD AND APPARATUS FOR OPERATING A FOOD OVEN" by the same inventors, incorporated herein by reference.

Steps 311 involves setting a load compensation factor. The load compensation factor is utilized by the load compensation aspect of the present invention to account for the type of load being cooked within the oven and the particular temperature within the oven. The load compensation factor is used by steps 313–315 in a preferred embodiment to compensate the timing characteristics of the various operating intervals, and it will be described in further detail below with respect to FIGS. **2*a* and 2*b*** . After the load compensation factor has been set, execution transfers back to the ready state/preheat function until the user requests another operation.

Steps 313–317 involve executing the "brown", "cook" and "finish" intervals according to a preferred embodiment of the present invention. These steps are executed after the associated characteristics have been set in steps 303–311, and when the user selects, in a preferred embodiment, the "start" function by pressing the "Start/Stop" key ("START/STOP" switch of element 63 of FIG. 1). Steps 313–317 utilize the corresponding temperature, times, load compensation factor, and heating element 10 switch settings selected in steps 303–311. Specifically, the temperature set in step 303 is maintained throughout these steps, the times for the various intervals are kept in conjunction with the load compensation factor, and the quartz lamp operational status is maintained for each of the three intervals in a preferred embodiment. If the time of a particular interval is set to 0, that interval is skipped. Throughout the cooking cycle, status indicators 77 indicate the interval which is being executed.

Finally, step 319 corresponds to the end-of-cycle operation performed after the "brown", "cook" and "finish" intervals are completed. After this step has been reached, execution is transferred back to the ready state/preheat function of step 301. A more detailed description of a preferred embodiment of the present invention follows.

Load Compensation Operation

As described above, a purpose of the present invention is to ensure a uniformly processed product, regardless of product and environment variations. For example, the temperature of the food product entering the oven may vary depending on whether it is frozen or fresh, and how long it has been unrefrigerated before cooking. The stored heat of the oven will vary depending on the usage of the oven prior to cooking the product. For examples, in the case of a pizza oven, the stored heat of the oven will be greater after several pizzas have been cooked, than it is during cooking the first pizza of the day. A system is needed which compensates for variations in the temperature of the product (load) and the environment—a load compensation.

Some experimental results indicate that one of the best ways to perform load compensation in an oven having two heating elements is to vary the on-time of the quartz lamp. The on-time of quartz lamp 10 preferably changes as the function of the actual air temperature in the oven and the base temperature set point measured by air temperature probe 15 and base temperature probe 25 respectively, as well as the load compensation factor. Thus, as the air temperature increases, the quartz on-time is shortened. In a preferred embodiment, the quartz on-time is never lengthened, although such an implementation is certainly possible.

Various degrees of load compensation may be programmed into EEPROM 55. Preferably, the load compensation may be set from 0 to 10. Zero is equivalent to no load compensation with 10 equivalent of (100%) load compensation. Load compensation may be programmed by the user from input switches 63 and stored in EEPROM 55. Additionally, the exterior front panel of the oven would preferably include a method of inserting a menu indicating which food item, and corresponding previously programmed load compensation, may be selected by a user.

Basically, implementation of the load compensation performs the following steps to determine the on-time of quartz lamp 10.

(1) Read the load compensation factor from a non-volatile memory.

(2) Set a variable "LcLim" to the difference between the base temperature set point (in A/D bits) and a constant.

(3) If "LcLim" is less than zero, then set LcLim to zero: otherwise, set LcLim to the base temperature set point multiplied by a constant minus another constant.

(4) During each pass through the main loop:

- (i) Set "TempErr" to the difference between the oven cavity air temperature and LcLim.
- (ii) Set a variable "N1" to TempErr multiplied by a load compensation value contained in a table indexed by the load compensation factor previously read from the non-volatile memory.
- (iii) Determine if variable N1 is less than a constant and if so assign it a value.
- (iv) Determine if TempErr is less than a constant. If so, assign LcReset a constant value. If not, assign LcReset the value of a constant minus N1 times a constant.
- (v) When a cooking interval begins, if the quartz lamps have been programmed to be turned on during the interval, then:
  - (i) Set "QClock" to the total number of seconds programmed for the cooking interval.
  - (ii) Set "LcCount" to the value of LcReset, and set "LcSec" to a constant, preferably 10.
  - (iii) During each timer interrupt, decrement LcCount, and when LcCount reaches zero, decrement LcSec.
  - (iv) Decrement QClock" when LcSet reaches zero.
  - (v) Turn quartz lamps off when QClock reaches zero.

Referring to FIGS. **2*a* and 2*b***, the basic operation described above for the load compensation factor is depicted. Each time an interval starts during the cooking process (i.e. brown, cook or finish), the control program checks to see if the quartz lamps have been programmed on for that interval. If the quartz lamps had been programmed on, then a variable QClock is calculated as:

$$QClock=60\ (minutes)+seconds$$

Figure 2A:
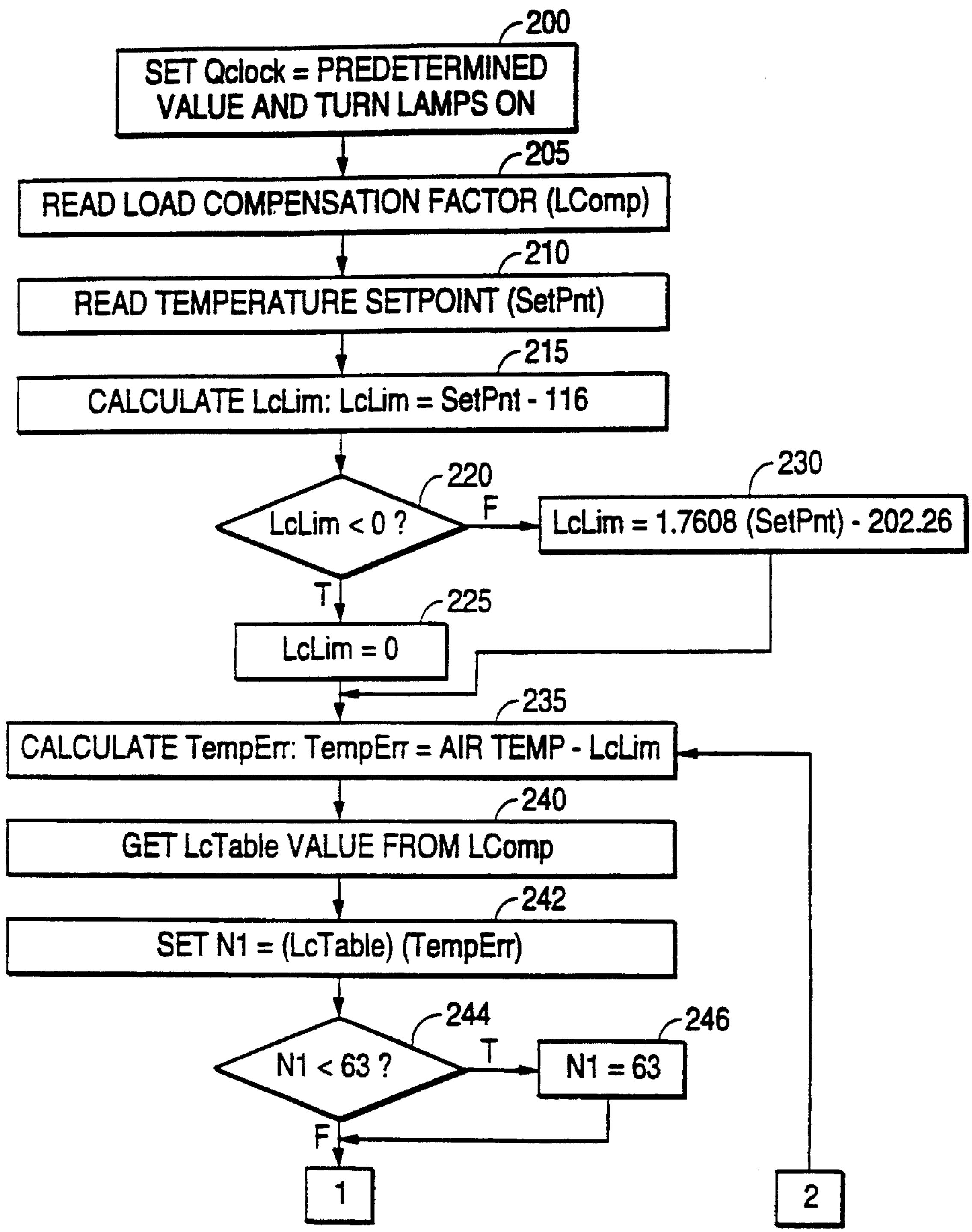
FIGS. 2*a* and 2*b* show flow charts detailing the operation of the present invention.

QClock obviously is then the total time in seconds. QClock is a clock that is run in parallel with the cooking time display 75 which is displayed on the front surface of the oven. QClock does not keeps "real" time but rather a compensated time depending upon the current air temperature of the oven and the load compensation factor. Thus, the higher the air temperature the more quickly QClock will decrement. Referring to FIG. 2*a*, QClock is set to a predetermined value for the particular cooking interval when the quartz lamps have been programmed on in block 200.

A load compensation factor depending on a particular food item is read from EEPROM 55 and stored in the RAM memory of microcomputer 30 as variable LcComp in block 205. The SetPnt temperature is stored as A/D bits and not in degrees. A particular predetermined temperature set point "SetPnt" is read from non-volatile memory in block 210. SetPnt represents a base temperature which is desired for a particular product to be cooked. Thus, a sandwich at room temperature would presumably have a lower predetermined SetPnt temperature while a frozen pizza would have a higher SetPnt value.

In block 215, the value LeLim is calculate by the formula:

LcLim=SetPnt−116

If LcLim is less than 0 (block 220), then LcLim is set to 0 (block 225). Otherwise, if LcLim is greater than 0, then LcLim is calculated in block 230 as:

LcLim=1.7608(SetPnt)−202.26

Next, a temperature error value TempErr is calculate in block 235 by the formula:

TempErr=AirTemp−LeLim where AirTemp is the current actual air temperature in the oven cavity as detected by air temperature probe 15. Temperature from air probe 15 is read in and filtered through conditioning circuit 83 and into A/D channel of microcomputer 30. Additionally, block 230 determines whether an error exists in air temperature probe 15. TempErr is an error value representing the difference between the current actual air temperature and the desired air temperature for the current base temperature SetPnt.

Using a lookup table stored in non-volatile memory, a value LcTable is selected in block 240 from the previously read load compensation factor LcComp. The following table shows the entry for valid values of LcComp:

| LcComp | LcTable Entry |
|---|---|
| 0 | 0.000 |
| 1 | 0.102 |
| 2 | 0.200 |
| 3 | 0.298 |
| 4 | 0.400 |
| 5 | 0.502 |
| 6 | 0.600 |
| 7 | 0.702 |
| 8 | 0.800 |
| 9 | 0.902 |
| 10 | 1.000 |

Note that these table entries step from 0 to 100% in steps of approximately 10%.

In block 242, a variable N1 is set by the formula:

N1=(LcTable) (TempErr)

Figure 2B:
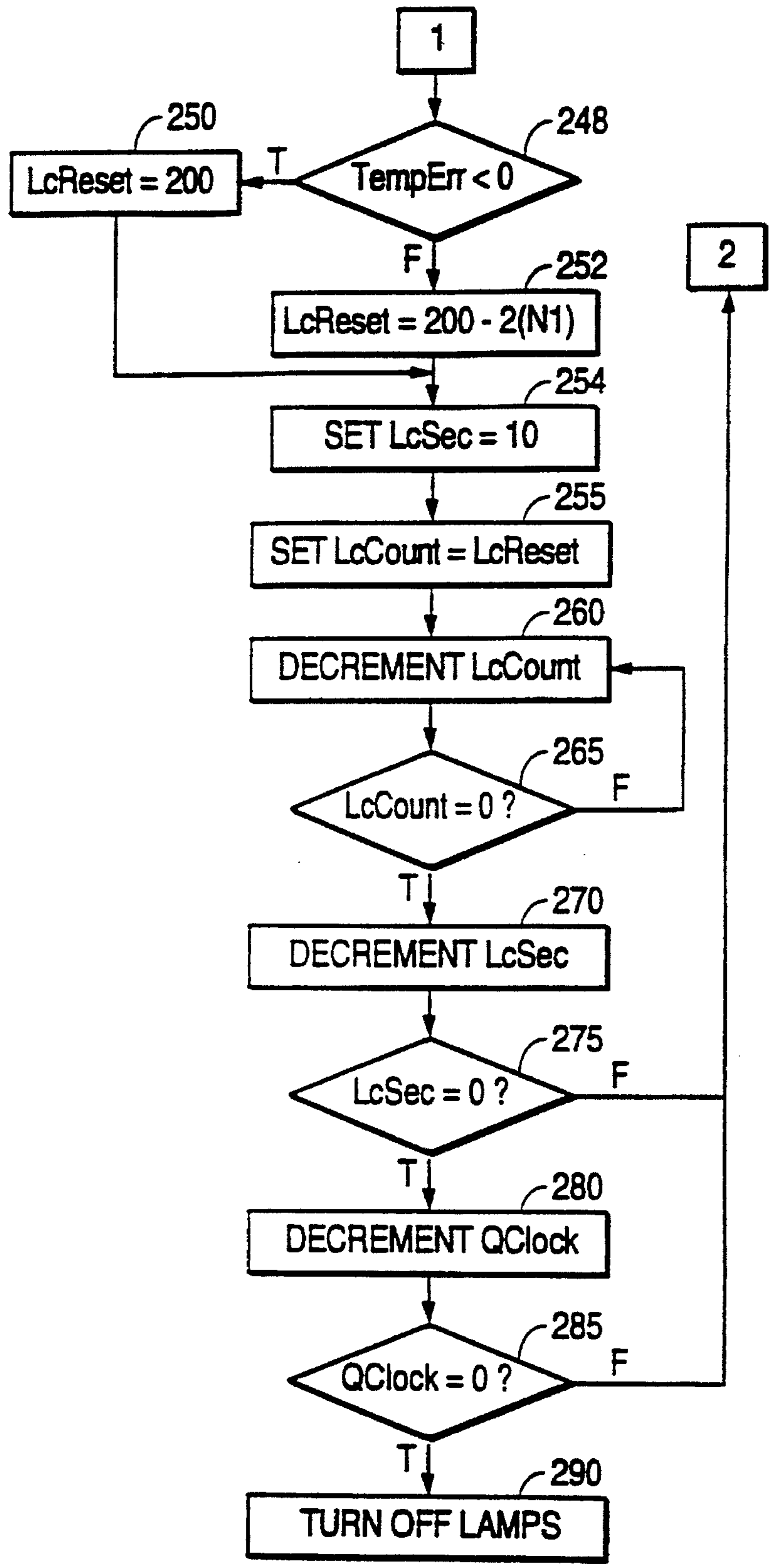

If N1 is less than 63 (block 244) then N1 is set to 63 in block 246. This is necessary to establish the maximum amount of load compensation that can occur. Note that the constant 63 could be another number but is preferably set to this value. Referring now to FIG. 2*b*, if TempErr is less than 0 (block 248), then LcReset is set to 200 (block 250). Otherwise, LcReset is calculated by the following formula in block 252:

LcReset=200−2(N1)

Figure 4:
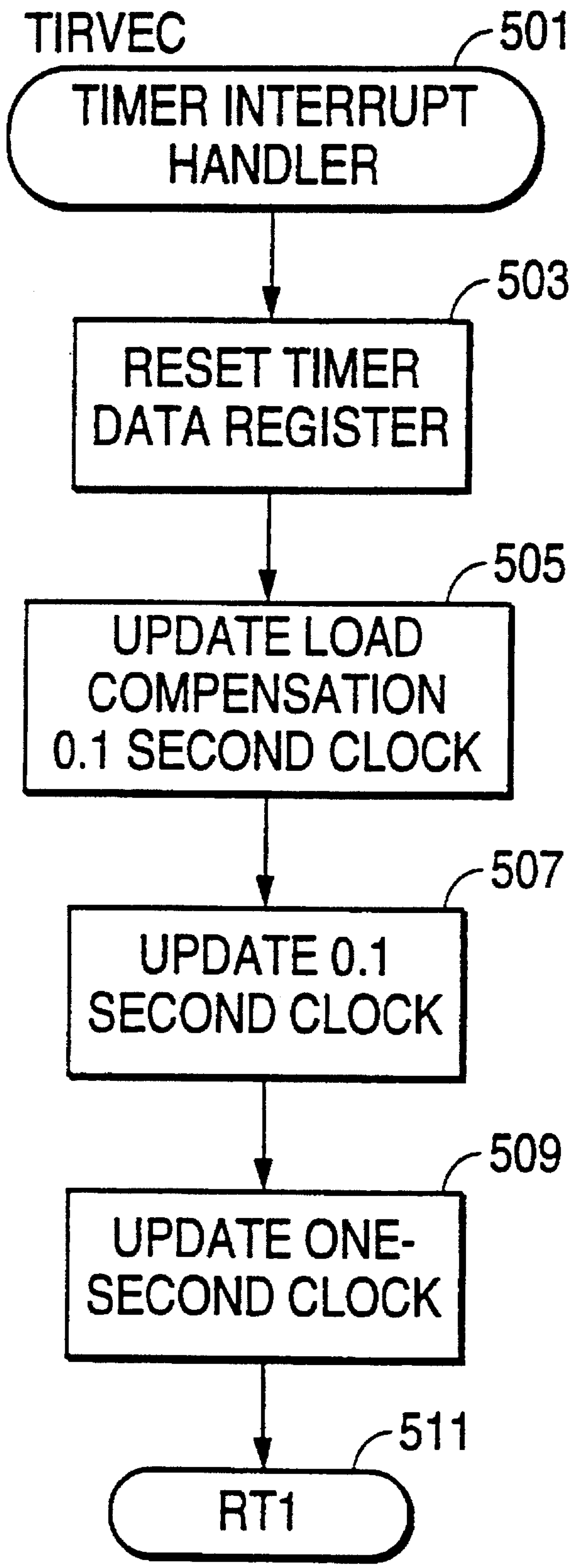
FIG. 4 shows a flowchart of the timer interrupt handler steps performed by the present invention.

Timer interrupts occur 2,000 times a second and are described in FIG. 4. Referring briefly to FIG. 4, block 501 indicates the beginning of the timer interrupt handler subroutine. In block 503, the timer data register is reset. In block 505, load compensation 0.1 second clock is updated. In block 507, the 0.1 second clock is updated. In block 509, the 1 second clock is updated. And in block 511, the subroutine interrupt instruction is returned.

FIG. 2*b* shows that in block 254, LcSec is set to 10. In block 255, LcCount is set to equal LcReset.

In block 260 of FIG. 2*b*, the clock LcCount is decremented. In block 265, if LcCount is equal to 0, then the clock LcSec is decremented in block 270. Otherwise, LcCount is again decremented in block 260. If clock LeSec is equal to 0 (block 275), then QClock is decremented in block 280. Otherwise, the process returns to block 235 and again goes through the above described steps.

If QClock equals 0 in block 285, then quartz lamps 10 are turned off in block 290. Otherwise, the process again returns to block 235.

From the above we see that the counter LcReset determines the length of a compensated second.

To summarize, the clocks involved in load compensation are:

LcCount: is initialized to LcReset. LcCount is decremented at each timer interrupt, and times are approximately 0.1 seconds. Actual time is 0.1 "compensated" second.

LcSec: is initialized to 10. LcSec is decremented (in UpdQClock routine) each time LcCount reaches 0, and its time approximately equals 1 second. Actual time is 1 "compensated" second.

QClock: is initialized to the total seconds in a predetermined and programmed interval (brown, cook or finish). QClock is decremented (in UpdQClock routine), each time LcSec equals 0. Its actual time is the total "compensated" interval time.

While the present invention has been disclosed with respect to a preferred embodiment and modifications thereto, further modifications will be apparent to those of ordinary skill in the art within the scope of the claims that follow. For example, although the formulas used to determine load compensation are linear as a function of air temperature and the SetPnt, this is not mandatory. A polynomial or logarithmic function would provide a better approximation to the effects of cooking time and temperature, but would complicate the process.

The compensation time could be made a function of the actual base temperature as well as the base SetPnt and other factors, including the air temperature as described above. The compensation could be designed to extend the quartz lamp on-time as well as the above described decrease in quartz on-time. Additionally, the quartz on-time compensation could be designed to work in conjunction with total cooking time compensation rather than on an interval basis.

The load compensation factor need not be the same for all intervals, and more intervals than three could be added. Greater details on operation of the steps in the above implementation are described in great detail in the source code attached at Appendix A. These details shown in this Appendix are primarily concerned with underflow, overflow, fractional representations of binary numbers and handling of signs of binary numbers. Refer specifically to the routines "READPROD, AIRSTAT and UPDQCLOCK in this Appendix. All these techniques are obvious and well known to one skilled in the art and may include other techniques known to those skilled in the art. Consequently, it is not intended that the invention be limited by the disclosure, but instead that its scope be determined entirely by reference to the claims which follow.

In an alternative embodiment, a load compensation technique is disclosed for use specifically with a rotisserie type cooking oven. An example of a rotisserie cooking device and a control therefor is disclosed in U.S. Pat. Nos. 4,968,515 and 5,044,262 issued to Burkett et al. and assigned to the assignee of the present invention. These patents are hereby incorporated herein by reference.

According to one aspect of this embodiment, the actual cooking time of a rotisserie is adjusted based on a load compensation factor and a difference between an actual air temperature and set point temperature. According to this technique, each displayed second of the cooking time is lengthened or shortened based on the difference in temperature between the actual sensed temperature and the set point temperature.

According to this embodiment, at the start of each new displayed cook timer "second", the timer interrupt code accesses a look-up table to obtain a multiplier associated with the current load compensation setting. It then multiplies the temperature difference (Actual air temperature—Setpoint temperature, preferably in degrees F.) by this multiplier to arrive at a time adjustment value.

If the actual air temperature is ABOVE the current setpoint temperature, the adjustment value is SUBTRACTED from a nominal value of "100" (i.e., 100/100ths of a second) and reloaded into the 100 Hz countdown component of the cook timer. This results in a "cook timer second" which is <100/100ths of a real second, and therefore results in a cook timer that counts down FASTER than real time.

If the actual air temperature is BELOW the current setpoint temperature, the adjustment value is ADDED to a nominal value of "100" and reloaded into the 100 Hz countdown component of the cook timer. This results in a "cook timer second" which is >100/100ths of a real second, and therefore results in a cook timer that counts down MORE SLOWLY than real time.

EXAMPLE

If the load compensation setting for the current product is "5", the setpoint temperature is 350 F., and the air temperature in the rotisserie is currently 320 F., then the temperature difference (350–320) is 30 Deg F. BELOW setpoint temperature Since the load compensation setting is 5, then from the look-up table, the multiplier associated with this setting is found, which in one embodiment is 0.5.

From this information, the load compensation adjustment can be obtained as follows:

LCAdjust=30 * 0.5=15

Since the temperature is BELOW setpoint, the adjustment (15) is ADDED to 100 to EXTEND the length of a "second" of cook time. Therefore, the 100'ths byte of the cook timer (CookTmr. 100s) is loaded with 115/100ths 100+LCAdjust seconds.

Therefore, the next "second" (i.e. displayed second) of cook time is 15/100ths seconds longer than a "real" second.

According to one embodiment, the temperature difference may be limited to a maximum, (e.g., +/–255 degrees F.) so that the "TmpDif" (temperature difference) can be handled as an 8-bit integer. When it is MORE than 255 degrees F. above or below setpoint, the Load Compensation adjustment will be the same as if it were exactly 255 degrees F. above or below setpoint, though it would rarely be this far from setpoint while cooking.

Also, the final 100's reload value may be limited to the range "LC100Min." to "LC100Max.", as a means of restricting the timing to reasonable rates. For example, these constants can be set to limit the minimum 100's reload value to 50/100ths seconds, and the maximum reload value to 200/100s. This effectively limits the load compensation to at most halving or doubling the cooking time.

Preferably, the actual cook timer components—Hours, Minutes, seconds, and 100ths of seconds—actually count down to –1 rather than to 0, so they are reloaded with values 1 less than the item they count. For example, 100ths of seconds is normally reloaded with "99" to count one full second (99..-1=100/100ths of a second), and reloading minutes with 59 will result in a 60 minute countdown (59.-1). This adjustment to the 100ths component of the cook timer is made by simply decrementing the calculated reload value just before saving it into the 100ths byte of the cook timer. Preferably, all of the load compensation calculations are made based on a nominal value of "100".

According to one embodiment, the look-up table, referred to as the "LCPercentTbl," is represented as 8-bit fractional values, and is indexed by the load compensation setting (0..10). In a preferred embodiment, the table contains the following values.

| 8 bit fractional value (/256) | Load Compensation Setting |
|---|---|
| 0 | 0 = 0% |
| 26 | 1 = 10% (10% * 256 = 25.6) |
| 51 | 2 = 20% (20% * 256 = 51.2) |
| 77 | 3 = 30% (30% * 256 = 76.8) |
| 102 | 4 = 40% (40% * 256 = 102.4) |
| 128 | 5 = 50% (50% * 256 = 128.0) |
| 154 | 6 = 60% (60% * 256 = 153.6) |
| 179 | 7 = 70% (70% * 256 = 179.2) |
| 205 | 8 = 80% (80% * 256 = 204.8) |
| 230 | 9 = 90% (90% * 256 = 230.4) |
| 255 | 10 = 100% (255/256 - 99.6%) |

The values in this table may be changed based on actual cook testing and analysis. Also, the progression of values need not be linear.

The following code excerpts illustrate a preferred way of carrying out this embodiment.

```
;-------------------------------------------------------------------------------------------
;G e t L C A d j 1 0 0 s (Get Load Compensation Adjusted 100's) Subroutine
;This routine returns the 100's reload value for the state variables pointed to by [X].
This ;value may be more or less than 100/100ths of a second, depending on the degree
of ;load compensation selected and the current difference between actual air
temperature ;and the product's setpoint temperature.
;
;Input:          [X] -- points to state variables
;                _LoadComp -- load compensation setting
;                _SetptTmpFS -- product temperature setpoint (Sear/Cook/Hold)
;                AirTmpFS -- current air temperature
;
;Output:         [A] -- 100's seconds for the next "cook second" (LC100Min.,LC100Max)
;                Since timer counts down to -1, "99" is exactly one second, and
;                224 is two and 1/4 seconds, etc.
;Routines Called: None
;Exit State:                          [A] -- adjusted 100's (99 = 1 full second)
;                                     [X] -- unchanged (points to state variables)
;                                     [B],CCR -- indeterminate
;
;-------------------------------------------------------------------------------------------

GetLCAdj100s:

;On entry here, [X] points to the state variables record and a copy of the state vars
;PSHX
;++ [save a copy of the state vars pointer]
;First, calculate how far below setpoint we are.
;
;If Setpt > Actual, (Setpt-Actual > 0), we are lower than we want to be
; and therefore must stretch out time by adding a little to each second.
;
;If Setpt < Actual, (i.e. Setpt-Actual < 0), we are higher than we want to be
; and therefore must speed up time by reducing each second a little bit. This may be
; implemented as follows.
          LDD       _SetptTmpF$,X     ;Calculate the difference between setpoint
                                      ;temperature and actual temperature (+==>
                                      ;add time, -==> subtract time)
          SUBD;     AirTmpFS
          PSHA                        ;+(Save top byte of difference -- pos or neg)
          BPL       GotAbsDif         ;If positive difference, we're ready . . .

          COMA                        ;Else convert negative number to positive
          COMB                        ;(two's complement = bit comp, then add 1)
          ADDD #0001                  ;)two's complement = bit comp, then add 1)
;Now have 16-bit absolute value of Setpt-AirTmp in [D]. Clip this to a
;maximum working value of 255 so we can work with single byte values.
GotAbsDif:
          TSTA                        ;If top byte is = 0 . . .
          BEQ       LE255             ;then [B] is already less than or equal to 255
          LDAB #255                   ;else clip difference in [B] to 255
LE255:

;At this point, we have 8-bit absolute value of tmp. diff. in [B] (0..255).
;
;Multiply "temperature difference" by the percent appropriate for the
;current LoadComp setting for this product.

          TBA                         ;First, transfer dif to [A] so we can use [B]
          LDAB      —LoadComp,X       ;Get the load compensation setting
          LDX       #LCPercentsTbl    ;Get base address of the Load Comp/Pcnts
                                      ;table
          ABX                         ;[X] points to "fractional" byte

          LDAB O,X                    ;Get the fraction (i.e. 50% = 128, etc.)
                                      ;Difference byte is still in [A]
          MUL                         ;Multiply by fraction -- 16 bit answer

          ADCA #0                     ; is 8-bit integer and 8-bit fraction
                                      ;("ADCA #O" rounds integer byte up, if nec.)
          TAB                         ;Transfer result (0..255) into [B]
          PULA                        ;-[Get original sign -- positive or negative]
          TSTA                        ;Do we need to INCREASE or DECREASE
                                      ;time?
          BPL       LongerTime        ;(LCPcnt * TmpDif) is still in [B]
;Need to reduce cook time seconds
ShorterTime:
          LDAA      #100              ;Start with a "full" second (i.e. 100/100's)
          SBA                         ;SUBTRACT the calc'd adj value ([B]) from
                                      ;100
```

```
            BCS     ClipToMin           ;If [B] was > [A], clip to min
            CMPA    #LC100Min.          ;Else are we below minimum value?
            BHS     LCAdj100sDone       ;If > = min, we're all set

ClipToMin:
            LDAA    #LC100Min           ;Else clip to minimum value...
            BRA     LCAdj100sDone

;Need to extend cook time seconds
LongerTime:
            LDAA    #100                ;Start with a "full" second (i.e. 100/100's)
            ABA                         ;Add the calc'd adj value ([B]) to 100
            BCS     ClipToMax           ;If [B] + [A] > 255, clip to max value

            CMPA    #LC100Max.          ;Else compare result to max:
            BLS     LCAdj100sDone       ;If < = max, we're all set

ClipToMax:
            LDAA    #LC100Max.          ;Else clip to maximum allowed value
;opt        BRA     LCAdj100sDone
LCAdj100sDone:                          ;Need to return adjusted 100's value in [A] . . .
                                        ;Subtract 1 -- we count from 99 down to -1 to
            DECA                        ;get one full second, etc

            PULX                        ;--(Restore the original state vars ptr)
            RTS                         ;(On exit, [X] still points to state vars rec)
;------------------------------------------------------------------------------------------------
;D o S t a t e 1 0 0 H z T m r s (Do State 100Hz Timers) Subroutine
;
;This routine takes care of the 100 Hz timers and clocks that are directly associated with
;the state variables record.
;
;Cooking and Holding timers receive special attention: A Load Compensation
;calculation is used to decide how long a "second" of cook time should be, based on
;whether we are over or under the current product setpoint and what level of load
;compensation is used.
;
;One second of cook time when no Load Compensation is in effect or when we are
;currently right on the setpoint temperature, is exactly 100 1/100's (0..99). When Load
;Compensation is in effect, however, we might tally another second of cook time either
;sooner or later than the normal 100 1/100's. For example, if we are above setpoint, we
;may tally the next second of cook time after only 95/100's actual time (because the
;product is cooking a little faster than it would at the setpt temperature). If below
;setpoint, one second may be 110/100's, for example.
;
;
;Input:          _CookTmr
;
;Output:         _CookTmr
;
;Routines Called:
;Exit State:                [A], [B], [X], CCR - indeterminate
;
;------------------------------------------------------------------------------------------------
DoState100HzTmrs:


;On entry here, [X] points to the state variables record.
AlmEoc:
            LDD     _AlmEoc100s$,X          ;Get the Alm/Eoc duration timer
            SUBD    #0001                   ;Subtract 1/100 second
            BMI     AlmEocDone              ;If not decremented to -1 . . .
            STD     _AlmEoc100s$,X          ; . . . then save the new value
AlmEocDone:
;Decrement the Cook timer 100's of a second.
;
;If 100's hit negative, just finished another "second". Need to reload 100's while
;decrementing SS's (rippling to MM's, if necessary).
;
;If Load Compensation is in effect, we may load 100's with more or less than 100/100's,
;to compensate for temperature being more or less than setpoint. (Note that reloading
;with "99" = 1 full second, since we count from 99 downto -1 . . . If no load comp is in
;effect, simply reload with unadjusted 99.
DecCook:
            LDAA    _CookTmr+_Sta,X         ;Test the top bit of the status byte;
            BPL     DecCookDone             ;If b7 = 0, timer is not Running --
                                            ;ignore...

            LDAA    _CookTmr+_100,X         ;Else decrement 1/100's:
            SSUBA   #1                      ;(*Note: _100 value is UNSIGNED
```

-continued

```
                                    ;255..0)
        STAA    _CookTmr+_100,X
        BCC     DecCookDone         ;If _100's decremented from 0 --> 255,
                                    ;need to reload 100's, decrement SS . . .

        JSR     GetLCAdj100s        ;Get new 100's value based on AirTmp
                                    ;SetptTmp, and LoadComp setting

        STAA    _LCAdj100,X         ;(Save for later reference, as when
                                    ;blinking colon leds at half "second" rate)

        STAA    _CookTmr+_100,X     ;Save new 100's reload value . . .
        DEC     _CookTmr+_SS,X      ; . . . and decrement seconds
        BPL     DecCookDone         ;If SS still >= 0, all done here

        LDAA    #59                 ;Else if seconds hits -1 ==> reload at
                                    ;59 sec.
        STAA    _CookTmr+_SS,X
        DEC     _CookTmr+MM,X       ; . . . and decrement minutes
        BPL     DecCookDone         ;If MM still >= 0, all done here

        LDAA    #59                 ;Else if seconds hits -1 ==> reload at
                                    ;59 min.
        STAA    _CookTmr+_MM,X
        DEC     _CookTmr+_HH,X      ;. . . and decrement hours
        BPL     DecCookDone
                                    ;If Hours hits -1 . . .
        LDAA    #TmrTimeOut.        ;. . . we've hit the end -- signal timed
                                    ;out!
        STAA    _CookTmr+_Sta,X

DecCookDone:

RTS
```

The "DoState 100HzTmrs" subroutine is preferably called every 1/100th second by the (hardware) TimerISR (Interrupt Service Routine).

The "AlmEoc100s" timer, handled at the start of DoState100HzTmrs, is separate from load compensation.

The values in the LCPercentsTbl are preferably implemented as 8-bit fractions (i.e. "X" in the table is implicitly the fraction "X"/256), but these multiplier constants do not need to be limited to fractional values. The multipliers could be 8-bit integer/8-bit fractional numbers, for example, to allow much more aggressive compensation.

In the preferred embodiment the cook time is sped up or slowed down by adding or subtracting "K * abs (SetptTmpF–AirTmpF)" to a nominal value of "100" when reloading the 1/100s component of the CookTmr countdown timer.

CookTmr. 100s:=100+K*(SetptTmpF–AirTmpF)

(where "K" is the multiplier for the current LoadComp setting)

An alternate correction calculation would make the adjustment directly proportional to the percent temperature difference rather than just the temperature difference itself. In this embodiment, an air temperature that was 15% too low, for example, could result in a cook timer "second" that was 15% longer, etc. For example, the time could be adjusted as follows:

CookTmr.100s:=100+K*((SetptTmpF–AirTmpF)/SetptTmpF)

Figure 5:
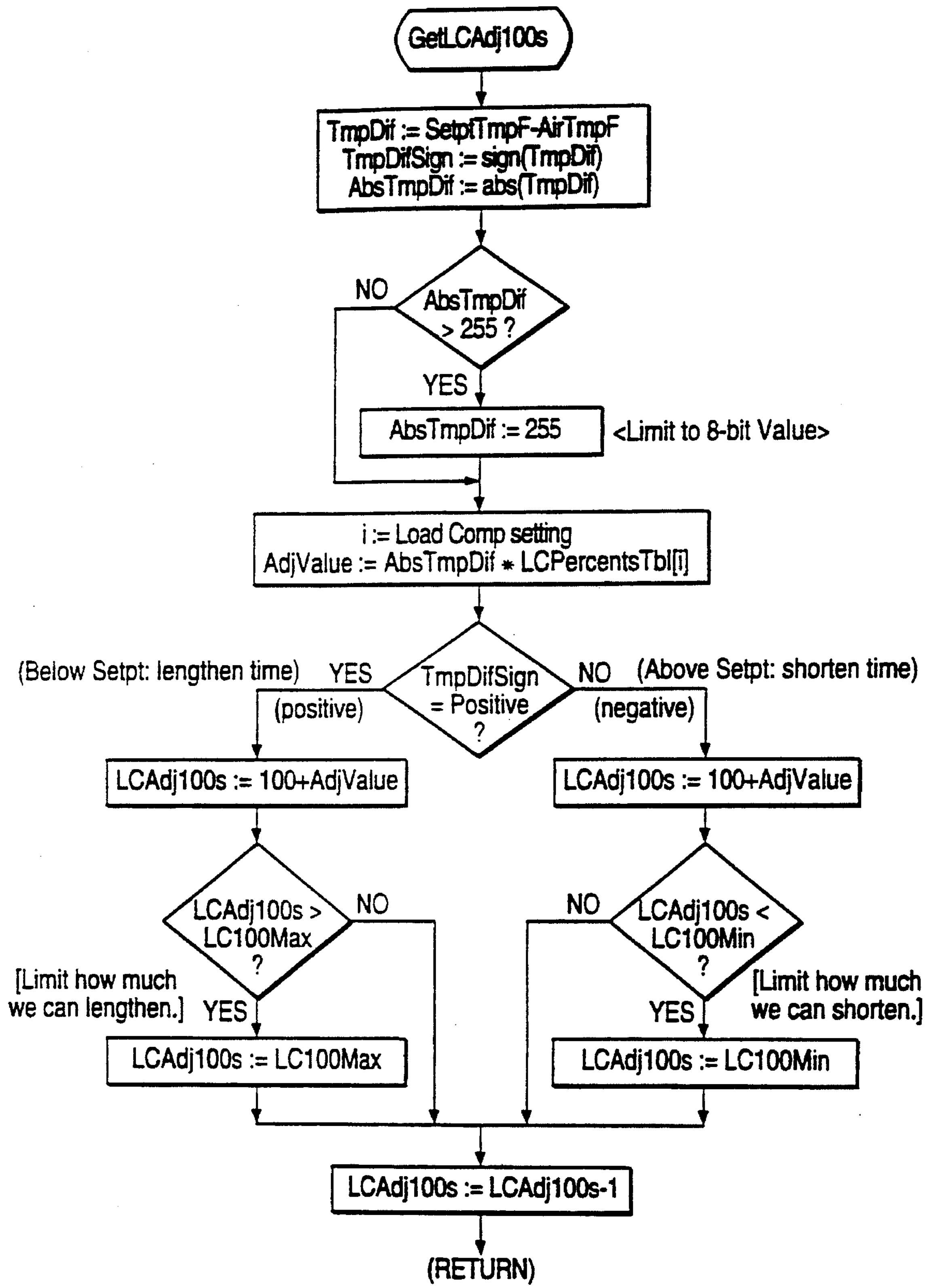
FIG. 5 is a flowchart for the "Dostate 100HzTMrs" subroutine.
Figure 6:
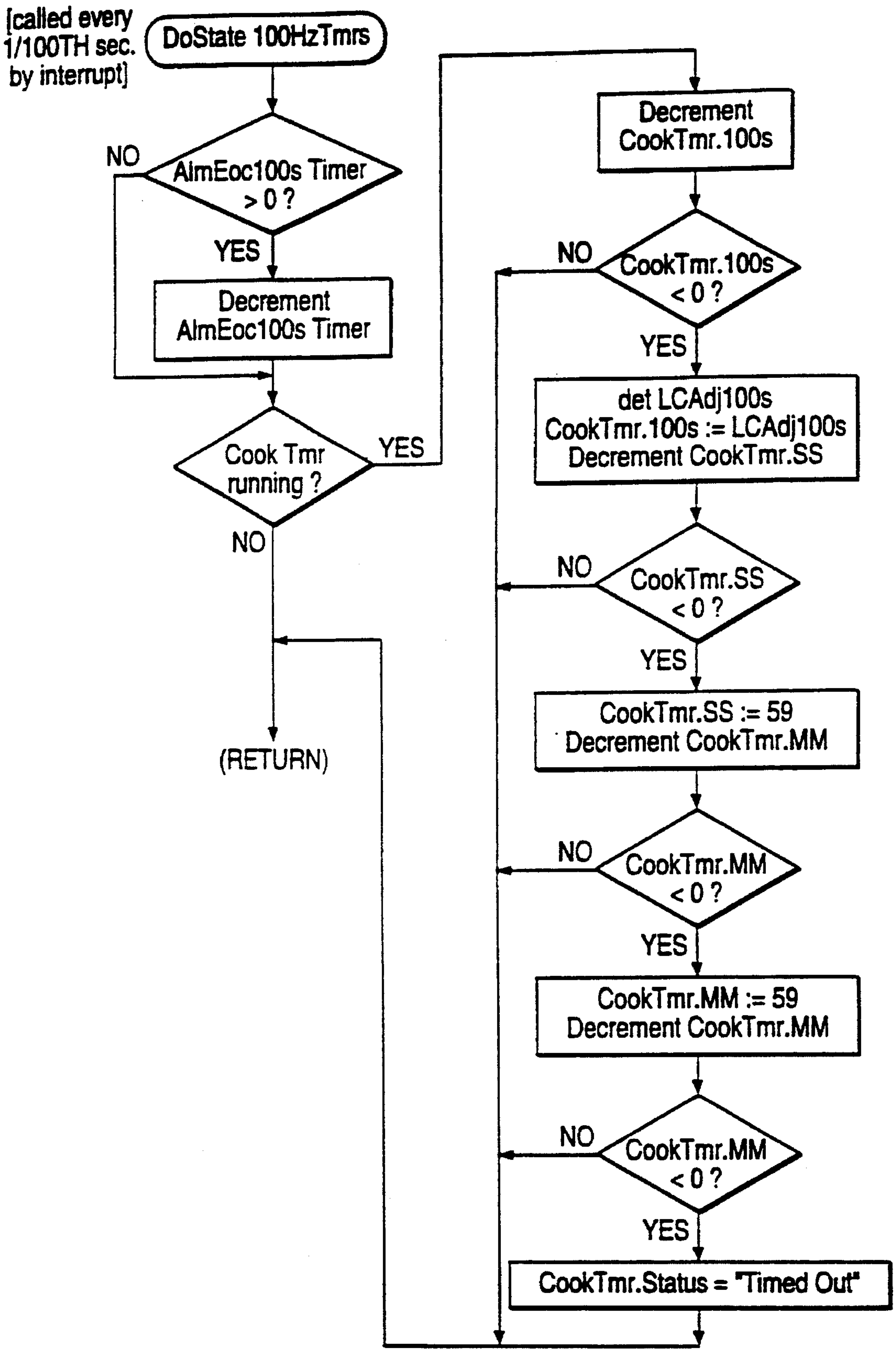
FIG. 6 is a flowchart for the "GetLCadj100s" subroutine.

A flow chart illustrating the steps in the "Dostate 100HzTMrs" subroutine is depicted in FIG. 5. A flow chart depicting the "GetLCadj100s" subroutine is depicted in FIG. 6.

The previously described hardware controller embodiments are usable with various types of food ovens. For example, but without limitation, the controller may be used in a rotisserie type oven, as discussed above. However, it is to be understood that the following control features are not limited to use in a rotisserie oven.

As described, for example, in U.S. Pat. Nos. 5,044,262 and 4,968,515, a rotisserie type food oven may be used to cook food in a cooking chamber by rotating the food about at least one axis within the cooking chamber. The rotation may be implemented by a rotor. The rotisserie type oven may include one or more types of heating elements to cook and/or brown the food. For example, one or more radiant heating elements and one or more air heating elements may be used. Typically, the air heating element(s) are used in combination with a fan (or blower) whereby the fan blows air over the heating elements to cause heated air to flow within the cooking cavity to assist in cooking the food. To control these (and other) components of the rotisserie, a controller may be used. To program and operate the controller, a user accessible control panel is provided. The control panel may include a plurality of input keys and displays.

The following is a description of another example of a controller which may be used to control a rotisserie of the type described above. However, the arrangement of the components need not be the same. Additionally, the concepts and features described below may be used in a controller to control other types of cooking appliances. Preferably, the controller is user accessible via a control panel which has a plurality of keys and displays, described in more detail below.

According to a preferred embodiment of the present invention, the rotisserie controller has several basic modes of operation. These modes include, without limitation, a STANDBY mode, a PREHEAT mode, a COOK mode, a HOLD mode, a PROGRAM mode, a SPECIAL PROGRAM mode and a TEST mode. The functions and operation of each of these modes is described below.

Figure 7:
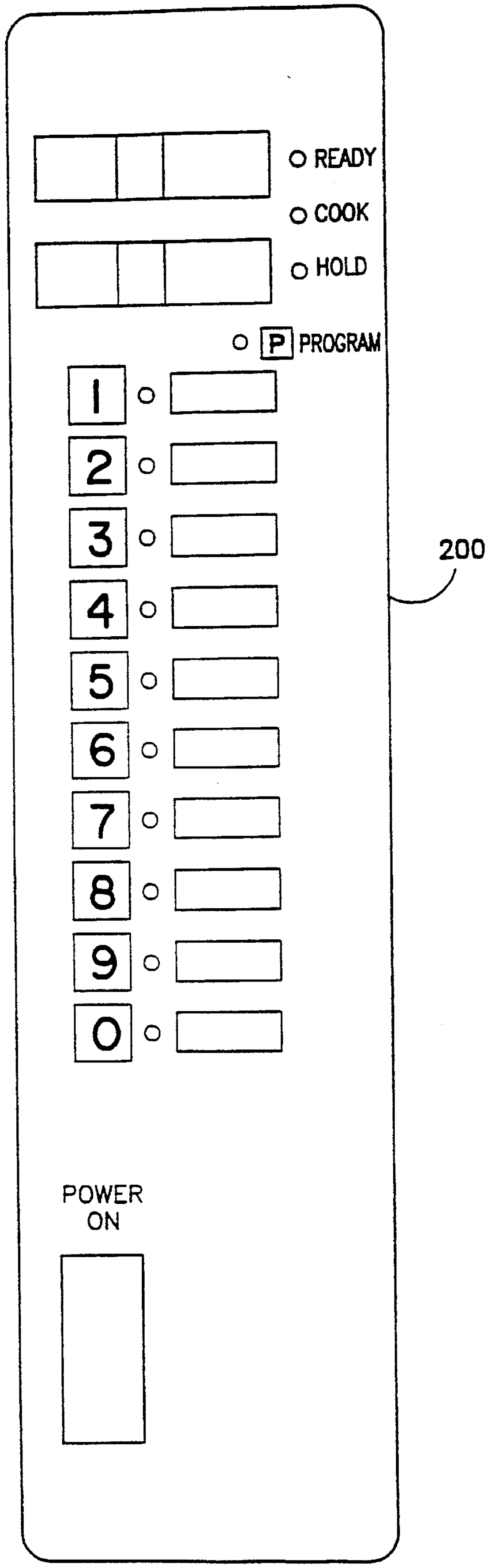
FIG. 7 is a schematic illustration of a control panel which may be used with one or more embodiments of the present invention.

As shown, for example, in FIG. 7, the control panel (200) may be configured as follows.

Preferably, located on (or adjacent to) the control panel 200 are (2) five-digit LED displays (201A, 201B) including a top and bottom (or left and a right) display. As further discussed below, these displays show the temperature, time and messages associated with a control operation. Additionally, a plurality of LEDs are provided. For example, there may be a READY LED, a COOK LED, and a PROGRAM LED. The READY LED turns on during PREHEAT when the air temperature is in the programmed READY range. It turns off during cooking, regardless of the air temperature. The COOK LED turns on when the COOK timer is running. The HOLD LED turns on when the HOLD timer is running. The PROGRAM LED flashes during PROGRAM mode.

Additionally, there are preferably a plurality of PRODUCT LEDs (1–9 and 0). One PRODUCT LED is located adjacent each PRODUCT switch. A PRODUCT LED turns on to show which product is selected, and flashes while the COOK and HOLD timers are running for that product. All PRODUCT LEDs turn on in PROGRAM mode when a product must be selected.

Preferably, there are 10 PRODUCT switches, labelled 1 through 9 and zero. However, any reasonable number of such switches may also be used. The PRODUCT switches are used to select a product and operate the COOK timers. Moreover, as described below, by providing 10 PRODUCT switches, these switches may also be used to enter numbers and other parameter values during PROGRAM mode.

A menu card window is preferably located adjacent the PRODUCT LEDs. When the menu card is installed, from the back of the control panel, the menu legends are visible above each PRODUCT switch. This enables ease of identification and replacement. A POWER switch, for example, a 2-position rocker switch, is located adjacent the PRODUCT switches. This switch controls power to the rotisserie and the control. A ROTOR switch (not shown), for example, a momentary contact-type switch, is located adjacent (or on) the control panel. Pressing the ROTOR switch overrides automatic control of the rotor, and turns the rotor motor on. An identical switch may be located on the opposite side of the rotisserie, especially when the rotisserie has two doors (e.g., on opposite sides of the rotisserie) for accessing the cooking chamber.

A speaker (not shown) is conveniently located in the control panel or any other suitable location. It is used to generate audible alarms (as discussed herein) and to provide switch feedback. Preferably, as described in more detail below, the control may be programmed to generate alarms having different volumes and different tones.

A general description of the various modes will now be provided, followed by a more detailed description of the functions and operations performed in these modes along with excerpts of the source code for the software routines which are run by the controller during these modes to control the operation of the cooking appliance.

In STANDBY mode, the control is waiting for the operator to select a product. Thus, the display scrolls "SELECT Product" across the LED displays. STANDBY is entered, for example, when power is applied to the rotisserie or when a COOK cycle timer is cancelled. In PREHEAT mode, the control preheats the rotisserie to the programmed PREHEAT temperature (discussed below). The PREHEAT mode is entered when a product is selected. From the PREHEAT mode, to enter the COOK mode and thereby start the COOK timer, the PRODUCT switch is pressed. In COOK mode, the control causes the display to display the time remaining in the COOK cycle and regulates the process outputs for each stage of the COOK cycle to the parameter settings programmed during the PROGRAM mode. The HOLD mode is an optional mode in which the control regulates the process outputs as programmed for holding product after it is cooked. HOLD mode is automatically entered after the COOK timer end-of-cycle (EOC) alarm. In the PROGRAM mode, the PREHEAT, COOK and HOLD parameters are set. PROGRAM mode is entered by pushing and holding the "Program" (P) switch. Once in PROGRAM mode, pushing and holding the "Program" switch causes the controller to exit the PROGRAM mode. In the SPECIAL PROGRAM mode, system settings are set. Such settings include, for example, probe calibration, selection of °F./°C. operation, READY RANGE limits, and CPU temperature display. SPECIAL PROGRAM mode is entered by pressing and holding the PROGRAM switch until the displays show "SPCL Prog". SPECIAL PROGRAM mode is exited by pressing and holding the "Program" switch. The TEST mode enablers various output tests to be performed as described below.

Figure 8:
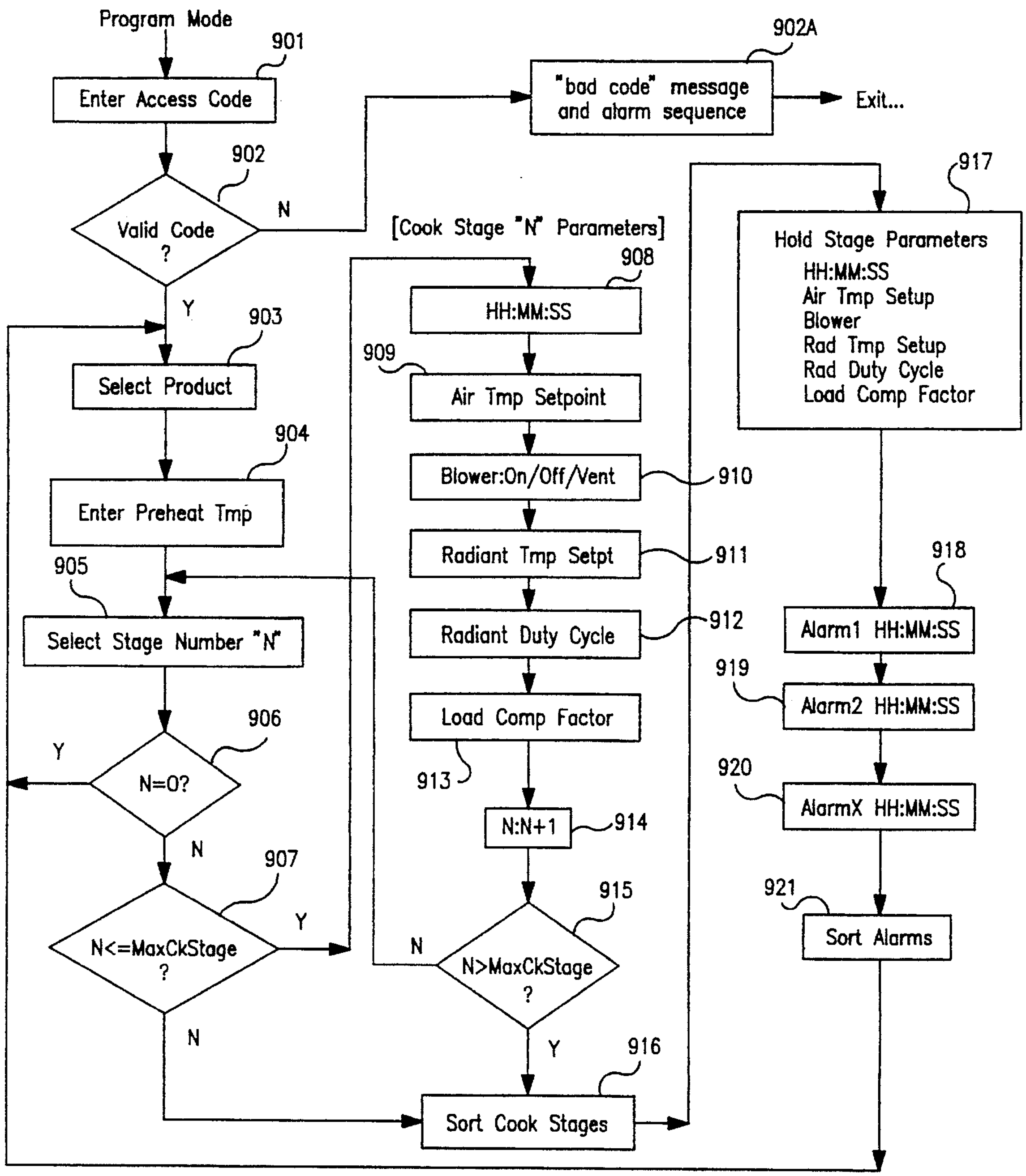
FIG. 8 is a flow chart of the PROGRAM mode.
Figure 8A:
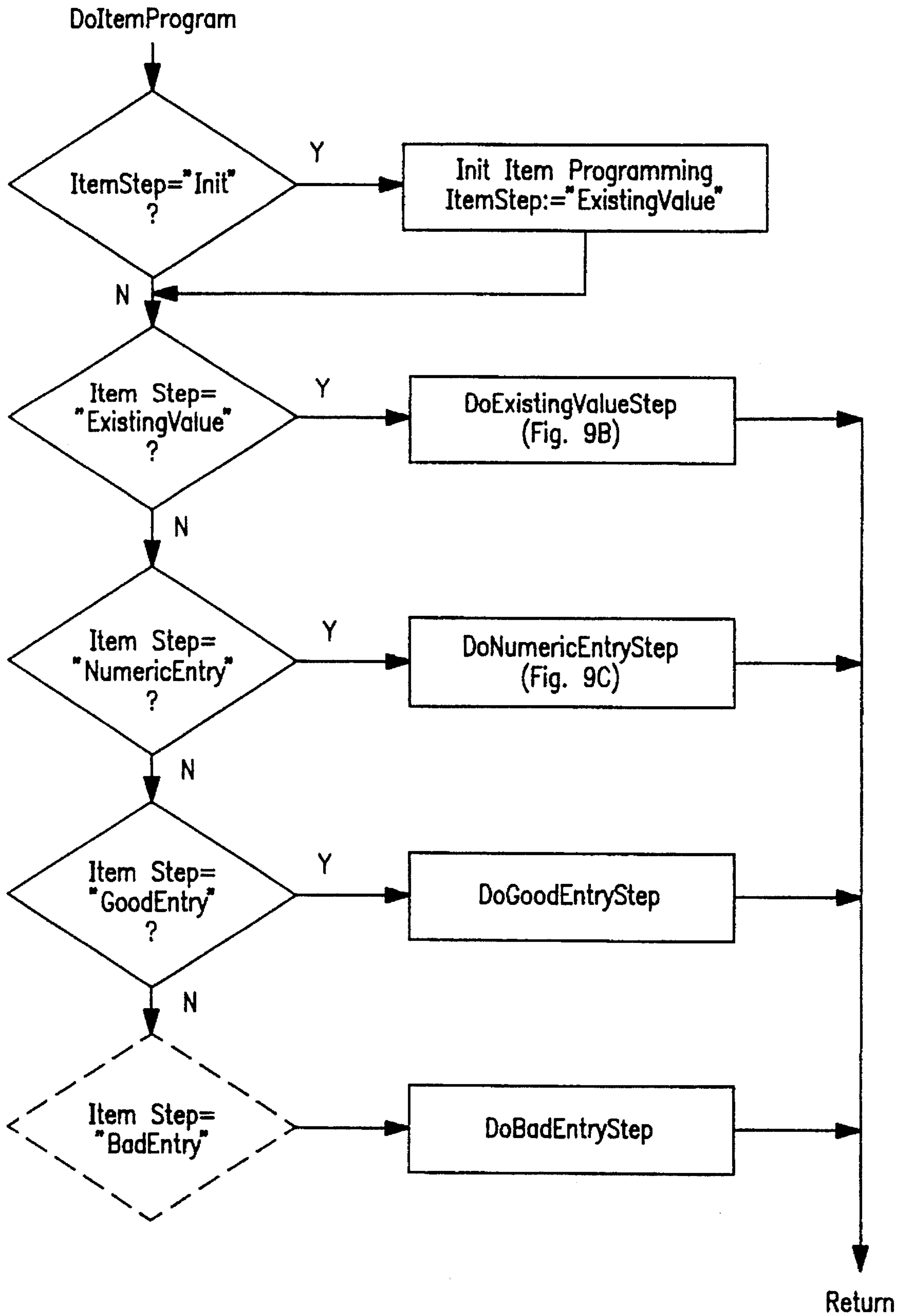
FIG. 8A–8E are subroutines performed during PROGRAM mode.

According to a preferred embodiment, in PROGRAM mode, the control can be programmed by a user for up to 10 products. Each PRODUCT program, corresponding to a COOK cycle, can include 10 COOK stages, an optional HOLD stage, and four process alarms. Of course, other numbers of stages and alarms could easily be accommodated. With reference to FIG. 8, a description of one embodiment of the PROGRAM mode will now be described. PROGRAM mode is entered by pressing and holding the PROGRAM ("P") switch until the displays show "Prod Set", then the top display shows "Code". An access code is entered (step 901) with the PRODUCT keys to prevent unauthorized use of the PROGRAM mode. Once the proper access code is entered (step 902), the top display scrolls "SELECT Product", the bottom display shows "0–9", and all product LEDs turn ON. If no key is pressed for 15 seconds after the "Code" message display, the speaker sounds an alarm, the displays show "code" and "- - - ", and the control resumes operation. If an invalid password is entered, the displays flash "Bad" and "Code" (902*a*), and the speaker sounds at the maximum volume for 10 seconds. The control then resumes operation. Once access has been granted, the top display scrolls "SELECT Product" and the bottom display shows "0–9". As in COOK mode, the desired product is selected by pressing one of the PRODUCT keys (0–9) (step 903).

When the product has been selected in PROGRAM mode, the displays are used in a consistent way. The top display describes the parameter and the bottom display shows the current value of the parameter. Once the product is selected, each press of the program switch advances to the next parameter. The parameters are described below.

Next, the PREHEAT temperature is selected (step 904) by using the PRODUCT keys and pressing the PROGRAM switch, which acts like an ENTER key in this mode. The PREHEAT temperature is the temperature to which the control will regulate the air and radiant heat elements during PREHEAT mode. For this parameter, the top display shows "PrHt" and the bottom display shows preheat temperature in degrees. Next, the top display shows "ST.=" (stage), and the bottom display shows a stage number. The displayed stage number is the stage that will be selected if the PROGRAM switch is pressed. If a PRODUCT switch (0–9) is pressed, followed by the PROGRAM switch, the control will immediately access the selected stage (0–9) for programming (step 905). For example, after the PREHEAT is programmed, the displays may show "St.=1". If the program switch is pressed here, the stage 1 programming is entered. Alternatively, if "5" is pressed followed by the PROGRAM switch, the control jumps to stage 5. If the selected stage is "0" (step 906), control returns to step 903, otherwise control proceeds to step 907. If the selected stage number (N) is not less than or equal to the maximum number of COOK stages (e.g. 10), control passes to step 908. Otherwise, it proceeds to step 908. In steps 908–913, the parameters for COOK stage N are selected. For purposes of example, it will be assumed that the Stage 1 parameters are being programmed.

First, the Stage 1 cook time is set (step 908). The Stage 1 COOK time is the total COOK time for a COOK cycle (all stages) in hours and minutes. All other COOK stage times are then set and displayed in terms of time remaining to the end of the COOK cycle. The top display shows "St. x", where "x" is the stage number and the bottom display shows stage time in hours and minutes.

The Stage 1 COOK time seconds is the total COOK time seconds. This time is added to the stage 1 COOK time in hours and minutes programmed above. This step can be skipped if it is only necessary to use hours and minutes. The left display shows "St. 1", "sec". The right display shows ":xx", where "xx" is the time in seconds. The time can be set from 0 to :59

Next, the Stage 1 AIR TEMPERATURE setpoint is set (Step 909). This is the setpoint to which the air heat elements will be regulated during the stage. For this parameter, the display shows "Air", and the bottom display shows setpoint in degrees. The PRODUCT keys are used to select this temperature. Then, the Stage 1 FAN (blower) status may be set to ON, OFF or VENT (step 910). For this parameter, the top display shows "Fan", and the bottom display shows VENT, ON or OFF. Any PRODUCT key may be pressed to cycle the setting through VENT, ON, OFF, VENT, etc.

In steps 911–912, the RADIANT HEAT setpoint and its DUTY CYCLE are set. The Stage 1 RADIANT HEAT TEMPERATURE setpoint is the temperature limit for the radiant heat elements during the stage. The Stage 1 radiant heat DUTY CYCLE percent is the duty cycle that the radiant heat elements will be on during the stage. For this parameter, the top display shows "rAd", and the bottom display shows "xxx%", where "xxx" is the duty cycle in percent.

The control will cause the radiant heat elements to operate according to the programmed DUTY CYCLE when the air temperature is at or below this setpoint. The radiant heat will be off when the air temperature is above this setpoint. Top display shows "rAd°" and the bottom display shows the setpoint in degrees.

In step 913, the Stage 1 LOAD COMPENSATION FACTOR is set. This is the load compensation setting for the stage. 0 is minimum (no load compensation), and 10 is maximum load compensation. The load compensation adjustment is calculated based on the higher of the radiant and air temperature setpoints as discussed in connection with other embodiments. For this parameter, the top display shows "LdCo" and the bottom display, shows "LC:xx", where "xx" is the load compensation setting.

After stepping through all stage 1 parameters, the top display shows "St. =", and the bottom display shows the number of the next stage (step 914) and control returns to step 905, if this is not the last stage (step 915). Pressing the "P" switch at this point causes entry to the displayed stage number parameters. Alternatively, the desired stage number can be entered, and the entered stage is accessed. For example, after programming all stage 1 parameters, the display shows "St. =", "2". If "P" is pressed, programming continues with the stage 2 parameters. If, instead of pressing "P", 3 is entered, then "P" is pressed, programming continues with stage 3. Thus the user may set the parameters for stages 2–10 in substantially the same way. As noted above, however, the time set will be the time remaining in the COOK cycle when the stage is entered. After setting the desired parameters for stages 2–10, the HOLD stage parameters may be set(step 917), if desired.

The HOLD stage time is the total product HOLD time in hours and minutes. For this parameter, the top display shows "Hold" and the bottom display shows the total HOLD time in hours and minutes. If the HOLD time is set to 0:00, then the HOLD parameters will not appear during programming. The HOLD stage time SECONDS is the HOLD stage time seconds which are added to the HOLD time hours and minutes, programmed above. For this parameter, the top display shows "HOLD", "sec" and the bottom display shows the HOLD time seconds. The HOLD stage AIR TEMPERATURE setpoint is the temperature to which the air heat elements are regulated during the HOLD stage. For this parameter, the top display alternates "Hold", Air°" and the bottom display shows the AIR TEMPERATURE setpoint in degrees. The HOLD stage FAN status is the fan status during the HOLD stage. For this parameter, the top display alternates "Hold", "FAN" and the bottom display shows VENT, ON, or OFF. Any PRODUCT key may be pressed to cycle through VENT, ON, and OFF. The HOLD stage radiant heat DUTY CYCLE percent is the duty cycle that the radiant heat elements will be on during the HOLD stage. For this parameter, the top display alternates "Hold", "rAd" and the bottom display shows duty cycle in percent. The HOLD stage RADIANT HEAT setpoint is the temperature to which the radiant heat elements are regulated during the HOLD stage. For this parameter, the Top display alternates "Hold", "rAd°" and the bottom display shows the setpoint in degrees. The HOLD stage LOAD COMPENSATION FACTOR is the load compensation setting for the HOLD stage. For this parameter, the Top display alternates "Hold", "LdCo" and the bottom display shows "LC:xx", where "xx" is the load compensation setting. The load compensation can be set from 0 to 10. 0 is no load compensation, 10 is maximum load compensation.

As noted above, various alarms may be set (steps 918–920). Alarm 1 time, in hours and minutes is set in terms of the time remaining in the COOK cycle. For this parameter, the top display shows "AL x", where x=1 for alarm 1, 2 for alarm 2, etc. The bottom display shows the alarm time in hours and minutes. If all alarms are set to 0:00, the remaining alarms will not be displayed in PROGRAM mode. If more than one alarm is not set to 0:00, then only one "0:00" alarm will be shown. For example, if alarm 1 is 1:00, alarm 2 is :40, and alarms 3 and 4 are zero, then only alarms 1, 2 and 3 will be shown during programming.

The ALARM 1 time, SECONDS is the number of seconds which is added to the alarm 1 time hours and minutes, programmed above. This step can be skipped if it is only necessary to set the alarm time in hours and minutes. For this parameter, the top display shows "AL 1", "sec" and the bottom display shows the alarm time seconds. The seconds can be set from 0 to :59. Similarly, Alarms 2–4 may be set.

When programming the stage parameters, the top display alternates between displaying "St. x", and the parameter label, where "x" is the stage number. This acts as a reminder of which stage is being programmed.

During programming, preferably the numeric parameters are entered by using the PRODUCT keys as a numeric keypad. For example, to enter "400", the keys 4, 0 and 0 are pressed. Mistakes in parameter entry are cleared by pressing the "0" key until the display shows all zeros. The correct parameter can be entered at this point. Other known data entry techniques may also be used.

To prevent errors and for other reasons, parameter limits and resolution may be fixed. For example, COOK, HOLD and ALARM times between 0:00:00 and 18:00:00, with one second resolution are reasonable limits. For temperatures 140° to 425° F., with one degree resolution, are reasonable limits. For radiant heat duty cycle 0 to 100%, with 1% resolution are reasonable limits. For load compensation settings of 0 to 10, with 1 unit resolution.

If a parameter is entered that exceeds the parameter limits, an error message is sounded. The error message occurs when the PROGRAM switch is pressed to advance to the next item. If the value is too low, the bottom display flashes "too Lo", then the previous value of the parameter is shown. If the value is too high, the display flashes "too Hi". In either case, the top display shows the parameter prompt. It is not possible to advance to the next parameter until a valid parameter is entered.

PROGRAM mode can be exited at any time by pressing and holding the "Program" switch. PROGRAM mode will be exited automatically if no switches are pressed for 60 seconds, or some other predetermined time.

If no HOLD stage is required, the HOLD time can be set to zero. Similarly, if no alarms are required, all alarm times can be set to zero. Since all of the various stage parameters can be set for the HOLD stage, this means, for example, that HOLD mode can be programmed so that only radiant heat is used with no air heat as described above or vice versa. To skip past all COOK stage settings, directly to HOLD and alarm settings, a stage number greater than 10 (for example, 11 or 15) is entered when the top display shows "St. =" (step 905).

To COOK or HOLD with only radiant heat, and no air heat, the AIR TEMP setpoint can be programmed to a very low value, and the radiant heat setpoint can be programmed to the desired regulation point, with the radiant heat duty set as wide as required. To COOK or HOLD with only air heat, and no radiant heat, the radiant heat duty cycle is set to zero. In this case, the radiant heat setpoint does not matter.

Figure 8B:
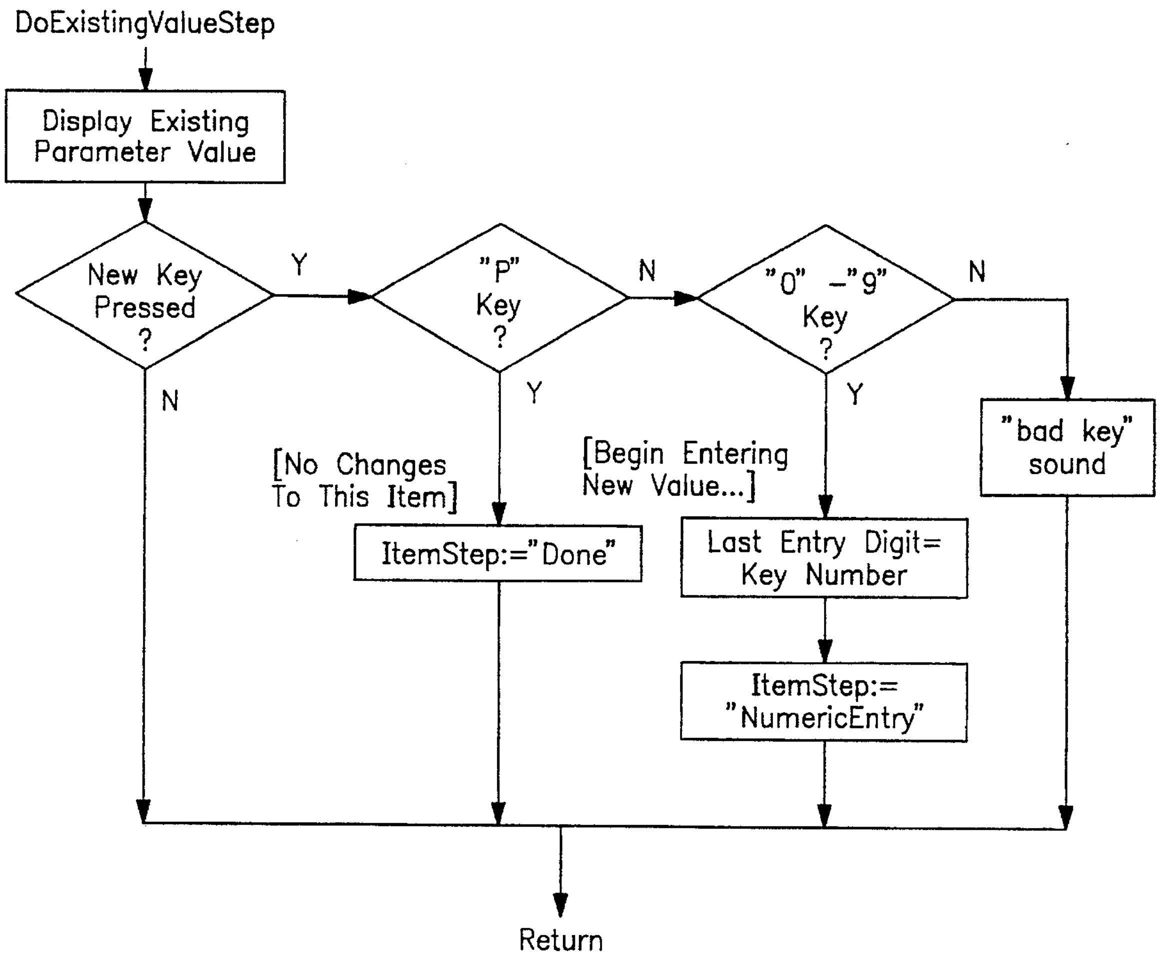
Figure 8C:
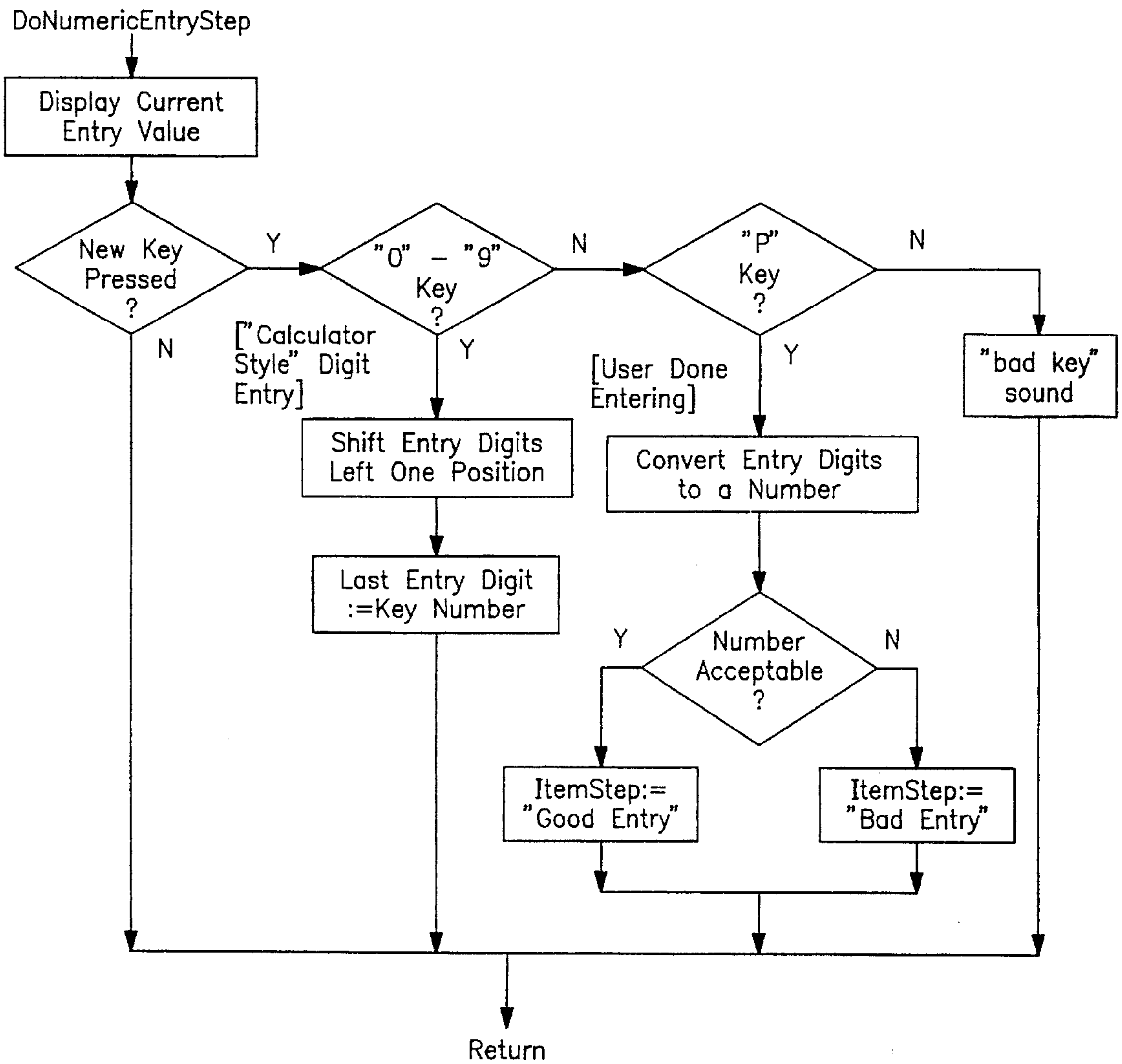
Figure 8D:
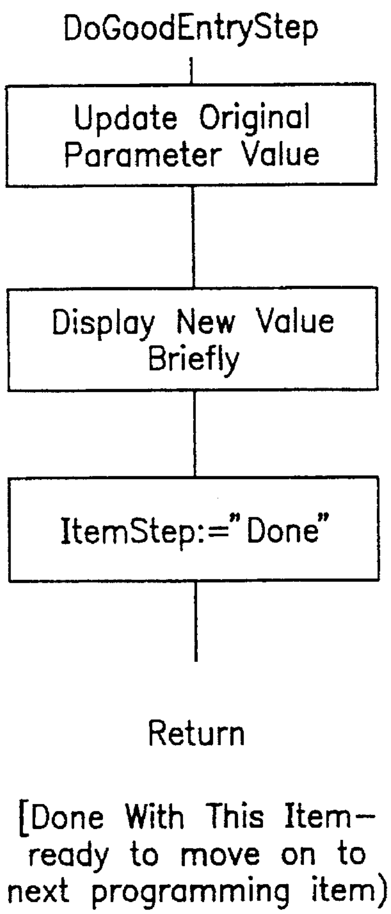
Figure 8E:
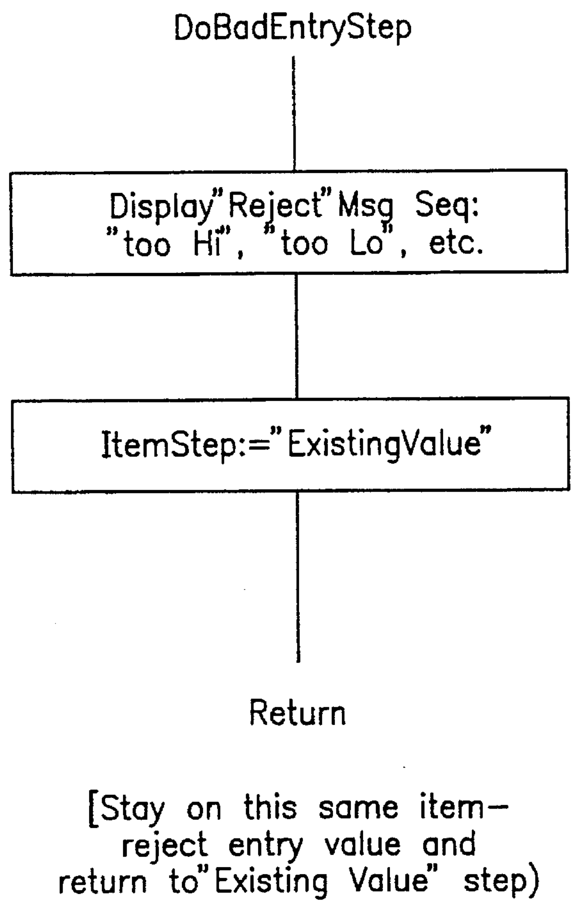
Figure 9:
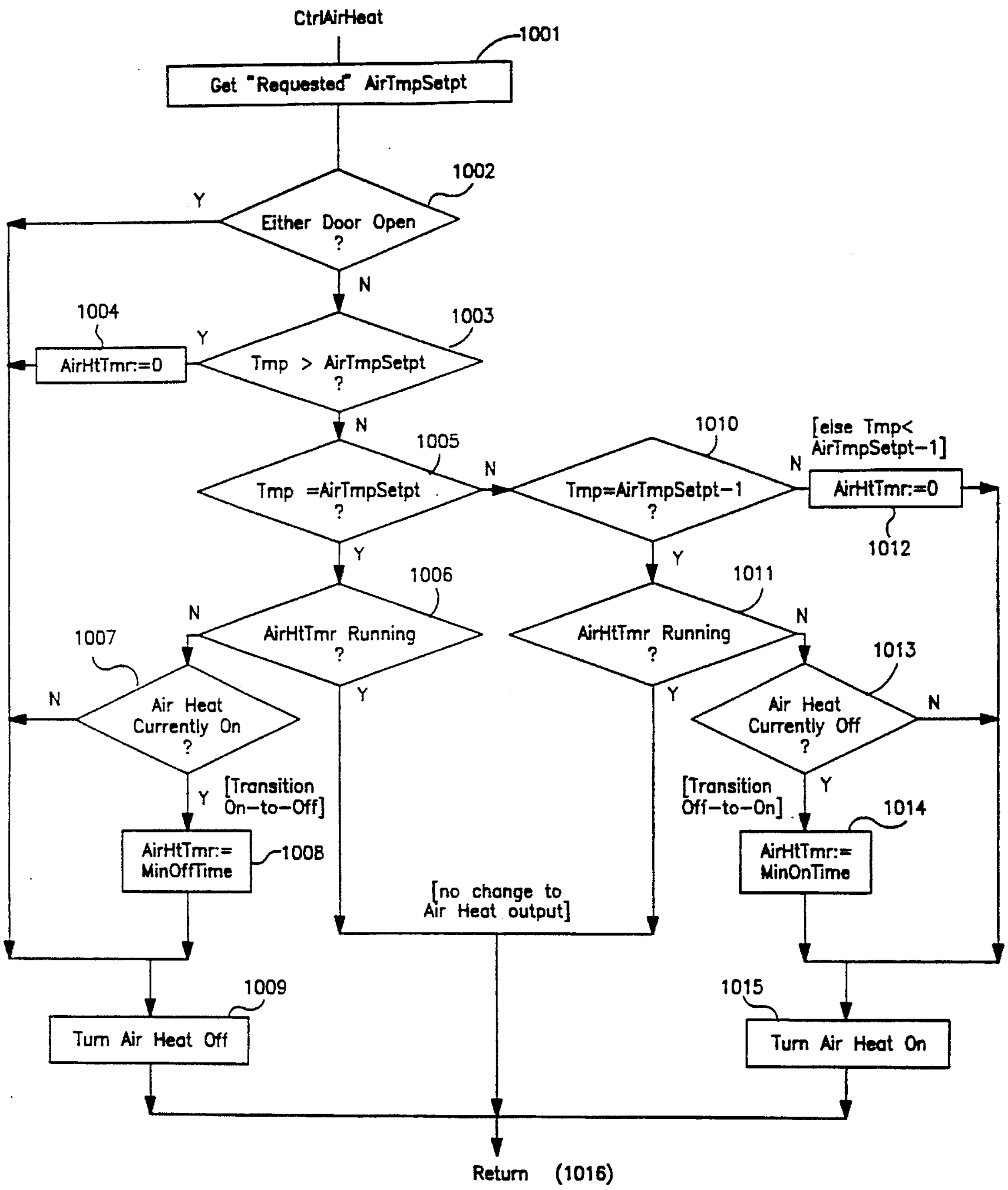
FIG. 9 is a flow chart of the AIR HEAT control.

In PROGRAM mode, data may be entered in various ways. For example, as shown in FIGS. 8A–8E, the item (parameter) displayed well generally be displayed with an existing value or is initialized to set an "existing value." Selection of the existing value is performed as shown in FIG. 8B. Entry of a numeric value is performed as shown in FIG. 9C. If an entry is a "good entry" (e.g. a valid entry) the good entry routine is performed as shown in FIG. 8D. If a bad entry (e.g. invalid entry) the routine of FIG. 8E is performed.

By way of example, an excerpt of a software routine for enabling items (e.g. parameters) to be programmed with data values is as follows.

```
-- Programming mode

;-----------------------------------------------------------------------
;
;       . E X i t e m P r . S R C
;
; The routines in this file provide the item programming routines, for
; all "standard" item types.
;
; Callers to the DoItemProgram routine must initialize proper item
; description parameters, such as ItemType, ItemSrcPtr$, etc.  The caller
; initializes "ItemStep" to 0, then passes I/O control to this routine
; until the caller sees ItemStep = 99, which indicates the user and this
; routine are done with the current item.
;
; If the user has made "acceptable" (in range) changes to the current item's
; value, this routine will update the actual parameter value (via the
; ItemSrcPtr$) and will set the PrgChanged flag to $FF.  The PrgChanged flag
; is never reset by the code included here, so it may be used as a "changed"
; indicator for an individual parameter value, or for a group of parameters,
; as a product record, etc.  It is the caller's responsibility to make sure
; the "PrgChanged" flag is reset as needed.  It is also the caller's
; responsibility to update checksums and secondary copies of parameters,
; as the code here only updates the variable pointed to by ItemSrcPtr$.
;
;-----------------------------------------------------------------------

        .include D:\HStd.L10

; External Variables:

        .extern page0 ScrollCode, page0 ScrollSrcPtr$, page0 ScrollDigPtr$
        .extern page0 ScrollTmr, page0 ScrollDelay.

        .extern page0 BlnTmr, Tmr16HzBit., Tmr8HzBit., Tmr4HzBit., Tmr2HzBit.
        .extern page0 [illegible]
        .extern page0 CurKey, page0 KeyHeldMS, page0 KeyHeld100
        .extern page0 BeepTmr

        .extern LDigits, RDigits
        .extern LDig1, LDig2, LDig3, LDig4, LDigLeds
        .extern RDig1, RDig2, RDig3, RDig4, RDigLeds
        .extern _Dig1, _Dig2, _Dig3, _Dig4, _DigLeds, ColonLeds.

        .extern ModeLeds, SearLed., CookLed., HoldLed., SetLed.
        .extern ZSearLed., ZCookLed., ZHoldLed., ZSrCkHdLed., ZSetLed.

        .extern page0 KeyStat
        .extern KeySet., KeyStStp.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.

        .extern PrgPending, PrgPendClk
        .extern ExitPending, ExitPendClk

        .extern PrgChanged

        .extern ItemStep, ItemSubStep
        .extern ItemType, ItemSrcPtr$, ItemPrDigPtr$, ItemNumPtr$
        .extern ItemDigits, ItemDig1,ItemDig2,ItemDig3,ItemDig4,ItemDigLeds
        .extern ItemZeroBlanking
        .extern ItemMatch1$, ItemMatch2$, ItemLoLmt$, ItemHiLmt$
        .extern ItemErrCode, ItemMsgSeq$

        .extern ItemListEntry, ItemListMax

        .extern NumEntryStep
        .extern NumDigits, NumDig1, NumDig2, NumDig3, NumDig4
        .extern NumValue$

        .extern DegCMode, DegSym

        .extern page0 TempByte, page0 TempWord$, page0 [illegible]
        .extern page0 IndexI, page0 IndexJ, page0 PtrI$, page0 PtrJ$

; Messages

        .extern MsgBlanks.
        .extern MsgToo., MsgHi., MsgLo., MsgBad., MsgHr.

; External routines:

        .extern ShowScrollMsg

        .extern FlexibleBCD, StrictBCD
        .extern BinToBcd2Dig, BinToBcd3Dig, BinToBcd4Dig
        .extern DisplayTmp, DisplayTime, DisplayPcnt
        .extern GetKey, ChkKeyPressed

        .extern StartBzr, StartSong
        .extern BadKeySound, GoodEntrySound, BadEntrySound

        .extern ShowMsg, ShowMsgSeq
        .extern DegCToDegF

; Routines, Constants declared here:

        .global Num2DigType., PcntType.
        .global TimeType., TmpType., Num4DigType.

        .global DoItemProgram

        .global ProgListItem, ProgDigItem

; "Item Types" are used to identify the format and size of the item
; double-byte value.  b7 = "0" ==> single byte;  b7 = "1" ==> double byte.
; (This does not apply to "CustomType" parameters.)

Num2DigType.    .equ    $01     ;Single-byte, 2 digit number
PcntType.       .equ    $02     ;Single-byte, 0..100

TimeType.       .equ    $81     ;Double-byte, Hours:Min or Min:Sec
TmpType.        .equ    $82     ;Double-byte, Temperature
Num4DigType.    .equ    $83     ;Double-byte, 4 digit number

; Definitions internal to this routine

; The following "ItemStep" steps are used for item entry
; (ItemStep set to 99 when done with current item)

ItemExisting.   .equ    1       ;Show existing value
ItemNumEntry.   .equ    2       ;Numeric (calculator style) entry step

ItemGoodEntry.  .equ    4       ;Good value entered and accepted
ItemBadEntry.   .equ    5       ;Bad value entered -- show error message

; "Validation results"
;  used to describe the validity of the values entered by the user

NumGood.        .equ    0
NumInvalid.     .equ    1       ;(ie invalid format, like HH:MM w/ MM > 59)
NumLo.          .equ    2
NumHi.          .equ    3

;-----------------------------------------------------------------------
; P r o g L i s t I t e m  (Program List Item)  Subroutine
;
; This routine lets the user select a new value for a "list" type parameter.
;
; A "ListType" is basically an index value 0..ItemListMax.  Each time the
; user presses a number key, the current index is incremented, with
; wraparound after the last value back to the first.
;
; The display value is simply a message indexed with the value of the
; indicated list variable (pointed to by ItemSrcPtr$).  The table of
; messages is pointed to by ItemMsgTbl.
;
; Input:  ItemSrcPtr$, ItemPrDigPtr$, ItemMsgTbl
;
; Output:
;
; Routines Called:
; Exit State:         [A],[B],[X],CCR -- indeterminate
;
;
;
;-----------------------------------------------------------------------

ProgListItem:

; Steps of "List" parameter entry:
;    0 -- initialize --
;    1 -- displaying original value
;    2 -- new value pending
;   99 -- done

; See if we just entered this "List" parameter programming

ChkListInit:

        LDAA    ItemStep        ;Are we on the "init" step
        BNE     ListInitDone

        LDX     ItemSrcPtr$     ;If so, we need to copy existing value
        LDAB    0,X             ; into the ItemListEntry variable
        STAB    ItemListEntry

        INC     ItemStep        ;Move on to next step -- existing value

ListInitDone:

; Update the display to show the current entry value...
;
; If ItemStep = 1, we are still showing the original value (no blinking)
; Else ItemStep = 2 indicates user is showing a new value (blink at 4 Hz)

        LDAA    ItemStep        ;Are we still on step 1 (existing value)?
        CMPA    #1
        BEQ     ShowListValue   ; If so, display value without blinking

        LDAA    BlnTmr          ;Else "Entry" values always blink:
        BITA    #Tmr4HzBit.
        BNE     ShowListValue   ; If 4 Hz bit = 1, we are in "on" phase

ShowListBlanks:
        LDAB    #MsgBlanks.     ; Else time to show blanks...
        BRA     DoListDisplay

ShowListValue:
        LDX     ItemNumPtr$     ;Get a pointer to the list of option msgs
        LDAB    ItemListEntry   ;Get the current entry value
        ABX                     ;Add the current value as offset into table
        LDAB    0,X             ;Get the corresp. msg number from the table

;opt    BRA     DoListDisplay

DoListDisplay:
```

```
; Now handle the key inputs:
; Number keys 1..10 all advance to the next list option
; The "Set" key terminates the current entry string (like an [Enter] key).

        JSR     GetKey          ;See if any keys have been pressed...
        BEQ     ListKeyDone     ;(if not, nothing more to do here)


;   - - Is it the SET key? - - -

ListIsItSetKey:
        CMPA    #KeySet.        ;Is it the SET key?  (SET ==> "Enter" key)
        BNE     ListIsItNmbrKey

ListChkSave:                    ; If so, we're done with this item.
        LDAB    ItemStep        ; Do we have a new value to save back?
        CMPB    #2
        BLO     ListSaveDone    ;  If not on "pending entry" step, nothing new

        LDX     ItemSrcPtrs     ; Else save the new "list" value into the
        LDAB    ItemListEntry   ;  actual variable pointed to by ItemSrcPtrs
        STAB    0,X

        LDAB    #$FF            ;Set the "changed" flag to true
        STAB    PrgChanged
ListSaveDone:

        LDAA    #00             ;All done with programming this item
        STAA    ItemStep

; Also, this press of the set key may be the start of a
; "Press and Hold SET key to Exit" operation...

        LDAA    #$FF            ; If so, start the "Exit Pending" operation
        STAA    ExitPending
        CLR     ExitPendClk     ;  (user must Press and Hold to do exit)

        BRA     ListKeyDone


; - - - Is it a NUMBER key? - - -

ListIsItNmbrKey:                ;Else is it a number key 1..10?
        CMPA    #10
        BHI     ListOtherKey

ListNextValue:
        LDAB    ItemListEntry   ;Get the current entry value
        INCB                    ;Move on to the next option
        CMPB    ItemListMax     ;Are we past the max value?
        BLS     ListNextSave
        CLRB                    ; If so, wrap back to first option (#0)
ListNextSave:
        STAB    ItemListEntry


        LDAB    #2              ;Now on ItemStep #2 -- "Pending Entry"
        STAB    ItemStep        ;(we may have already been on this step)

        BRA     ListKeyDone


; Else some other key?

ListOtherKey:                   ;Else what other key???
        JSR     BadKeySound

.   BRA     ListKeyDone


ListKeyDone:


        RTS



;----------------------------------------------------------------------
;  V a l i d a t e I t e m   (Validate program Item) Subroutine
;
;  The new parameter value must be passed here as a 16-bit number in the
;  [X] register.  This routine checks to see if the value in [X] matches
;  either of the two "match" parameters (ItemMatch1$ or ItemMatch2$), or
;  is within the range ItemLoLmt$ to ItemHiLmt$.  If so, the ItemErrCode
;  will be returned set to 0.  Otherwise, the ItemErrCode will be set
;  to indicate the type of error: NumLo., NumHi., NumInvalid.
;
;
;  Input:  [X] -- 16-bit item value
;          ItemLoLmt$, ItemHiLmt$, ItemMatch1$, ItemMatch2$
;
;  Output: [B], ItemErrCode -- validation code (0 ==> "good")
;          CCR.Z -- indicates whether or not validation code is 0 ("good")
;               ( in JSR ValidateItem / BEQ GoodItem / BNE BadItem )
;
;  Routines Called:
;  Exit State:          [A],[B],[X],CCR -- indeterminate
;
;
;
;  ---------------------------            ---------------------------

ValidateItem:

; Check the value in [X] against Match values and Limits

MatchChk:
        CPX     ItemMatch1$     ;Does it match 1st discrete match value?
        BEQ     GoodValue

        CPX     ItemMatch2$     ;Else does it match 2nd discrete value?
        BEQ     GoodValue

RangeChk:
        CPX     ItemLoLmt$      ;If < Low Limit...
        BLO     LoValue         ; ...entry is too low

        CPX     ItemHiLmt$      ;If > High Limit...
        BHI     HiValue         ; ...entry is too low

        BRA     GoodValue       ;Else within range -- good value


; Return values:

GoodValue:
        CLRB
        BRA     ValidateDone

InvValue:
        LDAB    #NumInvalid.
        BRA     ValidateDone

LoValue:
        LDAB    #NumLo.
        BRA     ValidateDone

HiValue:
        LDAB    #NumHi.
        BRA     ValidateDone


ValidateDone:                   ;On return, ItemErrCode & [B] both hold the
                                ; validation code, and CCR.Z flag indicates
        STAB    ItemErrCode     ; whether or not that code is 0 (good) or not

        RTS


;----------------------------------------------------------------------
;  S t a r t I t e m E r r S e q   (Start Item Error Sequence)  Subroutine
;
;  This routine simply starts the display sequence for the error indicated
;  by the ItemErrCode.
;
;  Input:  ItemErrCode -- validation code (ie = NumInvalid., NumLo., or NumHi.)
;
;  Output: ItemMsgSeq -- set to the appropriate message sequence
;          DspTmr -- started with duration value of the selected msg seq
;          "BadEntry" speaker sequence initiated
;
;  Routines Called:
;  Exit State:          [A],[B],[X],CCR -- indeterminate
;
;
;
;----------------------------------------------------------------------

TooHiSeq        .byte   'M', 32, MsgToo., 20, MsgHi., 8, MsgBlanks., 0


TooLoSeq        .byte   'M', 32, MsgToo., 20, MsgLo., 8, MsgBlanks., 0
BadNbrSeq       .byte   'M', 32, MsgBad., 20, MsgNbr., 8, MsgBlanks., 0

StartItemErrSeq:

        LDAB    ItemErrCode     ;Get the item error code (set by validate rtn)

        LDX     #TooHiSeq
        CMPB    #NumHi.
        BEQ     SetBadMsgSeq

        LDX     #TooLoSeq
        CMPB    #NumLo.
        BEQ     SetBadMsgSeq

        LDX     #BadNbrSeq

SetBadMsgSeq:
        STX     ItemMsgSeq$     ;Save pointer to error message sequence

        LDAB    1,X             ;Get the Message Sequence duration from byte
        STAB    DspTmr          ; [1] of the actual message sequence definition

        JSR     BadEntrySound   ;Sound the "bad number/too high/too low" song


        RTS



;----------------------------------------------------------------------
;  S h o w 2 D i g V a l u e  (Show 2-digit Value)  Subroutine
;
;  S h o w 2 D i g E n t r y  (Show 2-digit Entry)  Subroutine
;
;  The "Show2DigValue" routine simply displays the existing 2-digit parameter
;  value -- pointed to by the ItemSrcPtrs -- in the displays pointed by
;  ItemPrgDigPtrs, using the "template" defined by ItemDigits and ItemAuxPtrs.
;
;  The "Show2DigEntry" routine simply displays the last two digits entered
;  (NumDig2, NumDig1) in the same format (as defined by the "template").
;
;  Input:
;
;  Output:
;  --
;  Routines Called:
;  Exit State:          [A],[B],[X],CCR -- indeterminate
;
;
;----            ---------------------------  ---------------------------

; ==> 1st entry point -- display the existing value
```

```
        LDX     ItemSrcPtr$     ;Get a pointer to the "existing" setting

        LDAB    0,X             ;Get the single byte value into [B]

        ASR     ItemZeroBlanking ;Get the "zero blanking" indicator into Carry
                                ; $FF ==> We DO want zero-blanking  (*)

        JSR     BinToBcdDig     ;Convert to 2 displayable digits in [B]

        BRA     Do2DigDisplay   ;Display digits now in [A] and [B]

; --> 2nd entry point -- display current entry value (last two digits entered)

Show2DigEntry:

        LDAA    NumDig2         ;Get the second to the last digit entered
        LDAB    NumDig1         ;Get the last digit entered

;opt    BRA     Do2DigDisplay   ;Display digits now in [A] and [B]


; - - - - - - - - - - - - - - - - - - - - - - - -
; Common code -- two digits are in [A], [B].
;
; Copy 2 digits into appropriate location in template.
; Then copy the template display into the actual display digits

Do2DigDisplay:

        LDX     ItemNumPtr$     ;Get pointer to the destination displays
        STD     0,X             ;Save 2-digit value into ItemDigN, ItemDigN+1

; Now copy "template" area into the actual display digits

        LDX     ItemPrDigPtr$   ;Get the pointer to the actual display digits

        LDD     ItemDig1        ;Get digits 1 and 2
        STD     _Dig1,X         ; copy into actual display digits

        LDD     ItemDig3        ;Get digits 3 and 4
        STD     _Dig3,X         ; copy into actual display digits

        LDAB    ItemDigLeds     ;Get the digit leds (colons, etc)
        STAB    _DigLeds,X      ; copy into actual display digit leds


        RTS

; (*) Note: ItemZeroBlanking flag should be all 1's or all 0's.
; "ASR ItemZeroBlanking" basically copies 1 or 0 into the Carry bit while
; leaving the byte value unchanged -- like a "test" instruction that
; sets the Carry bit to "1" if byte = $FF, else sets carry to 0 if byte = 0.
; Carry = 1 ==> we DO want leading zeroes to be blanked.



; ------------------------------------------------------------------------
; C n v V a l 2 D i g E n t r y  (Convert and Validate 2 Digit Entry) Subrtn
;
;  This routine converts the last two digits entered into a (binary) number,
;  saved into NumValue$, then checks the validity of that number using the
;  ItemHiLmt$, ItemLoLmt$, ItemNotchl$ and ItemNotch2$ variables.  If the
;  value entered is good, the original source variable (pointed to by
;  ItemSrcPtr$) is updated, the PrgChanged flag is set to $FF, and ItemErrCode
;  is reset to 0.  If the value is not good, then the original is left
;  unchanged, and the error status is saved into ItemErrCode.
;
;
;  Input:
;
;  Output:
;
;  Routines Called:
;  Exit State:          [A],[B],[X],CCR -- indeterminate
;
;
;
;------------------------------------------------------------------------

Cnv2DigEntry:

; Convert the digits entered into a binary number.

; First of all, we need to replace all _'s with 0's.
;
; In 2-digit programming, only NumDig2 could hold a "_" right now.

C.ChkNum2:
        LDAB    NumDig2         ;Get the second to the last digit entered
        CMPB    #9
        BLS     C.GotNum2       ; If digit = 0..9, ready to go

        CLRB                    ; Else must be "_" -- convert to "0"

C.GotNum2:
        LDAA    #10
        MUL                     ; [D] = 10*NumDig2  ([D] = 0..90)

; NumValue$ := 10*NumDig2 + NumDig1

        ADDB    NumDig1         ;Now add the last digit entered
                                ; Answer now in range 0..99 (fits into [B])
        CLRA
        STD     NumValue$       ;Save result as a 16-bit value


        RTS



;------------------------------------------------------------------------
; D o 2 D i g E x i s t (Do 2-digit Existing value step)  Subroutine
;
```

```
;  This routine also handles keys for this step.
;
;  Input:
;
;  Output:
;
;  Routines Called:
;  Exit State:          [A],[B],[X],CCR -- indeterminate
;
;
;
;------------------------------------------------------------------------

Do2DigExist:

; (ItemSubStep not used by this step...)


; First of all, update the displays for the current step

        JSR     Show2DigValue

; Now handle the key inputs:
; Number keys 1..10 begin the numeric entry step.
; The "Set" key terminates this programming item (no changes made...)

        JSR     GetKey          ;See if any keys have been pressed...
        BEQ     A.KeyDone

; S E T  k e y . . .

A.ChkSet:
        CMPA    #KeySet.        ;Is it the SET key?
        BNE     A.ChkNbr

        LDAA    #99             ; If so, signal "Done with this item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     A.KeyDone


; N u m b e r  K e y s  1 - 1 0 . . .

A.ChkNbr:                       ;Else is it a number key 1..10 or Clear?
        CMPA    #10
        BHI     A.KeyOther

        STAA    NumDig1         ;Save this key as the 1st entry digit

        LDAB    #2              ;Advance to the "entering new value" step
        STAB    ItemStep
        CLR     ItemSubStep     ; (entry routine needs to initialize)



        BRA     A.KeyDone


; O t h e r  k e y s . . .

A.KeyOther:                     ;Else what other key???
        JSR     BadKeySound

;opt    BRA     A.KeyDone


A.KeyDone:


        RTS

;------------------------------------------------------------------------
; D o 2 D i g E n t r y (Do 2-digit Entry step)  Subroutine
;
;  This routine lets the user enter digits calculator style, into the
;  appropriate 2 digits of the display template.
;
;
;  Input:
;
;  Output:
;
;  Routines Called:
;  Exit State:          [A],[B],[X],CCR -- indeterminate
;
;
;
;------------------------------------------------------------------------

Do2DigEntry:

; (ItemSubStep not used by this step...)

; Do we need to initialize 2-digit entry step?

        LDAA    ItemSubStep
        BNE     B.InitDone

; Init for 2 digit entry -- put "_" into left digit (NumDig2).
; First digit entered is already in NumDig1.

B.Init:
        LDAA    #Char.LoBar.    ;Get the "_" character
        STAA    NumDig2         ;Save into the "2nd-to-the-last digit entered"

        INC     ItemSubStep     ;Ready to proceed...

B.InitDone:


; Now update the displays for the current step.
; We are only concerned with the last two digits entered.
; Display them in the appropriate place in the "display template".
```

```
; Now handle the key inputs:
; Number keys 1..10 begin the numeric entry step.
; The "Set" key terminates this programming item (no changes made...)

        JSR     GetKey          ;See if any keys have been pressed...
        BEQ     B.KeyDone

;- - - - - - - - - - - - - - - - -
;
; N u m b e r   K e y s   1 - 1 0
;

B.ChkNbr:                       ;Else is it a number key 1..10?
        CMPA    #10
        BHI     B.ChkSet

        BLO     B.Append        ; Keys 1..9 --> use as is

        CLRA                    ; Else key 10 --> convert to "0"

B.Append:
        LDAB    NumDig1         ;Get the previous key entered
        STAB    NumDig2         ;Save as the "2nd to last key entered"

        STAA    NumDig1         ;Save new digit as "last key entered"

        BRA     B.KeyDone

;- - - - - - - - - - - - - - - - -
;
; S E T   K e y
;

B.ChkSet:
        CMPA    #KeySet.        ;Is it the SET key?
        BNE     B.OtherKey

        JSR     Cnv2DigEntry    ; Convert to numeric value, save in NumValue$

        LDX     NumValue$
        JSR     ValidateItem    ; Validate entry value (range check...)
        BNE     B.Reject        ;  ( BNE --> something wrong )

B.Accept:                       ; Good value (in range) entered:
        LDAA    #3              ;
        STAA    ItemStep        ; Advance to the "good entry" step
        CLR     ItemSubStep     ;  (this will save new value)

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     B.KeyDone

B.Reject:                       ; Bad value (out of range) entered:
        LDAA    #4              ;
        STAA    ItemStep        ; Advance to the "bad entry" step
        CLR     ItemSubStep     ;(Type of error indicated by ItemErrCode)

                                ;(no ExitPending on a bad entry...)
        BRA     B.KeyDone

;- - - - - - - - - - - - - - - - -
;
; O t h e r   K e y s . . .

B.OtherKey:                     ;Else what other key???
        JSR     BadKeySound

B.Exit  BRA     B.KeyDone


B.KeyDone:


        RTS


;------------------------------------------------------------------------
; D o 2 D i g G o o d  (Do 2-digit "Good Entry" step)  Subroutine
;
; This routine simply pauses for a brief time to display the new value
; of the "accepted" 2-digit entry.  At the end of the brief pause, the
; ItemStep is set to 99 to indicate we are done with this item.
;
;
; Input:
;
; Output:
;
; Routines Called:
; Exit State:           [A],[B],[X],CCR -- indeterminate
;
;
;
; -----------        ----------       ---------------------------------------

Do2DigGood:

; Good value entered -- save new value, display briefly before moving on

        LDAB    ItemSubStep     ;Did we just get here?  If so, need to init
        BEQ     D.InitDone

D.Init:
        LDX     ItemSrcPtr$     ;Get pointer to the source variable
        LDD     NumValue$       ;Get the newly entered value
        STAB    0,X             ;Save the new single-byte value

        LDAB    #$FF            ;Set the "Changed" flag
        STAB    PrgChanged

        LDAB    #8              ;Start the display timer for a "brief"
```

```
D.InitDone:


; Simply display the new (existing) value for a short time,
;  and discard any keys pressed during this time

        JSR     Show2DigValue   ;Display the value at ItemSrcPtr$

        JSR     GetKey          ;If any keys pressed, fetch and discard


; Are we done yet?  DspTmr is used to time the "brief delay" that we spend
; displaying the new value before we move on to the next parameter...

        LDAA    DspTmr          ;If DspTmr is still counting down (ie > 0...)
        BNE     D.Done          ; ...then nothing more to do for now

        LDAA    #99             ;Else DspTmr has expired -- signal that
        STAA    ItemStep        ; we're ready to move on to the next item

D.Done:


        RTS


;------------------------------------------------------------------------
; D o 2 D i g B a d  (Do 2-digit "Bad Entry" step)  Subroutine
;
; This routine simply pauses for a brief time to display an error message
; and sound a "bad entry" tone.  At the end of the brief pause, the ItemStep
; is set to 1 in order to return to the initial "Show Existing Value" step.
;
;
; Input:
;
; Output:
;
; Routines Called:
; Exit State:           [A],[B],[X],CCR -- indeterminate
;
;
;
;------------------------------------------------------------------------

Do2DigBad:

; Bad value entered -- start the error message display sequence,
;  sound the "bad entry" tone

        LDAB    ItemSubStep     ;Did we just get here?  If so, need to init
        BEQ     E.InitDone

E.Init:                         ;Start the display sequence that corresponds
        JSR     StartItemErrSeq ; to the ItemErrCode error type, and sound
                                ; the standard "bad entry" tone.

        INC     ItemSubStep     ;All done with the initialize step

E.InitDone:

; Display the error message,
;  discard any keys pressed during this time

        LDD     ItemPrDigPtr$   ;Keep the display sequence going
        LDX     ItemMsgSeq$     ; in the Programming Digits display
        JSR     ShowMsgSeq


        JSR     GetKey          ;If any keys pressed, fetch and discard


; Are we done yet?  DspTmr is used to time the "brief delay" that we spend
; displaying the new value before we move on to the next parameter...

        LDAA    DspTmr          ;If DspTmr is still counting down (ie > 0...)
        BNE     E.Done          ; ...then nothing more to do for now

        LDAA    #1              ;Else DspTmr has expired --
        STAA    ItemStep        ; return to the "display existing value" step
        CLR     ItemSubStep

E.Done:


        RTS


;------------------------------------------------------------------------
; P r o g 2 D i g I t e m  (Program Two Digit Item)  Subroutine
;
; This routine lets the user enter a new value for a numeric 2 digit item.
;
; The actual display information is generally assembled in the ItemDigits
; working variables, then copied into the actual display digits pointed to
; by ItemPrDigPtr$.
;
; The 2-digit number is displayed in the ItemDigits pointed to by
; ItemNumPtr$, and the remaining ItemDigits and ItemDigLeds must already
; be defined by the caller.  These other digits are generally set up like a
; template.  When programming a load compensation factor, for example, we
; can establish a display format of "LC:xx", where "xx" is the actual value
; of the parameter.  This is accomplished by setting ItemDig1 & ItemDig2 to
; "LC", turning the ColonLeds on in the ItemDigLeds byte, and setting
; ItemNumPtr$ to point to ItemDig3, so that the 2 digit number is
; displayed in ItemDig3 and ItemDig4.  This routine takes care of actually
; copying the display information from the ItemDigits working variables
; into the actual display variables pointed to by ItemPrDigPtr$.
;
;
; Input:  ItemSrcPtr$ -- points to actual parameter variable
;         ItemPrDigPtr$ -- points to actual display digits
;         ItemNumPtr$ -- points to ItemDigN & N+1, where the 2-digit
```

```
;       ItemStep, ItemSubStep -- current step, substep of item programming
;
;  Output:
;
;  Routines Called:
;  Exit State:          [A],[B],[X],CCR -- indeterminate
;
;
;
;-------------------------------------------------------------------------

; ItemStep: 0 = init
;           1 = display existing value
;           2 = entering new value
;           3 = bad value display
;           4 = good value display
;          99 = done with this item

Do2DigItem:

; Do we need to initialize 2-digit entry?

        LDAA    ItemStep
        BNE     Init2DigDone

Init2Dig:

        INC     ItemStep        ;Actually, nothing to initialize here
        CLR     ItemSubStep

Init2DigDone:

; Now see what step of 2-digit item programming we are on

        CaseJMP ItemStep,4

        .word   0               ; 0 (can't be step 0 still)
        .word   Do2DigExist     ; 1 -- showing existing value
        .word   Do2DigEntry     ; 2 -- entering a new value
        .word   Do2DigGood      ; 3 -- good value entered (accepted)
        .word   Do2DigBad       ; 4 -- bad value entered (rejected)


        RTS


;-------------------------------------------------------------------------
;  S h o w E x i s t V a l u e  (Show the "Existing" Value)  Subroutine
;
;  This routine simply displays the existing parameter value -- as pointed
;  to by the ItemSrcPtrS -- in the displays pointed by ItemPrDigPtrS.
;  Leds and the "other" display digits are not affected.
;



;  Inputs:  ItemSrcPtrS, ItemType, ItemPrDigPtrS
;
;  Output:
;
;  Routines Called:
;  Exit State:          [A],[B],[X],CCR -- indeterminate
;
;  Create Date:         5 Oct 92
;  Revision Record:     A - 5 Oct 92 - original
;-------------------------------------------------------------------------

ShowExistValue:

; Update the display to show the current entry values...
; Note that we have several display formats to choose from.

        LDX     ItemSrcPtrS     ;Get a pointer to the "existing" setting

ChkExFormat:
        LDAA    ItemType

        CMPA    #TimeType.
        BEQ     ShowAsTime

        CMPA    #TmpType.
        BEQ     ShowAsTmp

        CMPA    #PcntType.
        BEQ     ShowAsPcnt

        CMPA    #NumDigType.
        BCS     ShowAs4Dig

        BRA     ShowAs2Dig


; 2 - d i g i t   n u m b e r
;
;  numeric value in Dig+0, Dig+1

ShowAs2Dig:                     ;Item "source" pointer already in [X]

        LDX     ItemSrcPtrS     ;Get a pointer to the "existing" setting

        LDAB    0,X             ;Get the single byte value into [B]

        ASR     ItemZeroBlanking ;Get the "zero blanking" indicator into Carry
                                ; $FF  <=>  We DO want zero-blanking  (*)

        JSR     BinToBcd2Dig    ;Convert to 2 displayable digits

        LDX     ItemNumPtrS     ;Get pointer to the destination displays
        STD     0,X             ;Save 2-digit value into ItemDigN, ItemDigN+1

        CopyItemDigToPrDig      ;Copy the item digits into the actual displays

        BRA     ShowExistDone

; (*) Note: ItemZeroBlanking flag should be all 1's or all 0's.
; "ASR ItemZeroBlanking" basically copies 1 or 0 into the Carry bit while
```

```
; T i m e
;
; Standard "DisplayTime" format of existing time parameter

ShowAsTime:
        LDX     ItemSrcPtrS     ;Get a pointer to the "existing" setting

        LDD     0,X             ;Get the existing time value
        LDX     ItemPrDigPtrS   ;Put display destination pointer into [X]
        SEC                     ;We want the colons ON
        JSR     DisplayTime     ;Call the standard "display tmp" routine

        BRA     ShowExistDone


; T e m p e r a t u r e
;
; Standard "DisplayTmp" format of existing temperature parameter

ShowAsTmp:                      ;Item "source" pointer already in [X]
        LDX     ItemSrcPtrS     ;Get a pointer to the "existing" setting

        LDD     0,X             ;Get the existing temperature value
        LDX     ItemPrDigPtrS   ;Put display destination pointer into [X]
        JSR     DisplayTmp      ;Call the standard "display tmp" routine

        BRA     ShowExistDone


; P e r c e n t
;
;  value 0 to 99: 2 digit number in dig1 and dig2, percent sign in dig3 & dig4
;  value 100: "100" in dig1, dig2, and dig3; cheaper percent sign in dig4

ShowAsPcnt:                     ;Item "source" pointer already in [X]

        LDX     ItemSrcPtrS     ;Get a pointer to the "existing" setting
        LDAB    0,X             ;Get the single byte value into [B]

        LDX     ItemPrDigPtrS   ;Get pointer to the destination displays
        JSR     DisplayPcnt     ;Call the standard "display percent" routine

        BRA     ShowExistDone


; 4 - d i g i t   n u m b e r
;
;  numeric value in Dig1, Dig2, Dig3, Dig4...

ShowAs4Dig:                     ;Item "source" pointer already in [X]
        LDX     ItemSrcPtrS     ;Get a pointer to the "existing" setting

        LDD     0,X             ;Get the double-byte value into [D]



        SEC                     ;We DO want zero-blanking
        JSR     BinToBcd4Dig    ;Convert to 2 displayable digits

        STX     TempWordS       ;Save the top two display digits

        LDX     ItemPrDigPtrS   ;Get pointer to the destination displays
        STD     _Dig3,X         ;Save 2 lower digits into Dig3, Dig4

        LDD     TempWordS       ;Retrieve the top two digits again
        STD     _Dig1,X         ;Save into Dig1, Dig2

        CLR     _DigLeds,X      ;No colons or decimal points

        BRA     ShowExistDone


ShowExistDone:

        RTS


;-------------------------------------------------------------------------
;  S h o w N u m V a l u e  (Show the "Numeric entry" Value)  Subroutine
;
;  This routine simply displays the numeric entry parameter value -- as
;  indicated by the NumDig1..NumDig4 digits -- in the displays pointed to
;  by ItemPrDigPtrS.  Leds and the "other" display digits are not affected.
;
;  Inputs:
;
;  Output:
;
;  Routines Called:
;  Exit State:          [A],[B],[X],CCR -- indeterminate
;
;
;
;-------------------------------------------------------------------------

ShowNumValue:

; Update the display to show the current entry values...
; Note that we have several display formats to choose from.

        LDX     ItemPrDigPtrS   ;Which digits are we displaying in?
                                ;(DigPtrS points to LDigits or RDigits)
ChkNumFormat:
        LDAA    ItemType

ChkTimeEntry:
        CMPA    #TimeType.
        BNE     ChkTmpEntry
        JMP     ShowTimeEntry

ChkTmpEntry:
        CMPA    #TmpType.
```

```
ShowPcntEntry:
        CMPA    #PcntType.
        BEQ     ShowPcntEntry

Show4DigEntry:
        CMPA    #Num4DigType.
        BNE     NotShow4Dig
        JMP     Show4DigEntry

NotShow4Dig:
;opt     BRA     Show2DigEntry


; 2 - d i g i t   n u m b e r
;
;   Copy last two digits into ItemDigN pointed to by ItemNumPtrS.
;   Then copy entire ItemDigits template and value into display digits.

Show2DigEntry:

; Blink the entry digits...

        LDAB    BlnTmr
        BITB    #Tmr4HzBit.
        BNE     BlinkOn2Dig

BlinkOff2Dig:
        LDD     #256*Char.Blank.+Char.Blank.
        BRA     Save2Digits

BlinkOn2Dig:
        LDD     NumDig3         ;Last two entered digits to Dig+0, Dig+1

; Save the 2 digits into ItemDigN & ItemDigN+1, then copy into display digits

Save2Digits:
        LDX     ItemNumPtrS     ;Save entry digits or blanks into ItemDigN,+1
        STD     0,X

;opt    CopyItemDigToPrDig      ;Copy ItemDigits template into display digits

Show2Done:
        JMP     ShowNumDone


; P e r c e n t
;
;   If last 3 digits = "1" "0" "0", show as 100% using standard routine
;   Else display last 2 digits using standard routine

ShowPcntEntry:

        CLR     _DigLeds,X      ;No colon on for percent display

; Do we have 2-digit or 3-digit entry value:
;
;   If last 3 digits were "100", show as 3 digit percent with "kludgy" percent
;
;   Else simply show a 2-digit percent with "nice" percent sign in dig3 & 4

        LDD     NumDig3         ;Get last two digits entered (num3, num4)
        BNE     Show2Pcnt       ; If not "00", then we can't have "100"...

        LDAB    NumDig2         ;Else check the digit before that:
        CMPB    #1              ; If last two WERE "00", and "1" before that...
        BEQ     Show3Pcnt       ;   ...we have special case of "100%"
                                ;       ==> need special 3 digit pcnt display

; 2-digit percent display

Show2Pcnt:
        LDAB    BlnTmr
        BITB    #Tmr4HzBit.
        BNE     BlinkOn2Pcnt

BlinkOff2Pcnt:
        LDAA    #Char.Blank.
        STAA    _Dig1,X
        STAA    _Dig2,X
        BRA     Show2PcntDone

BlinkOn2Pcnt:
        LDD     NumDig3         ;Last two entered digits in _Dig1, _Dig2
        STD     _Dig1,X         ;(This does NumDig3 & NumDig4 both)

Show2PcntDone:

        LDAA    #$80+Seg.b.     ;Construct the "nice" percent sign (two digits)
        LDAB    #$80+Seg.f.+Seg.e.+Seg.c.
        STD     _Dig3,X         ;Save into Dig3 & Dig4

        BRA     ShowNumDone


; 3-digit percent display

Show3Pcnt:
        LDAB    BlnTmr
        BITB    #Tmr4HzBit.
        BNE     BlinkOn3Pcnt

BlinkOff3Pcnt:
        LDAA    #Char.Blank.
        STAA    _Dig1,X
        STAA    _Dig2,X
        STAA    _Dig3,X
        BRA     Show3PcntDone

BlinkOn3Pcnt:
        LDD     NumDig2         ;Last three entered digits in _Dig1.._Dig3
        STD     _Dig1,X         ; Save NumDig2 & 3 into _Dig1 & 2
        LDAB    NumDig4
        STAB    _Dig3,X

Show3PcntDone:                  ;Still need to show percent sign in _Dig4
        LDAB    #$80+Seg.f.+Seg.c.
        STAB    _Dig4,X
```

```
; T e m p e r a t u r e
;
;   Last 3 entered digits in _Dig1.._Dig3, Celsius/Degree symbol in _Dig4
;   Colons OFF.

ShowTmpEntry:

        LDAA    DegSymb         ;Display current temperature symbol
        STAA    _Dig4,X

        CLR     _DigLeds,X      ;Make sure colons are OFF...

; Blink the entry digits

        LDAB    BlnTmr
        BITB    #Tmr4HzBit.
        BNE     BlinkOnTmp

BlinkOffTmp:
        LDAA    #Char.Blank.
        STAA    _Dig1,X
        STAA    _Dig2,X
        STAA    _Dig3,X
        BRA     ShowTmpDone

BlinkOnTmp:
        LDD     NumDig2         ;NumDig2/NumDig3 --> _Dig1, _Dig2
        STD     _Dig1,X
        LDAA    NumDig4         ;NumDig4 --> _Dig3
        STAA    _Dig3,X

ShowTmpDone:
        BRA     ShowNumDone


; T i m e
;
;   Last 4 entered digits in _Dig1.._Dig4; Colons ON.

ShowTimeEntry:

        LDAA    #ColonLeds.     ;Turn the colons ON...
        STAA    _DigLeds,X

        BRA     ShowAll4Nums    ;Then display last 4 digits entered


; N u m 4 D i g

Show4DigEntry:
        CLR     _DigLeds,X      ;Keep the colons OFF...

;opt    BRA     ShowAll4Nums    ;Then display last 4 digits entered

ShowAll4Nums:

; Blink the entry digits

        LDAB    BlnTmr
        BITB    #Tmr4HzBit.
        BNE     BlinkOnTime

BlinkOffTime:
        LDAA    #Char.Blank.
        STAA    _Dig1,X
        STAA    _Dig2,X
        STAA    _Dig3,X
        STAA    _Dig4,X
        BRA     ShowTimeDone

BlinkOnTime:
        LDD     NumDig1         ;NumDig1/NumDig2 --> _Dig1, _Dig2
        STD     _Dig1,X
        LDD     NumDig3         ;NumDig3/NumDig4 --> _Dig3, _Dig4
        STD     _Dig3,X

ShowTimeDone:

;opt    BRA     ShowNumDone


ShowNumDone:

        RTS


;-----------------------------------------------------------------------
;  C o n v N u m E n t r y   (Convert Numeric Entry)   Subroutine
;
;  Converts the current item entry keys into a numeric value, and returns
;  the actual value in both the [D] register and in the NumValue$ variable.
;  The entry digits used for the conversion and the conversion process
;  itself depend on the current item type:
;
;  Note: NumDig's holding the "_" character are treated as 0's
;
;  Time: [A] = 10*NumDig1 + NumDig2     (hours)
;        [B] = 10*NumDig3 + NumDig4     (minutes)
;
;  Tmp:  [D] = 100*NumDig2 + 10*NumDig3 + NumDig4      (NumDig1 not used)
;  -
;  Nbr2Dig:
;        [A] = 0
;        [B] = NumDig3*10 + NumDig4       (NumDig1, NumDig2 not used)
;
;
;  Input:   ItemType, ItemSrcPtrS, ItemStep
;           NumDig1, NumDig2, NumDig3, NumDig4
;
;  Output: NumDig1..NumDig4 -- leading non-digits (ie _'s) converted to 0's
```

```
; Exit State:          [A],[B],[X],CCR -- indeterminate
;
;
;
;----------------------------------------------------------------------------

ConvNumEntry:

; First of all, examine the numeric entry digits NumDig1..NumDig4, and
; convert all _'s to 0's.  The _'s are in essence "leading blanks".
;
; --> Caller must have ALREADY verified that entry wasn't "____"
;     (which is only possible if we have a clear button).  Otherwise,
;     this routine will make it look like the user entered "0000".

ReplaceBlanks:

        LDX     #NumDig1        ;Start out on numeric entry digit #1

ReplBlLoop:
        LDAA    0,X             ;Get the current digit
        CMPA    #9              ;Legal digit 0..9?
        BLS     ReplBlanksDone  ;If so, we've finished with "leading blanks"

        CLR     0,X             ;Else this is a blank (or "_", etc)
                                ; --> make it a "0"
        INX
        CPX     #NumDig4        ;Go back and check next digit
        BLS     ReplBlLoop      ; (unless we are past the last one...)

ReplBlanksDone:


ChkConvFormat:
        LDAA    ItemType

        CMPA    #TimeType.
        BEQ     ConvTimeEntry

        CMPA    #TmpType.
        BEQ     ConvTmpEntry

        CMPA    #PcntType.
        BEQ     ConvPcntEntry

        CMPA    #Num4DigType.
        BEQ     Conv4DigEntry

;ail    BRA     Conv2DigEntry

; 2 - d i g i t   n u m b e r
;
;   Only the last two digits entered are used:
;
;   [D] := 10*NumDig3 + NumDig4


Conv2DigEntry:
        LDAA    #10             ;Calculate 10*NumDig3
        LDAB    NumDig3
        MUL                     ;(Answer <= 90, so it fits into [B]...)
        ADDB    NumDig4         ;Add in the 1's digit  ([A] still 0 from mult)

        BRA     ConvItemDone

; P e r c e n t
;
;   Only the last two or three digits entered are used:
;
;   If last 3 digits = "100", [D] := 100
;
;   Else if last 3 NOT "100", then only last 2 digits used:
;
;       [D] := 10*NumDig3 + NumDig4

ConvPcntEntry:

        LDD     NumDig3         ;Get last two digits entered (Num3, Num4):
        BNE     Conv2Pcnt       ; If <> "00", can't be "100" -- do 2 dig conv

        LDAB    NumDig2         ;Else get the digit entered before that...
        CMPB    #1
        BNE     Conv2Pcnt       ; If <> "1", we don't have "100" -- do 2 dig

        LDD     #100            ;Else the answer is exactly "100"

        BRA     ConvItemDone

Conv2Pcnt:
        LDAA    #10             ;Calculate 10*NumDig3+NumDig4
        LDAB    NumDig3
        MUL                     ;(Answer <= 90...)

        ADDB    NumDig4         ;Add in the 1's digit
                                ;(Answer <= 99... no carry to worry about)
        BRA     ConvItemDone


; T e m p e r a t u r e
;
;   Last 3 entered digits in NumDig2..NumDig4
;
;   [D] := 100*NumDig2 + 10*NumDig3 + NumDig4
;       :=  (10 * (10*NumDig2 + NumDig3)) + NumDig4
;
;   If Celsius mode, Convert [D] from Celsius to Fahrenheit
;       (except dummy value "0" ("Off") should stay = 0...)

ConvTmpEntry:
        LDAA    #10
        LDAB    NumDig2
        MUL                     ;[D] := 10*NumDig2               ([A]=0,[B]<=90)
        ADDB    NumDig3         ;[D] := (10*NumDig2+NumDig3)     ([A]=0,[B]<=99)
        LDAA    #10
        MUL                     ;[D] := 10*(10*NumDig2+NumDig3)  ([D]<=990)
        ADDB    NumDig4
```

```
        BCC     ConvItemDone    ; If not, we're ready to go ("F" value entered)

        ADDD    #0              ;Else we ARE in Celsius mode:
        BEQ     ConvItemDone    ; If dummy value "0" entered, leave as is

        JSR     DegCToDegF      ;Else convert the Celsius value entered by
                                ; the user to a Fahrenheit value...
                                ;([D] = Fahrenheit equivalent of Celsius entry)
        BRA     ConvItemDone


; T i m e
;
;   Last 4 entered digits in _Dig1.._Dig4:
;
;   [A] = 10*NumDig1 + NumDig2    (hours)
;   [B] = 10*NumDig3 + NumDig4    (minutes)

ConvTimeEntry:

        LDAA    #10             ;Do the HOURS part first:
        LDAB    NumDig1
        MUL                     ;[D] := 10*NumDig1               ([A]=0,[B]<=90)
        ADDB    NumDig2         ;[D] := 10*NumDig1+NumDig2       ([A]=0,[B]<=99)

        PSHB                    ; +(Save the HOURS value on the stack)

        LDAA    #10             ;Now do the MINUTES part:
        LDAB    NumDig3
        MUL                     ;[D] := 10*NumDig3               ([A]=0,[B]<=90)
        ADDB    NumDig4         ;[D] := 10*NumDig3+NumDig4       ([A]=0,[B]<=99)

        PULA                    ; -(Retrieve the HOURS value into [A])

        BRA     ConvItemDone


; N u m 4 D i g
;
;   Last 4 entered digits in NumDig1..NumDig4
;
;   [D] := 1000*NumDig1 + 100*NumDig2 + 10*NumDig3 + NumDig4
;       := 1000*NumDig1 + (10 * (10*NumDig2 + NumDig3)) + NumDig4
;
;   If Celsius mode, Convert [D] from Celsius to Fahrenheit
;       (except dummy value "0" ("Off") should stay = 0...)

Conv4DigEntry:

        LDAA    #10             ;Need to calc 1000 * NumDig1:
        LDAB    NumDig1
        MUL                     ;  [D] = 10*NumDig1:  ( <= 90, fits into [B] )
        LDAA    #100
        MUL                     ;  [D] = 100*(10*NumDig1) = 1000*NumDig1

        STD     TempWord$       ;Save 1000*NumDig1 into TempWord$


        LDAA    #10             ;Now calculate the lower 3 digits:
        LDAB    NumDig2
        MUL                     ;[D] := 10*NumDig2               ([A]=0,[B]<=90)
        ADDB    NumDig3         ;[D] := (10*NumDig2+NumDig3)     ([A]=0,[B]<=99)
        LDAA    #10
        MUL                     ;[D] := 10*(10*NumDig2+NumDig3)  ([D]<=990)
        ADDB    NumDig4
        ADCA    #0              ;[D] := 10*(10*NumDig2+NumDig3) + NumDig4

        ADDD    TempWord$       ;Finally, add the 1000*NumDig1 into result

;opt    BRA     ConvItemDone    ;[D] = 1000*Num1 + 100*Num2 + 10*Num3 + Num4


ConvItemDone:                   ;Converted value returned in [D] & NumValue$.
        STD     NumValue$       ; (not value checked or validity checked)

        RTS

;----------------------------------------------------------------------------
; V a l i d a t e N u m E n t r y (Validate Numeric Entry)  Subroutine
;
; This routine checks the validity of the value in NumValue$, performing
; format validity checks and limit checks as appropriate for the "type"
; of the current item.  Format check is based strictly on the current
; item type (ie "Time" items should not have lower byte > 59).  Limit checks
; are based on values from the ItemDef table for the current item.
;
;
; Input:  NumValue$
;         ItemType, ItemSrcPtr$, ItemStep
;
; Output: [B] -- validity code
;
; Routines Called:
; Exit State:          [A],[B],[X],CCR -- indeterminate
;
;
; .
;----------------------------------------------------------------------------

ValidateNumEntry:


; See what kind of item we are dealing with

ChkValFormat:
        LDAA    ItemType

        CMPA    #TimeType.
        BEQ     ValTimeEntry

        CMPA    #TmpType.
        BEQ     ValTmpEntry

        CMPA    #PcntType.
```

```
        BEQ     Val4DigEntry

;opt    BRA     Val2DigEntry

;2-digit number
;
;   Only the last two digits entered are used:
;
;   NumValue$ := 10*NumDig3 + NumDig4

Val2DigEntry:

        BRA     ValChkDone

;Percent
;
;   Only the last three digits entered are used:
;
;   NumValue$ := 100*NumDig2 + 10*NumDig3 + NumDig4

ValPcntEntry:

        BRA     ValChkDone

;Temperature
;
;   Last 3 entered digits in NumDig2..NumDig4
;
;   NumValue$ := 100*NumDig2 + 10*NumDig3 + NumDig4
;       :=  (10 * (10*NumDig2 + NumDig3)) + NumDig4

ValTmpEntry:

        BRA     ValChkDone

;Num4Dig
;
;   Last 3 entered digits in NumDig2..NumDig4
;
;   NumValue$ := 100*NumDig2 + 10*NumDig3 + NumDig4
;       :=  (10 * (10*NumDig2 + NumDig3)) + NumDig4

Val4DigEntry:

        BRA     ValChkDone

;Time
;
;  Last 4 entered digits in _Dig1.._Dig4
;
;  NumValue$+0 = 10*NumDig1 + NumDig2   (hours)
;  NumValue$+1 = 10*NumDig3 + NumDig4   (minutes)

ValTimeEntry:

; Only format validation for TIME is to make sure low byte (typ. minutes)
; is <= 59, whenever the high byte (typ. hours) is <> 0.  For example,
; "1:75" is not a valid time format, but we will allow "0:99" minutes, etc...

        LDAA    NumValue$+0     ;Get the high byte (hours) of the time:
        BEQ     ValChkDone      ; If Hours = 00, we will allow minutes 0..99

        LDAB    NumValue$+1     ;Else get the low byte (minutes) of the time
        CMPB    #59             ;Is it > 59?
;>>>    BHI     InvValue        ; - If >= 59, invalid format...

;opt    BRA     ValChkDone

ValChkDone:

; If format looks valid, see if actual value is okay:
;
;  1. First, see if value matches either of the two "match" values
;
;       - If match, return "OK" code
;
;  2. If no match, see if number is within the specified range of values
;
;       - If within range, return "OK" code
;
;  3. If not within range, then return a "too high" or "too low" code
;
; NOTE: Time values limits and match values MUST be specified in strict
; HH:MM format, where MM <= 59.  The user may enter these parameters as
; strictly "MM" values, however, where MM can be up to 0:99 minutes.
; For comparison here, we will convert entry to the strict HH:MM format,
; but will leave the entry value itself in the format the user entered.


        LDX     NumValue$       ;Get the 16-bit numeric value
                                ; (use 16-bits even if parm is 8-bits...)

; Convert all time entries into strict HH:MM format, at least for this
; comparison.  All "ItemMatch" and "ItemLmt" values MUST be specified in
; strict HH:MM format, even though user may enter time parameters as
; strictly "minutes" values up to 99 (corresponding hours must be 00).

ChkTimeAdj:
        LDAA    ItemType        ;Get the current item type
        CMPA    #TimeType.      ;Are we working with a "TIME" entry?
        BNE     TimeAdjDone     ; (If not, ignore this stuff)

        LDD     NumValue$       ;Get the HH:MM entry into [A]:[B]
        JSR     StrictHHMM      ;Convert to the "strict" HH:MM format (MM <=59)
        STD     BKMove$         ; ==> THIS IS FOR VALUE CHECKING ONLY!
        LDX     BKMove$         ;Now copy strict HH:MM value back into [X]

TimeAdjDone:
```

```
;>>>
        JSR     ValidateItem    ;Validate the value in [X]
;>>>

;-----------------------------------------
;MatchChk:
;       CPX     ItemMatch1$     ;Does it match 1st discrete match value?
;       BEQ     GoodValue
;
;       CPX     ItemMatch2$     ;Else does it match 2nd discrete value?
;       BEQ     GoodValue
;
;; If no "match" value, see if within range...
;
;RangeChk:
;       CPX     ItemLoLmt$      ;If < Low Limit...
;       BLO     LoValue         ; ...entry is too low
;
;       CPX     ItemHiLmt$      ;If > High Limit...
;       BHI     HiValue         ; ...entry is too low
;
;;opt   BRA     GoodValue       ;Else within range -- good value
;
;; Return values:
;
;GoodValue:
;       LDAB    #NumGood.
;       BRA     ValidateDone
;
;InvValue:
;       LDAB    #NumInvalid.
;       BRA     ValidateDone
;
;LoValue:
;       LDAB    #NumLo.
;       BRA     ValidateDone
;
;HiValue:
;       LDAB    #NumHi.
;;opt   BRA     ValidateDone
;
;
;
;ValidateDone:                  ;On return, [B] holds a validation code
;-----------------------------------------

        RTS


;------------------------------------------------------------------------
;  AppendNextDig (Append Next Digit)  Macro
;
;  This macro takes the key number (#1..#10) passed in the [A] register and
;  appends it to the end of the entry list.  Effectively, the 4 entry digits
;  are all shifted left one position, and the newest digit is placed into
;  the rightmost digit.
;
;  Input:  [A] -- key code 1..10, representing digits 1..9, 0
;          NumDig1, NumDig2, NumDig3, NumDig4
;
;  Output: NumDig1, NumDig2, NumDig3, NumDig4
;
;  Routines Called:
;  Exit State:          [X] -- unchanged
;                       [A],[B],CCR -- indeterminate
;
;
;
;------------------------- ----------------------------------------------

AppendNextDig:

        .macro

        CMPA    #9              ;Keys #1..#9, use as is...
        BLS     AppendEntry
        CLRA                    ; else Key #10 should be converted to "0"

AppendEntry:
        LDAB    NumDig2
        STAB    NumDig1

        LDAB    NumDig3         ; NumDig1..3   <---  NumDig2..4
        STAB    NumDig2

        LDAB    NumDig4
        STAB    NumDig3

        STAA    NumDig4         ; NumDig4  <--- New key digit

        .endm


;------------------------------------------------------------------------
;  GoodNumEntry  (Good Numeric Entry)  Macro
;
;  This macro handles a valid numeric entry.
;
;  The source value (pointed to by ItemSrcPtr$) is updated with the new entry
;  value, and ItemStep is advanced to the "Good Value Entered" step (with
;  proper DspTmr initialization, etc)
;
;  Input:
;
;  Output:
;
;  Routines Called:
;  Exit State:          [A],[B],[X],CCR -- indeterminate
;
;
;
;-------     -----------------------------------------------------------

GoodNumEntry:
```

```
        LDX     ItemPrePtr$     ;Get pointer to the source variable

        LDAB    ItemType        ;Is it Byte-size or Word-size?
        BMI     ItemWordSave    ; (ItemType.07 = "1"  --> WORD size)

ItemByteSave:
        LDD     NumValue$
        STAB    0,X
        BRA     ItemSaved

ItemWordSave:
        LDD     NumValue$
        STD     0,X
;.WIT   BRA     ItemSaved

ItemSaved:
        LDAB    #$FF
        STAB    PrgChanged

; Good value entered -- display briefly before moving on to next item

        LDAB    #ItemGoodEntry. ;Move on to the "Good Value entered" step
        STAB    ItemStep

        LDAB    #0              ; (start the display timer for a "brief"
        STAB    DspTmr          ;   delay before we move on to the next item)

        .endm

;------------------------------------------------------------------------
; B a d N u m E n t r y  (Bad Numeric Entry) Macro
;
; This macro handles an invalid or out-of-range numeric entry.
;
;
; Input:  [B] -- validation code (to = NumInvalid., NumLo., or NumHi.)
;
; Outputs: ItemMsgSeq -- set to the appropriate message sequence
;         DspTmr -- started with duration value of the selected msg seq
;         ItemStep -- set to the "Bad Value Entered" step
;         <buzzer pulse started>
;
; Routines Called:
; Exit State:          [A],[B],[X],CCR -- indeterminate
;
;
;
;------------------------------------------------------------------------

TooHiSeq        .byte   'M', 32, MsgToo., 20, MsgHi., 8, MsgBlanks., 0
TooLoSeq        .byte   'M', 32, MsgToo., 20, MsgLo., 8, MsgBlanks., 0
BadNbrSeq       .byte   'M', 32, MsgBad., 20, MsgNbr., 8, MsgBlanks., 0


BadNumEntry:
        .macro

        JSR     StartItemErrSeq

;***.....................................................................
;       LDX     #TooHiSeq
;       CMPB    #NumHi.
;       BEQ     SetBadMsgSeq
;
;       LDX     #TooLoSeq
;       CMPB    #NumLo.
;       BEQ     SetBadMsgSeq
;
;       LDX     #BadNbrSeq
;
;SetBadMsgSeq:
;       STX     ItemMsgSeq$     ;Save pointer to error message sequence
;
;       LDAB    1,X             ;Get the message sequence duration from byte
;       STAB    DspTmr          ; [1] of the actual message sequence definition
;
;       JSR     BadEntrySound   ;Sound the "bad number/too high/too low" song
;
;       LDAB    #ItemBadEntry.  ;Go to the "Bad Value entered" item step
;       STAB    ItemStep
;***.....................................................................

        .endm

;  -----------------------------------------------------------------------
;  D o N u m e r i c E n t r y  (Do Numeric Entry) Subroutine
;
;  This subroutine allows the user to enter a numeric value using the 10
;  product select keys as a 10-key numeric keypad.  Values shift in
;  "calculator style" as digits are entered.  Entry is terminated with
;  the SET key, at which point the current NumDigits are converted into
;  a binary value.
;
;
;  Input:  [A] -- first number entry, on "init" call only
;          EntryStep
;          NumDig1, NumDig2, NumDig3, NumDig4
;          ItemPrDigPtr$, ItemType
;
;  Output:
;
;  Routines Called:
;  Exit State:          [A],[B],[X],CCR -- indeterminate
;
;
;
;-----------------------------------------       ------------------------

DoNumericEntry:

; Steps of numeric entry (EntryStep):
;   0 -- initialize -- first number entry is in [A], digit ptr in [X]

ChkNumInit:
        LDAB    NumEntryStep    ;Are we on the "initialize" step?
        BNE     ChkNumInitDone

        LDAB    #Char.Under.    ;Blank out all 4 digits
        STAB    NumDig1         ; (use "_" character...)
        STAB    NumDig2
        STAB    NumDig3
        STAB    NumDig4

; The first number key is passed here in [A].
;
;  - If "clear" key, we're ready to go (all entry digits already cleared)
;
;  - If digit key, save into the rightmost entry digit.
;    (Need to convert key number 10 into the "0" digit.)

        CMPA    #KeyNbr10.      ;Is it the #10 key?
        BNE     Save1stEntry    ;If not, digit = key number
        CLRA                    ;Else key #10 is the "0" digit
Save1stEntry:
        STAA    NumDig4         ;Save the first entry number


NumStepOInc:

        INC     NumEntryStep    ;Move on to the "number entry" step

ChkNumInitDone:


; Update the display to show the current entry values...
; Note that we have several display formats to choose from.

        JSR     ShowNumValue



; Now handle the key inputs:
; Number keys 1..10 shift all entered numbers over one position (#10 = "0")
; The "Set" key terminates the current entry string (like an [Enter] key).

        JSR     GetKey          ;See if any keys have been pressed...
        BNE     IsItSet
        JMP     NumKeyDone      ;(If not, nothing more to do here)

IsItSet:
        CMPA    #KeySet.        ;Is it the SET key?  (SET --> "Enter" key)
        BNE     IsItNbr

        JSR     ConvNumEntry    ;Convert NumDig1..4 to actual numeric value
                                ; (answer is returned in NumValue$)

        JSR     ValidateNumEntry ;Validation code returned in [B] -- 0 ==> OK
        CMPB    #NumGood.

        BEQ     GoodEntry

; Invalid value, or value out of range:  Select corresp error msg sequence

BadEntry:                       ;Validation code is in [B]

        BadNumEntry             ;Set "ItemMsgSeq$" pointer & start DspTmr
                                ;Go to "Bad Value Entered" ItemStep
        JMP     NumKeyDone


; Good value entered -- update the actual item value

GoodEntry:
                                ;Start DspTmr for a "brief" time.
        GoodNumEntry            ;Go to "Good Value Entered" ItemStep.

; Also, this press of the set key may be the start of a
; "Press and Hold SET key to Exit" operation...

        LDAA    #$FF            ; If so, start the "Exit Pending" operation
        STAA    ExitPending
        CLR     ExitPendClk     ;  (user must Press and Hold to do exit)

        JMP     NumKeyDone



; Is it a NUMBER key?

IsItNbr:                        ;Else is it a number key 1..10?
        CMPA    #10
        BHI     NumOther

        AppendNumDig            ; If so, enter the new digit

        BRA     NumKeyDone

NumOther:                       ;Else what other key???
        JSR     BadKeySound

;dwt    BRA     NumKeyDone


NumKeyDone:


        RTS


;------------------------------------------------------------------------
; D o E x i s t i n g I t e m  (Do Existing Item) Subroutine
;
; This routine displays the EXISTING value of the current item (in the
; proper format, of course) and waits to see if the user wants to
; change the value or simply move on.  If the user presses a number key,
```

```
;
;  Input:  ItemType, ItemSrcPtr$, ItemPrDigPtr$, ItemStep
;
;  Output:
;
;  Routines Called:
;  Exit State:          [A],[B],[X],CCR -- indeterminate
;
;
;
; ------------- ---------------------------------------------------------

DoExistingItem:

; Update the display to show the current entry values...
; Note that we have several display formats to choose from.

        JSR     ShowExistValue  ;Display existing value in ItemPrDigPtr$ digits


; Now handle the key inputs:
; Number keys 1..10 shift all entered numbers over one position (#10 = "0")
; The "Set" key terminates the current entry string (like a [Enter] key).

        JSR     GetKey          ;See if any keys have been pressed...
        BEQ     ExKeyDone

; S E T   K e y . . .

ExChkSet:
        CMPA    #KeySet.        ;Is it the SET key?
        BNE     ExChkNbr

        LDAA    #99             ; If so, signal "Done with this item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     ExKeyDone

; N u m b e r   K e y s   1 - 1 0 . . .

ExChkNbr:                       ;Else is it a number key 1..10? Or Clear?
        CMPA    #10
        BHI     ExKeyOther

        LDAB    #ItemNumEntry.  ;Advance to the "entering number" step
        STAA    ItemStep
        CLR     NumEntryStep    ;Init numeric entry
        JSR     DoNumericEntry




        BRA     ExKeyDone

; O t h e r   K e y s . . .

ExKeyOther:                     ;Else what other key???
        JSR     BadKeySound

.nut    BRA     ExKeyDone


ExKeyDone:

        RTS


;-----------------------------------------------------------------------
;  D o G o o d V a l u e   (Do "Good Value" response)  Subroutine
;
;  This routine displays the EXISTING value of the current item -- which
;  really is the value just entered and accepted as good for the current
;  programming item.
;
;
;  Input:  ItemType, ItemSrcPtr$, ItemPrDigPtr$, ItemStep
;
;  Output:
;
;  Routines Called:
;  Exit State:          [A],[B],[X],CCR -- indeterminate
;
;
;
;-----------------------------------------------------------------------

DoGoodValue:

; Update the display to show the current entry values...
; Note that we have several display formats to choose from.

        JSR     ShowExistValue  ;Display existing value in ItemPrDigPtr$ digits

; Throw-away any keys that are pressed during this step (no beep-beep needed)

        JSR     GetKey

; Are we done yet?  DspTmr is used to time the "brief delay" that we spend
; displaying the new value before we move on to the next parameter...

        LDAA    DspTmr          ;If DspTmr is still counting down (ie > 0...)
        BNE     DoGoodDone      ; ...then nothing more to do for now

        LDAA    #99             ;Else DspTmr has expired -- signal that
        STAA    ItemStep        ; we're ready to move on to the next item
```

```
;-----------------------------------------------------------------------
;  D o B a d V a l u e   (Do "Bad Value" response)  Subroutine
;
;  This routine displays the error response for a "bad" entry value.
;
;
;  Input:  ItemType, ItemSrcPtr$, ItemPrDigPtr$, ItemStep
;
;  Output:
;
;  Routines Called:
;  Exit State:          [A],[B],[X],CCR -- indeterminate
;
;
;
;-------        -------------------------------------------------------

DoBadValue:

; Display the "bad value entered" sequence

ShowBadMsgSeq:
        LDD     ItemPrDigPtr$
        LDX     ItemMsgSeq$
        JSR     ShowMsgSeq

; Throw-away any keys that are pressed during this step (no beep-beep needed)

        JSR     GetKey

; Are we done yet?  DspTmr is used to time the "brief delay" that we spend
; displaying the new value before we move on to the next parameter...

        LDAA    DspTmr          ;If DspTmr is still counting down (ie > 0...)
        BNE     DoBadDone       ; ...then nothing more to do for now

        LDAA    #ItemExisting.  ;Else DspTmr has expired -- return to the
        STAA    ItemStep        ; "existing value" step of this item

DoBadDone:

        RTS



;-----------------------------------------------------------------------
;  D o I t e m P r o g r a m   (Do Item Programming)  Subroutine
;
;  This subroutine performs "Item Programming" user i/o for the currently
;  selected programming item.  All item parameters (ItemType, ItemSrcPtr$,
;  ItemLmtsS, etc) must already be set before this routine is called.






;
;
;  Input:  [A] -- key code 1..10, representing digits 1..9, 0
;          NumDig1, NumDig2, NumDig3, NumDig4
;
;  Outputs: NumDig1, NumDig2, NumDig3, NumDig4
;
;  Routines Called:
;  Exit State:          [X] -- unchanged
;                       [A],[B],CCR -- indeterminate
;
;
;
;-----------------------------------------------------------------------


DoItemProgram:

; ItemStep 0 = init current item
; ItemStep 1 = show existing value
; ItemStep 2 = do numeric entry (input step)

; ItemStep 3 = (was On/Off entry (input step for On/Off types))

; ItemStep 4 = Good value entered -- slight delay before moving on
; ItemStep 5 = Bad value entered -- give error message, return to ItemStep #1
; ItemStep 99 = done with this item

; First of all, see if we are on the "init" step of this item...

ChkItemInit:
        LDAA    ItemStep        ;Step 0 of current programming item?
        BNE     ItemInitDone

; (actually, nothing to initialize at this point)

        INC     ItemStep        ;(init step for this item now done...)

ItemInitDone:



; Now see what item programming step we are currently on...

        CaseJSR ItemStep,5

        .word   0               ;("0" was the init step...)
        .word   DoExistingItem  ; 1 -- display existing value
        .word   DoNumericEntry  ; 2 -- entering a new value
        .word   0               ; 3 -- (was On/Off value)
        .word   DoGoodValue     ; 4 -- good value was entered (delay, move on)
        .word   DoBadValue      ; 5 -- bad value entered -- error message seq


ItemPrgDone:

        RTS
```

An example of software routine which may be used during programming is as follows.

```
; -- Programming mode

;-----------------------------------------------------------------------------
;
;       E X P R O G . S R C
;
; The routines in this file provide the parameter programming mode,
; by which the setpoint temperature and the timer values may be programmed.
;
;-----------------------------------------------------------------------------

        .include B:HRStd.LIB


; External Variables:

        .extern page0 ScrollCons, page0 ScrollSrcPtrS, page0 ScrollDigPtrS
        .extern page0 ScrollTmr, page0 ScrollDelay.

        .extern DelPrScrMsg


        .extern page0 DlsTmr, TmrHdBit., TmrSecBit., TmrHdBit., TmrDHdBit.
        .extern page0 CurKey, page0 KeyHoldHi, page0 KeyHoldLo
        .extern page0 BspTmr

        .extern page0 SpkrReq, page0 SpkrReqVol, page0 SpkrReqTime
        .extern Tone.Good., Tone.Bad.

        .extern LDigits, RDigits
        .extern LDig1, LDig2, LDig3, LDig4, LDigLeds
        .extern RDig1, RDig2, RDig3, RDig4, RDigLeds
        .extern _Dig1, _Dig2, _Dig3, _Dig4, _DigLeds
        .extern ColonLeds., DigDot.

        .extern ModeLeds, SearLed., CookLed., HoldLed., SetLed.
        .extern zSearLed., zCookLed., zHoldLed., zSrCkHdLed., zSetLed.

        .extern ProdLedsS

        .extern page0 KeyStatS
        .extern KeySet., KeyStStp.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.

        .extern MiscFlags
        .extern IntroMode., ErrMode., BurnInMode.
        .extern SpPrgMode., PrgMode., NeedInitMsg.
        .extern zIntroMode., zErrMode., zBurnInMode.
        .extern zSpPrgMode., zPrgMode., zNeedInitMsg.

        .extern ItemStep
        .extern ItemType, ItemSrcPtrS, ItemPrDigPtrS, ItemAsePtrS


        .extern ItemDigits, ItemDig1,ItemDig2,ItemDig3,ItemDig4,ItemDigLeds
        .extern ItemZeroBlanking
        .extern ItemMatch1S, ItemMatch2S, ItemLoLmtS, ItemHiLmtS
        .extern ItemMsgSeqS
        .extern ItemListMax

        ; - - - C k S t a g e T y p e - - -

        .extern CkStageSz.
        .extern _HHMMSS, _SetptTmpFS, _RedPcnt, _RedTmpFS, _Flags.Fan.LC

        .extern _HHMM, _MMSSS, _NextHHMMSS
        .extern FanOn., FanMostlyOff., FanVent., FanKeepOff.

        ; - - - P r o d u c t T y p e - - -

        .extern ProductSz., AlmTimeSz.
        .extern _CkStages, _HdStage, _PreheatTmpFS, _AlmTimes

        .extern NbrCkStages., NbrAlms., MaxCkStage., MaxAlm.
        .extern _CookHHMMSS, _HoldHHMMSS


        ; - - - S t a t e V a r s T y p e - - -

        .extern StateVarsSz.
        .extern _SVProduct, _ProdNbr, _NeedProdUpd
        .extern _State, _SubState, _ExitFlag
        .extern _CookTmr, _LCAdj100
        .extern _RemHH, _RemMM, _RemSS
        .extern _CkStageNbr, _CkStagePtrS
        .extern _ReqSetptTmpFS, _ReqRedPcnt, _ReqRedTmpFS
        .extern _ReqFan, _ReqLoadComp
        .extern _AlmExcCode, _AlmExc100uS
        .extern _StStpPending, _StStpClk

        .extern _RemHHMMS, _RemMMSSS
        .extern OffState., PreheatState., CookState., HoldState.
        .extern CkCookStep., CkExcStep.
        .extern HdHoldStep., HdExcStep.

        ; - - - - - - - - - - - - - - - - - - - -


        .extern MaxProd., ProdArray

        .extern PrgProductRec, PrgProdNbr
        .extern PrgCkStages, PrgLastCkStage
        .extern PrgAlmTimes, PrgLastAlmTime
        .extern PrgHdStage
        .extern PrgPreheatTmpFS

        .extern PrgPending, PrgPendClk
        .extern ExitPending, ExitPendClk

        .extern PrgStep, PrgSubStep, PrgChanged
        .extern PrgStageNbr, PrgStagePtrS, PrgAlmNbr, PrgDspTmr

        .extern PrgFan, PrgLoadComp, PrgOrigHHMMSS, PrgSumpI, PrgSumpJ

        .extern MinCkHHMM., MaxCkHHMM.
        .extern MinHdHHMM., MaxHdHHMM.
        .extern MinLC., MaxLC.


        .extern StateVarsPtrS

        .extern BspCMode, BspSymb

        .extern PrgModePasswd

        .extern PasswdStep, PasswdTargetPtrS
        .extern PwdInput., PwdInvalid., PwdValid., PwdTimeout., PwdCancel.
        .extern PwdNo., PwdMode.

        .extern page0 TempByte, page0 TempWordS, page0 BBSaved
        .extern page0 IndexI, page0 IndexJ
        .extern page0 PtrIS, page0 PtrJS

        .extern ChkSum1S, ChkSum2S, DataWrite20fs.


; Messages

        .extern MsgProdPrg., MsgProd.
        .extern MsgBlanks., MsgLoadComp., MsgAlarm.
        .extern MsgTmo., MsgHi., MsgLo., MsgBad., MsgNbr.
        .extern MsgPrnt., MsgAlrmt., MsgRedAt., MsgRedPcnt, MsgHold.
        .extern MsgOn., MsgOff., MsgVent., MsgFan.
        .extern MsgSec.


; from GRItemPr.SRC:

        .extern NumBDigType., PcntType.
        .extern TimeType., TmpType.



; External routines:


        .extern ShowScrollMsg

        .extern SetProdLed
        .extern CopyProduct, CalcChk1, CalcChk2

        .extern DoPasswdEntry, DoPasswdResult

        .extern DoItemProgram
        .extern ProgListItem, Prog4DigItem

        .extern BinToBcd2Dig, BinToBcd3Dig, BinToBcd4Dig
        .extern DisplayTmp, DisplayTime
        .extern GetKey, ChkKeyPressed
        .extern BadKeySound, StartBzr


        .extern ShowMsg, ShowMsgSeq
        .extern BspCToBspf


; Routines declared here:

        .global DoProgMode


; Definitions internal to this routine


Ck60To99.       .equ    $80     ;Temporarily use top bit of _Flags.Fan.LC byte
                                ; of each cook cycle to keep track of whether
                                ; each cook time was originally a MM-only
                                ; value from 0:60 to 0:99 or not

zCk60To99.      .equ    ((Ck60To99.)^($FF))



;-----------------------------------------------------------------------------
; M a k e A l m s S t r i c t   (Make Alarms "Strict" HH:MM)   Subroutine
;
; This routine checks all the alarms in the PrgProductRec. Where an alarm
; is found to be a "minutes only" value "0:60" to "0:99", the alarm value
; is converted to the "strict" HH:MM format.  No record is kept of which
; alarms are converted.  Normally, we will want all alarms and all cook
; times in the same format, either "strict HH:MM" or "MM-only", based on
; the original value of the highest interval time.
;
; Input:  PrgAlmTimes array
;
; Output: PrgAlmTimes array
;
;
; Uses:   PtrIS, TempByte
;
; Routines Called:
; Exit State:           [A],[B],[X],CCR  -  indeterminate
;
;
; .
;-----------------------------------------------------------------------------

MakeAlmsStrict:

; for [X] := PrgAlmTime[0] to PrgAlmTime[MaxAlm] do
;    if Alm[X] in [0:60..0:99] then
;       <convert Alm[X] to strict HH:MM format>

        LDX     #PrgAlmTimes    ;Get address of program product alarms array

        CLR     IndexI          ;IndexI will be used to index the alarms

MkAlmStrtLp:
```

```
        SUBB    #40             ;Else convert to strict HH:MM format:
        INCA                    ; sub 60 min from MM, add 1 hr to HH
        STD     0,X             ;Save the new "strict" HH:MM value

MkAlmStrNext:
        LDAB    #AlmTimeSz.     ;Move on to the next alarm (3 bytes / alarm)
        ABX

        INC     Index1          ;Advance the alarm number index

        LDAB    Index1          ;Are we past the last alarm yet?
        CMPB    #NumAlm.
        BLS     MkAlmStrLp      ; If not, go back and repeat

        RTS

;-----------------------------------------------------------------------
; M a k e A l m s M M O n l y  (Make Alarms Minutes-Only)  Subroutine
;
; This routine checks all the alarms in the PrgProductRec. Wherever
; possible, alarms are converted to "minutes-only" values, in the
; range "0:00" to "0:99".
;
; Input:  PrgAlmTimes array
;
; Output: PrgAlmTimes array
;
;
; Uses:   PtrI$, TempByte
;
; Routines Called:
; Exit State:           [A],[B],[X],CCR  -  indeterminate
;
;
;
;-----------------------------------------------------------------------

MakeAlmsMMOnly:

; For [X] := PrgCkTime[0] to PrgCkTime[NumCkStage] do
;    if CkTime[X].HHMM in (1:00..1:39)
;        <convert CkTime[X] to MM-Only format (0:60..0:99)>

        LDX     #PrgAlmTimes    ;Get address of program alarms array

        CLR     Index1          ;Index1 will be used to index the alarms

MkAlmMMLp:
        LDD     0,X             ;Get the current alarm "HH:MM" value

        CMPA    #1              ;Do we have exactly 1 hour?
        BNE     MkAlmMMNext     ; If HH = 0 or HH > 1, not in range 1:00..1:39

        CMPB    #39             ;Yes -- HH = 1!  Is the "MM" <= 39?
        BHI     MkAlmMMNext     ; If MM > 39, can't convert to 60..99 range
                                ;  (because 60+MM would be > 99)
        DECA
        ADDB    #60             ; Else convert: HH - 1 hr, MM + 60 minutes
        STD     0,X             ; Save the converted value

MkAlmMMNext:
        LDAB    #AlmTimeSz.     ;Move on to the next alarm (3 bytes/alarm)
        ABX                     ; [X] now points to the "next" cook stage

        INC     Index1          ;Advance the alarm index number

        LDAB    Index1          ;Are we past the last cook stage yet?
        CMPB    #NumAlm.

        BLS     MkAlmMMLp       ; If not, go back and repeat

        RTS

;-----------------------------------------------------------------------
; S o r t A l m s  (Sort Alarms)  Subroutine
;
; This subroutine collates the programmed alarm times in the PrgProduct
; record, in descending order. The alarms are stored as double-byte
; Minutes and Seconds (MM:SS), and are sorted so the highest values end
; up in the first slots, and the lowest values end up in the last.
;
; Note: The "Cook" State Routine takes care of looking for and triggering
; cook alarms. Each time it checks for an alarm match, it will check each
; of the (4) programmable alarms to see if any match the current time
; remaining (in MM:SS). By checking all (4) values each time, we don't
; have to worry about any special processing for cases where a programmed
; alarm time is greater than the cook time. We also avoid the need to
; re-synchronize a "next alarm" index when the user enters Program
; mode during a cook cycle, and changes the alarm times for a running
; product.
;
;
; Input:  PrgAlmTimes
;
; Output: PrgAlmTimes
;
; Routines Called:
; Exit State:           [A],[B],[X],CCR  -  indeterminate
;
;
;
;-----------------------------------------------------------------------

SortAlms:

; Note: unused alarms are set to 00:00 (ie "off"), and will automatically
; end up at the end of the alarm list when it is sorted into descending order.

        JSR     MakeAlmsStrict  ;Convert all alarms to STRICT HH:MM format
                                ; (otherwise, 0:90 would appear < 1:00)
```

```
;
; For I := 0 to (NumAlm.-1)
;   for J := I+1 to NumAlm.
;      if AlmTimes[J] > AlmTimes[I] then
;          { swap AlmTimes[I] and AlmTimes[J] }
;
;

; For PtrI := Alm[0] to Alm[NumAlm.-1]

        LDX     #PrgAlmTimes    ;Get address of the program product alarm times
        STX     PtrI$           ;Start PtrI$ at the first alarm time

AlSortLpI:

;   For PtrJ := PtrI+1 to Alm[NumAlm.]

        LDX     PtrI$           ;Start "J" out at slot past current "I" ptr...
        LDAB    #AlmTimeSz.
        ABX
        STX     PtrJ$

AlSortLpJ:
        LDX     PtrI$           ;Get pointer to Alm[I]

        LDAB    2,X             ;Get Alm[I].SS
        STAB    TempByte        ; ...and save into TempByte in case we need it

        LDD     0,X             ;Load Alm[I].HHMM into [D]...
        STD     TempWord$       ; (Save into TempWord$ in case we to do swap)

        LDX     PtrJ$           ;Set [X] to point to Alm[J].HHMM

        SUBD    0,X             ;Compare Alm[I].HHMM (in [D]) to Alm[J].HHMM

        BHI     AlSortNextJ     ;If HHMM[I] > HHMM[J], already in proper order

        BLO     AlSwapIJTimes   ;Else if HHMM[I] < HHMM[J] -- need to swap

        LDAB    TempByte        ;Else HHMM[I] = HHMM[J] -- need to compare SS's
        CMPB    2,X
        BHS     AlSortNextJ     ;  If SS[I] >= SS[J], already in proper order

; If Alm[I] < Alm[J] -- need to swap!

AlSwapIJTimes:
;opt    LDX     PtrJ$           ;([X] already points to Alm[J]...)

        LDAB    2,X             ;Get the Alm[J].SS value
        PSHB                    ; +[Save it on the stack for a moment]

        LDD     0,X             ;Get the Alm[J].HHMM value

        LDX     PtrI$

        STD     0,X             ;Save old Alm[J].HHMM into Alm[I].HHMM

        PULB                    ; -[Retrieve the old Alm[J].SS value]
        STAB    2,X             ;Save old Alm[J].SS into Alm[I].SS

        LDX     PtrJ$

        LDD     TempWord$       ;Get the old Alm[I].HHMM value from TempWord$
        STD     0,X             ; ...and save it into Alm[J].HHMM

        LDAB    TempByte        ;Get the old Alm[I].SS value from TempByte
        STAB    2,X             ; ...and save it into Alm[J].SS

; Now move on to the next [J]

AlSortNextJ:
;opt    LDX     PtrJ$           ;Advance "J" pointer
        LDAB    #AlmTimeSz.
        ABX
        STX     PtrJ$

        CPX     #PrgLastAlmTime$ ;If "J" pointer <= last alarm time, repeat
        BLS     AlSortLpJ

AlSortNextI:
        LDX     PtrI$           ;Advance "I" pointer
;opt    LDAB    #AlmTimeSz.
        ABX
        STX     PtrI$

        CPX     #PrgLastAlmTime$ ;If "I" pointer < last alarm time, repeat
        BLO     AlSortLpI

; All done now -- alarms sorted into descending order...

; Examine the first cook time. If it is in the range 0:60 to 0:99 (ie in
; "minutes only" format), we need to change all these alarms into the
; minutes-only format as well. Otherwise, we can leave the alarms in
; the current "strict HH:MM" format.

AlmChkMMOnly:
        LDX     PrgCkStages.    ;Get pointer to the first cook stage
        LDD     _MMSS,X         ;Get the first cook stage time
        CMPB    #59             ;Is MM value > 59?
        BLS     AlmMMOnlyDone   ; If not, we'll leave everything as is

                                ;Else if MM > 59, we will assume that we
        JSR     MakeAlmsMMOnly  ; have MM:SS in range 0:60..0:99...
                                ; Convert all alarm values, where possible
AlmMMOnlyDone:

        RTS

;-----------------------------------------------------------------------
; M a k e C k s S t r i c t  (Make Cook Stages "Strict" HH:MM)  Subroutine
```

```
.   "Ck60To99" bit of "_Flags.Fan.LC" is set to "0".  Where an cook time
.   is found to be a "minutes only" value "0:60" to "0:99", the time value
;   is converted to the "strict" format, and the corresponding "Ck60To99" bit
;   of _Flags.Fan.LC is set to "1" (to indicate that the original value was
;   a 0:60 to 0:99 value).
;
;   Note: This routine should ONLY be called if all the cook time values are
;   currently in the "flexible" format.  If some cook times have already been
;   converted to "strict" format, these Ck60To99 bits will be cleared here,
;   so the fact that these values were originally 0:60 to 0:99 will be lost.
;
;
;   Input:  PrgCkStages$ array
;
;   Output: PrgCkStages$ array
;           _Flags.Fan.LC "Ck60To99" bit flags for each stage
;
;
;   Uses:   PtrI$, TempByte
;
;   Routines Called:
;   Exit State:          [A],[B],[X],CCR  -  indeterminate
;
;
;
;-----------------------------------------------------------------------

MakeCksStrict:

; Note: we assume at this point that all cook times with HH > 59 are
; in the range 0:60 to 0:99.  This situation should be guaranteed by
; the Time entry routine of item programming.  (ie "0:120" is not possible).

; Then we will simply look at each cook time in the CkStages array,
; and "set" the bits for cook times that we convert to "strict", or
; otherwise "clear" the bits for times which already meet the "strict" format.

; For [X] := PrgCkTime[0] to PrgCkTime[MaxCkStage] do
;     If CkTime[X] in (0:60..0:99)
;        then begin
;             <convert CkTime[X] to strict HH:MM format>
;             <set Ck60To99 bit flag for CkStage[X]>
;             end
;        else <clear Ck60To99 bit flag for CkStage[X]>


        LDX     #PrgCkStages$   ;Get address of program prod cook stages array

        CLR     IndexI          ;IndexI will be used to index the cook stages

MkCkStrictLp:
        LDAA    _Flags.Fan.LC,X ;Get the flags byte
        ANDA    #$FF-Ck60To99.  ;Clear the "Cook Time 60 to 99" bit in [A]

        LDAB    _HHMMSS+1,X     ;Get the current cook stage's "MM" value
        CMPB    #59             ;If the "MM" value is already <= 59...
        BLS     MkCkStrSave     ; ...then no conversion is necessary


        SUBB    #60             ;Else convert to strict HH:MM format by
        STAB    1,X             ; subtracting 60 minutes from MM...
        INC     0,X             ;  ...and adding 1 hour to HH

        ORAA    #Ck60To99.      ;Now set the corresp bit "60To99" bit flag

MkCkStrSave:                    ;Save the new flags byte -- "Ck60To99" bit
        STAA    _Flags.Fan.LC,X ; has been set to "0" or "1" as appropriate

        LDAB    #CkStageSz.     ;Move on to the next cook stage
        ABX                     ; [X] now points to the "next" cook stage

        INC     IndexI          ;Advance the cook stage index number

        LDAB    IndexI          ;Are we past the last cook stage yet?
        CMPB    #MaxCkStage.

        BLS     MkCkStrictLp    ; If not, go back and repeat


        RTS


;-----------------------------------------------------------------------
;  M a k e C k s M M O n l y   (Make Cook Stages "Minutes Only") Subroutine
;
;  This routine checks each time in the Cook Stages array, and wherever
;  possible converts HH:MM values to MM-only values -- where MM = 0..99.
;
;  Normally, this routine is called ONLY when we have determined the highest
;  cook time value was originally entered as a MM-only value in the range
;  60..99 minutes.  We then call this routine to convert ALL other times to
;  to the MM-only format.  Since all other times are < highest cook time,
;  we shouldn't have any problems representing them as MM-only.
;
;  Note: this routine has nothing to do with the Ck60To99 flags, which are
;  only used to convert all Cooks to strict HH:MM format before sorting,
;  and then to check which format (HH:MM or MM-only) the highest interval
;  uses).
;
;  Input:  PrgCkStages$ array
;
;  Output: PrgCkStages$ array
;
;
;  Uses:   IndexI
;
;  Routines Called:
;  Exit State:          [A],[B],[X],CCR  -  indeterminate
;
;
;
;-----------------------------------------------------------------------

MakeCksMMOnly:

; Then we will simply look at each cook time in the CkStages array,
; and wherever we find "HH = 1" and "MM <= 39", we will convert the
;     If CkTime[X].HHMM in {1:00..1:39}
;        <convert CkTime[X] to MM-only format (0:60..0:99)>


        LDX     #PrgCkStages$   ;Get address of program prod cook stages array

        CLR     IndexI          ;IndexI will be used to index the cook stages

MkCkMMLp:
        LDD     _HHMMS,X                ;Get the current cook stage's "HH:MM" value

        CMPA    #1              ;Do we have exactly 1 hour?
        BNE     MkCkMMNext      ; If HH = 0 or HH > 1, not in range 1:00..1:39

        CMPB    #39             ;Yes -- HH = 1!  Is the "MM" <= 39?
        BHI     MkCkMMNext      ; If MM > 39, can't convert to 60..99 range
                                ;  (because 60+MM would be > 99)
        DECA
        ADDB    #60             ; Else convert: HH - 1 hr, MM + 60 minutes
        STD     _HHMMS,X        ; Save the converted value

MkCkMMNext:
        LDAB    #CkStageSz.     ;Move on to the next cook stage
        ABX                     ; [X] now points to the "next" cook stage

        INC     IndexI          ;Advance the cook stage index number

        LDAB    IndexI          ;Are we past the last cook stage yet?
        CMPB    #MaxCkStage.

        BLS     MkCkMMLp        ; If not, go back and repeat


        RTS


;-----------------------------------------------------------------------
;  S w a p I J C k S t a g e s   (Swap PtrI$ & PtrJ$ Cook Stages)  Subroutine
;
;  This subroutine simply swaps the two cook stages pointed to by PtrI$
;  and PtrJ$.
;
;
;  Input:  PrgCkStages$
;
;  Output: PrgCkStages$
;
;  Routines Called:
;  Exit State:          [A],[B],[X],CCR  -  indeterminate
;
;
;  ..
;-----------------------------------------------------------------------


SwapIJCkStages:


; IMPORTANT: See notes at end of this routine!

        LDX     PtrJ$           ;Copy CkStage[J] into PrgSwapJ area (*)
        LDD     _HHMMSS+0,X
        STD     PrgSwapJ+0      ;  Time.HHMM into SwapJ+0,1
        LDAB    _HHMMSS+2,X
        STAB    PrgSwapJ+2      ;  Time.SS into SwapJ+2
        LDD     _SetptTmpF$,X
        STD     PrgSwapJ+3      ;  Tmp into SwapJ+3,4
        LDAA    _RadPcnt,X
        LDAB    _Flags.Fan.LC,X ;  Rad, Flags/Fan/LdCo into SwapJ+5,6
        STD     PrgSwapJ+5
        LDD     _RadTmpF$,X
        STD     PrgSwapJ+7      ;  RadTmp into SwapJ+7,8

        LDX     PtrI$           ;Copy CkStage[I] into PrgSwapI area (*)
        LDD     _HHMMSS+0,X
        STD     PrgSwapI+0      ;  Time.HHMM into SwapI+0,1
        LDAB    _HHMMSS+2,X
        STAB    PrgSwapI+2      ;  Time.SS into SwapI+2
        LDD     _SetptTmpF$,X
        STD     PrgSwapI+3      ;  Tmp into SwapI+3,4
        LDAA    _RadPcnt,X
        LDAB    _Flags.Fan.LC,X ;  Rad, Flags/Fan/LdCo into SwapI+5,6
        STD     PrgSwapI+5
        LDD     _RadTmpF$,X
        STD     PrgSwapI+7      ;  RadTmp into SwapI+7,8

100t    LDX     PtrI$           ;Now copy orig [J] from SwapJ into CkStage[I]
        LDD     PrgSwapJ+0
        STD     _HHMMSS+0,X     ;  Orig Time[J].HHMM into Time[I].HHMM
        LDAB    PrgSwapJ+2
        STAB    _HHMMSS+2,X     ;  Orig Time[J].SS into Time[I].SS
        LDD     PrgSwapJ+3
        STD     _SetptTmpF$,X   ;  Orig Tmp[J] into Tmp[I]
        LDD     PrgSwapJ+5
        STAA    _RadPcnt,X      ;  Orig Rad[J], F/F/LC[J] into Rad[I], FFLC[I]
        STAB    _Flags.Fan.LC,X
        LDD     PrgSwapJ+7      ;  Orig RadTmp[J] into RadTmp[I]
        STD     _RadTmpF$,X

        LDX     PtrJ$           ;Finally, copy orig [I] into CkStage[J]
        LDD     PrgSwapI+0
        STD     _HHMMSS+0,X     ;  Orig Time[I].HHMM into Time[J].HHMM
        LDAB    PrgSwapI+2
        STAB    _HHMMSS+2,X     ;  Orig Time[J].SS into Time[I].SS
        LDD     PrgSwapI+3
        STD     _SetptTmpF$,X   ;  Orig Tmp[I] into Tmp[J]
        LDD     PrgSwapI+5
        STAA    _RadPcnt,X      ;  Orig Rad[I], F/F/LC[I] into Rad[J], FFLC[J]
        STAB    _Flags.Fan.LC,X
        LDD     PrgSwapI+7      ;  Orig RadTmp[I] into RadTmp[J]
        STD     _RadTmpF$,X


        RTS
```

```
; If fields are added or subtracted to a cook stage, this routine will
; have to be modified accordingly, to swap more or fewer bytes.
;
; ALSO: when swapping values between two cook stages, we make use of
; PrgSwapI and PrgSwapJ temporary areas.  These areas are guaranteed to
; be big enough to hold a CkStageRec, but we make no attempt here to assure
; that the values in the SwapI, SwapJ areas are in valid CkStageRec order.
; For example, we store _HHMMSS in bytes [0], [1], & [2], and _SetptTmpF$ in
; bytes [3] & [4].  It doesn't really matter if these are the same locations
; they occupy in a valid CkStageRec, as long as we are consistent when
; we fetch the values back out of the temporary storage.


;--------------------------------------------------------------------------
; S o r t C k S t a g e s   (Sort Cook Stages)  Subroutine
;
;  This subroutine collates the programmed cook stages in the PrgProduct
;  record, in descending order.  Each cook stage is "StageSz" bytes long,
;  and each has an associated countdown time.  The stages are sorted on
;  the basis of time so that the highest values end up in the first slots
;  of the CkStages array, and the lowest values end up in the last.  Unused
;  cook stages always have their times set to 00:00, so they end up at the
;  end of the array.
;
;
;  Input:  PrgCkStages$
;
;  Output: PrgCkStages$
;
;  Routines Called:
;  Exit State:          [A],[B],[X],CCR  -  indeterminate
;
;
;
;---                    . .....              ... ..........................

SortCkStages:

; Note: unused alarms are set to 00:00 (ie "off"), and will automatically
; end up at the end of the alarm list when it is sorted into descending order.

        JSR     MakeCkStrict    ;Convert all alarms to STRICT HH:MM format
                                ; (otherwise, 0:90 would appear < 1:00)


; Perform bubble sort
;
; for I := 0 to (NumCkStage.-1)
;   for J := I+1 to NumCkStage.
;       if CkTime$[J] > CkTime$[I] then
;            { swap CkStage[I] and CkStage[J] }
;
; NOTE: IndexI and IndexJ will hold the Alm60To99 bit masks for PtrI, PtrJ.

; for PtrI := Alm[0] to Alm[NumAlm.-1]


        LDX     #PrgCkStages    ;Get address of the program product alarm times
        STX     PtrI$           ;Start PtrI$ at the first alarm time

CkSortLpI:

;   for PtrJ := PtrI+1 to Alm[NumCkStage.]

        LDX     PtrI$           ;Start "J" out at slot past current "I" ptr...
        LDAB    #CkStageSz.     ; (each array slot occupies CkStageSz bytes)
        ABX
        STX     PtrJ$

CkSortLpJ:
        LDX     PtrI$           ;Get pointer to CkStage[I]

        LDD     _HHMMS,X        ;Load CookTime[I] into [D]...

        LDX     PtrJ$           ;Set [X] to point to CkStage[J]
        SUBD    _HHMMS,X        ;Compare CkTime[I] (in [D]) to CkTime[J] (@[X])

        BHI     CkSortNxtJ      ;If HHMM[I] > HHMM[J], already in proper order

        BLO     SwapCkIAndCkJ   ;Else if HHMM[I] < HHMM[J], need to swap

        LDX     PtrI$           ;Else HHMM[I] = HHMM[J]: need to compare SS's
        LDAB    _HHMMSS+2,X
        LDX     PtrJ$           ; Compare SS[I] to SS[J]...
        CMPB    _HHMMSS+2,X

        BHS     CkSortNxtJ      ; if SS[I] >= SS[J], already in proper order

                                ;   else need to swap...

; If CkTime[I] < CkTime[J] -- need to swap!

SwapCkIAndCkJ:

        JSR     SwapIJCkStages


; Now move on to the next [J]

CkSortNxtJ:
        LDX     PtrJ$           ;Advance "J" pointer
        LDAB    #CkStageSz.
        ABX
        STX     PtrJ$

        CPX     #PrgLastCkStage$ ;If "J" pointer <= last cook stage, repeat

        BLS     CkSortLpJ


CkSortNxtI:
        LDX     PtrI$           ;Advance "I" pointer
;opt    LDAB    #CkStageSz.
        ABX
        STX     PtrI$
```

```
        BLO     CkSortLpI

CkSortEnd:

; All done now -- cook stages sorted into descending order...
;
; All cook times currently in "strict" HH:MM format, but original MM-only
; (0:00..0:99) status currently indicated by _Flags.Fan.LC "Uh60To99" bit.
; If highest cook time was originally entered as a value from 0:60 to 0:99,
; then convert ALL cook times to that "minutes only" format, and convert
; all alarms to that format as well.  Otherwise, make sure all alarms
; are converted to "strict" HH:MM format (cook stages are already "strict")

        LDX     #PrgCkStages    ;Get pointer to the first cook stage
        LDAB    _Flags.Fan.LC,X ;Get the "flags" byte of first cook stage
        BITB    #Ck60To99.      ;Was original value in range 0:60 to 0:99?
        BNE     MakeAllMMOnly   ;(Ck60To99 bits set by MakeCkStrict above)

MakeAllStrict:

;opt    JSR     MakeCkStrict    ;(Cooks are already in "strict" format)

        JSR     MakeAlmStrict   ;Convert all alarms to "strict" format

        BRA     SortCkDone

MakeAllMMOnly:

        JSR     MakeCkMMOnly    ;Convert all cook times to MM-only format

        JSR     MakeAlmMMOnly   ;Convert all alarm times to MM-only format

;opt    BRA     SortCkDone

SortCkDone:

        RTS



;--------------------------------------------------------------------------
; G e t P r g P r o d u c t   (Get Programming Product)  Subroutine
;
;  This routine copies the indicated product information from the ProdArray
;  into the PrgProduct programming record, saves the indicated product number
;  into PrgProdNbr, and lights the proper product led
;
;  Input:  [A] -- Product index (0..MaxProd)
;          ProdArray -- product array


;
;  Output: PrgProdNbr -- assigned product number passed in [A]
;          PrgProduct -- loaded with info from ProdArray[PrgProdNbr]
;
;
;  Routines Called:
;  Exit State:          [A],[B],[X],CCR  -  indeterminate
;
;
;
;--------------------------------------------------------------------------

GetPrgProduct:

        STAA    PrgProdNbr      ;Save programming product index

        LDAB    #ProductSZ.     ;Get size of a product record
        MUL                     ;Multiply by index to get offset
        ADDD    #ProdArray      ;Add address of start of array

        STD     BbMoveS         ;Copy pointer to ProdArray record into [X]
        LDX     BbMoveS         ; ([X] is our "Source" pointer)
        LDD     #PrgProductRec  ;[D] points to program record ("Destination")

        JSR     CopyProduct     ;Copy the product information into prg record

        CLR     PrgChanged      ;Clear the "changed" flag

        RTS


;--------------------------------------------------------------------------
; S a v e P r g P r o d u c t   (Save Programming Product)  Subroutine
;
;  This routine copies the PrgProduct record back into the proper ProdArray
;  record, as indicated by PrgProdNbr index.  A new checksum is calculated
;  the Primary Data Area (where ProdArray resides), and then the Primary Data
;  Area and checksum are copied into the Secondary Data Area and checksum.
;
;  Also, if this product is currently selected by any state variables,
;  record, the corresponding NeedProdUpd flag is set to $FF
;  to indicate the information in the state variables needs to be updated
;  with the new information just placed into the corresp. ProdArray record.
;
;  Input:  PrgProdNbr -- index of product in PrgProduct record
;          PrgProduct -- the product record we need to save
;
;  Output: ProdArray -- assigned values from PrgProdRecord
;          PrgChanged -- "edited" flag -- reset to 0
;          DataArea1, ChkSum1$
;          DataArea2, ChkSum2$
;          _NeedProdUpd -- set to $FF if PrgProdNbr = _ProdNbr
;
;
;  Routines Called:
;  Exit State:          [A],[B],[X],CCR  -  indeterminate
;
;
; ;
;--------------------------------------------------------------------------
```

```
; need to update record in the Product array

; First, make sure the cook stage timers are sorted and converted to a
; uniform time format ("strict HH:MM" or "MM-only"), then do the same
; for the programmed alarm values.  (*)

        JSR     SortCkStages    ;Sort cook stages, convert to uniform format

        JSR     SortAlm         ;Sort alarm times, convert to same "strict"
                                ; or "MM-only" format as used for ck times.


; Save PrgProduct into the proper ProdArray record

        LDAA    PrgProdNbr      ;Get the programming product index
        LDAB    #ProductSiz.    ;Get size of a product record
        MUL                     ;Multiply by index to get offset
        ADDD    #ProdArray      ;Add address of start of array

        LDX     #PrgProductRec  ;[X] points to program record ("Source")
                                ;[D] points to ProdArray record ("Destination")
        JSR     CopyProduct     ;Copy the programmed info into ProdArray record


; Update the ProdArray record in the "back up" area

        ADDD    #DataDataOfs.   ;Add offset to secondary data area --
                                ; "Destination" = same product in DataArea2...
        JSR     CopyProduct     ;Update the "secondary" copy ProdArray
                                ;([X] still points to PrgProduct source...)


; Now update the checksums

        JSR     CalcChk1        ;Calculate checksum for Primary Data Area
        STD     ChkSum1S

        JSR     CalcChk2        ;Do the same for the Secondary Data Area
        STD     ChkSum2S


; Everything updated -- clear the "PrgChanged" flag to indicate that
; information from the PrgProduct record has been copied into the ProdArray.
; Then check the left side and right side state variables to see if either
; of them is currently using this product.  If so, set the corresponding
; "NeedProdUpd" flag to indicate to State Variables that the information
; THEY have needs to be updated from the ProdArray.
;
; Note: This "need product update" flag is monitored only in Standby mode.
; If currently in Standby, the product record will be updated almost
; immediately.  Otherwise, the update will not occur until we DO return to
; Standby mode.  (We might be in Cook, or even Halt at the moment...)

        CLR     PrgChanged      ;Clear the "changed" flag
                                ; (Changes have been saved...)

ChkInUse:




        LDAA    PrgProdNbr      ;Number of the Product that we just updated

        LDX     StateVarsPtrS
        CMPA    _ProdNbr,X      ;Is this product currently selected?
        BNE     InUseDone

        LDAB    #$FF            ;If so, set the "Need Update" flag to true
        STAB    _NeedProdUpd,X
InUseDone:


        RTS

; (*) Note: the CkStage and Alarm sort routines are normally called during
; programming when we finish the cook stages or finish the alarm times.
; We need to call them here, however, in case this "save" routine is being
; called due to an automatic exit from program mode.  For example, the user
; could have changed a cook time, then let the control sit and do an
; automatic exit.  In this case, we need to make sure we check for sorted
; order here, before we write the product record into the array.



;---------------------------------------------------------------------------
;  B l i n k S e t L e d  (Blink the "SET" led)  Macro
;
;  This macro simply takes care of blinking the SET led to indicate that
;  we are currently in program mode...
;
;  Input:  BlnTmr
;
;  Output: ModeLeds.SetLed
;
;  Routines Called:
;  Exit State:          [A],[B],[X],CCR -- indeterminate
;
;
;
;-----------------------------------------          -------------------------

BlinkSetLed:
        .macro

        LDAA    ModeLeds        ;Get the current Mode leds values
        ANDA    #~SetLed.       ;Assume we will need SET Led to be OFF

        LDAB    BlnTmr          ;Check the ghz blink bit:
        BITB    #TmrHzBit.
        BEQ     SaveSetLed      ;If bit = 0, we DO want the leds OFF

        ORAA    #SetLed.        ;Else if bit = 1, we want the led ON
SaveSetLed:
        STAA    ModeLeds


        .endm
```

```
;  This subroutine simply takes care of lighting the Product led for the
;  currently selected product.
;
;  Input:  PrgProdNbr
;
;  Output: ProdLedsS
;
;  Routines Called:
;  Exit State:          [A],[B],[X],CCR -- indeterminate
;
;
;
;---------------------------------------------------------------------------

ShowProdLed:

; Show which programming product is currently selected by lighting
; that product led steadily (no blinking)

        LDAB    PrgProdNbr      ;Product number 1..10
        JSR     GetProdLed
        STD     ProdLedsS       ;Update the product leds

        RTS


;---------------------------------------------------------------------------
;  S h o w S t a g e I d  (Show cook Stage ID)  Subroutine
;
;  This routine takes care of display the cook stage identifier in the
;  display digits pointed to by [X].  For convenience, PrgStageNbr can
;  be set to "99" to display "Hold" cycle parameters
;
;  Input:  [X] -- points to display digits
;          [B] -- optional ID message number, for cycling display
;                 [B] = 0  ==>  no alternating message
;          PrgStageNbr -- cook stage index, 0..MaxCkStage.
;                         else = 99 to indicate "Hold" cycle parameters
;
;  Output: [X] digits
;
;  Routines Called:
;  Exit State:          [A],[B],[X],CCR -- indeterminate
;
;
;
;-----------------------------------------     ----------------------------

ShowStageId:

; First of all, check to see if we have a "cycling" message to display.
; If [B] = 0 on entry here, caller wants continuous display of "St. N".
; Otherwise, [B] = message number of parameter identifier, to be
; alternated with the stage number display.

        TSTB                    ;Is [B] = 0?




        BEQ     ShowStageNbr    ; If so, do continuous stage number display
                                ;    (don't even worry about PrgDispTmr)

; If the timer counts down to 0, we need to restart it

ChkTmr0:
        LDAA    PrgDspTmr       ;Else get the Program mode Display Timer
        BNE     WhatDspStep     ; If > 0 (running), see where we are...

        LDAA    #32             ; Else if we hit 0, reload timer again
        STAA    PrgDspTmr

; What stage of the display sequence are we in?

WhatDspStep:                    ;What display step are we on?
        CMPA    #20
        BHI     ShowStageNbr    ; - display "St. N" for first part of cycle

        CMPA    #4              ; - display parameter id for next part
        BHI     ShowStageMsg

        LDAB    #MsgBlanks.     ; - display separator blanks for a short time
                                ;    at the end of the message cycle
ShowStageMsg:
        JSR     ShowMsg         ;[B] = Msg id, [X] = display digits

        BRA     StageIdDone


; Display stage number

ShowStageNbr:

        LDAB    PrgStageNbr     ;Get the current stage number
        BMI     ShowHoldStage   ; (StageNbr $FF ==> "Hold")

        INCB                    ;Convert 0-based index (0..9) to 1..10 range

        SEC                     ;We DO want leading zeroes blanked
        JSR     BinToBcd2Dig    ;Convert number to two display characters
        STD     _Dig3,X         ;Display in _Dig3 & _Dig4
                                ; (Note: BinToBcd2Dig does not affect [X])

        LDAA    #Char.S.        ;"St" in digits _Dig1 & _Dig2
        LDAB    #Char.t.
        STD     _Dig1,X

        LDAA    #Dig2Dot.       ;Turn on the decimal point after the "t"
        STAA    _DigLeds,X

        BRA     StageIdDone

ShowHoldStage:                  ;PrgStageNbr set to $FF for "Hold" cycle parms
        LDAB    #MsgHold.

        JSR     ShowMsg         ;[X] still points to display digits

;opt    BRA     StageIdDone

StageIdDone:
```

```
;-----------------------------------------------------------------------------
; D o n e A l l C k S t a g e s   (Done with All Cook Stages)  Subroutine
;
; This subroutine handles what needs to be done when we are finished
; programming cook stages.  There are several indications of when we
; are done programming cook stages:
;
;       - We have just finished the last item of the maximum cook stage
;
;       - The user has left a 00:00 cook time unchanged -- essentially
;         passing up the opportunity to "add" a cook stage.  (Since all
;         cook cycles are in order when we start at the top of a product,
;         we know that all cycles following a 00:00 cycle are 00:00 also).
;
; Basically, this routine sorts the cook stages into proper order
; (descending order by time), then sets the PrgStep value to the next
; step after cook stages.
;
;
; Input:
;
; Output: PrgProductRec -- CkStages array sorted into proper order
;         PrgStep, PrgSubStep -- initialized for the first post-cookstage
;                                programming step.
;
; Routines Called:
; Exit State:          [A],[B],[X],CCR -- indeterminate
;
;
;
;-----------------------------------------------------------------------------

DoneAllCkStages:
                                  ;Sort the cook stages, and select a uniform
        JSR     SortCkStages      ; "strict HH:MM" or "MM-only" format for all
                                  ; times, based on format of first time.
                                  ;(--> also changes alarms to same format)

        LDAA    #HoldTimeStep.    ;Skip ahead to the Hold Time programming
        STAA    PrgStep
        CLR     PrgSubStep


        RTS


;-----------------------------------------------------------------------------
; D o n e T h i s C k S t a g e   (Done with This Cook Stage)  Subroutine
;
; This subroutine handles what needs to be done when we are finished
; with the current cook stage.  There are two situations where we
; are done programming the current cook stage:
;
;       - We have just finished the last item of the current cook stage
;
;       - The user has changed a previously non-zero cook time to 00:00,
;         essentially indicating that he wants to "delete" the current
;         stage.  When this happens, there is no point in programming
;         the cook stage parameters for a stage the user has just deleted.
;
; Basically, this routine checks to see if there are any cook stages
; left after this one.  If so, this routine sets PrgStageNbr, PrgStep,
; and PrgSubStep to begin with the first parameter of the NEXT cook stage.
; Otherwise, (ie this was the last stage), this routine calls the
; "DoneWithCkStages" routine (above) to finish up cook stage programming
; and advance to the next step of product programming.
;
; Input:
;
; Output: PrgProductRec -- CkStages array sorted into proper order
;         PrgStep, PrgSubStep -- initialized for the start of the next
;              cook stage, or for the first post-cookstage programming step.
;
; Routines Called:
; Exit State:          [A],[B],[X],CCR -- indeterminate
;
; C
; F
;-----------------------------------------------------------------------------

DoneThisCkStage:

        LDAB    PrgStageNbr       ;Get CURRENT cook stage index
        CMPB    #MaxCkStages.     ;Were we already on the last stage?
        BHS     DoneWLastStages   ; If so, we're done with all cook stage stuff

StartNextStage:
        INCB                      ;Else increment the current cook stage nbr...
        STAB    PrgStageNbr       ;   ...and save it back into PrgStageNbr
                                  ; (ProgCkTime will calculate StagePtrS...)

        LDAA    #SelStageStep.    ;Return to the "Select Stage" step
        STAA    PrgStep
        CLR     PrgSubStep        ;Start out on the "init" step

        BRA     DnThisCkDone

DoneWLastStage:                   ;If we were on the last cook stage...
                                  ; ...we're done with cook stage programming
        JSR     DoneAllCkStages   ; ==> sort stages, etc, and move on


DnThisCkDone:

        RTS



;-----------------------------------------------------------------------------
; D o n e W i t h P r o d u c t   (Done with Product)  Subroutine
;
; This subroutine handles what needs to be done when we are finished
; with the current product.  There are three situations where we
;
;       - The user has pressed and held the SET key while on
;         a product programming step, to return to Product Select step.
;
;       - An automatic exit from Programming is being executed.
;
; This routine takes care of cleaning up any loose ends, such as saving
; the product back into the ProdArray if any changes have been made, etc.
;
; NOTE: This routine DOES NOT set the value of PrgStep & PrgSubStep, since
; we may have come here as we perform an automatic exit.  The caller will
; need to assure that PrgStep & PrgSubStep are set appropriately if we are
; going to stay in program mode and loop back to the Product Select step.
;
;
; Input:
;
; Output:
;
; Routines Called:
; Exit State:          [A],[B],[X],C  -- indeterminate
;
;
; L.
;-----------------------------------------------------------------------------

DoneWithProduct:

        LDAA    PrgChanged        ;If "Changed" flag <> 0...
        BEQ     SaveDone
                                  ; ...need to save the current PrgProduct
        JSR     SavePrgProduct    ;Note: save routine takes care of sorting
                                  ; cook stages and alarms, and picking a
SaveDone:                         ; uniform "HH:MM" or "MM-only" format for all


DnWithProdDone:

        RTS



;-----------------------------------------------------------------------------
; P r o g C k H H M M   (Program Cook-stage HH:MM time)  Subroutine
;
; This routine takes care of programming the cook stage HH:MM time value for
; the cook stage indicated by PrgCkStageNbr.
;
;
; Input:  PrgStageNbr -- indicates which cook stage we are programming
;         PrgSubStep -- indicates current "substep" of this programming step
;
; Output: PrgStagePtrS -- points to beginning of the cook stage record
;         PrgProduct.CkStage[N].HHMMSS
;

; Routines Called:
; Exit State:          [A],[B],[X],CCR -- indeterminate
;
; C
; P.
;-----------------------------------------------------------------------------

ProgCkHHMM:

; See if we need to initialize for new parameters.
; PrgSubStep = 0  ==>  we're just starting with this parameter.

CkHHMMChkInit:
        LDAA    PrgSubStep        ;Substep = 0  ==>  Need to initialize
        BNE     CkHHMMInitDone    ; (if > 0, already initialized)

; The "Time" parameter is always the first step of programming a cook stage.
; "PrgStageNbr" is already set -- we need to calculate PrgStagePtrS here.

        LDAB    PrgStageNbr       ;Get the cook stage index number
        LDAA    #CkStageSz.       ;Get the size of each cook stage block
        MUL                       ;Calculate offset to current cook stage
        ADDD    #PrgCkStages.     ;Add address of start of PrgCkStages array
        STD     PrgStagePtrS      ;Save pointer to start of this cook stage

; Now setup the item programming parameters and limits

;opt    LDD     PrgStagePtrS      ;Get pointer to the current cook stage
        ADDD    #_HHMMSS          ;Add offset to the HH:MM time field
        STD     ItemSrcPtrS       ;[D] points to program item -- Set Source Ptr

        LDAA    #TimeType.        ;This item is a "Time" parameter
        STAA    ItemType

        LDD     #MinCkHHMM.       ;Get the minimum time value
        STD     ItemLoLimS

        LDD     #MaxCkHHMM.       ;Get the maximum time value
        STD     ItemHiLimS

        LDD     #0000             ;Regardless of MinCkHHMM value, we need to
        STD     ItemMatch1S       ; make sure user can enter 00:00 to
        STD     ItemMatch2S       ; zero-out an entire cook stage.

        LDX     #RDigits          ;We ALWAYS do programming in the
        STX     ItemPrDigPtrS     ; right side display digits

        CLR     ItemStep          ;Make sure the item programming routine
                                  ; starts out on ITS init step...

; The code at the bottom of this routine wants to know if the pre-edit value
; of this cook timer was 00:00:00, in order to determine if user is adding
; or deleting an interval, etc.  Get the existing value of CkStage[N].HHMMSS
; and save it into the PrgOrigHHMMSS variable for later reference.

        LDX     ItemSrcPtrS       ;Get the pointer to the CkStage[N].HHMMS
        LDD     0,X               ;Get the actual HH:MM value
        STD     PrgOrigHHMMSS+0   ; Save it into PrgOrigHHMMS variable
        LDAB    2,X               ;Get the actual SS value
        STAB    PrgOrigHHMMSS+2   ; And save it as well
```

```
        CLR     PrgDspTmr       ;Reset the programming display timer

        INC     PrgSubStep      ;Init done -- advance to next prg substep

CkHHMMInitDone:

; Display the appropriate legend in the left-side digits

        LDAB    #0
        LDX     #LDigits
        JSR     ShowStageId

; Now call the "Item Programming" routine

        JSR     DoItemProgram   ;Updates displays, handles key inputs,
                                ; validates entries, etc

; If done with THIS item:
;
;  If CkTime = 00:00, and it was 00:00 to start with, then the user
;  has just passed up a chance to add a new stage -- skip all remaining
;  (unused) 00:00 stages and proceed with the next major step of
;  programming (to Hold Mode?)
;
;  Otherwise, move on to the next item for the current cook stage.

CkTimeChkNext:
        LDAA    ItemStep        ;Are we done with the current item?
        CMPA    #99             ; (is done ItemStep = 99?)
        BNE     CkHHMMDone

; Yes -- done with current item!

        INC     PrgStep         ;Move on to the next programming step
        CLR     PrgSubStep      ;Start out on the "init" step

CkHHMMDone:

        RTS


;------------------------------------------------------------------------
;  P r o g C k S S   (Program Cook-stage :SS time)  Subroutine
;
;  This routine takes care of programming the cook stage SS time value for
;  the cook stage indicated by PrgCkStageNbr.
;
;
;  Input:  PrgStageNbr -- indicates which cook stage we are programming
;          PrgSubStep -- indicates current "substep" of this programming step
;
;  Output: PrgStagePtr$ -- points to beginning of the cook stage record
;          PrgProduct.CkStage[N].HHMMSS
;
;  Routines Called:
;  Exit State:          [A],[B],[X],CCR -- indeterminate
;
;
;
;------------------------------------------------------------------------

ProgCkSS:

; See if we need to initialize for new parameters.
; PrgSubStep = 0  ==>  we're just starting with this parameter.

CkSSChkInit:
        LDAA    PrgSubStep      ;SubStep = 0  ==>  need to initialize
        BNE     CkSSInitDone    ; (if > 0, already initialized)

; Setup the item programming parameters and limits

        LDD     PrgStagePtr$    ;Get pointer to the current cook stage
        ADDD    #_HHMMSS+2      ;Add offset to the :SS field
        STD     ItemSrcPtr$     ;[D] points to program item -- Set Source Ptr

        LDD     #00             ;Get the minimum time value
        STD     ItemLoLmt$

        LDD     #59             ;Get the maximum time value
        STD     ItemHiLmt$

        LDD     #0000           ;Regardless of MinCkHHMM value, we need to
        STD     ItemMatch1$     ; make sure user can enter 00:00 to
        STD     ItemMatch2$     ; zero-out an entire cook stage.

        LDX     #RDigits        ;We ALWAYS do programming in the
        STX     ItemPrDigPtr$   ; right side display digits

                                ;------ NumDig routine uses ItemDigits ------
        LDX     #ItemDig3       ;Only uses 2 display digits for numeric entry
        STX     ItemAuxPtr$     ; --> tell it which ones to use via ItemAuxPtr$

        LDAA    #Char.Blank.    ;We want to display "  :" in the
        STAA    ItemDig1        ; left side of the display
        STAA    ItemDig2
        LDAA    #ColonLeds.
        STAA    ItemDigLeds

        CLR     ItemZeroBlanking ;We DO NOT want zero-blanking:
                                 ;  want to show "  :05", "  :00", etc


        CLR     ItemStep        ;Make sure the item programming routine
                                ; starts out on ITS init step...

; Now reset the display timer and advance to the next step

        CLR     PrgDspTmr       ;Reset the programming display timer

        INC     PrgSubStep      ;Init done -- advance to next prg substep

; Display the appropriate legend in the left-side digits

        LDAB    #MsgSec.

        LDX     #LDigits        ;(display stage number continuously)
        JSR     ShowStageId

; Call the item programming routine

;>>>
        LDAA    #NumDigType.    ;This item is a "2 digit number" parameter
        STAA    ItemType

        JSR     DoItemProgram   ;Updates displays, handles key inputs,
                                ; validates entries, etc
;>>>


; If done with THIS item:
;
;  If CkTime = 00:00, and it was 00:00 to start with, then the user
;  has just passed up a chance to add a new stage -- skip all remaining
;  (unused) 00:00 stages and proceed with the next major step of
;  programming (to Hold Mode?)
;
;  Otherwise, move on to the next item for the current cook stage.

CkSSChkNext:
        LDAA    ItemStep        ;Are we done with the current item?
        CMPA    #99             ; (is done ItemStep = 99?)
        BNE     CkSSDone

; Yes -- done with current item!

; Is the current cook time = 00:00?

        LDX     PrgStagePtr$    ;Get the pointer to the current cook stage

        LDAB    _HHMMSS+0,X     ;Get the current cook time HH
        ORAB    _HHMMSS+1,X     ; "MM" in the MM portion
        ORAB    _HHMMSS+2,X     ; "SS" in the SS portion

        BNE     ContThisStage   ;If Time <> 00:00:00, we definitely need to
                                ; continue programming the rest of this stage

        LDAB    PrgOrigHHMMSS+0 ;Else if 00:00:00 now,
        ORAB    PrgOrigHHMMSS+1 ;   was it 00:00:00 before edit?
        ORAB    PrgOrigHHMMSS+2

        BEQ     SkipRemStages   ; If so, we are at end of stages -- skip ahead

        BRA     SkipThisStage   ;If was <> 00:00, but now IS 00:00, user
                                ; deleted current stage -- go to next (if any)


; Continue programming remaining parameters for the current cook stage

ContThisStage:

        INC     PrgStep         ;Move on to the next programming step
        CLR     PrgSubStep      ;Start out on the "init" step

        BRA     CkSSDone


; User deleted this stage (was <> 00:00, but just now set to 00:00)

SkipThisStage:

        JSR     DoneThisCkStage ;Move on to start of next cook stage, if any,
                                ; else if none left, go to next prog section
        BRA     CkSSDone


; Done with cook stage programming (was 00:00, still 00:00)

SkipRemStages

        JSR     DoneAllCkStages ;Skip rest of cook stages --
                                ;  go straight to next programming section
;opt    BRA     CkTimeDone

CkSSDone:

        RTS


;------------------------------------------------------------------------
;  P r o g C k T m p   (Program Cook-stage Temperature)  Subroutine
;
;  This routine takes care of programming the cook stage temperature value for
;  the cook stage indicated by PrgCkStageNbr.
;
;
;  Input:  PrgStageNbr -- indicates which cook stage we are programming
;          PrgStagePtr$ -- points to beginning of the cook stage record
;          PrgSubStep -- indicates current "substep" of this programming step
;
;  Output: PrgProduct.CkStage[N].SetptTmpF$
;
;  Routines Called:
;  Exit State:          [A],[B],[X],CCR -- indeterminate
;
;
;
;------------------------------------------------------------------------

ProgCkTmp:

; See if we need to initialize for new parameters.
; PrgSubStep = 0  -->  we're just starting with this parameter.
```

```
        LDD     PrgStagePtr$    ;Get pointer to the current cook stage
        ADDD    #_SetptTmpF$    ;Add offset to the temperature field
        STD     ItemSrcPtr$     ;[D] points to program item -- Set Source Ptr

        LDAA    #TmpType.       ;This item is a "Temperature" parameter
        STAA    ItemType

        LDD     #MinCkTmpF.     ;Get the minimum time value
        STD     ItemLoLmt$

        LDD     #MaxCkTmpF.     ;Get the maximum time value
        STD     ItemHiLmt$

        STD     ItemMatch1$     ;No other "match" values outside the
        STD     ItemMatch2$     ; indicated temperature range...

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

ChTmpInitDone:

; Display the appropriate legend in the left-side digits

        LDAB    #MsgCkTmt.
        LDX     #LDigits
        JSR     ShowStageId

; Now call the "Item Programming" routine

        JSR     DoItemProgram   ;Updates displays, handles key inputs,
                                ; validates entries, etc

; If done with THIS item, move on to the next

ChTmpChkNext:
        LDAA    ItemStep        ;Are we done with the current item?
        CMPA    #99             ; (is does ItemStep = 99?)
        BNE     ChTmpDone

; Yes -- done with current item!

        INC     PrgStep         ;Move on to the next programming step
        CLR     PrgSubStep      ;Start out on the "init" step

ChTmpDone:

        RTS

;-----------------------------------------------------------------------
; P r g C k R a d i a n t   (Program Cook-stage Radiant duty)  Subroutine
;
;  This routine takes care of programming the cook stage radiant heat
;  duty cycle value for the cook stage indicated by PrgCkStagePtr$.
;  The duty cycle is programmed as a percentage, 0..100.
;
;
;  Input:  PrgStageNbr -- indicates which cook stage we are programming
;          PrgStagePtr$ -- points to beginning of the cook stage record
;          PrgSubStep -- indicates current "substep" of this programming step
;
;  Output: PrgProduct.CkStage[N].RadPcnt
;
;  Routines Called:
;  Exit State:          [A],[B],[X],CCR -- indeterminate
;
;
;
;-----------------------------------------------------------------------

PrgCkRadiant:

; See if we need to initialize for new parameters.
; PrgSubStep = 0  ==>  we're just starting with this parameter.

CkRadChkInit:
        LDAA    PrgSubStep      ;SubStep = 0  ==>  Need to initialize
        BNE     CkRadInitDone   ; (if > 0, already initialized)

        LDD     PrgStagePtr$    ;Get pointer to the current cook stage
        ADDD    #_RadPcnt       ;Add in the offset to the RadPcnt field
        STD     ItemSrcPtr$     ;[D] points to program item -- Set Source Ptr

        LDAB    #PcntType.      ;This item is a Radiant "percent" parameter
        STAB    ItemType

        LDD     #0              ;Get the minimum percent value
        STD     ItemLoLmt$

        LDD     #100            ;Get the maximum percent value
        STD     ItemHiLmt$

        STD     ItemMatch1$     ;No other "match" values outside the
        STD     ItemMatch2$     ; indicated temperature range...

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

; Display the appropriate legend in the left-side digits

        LDAB    #MsgRadPcnt.
        LDX     #LDigits
        JSR     ShowStageId

; Now call the "Item Programming" routine

        JSR     DoItemProgram   ;Updates displays, handles key inputs,
                                ; validates entries, etc

; If done with THIS item, move on to the next

CkRadChkNext:
        LDAA    ItemStep        ;Are we done with the current item?
        CMPA    #99             ; (is does ItemStep = 99?)
        BNE     CkRadDone

; Yes -- done with current item!

        INC     PrgStep         ;Move on to the next programming step
        CLR     PrgSubStep      ;Start out on the "init" step

CkRadDone:

        RTS

;-----------------------------------------------------------------------
; P r g C k R a d T m p   (Program Cook-stage Radiant Temperature)  Subrtn
;
;  This routine takes care of programming the cook stage radiant temperature
;  value for the cook stage indicated by PrgCkStageNbr.
;
;
;  Input:  PrgStageNbr -- indicates which cook stage we are programming
;          PrgStagePtr$ -- points to beginning of the cook stage record
;          PrgSubStep -- indicates current "substep" of this programming step
;
;  Output: PrgProduct.CkStage[N].RadTmpF$
;
;  Routines Called:
;  Exit State:          [A],[B],[X],CCR -- indeterminate
;
;
;
;-----------------------------------------------------------------------

PrgCkRadTmp:

; See if we need to initialize for new parameters.
; PrgSubStep = 0  ==>  we're just starting with this parameter.

CkRTmpChkInit:
        LDAA    PrgSubStep      ;SubStep = 0  ==>  Need to initialize
        BNE     CkRTmpInitDone  ; (if > 0, already initialized)

        LDD     PrgStagePtr$    ;Get pointer to the current cook stage
        ADDD    #_RadTmpF$      ;Add offset to the temperature field
        STD     ItemSrcPtr$     ;[D] points to program item -- Set Source Ptr

        LDAB    #TmpType.       ;This item is a "Temperature" parameter
        STAB    ItemType

        LDD     #MinCkTmpF.     ;Get the minimum time value
        STD     ItemLoLmt$

        LDD     #MaxCkTmpF.     ;Get the maximum time value
        STD     ItemHiLmt$

        STD     ItemMatch1$     ;No other "match" values outside the
        STD     ItemMatch2$     ; indicated temperature range...

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

CkRTmpInitDone:

; Display the appropriate legend in the left-side digits

        LDAB    #MsgRadRt.
        LDX     #LDigits
        JSR     ShowStageId

; Now call the "Item Programming" routine

        JSR     DoItemProgram   ;Updates displays, handles key inputs,
                                ; validates entries, etc

; If done with THIS item, move on to the next

CkRTmpChkNext:
        LDAA    ItemStep        ;Are we done with the current item?
        CMPA    #99             ; (is does ItemStep = 99?)
        BNE     CkRTmpDone

; Yes -- done with current item!

        INC     PrgStep         ;Move on to the next programming step
        CLR     PrgSubStep      ;Start out on the "init" step

CkRTmpDone:
```

```
;-----------------------------------------------------------------------
;  P r o g C k L d C o m p   (Program Cook-stage Load Compensation) Subroutine
;
;  This routine takes care of programming the cook stage load compensation
;  value for the cook stage indicated by PrgCkStagePtr$.
;
;
;  Input:  PrgStageNbr -- Indicates which cook stage we are programming
;          PrgStagePtr$ -- points to beginning of the cook stage record
;          PrgSubStep -- indicates current "substep" of this programming step
;
;  Output: PrgProduct.CkStage[N].LoadComp
;
;  Routines Called:
;  Exit State:          [A],[B],[X],CCR -- indeterminate
;
;
;
;-----------------------------------------------------------------------

ProgCkLoadComp:

; See if we need to initialize for new parameters.
; PrgSubStep = 0  ==>  we're just starting with this parameter.

CkLCChkInit:
        LDAA    PrgSubStep      ;SubStep = 0  ==>  Need to initialize
        BNE     CkLCInitDone    ; (if > 0, already initialized)

        LDX     PrgStagePtr$    ;Get pointer to the current cook stage
        LDAB    _Flags.Fan.LC,X ;Get the combination Flags/Fan/LdComp byte
        ANDB    #$0F            ;Keep just the low 4 bits (b3..0 = load comp)
        STAB    PrgLoadComp     ;Save initial value into PrgLoadComp var

        LDD     #PrgLoadComp    ;Use the utility "load comp" var for program
        STD     ItemSrcPtr$     ;[D] points to program item -- Set Source Ptr

        LDD     #MinLC.         ;Get the minimum load compensation value
        STD     ItemLoLmt$

        LDD     #MaxLC.         ;Get the maximum load compensation value
        STD     ItemHiLmt$

        STD     ItemMatch1$     ;No other "match" values outside the
        STD     ItemMatch2$     ; indicated temperature range...

        LDX     #RDigits        ;We ALWAYS do programming in the
        STX     ItemPrDigPtr$   ; right side display digits

                                ;------ NumDDig routine uses ItemDigits ------
        LDX     #ItemDig3       ;Only uses 3 display digits for numeric entry
        STX     ItemAuxPtr$     ; --> tell it which ones to use via ItemAuxPtr$

        LDAA    #Char.L.        ;We want to display "LC:" in the
        STAA    ItemDig1        ; left side of the display
        LDAA    #Char.C.
        STAA    ItemDig2
        LDAA    #ColonLeds.
        STAA    ItemDigLeds

        LDAA    #$FF            ;We Do want leading zero-blanking
        STAA    ItemZeroBlanking

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

CkLCInitDone:

; Display the appropriate legend in the left-side digits

        LDAB    #MsgLoadComp.
        LDX     #LDigits
        JSR     ShowStageId

; Call the item programming routine

;>>>
        LDAB    #NumDDigType.   ;This item is a 2-digit numeric parameter
        STAB    ItemType

        JSR     DoItemProgram   ;Updates displays, handles key inputs,
;<<<                            ; validates entries, etc

; If done with THIS item, move on to the next

CkLCChkNext:
        LDAA    ItemStep        ;Are we done with the current item?
        CMPA    #99             ; (ie does ItemStep = 99?)
        BNE     CkLCDone

; Yes -- done with current item!
;
; First, save new LoadComp value back into composite Flags/Fan/LoadComp byte
; (if value didn't change, we'll just be putting the original value back in)

        LDX     PrgStagePtr$    ;Get pointer to the current cook stage

        LDAB    _Flags.Fan.LC,X ;Get the combination Flags/Fan/LdComp byte
        ANDB    #$F0            ;Zero out the low 4 bits (b3..0 = load comp)

        ORAB    PrgLoadComp     ;"OR" in the new load comp value into b3..0
        STAB    _Flags.Fan.LC,X ;Save new value back into Flags/Fan/LC byte

; Now time to move on.  Are we doing a CookStage or the HoldStage?

; Cook Stage:
;  If this was the last cook stage, move on to next programming step
;  Else if more cook stages remain, return to first item of next cook stage

CkLCNext:
        JSR     DoneThisCkStage ;(Let "DoneThisCkStage" handle cleanup
                                ;  and deciding where to go next...)
        BRA     CkLCDone

; Hold Stage:
;  Simply advance to the next item

HdLCNext:
        INC     PrgStep         ;Move on to the next programming step
        CLR     PrgSubStep      ;Start out on the "init" step

;opt    BRA     CkLCDone


CkLCDone:


        RTS


;-----------------------------------------------------------------------
;  P r o g C k F a n   (Program Cook-stage Fan option) Subroutine
;
;  This routine takes care of programming the cook stage "Fan" option value
;  for the cook stage indicated by PrgCkStagePtr$.  The fan option is really
;  a combination of the BlwrOn and VentOpen flags.
;
;
;  Input:  PrgStageNbr -- indicates which cook stage we are programming
;          PrgStagePtr$ -- points to beginning of the cook stage record
;          PrgSubStep -- indicates current "substep" of this programming step
;
;  Output: PrgProduct.CkStage[N].Flags   (BlwrOn & VentOpen bits)
;
;  Routines Called:
;  Exit State:          [A],[B],[X],CCR -- indeterminate
;
;
;
;-----------------------------------------------------------------------

FanOptionMsgs:  .byte   MsgOn., MsgOff., MsgVent.

MaxFanOption    .equ    2


ProgCkFan:

; See if we need to initialize for new parameters.
; PrgSubStep = 0  ==>  we're just starting with this parameter.

CkFanChkInit:
        LDAA    PrgSubStep      ;SubStep = 0  ==>  Need to initialize
        BNE     CkFanInitDone   ; (if > 0, already initialized)

        LDX     PrgStagePtr$    ;Get pointer to the current cook stage
        LDAB    _Flags.Fan.LC,X ;Get the actual Flags/Fan/LC byte into [B]

        LSRB                    ;"Fan" value is in b5..4 --
        LSRB                    ; shift right 4 times to get into b1..0,
        LSRB                    ; then mask to keep just two bits
        LSRB                    ; (should be a value of 0, 1, or 2...)
        ANDB    #$03

        STAB    PrgFan          ;Save into the "Fan" utility prog variable

; Set Fan item parameters

        LDX     #PrgFan         ;Utility variable for programming list items
        STX     ItemSrcPtr$     ;[X] points to program item -- Set Source Ptr

        LDAB    #MaxFanOption.  ;Set the maximum list index
        STAB    ItemListMax

        LDX     #FanOptionMsgs  ;Set a pointer to the list of "option" msgs
        STX     ItemAuxPtr$

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

CkFanInitDone:

; Display the appropriate legend in the left-side digits

        LDAB    #MsgFan.
        LDX     #LDigits
        JSR     ShowStageId

; Now call the "Item Programming" routine

        JSR     ProgListItem    ;Updates displays, handles key inputs,
                                ; validates entries, etc


; If done with THIS item, move on to the next

CkFanChkNext:
        LDAA    ItemStep        ;Are we done with the current item?
        CMPA    #99             ; (ie does ItemStep = 99?)
```

```
        LDX     PrgStagePtr$    ;Get pointer to the current cook stage
        LDAA    _Flags.Fan.LC,X ;Get the actual Flags/Fan/LC byte into [B]
        ANDA    #11001111b      ;Zero-out the "Fan" bits (b5..b4)

        LDAB    PrgFan          ;Get the programmed fan setting.

        LSLB                    ;"Fan" value should end up in b5..b4 --
        LSLB                    ; shift left 4 times to get it there
        LSLB
        LSLB

        ABA                     ;"ADD" Fan value from [B] into [A]
        STAA    _Flags.Fan.LC,X ;Save the new value back

; Now move on to the next programming step

        INC     PrgStep         ;Move on to the next programming step
        CLR     PrgSubStep      ;Start out on the "init" step

;opt    BRA     ChFanDone


ChFanDone:


        RTS



;-----------------------------------------------------------------------------
; P r g H d T i m e    (Program Hold-stage Time)  Subroutine
;
;  This routine takes care of programming the hold stage time value.
;
;  Input:  PrgSubStep -- indicates current "substep" of this programming step
;
;  Output: PrgProduct.HoldHHMMSS
;
;  Routines Called:
;  Exit State:          [A],[B],[X],CCR -- indeterminate
;
;
;
;-----------------------------------------------------------------------------

PrgHdHHMM:

; See if we need to initialize for new parameters.
; PrgSubStep = 0  ==>  we're just starting with this parameter.

HdHHMMChkInit:
        LDAA    PrgSubStep      ;SubStep = 0  ==>  Need to initialize
        BNE     HdHHMMInitDone  ; (if > 0, already initialized)

; Now setup the item programming parameters and limits


; (This is always the first HoldStage parameter to be programmed)

        LDAB    #$FF            ;Indicate "Hold" cycle with StageNbr = $FF
        STAB    PrgStageNbr     ; (Can share some CookStage routines...)

        LDD     #PrgHdStage     ;Set "StagePtr$" to point to Hold stage...
        STD     PrgStagePtr$

        ADDD    #_HoldHMS       ;Get pointer to program Hold Time
        STD     ItemSrcPtr$     ;[D] points to program item -- Set Source Ptr

        LDAB    #TimeType.      ;This item is a "Time" parameter
        STAB    ItemType

        LDD     #MinHdHHMM.     ;Get the minimum time value
        STD     ItemLoLmt$

        LDD     #MaxHdHHMM.     ;Get the maximum time value
        STD     ItemHiLmt$

        LDD     #0000           ;Regardless of MinHdHHMM value, we need to
        STD     ItemMatchH$     ; make sure user can enter 00:00 to
        STD     ItemMatchL$     ; zero-out the hold cycle

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

HdHHMMInitDone:

; Display the appropriate legend in the left-side digits

        LDAB    #0
        LDX     #LDigits
        JSR     ShowStageId

; Now call the "Item Programming" routine

        JSR     DoItemProgram   ;Updates displays, handles key inputs,
                                ; validates entries, etc

; If done with THIS item, move on to the next

HdHHMMChkNext:
        LDAA    ItemStep        ;Are we done with the current item?
        CMPA    #99             ; (is does ItemStep = 99?)
        BNE     HdHHMMDone

; Yes -- done with current item!
```

```
HdHHMMDone:

        RTS


;-----------------------------------------------------------------------------
; P r g H d S S    (Program Hold-stage :SS time)  Subroutine
;
;  This routine takes care of programming the hold stage SS time value for
;  the hold stage indicated by PrgCkStageNbr.
;
;
;  Input:  PrgStageNbr -- indicates which cook stage we are programming
;          PrgSubStep -- indicates current "substep" of this programming step
;
;  Output: PrgStagePtr$ -- points to beginning of the cook stage record
;          PrgProduct.CkStage[N].HHMMS
;
;  Routines Called:
;  Exit State:          [A],[B],[X],CCR -- indeterminate
;
;
;
;-----------------------------------------------------------------------------

PrgHdSS:

; See if we need to initialize for new parameters.
; PrgSubStep = 0  ==>  we're just starting with this parameter.

HdSSChkInit:
        LDAA    PrgSubStep      ;SubStep = 0  ==>  Need to initialize
        BNE     HdSSInitDone    ; (if > 0, already initialized)

; Setup the item programming parameters and limits

        LDD     PrgStagePtr$    ;Get pointer to the current cook stage
        ADDD    #_HHMMSS+2      ;Add offset to the :SS field
        STD     ItemSrcPtr$     ;[D] points to program item -- Set Source Ptr

        LDD     #00             ;Get the minimum time value
        STD     ItemLoLmt$

        LDD     #59             ;Get the maximum time value
        STD     ItemHiLmt$

        LDD     #0000           ;Regardless of MinCkHHMM value, we need to
        STD     ItemMatchH$     ; make sure user can enter 00:00 to
        STD     ItemMatchL$     ; zero-out an entire cook stage.

                                ;------ NumDig routine uses ItemDigits ------
        LDX     #ItemDig3       ;Only uses 2 display digits for numeric entry
        STX     ItemNumPtr$     ; --> tell it which ones to use via ItemNumPtr$


        LDAA    #Char.Blank.    ;We want to display "  :" in the
        STAA    ItemDig1        ; left side of the display
        STAA    ItemDig2
        LDAA    #ColumnLeds.
        STAA    ItemDigLeds

        CLR     ItemZeroBlanking ;We DO NOT want zero-blanking:
                                 ;  want to show "  :00",  "  :08", etc

        CLR     ItemStep        ;Make sure the item programming routine
                                ; starts out on ITS init step...

; Now reset the display timer and advance to the next step

        CLR     PrgDspTmr       ;Reset the programming display timer

        INC     PrgSubStep      ;Init done -- advance to next prg substep


HdSSInitDone:


; Display the appropriate legend in the left-side digits

        LDAB    #HoldSec.
        LDX     #LDigits
        JSR     ShowStageId


; Call the item programming routine

;>>>
        LDAB    #NumDigType.    ;This item is a "2 digit number" parameter
        STAB    ItemType

        JSR     DoItemProgram   ;Updates displays, handles key inputs,
                                ; validates entries, etc
;>>>



; If done with THIS item:
;
;
;  Otherwise, move on to the next item for the current cook stage.

HdSSChkNext:
        LDAA    ItemStep        ;Are we done with the current item?
        CMPA    #99             ; (is does ItemStep = 99?)
        BNE     HdSSDone

; Yes -- done with current item!

; If HoldTime currently set to 00:00:00, skip over the rest of the hold stuff

        LDX     #PrgProductRec  ;Get the address of the programming product

        LDAA    _HoldHHMMSS+0,X ;Load the programmed Hold HH value
        ORAA    _HoldHHMMSS+1,X ; "OR" in the programmed Hold MM value
        ORAA    _HoldHHMMSS+2,X ; "OR" in the programmed Hold SS value
```

```
; Hold time <> 00:00 -- continue with rest of Hold cycle parameters

DoHoldProg:

        INC     PrgStep         ;Move on to the next programming step
        CLR     PrgSubStep      ;Start out on the "init" substep

        BRA     HdSSDone

; Hold time = 00:00 -- no need to go through the rest of the Hold parameters

DoneWithHold:

        LDAA    #AlmHHMMStep.   ;Skip ahead to the Hold Time programming
        STAA    PrgStep
        CLR     PrgSubStep

;Exit   BRA     HdSSDone

HdSSDone:

        RTS



;-----------------------------------------------------------------------------
;  P r o g P r h t T m p    (Program Preheat Temperature)  Subroutine
;
;  This routine takes care of programming the preheat temperature.
;
;
;  Input:  PrgSubStep -- indicates current "substep" of this programming step
;
;  Output: PrgProduct.CkStage[N].PreheatTmpF$
;
;  Routines Called:
;  Exit State:          [A],[B],[X],CCR -- indeterminate
;
;
;
;-----------------------------------------------------------------------------

ProgPrhtTmp:

; See if we need to initialize for new parameters.
; PrgSubStep = 0  ==>  we're just starting with this parameter.

PrhtTmpChkInit:
        LDAA    PrgSubStep      ;SubStep = 0  ==>  Need to initialize
        BNE     PrhtTmpInitDone ; (if > 0, already initialized)

        LDD     #PrgPreheatTmpF$ ;Get pointer to the programmed Preheat tmp
        STD     ItemSrcPtr$     ;[D] points to program item -- Set Source Ptr

        LDAB    #TmpType.       ;This item is a "Temperature" parameter
        STAB    ItemType

        LDD     #MinCkTmpF.     ;Get the minimum temperature value
        STD     ItemLoLmt$

        LDD     #MaxCkTmpF.     ;Get the maximum temperature value
        STD     ItemHiLmt$

        STD     ItemMatch1$     ;No other "Match" values outside the
        STD     ItemMatch2$     ; indicated temperature range...

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgDspTmr       ;Reset the programming display timer

        INC     PrgSubStep      ;Init done -- advance to next prg substep

PrhtTmpInitDone:

; Display the appropriate legend in the left-side digits

        LDAB    #MsgPrht.
        LDX     #LDigits
        JSR     ShowMsg

; Now call the "Item Programming" routine

        JSR     DoItemProgram   ;Updates displays, handles key inputs,
                                ; validates entries, etc

; If done with THIS item, move on to the next

PrhtChkNext:
        LDAA    ItemStep        ;Are we done with the current item?
        CMPA    #99             ; (Is does ItemStep = 99?)
        BNE     PrhtTmpDone

; Yes -- done with current item!

        INC     PrgStep         ;Move on to the next programming step
        CLR     PrgSubStep      ;Start out on the "init" step

PrhtTmpDone:

        RTS



;-----------------------------------------------------------------------------
;  P r o g A l m H H M M  (Program Alarm time HH:MM)  Subroutine
```

```
;
;  Input:  PrgSubStep -- indicates current "substep" of this programming step
;          PrgAlmNbr -- alarm index, 0..MaxAlm
;
;  Output: PrgProduct.Alm$
;
;  Routines Called:
;  Exit State:          [A],[B],[X],CCR -  indeterminate
;
;
;
;-----------------------------------------------------------------------------

ProgAlmHHMM:

; See if we need to initialize for new parameters.
; PrgSubStep = 0  ==>  we're just starting with this parameter.

AlmHHMMChkInit:
        LDAA    PrgSubStep      ;SubStep = 0  ==>  Need to initialize
        BNE     AlmHHMMInitDone ; (if > 0, already initialized)

; Now setup the item programming parameters and limits

        LDX     #PrgAlmTimes    ;Get address of program product alarm array
        LDAB    PrgAlmNbr       ;Get the programming alarm index
        LDAA    #AlmTimeSZ.     ;Mult by nbr of bytes per alarm
        MUL
        ABX                     ;[X] now points to current program alarm

        STX     ItemSrcPtr$     ;[X] points to program item -- Set Source Ptr

        LDAB    #TimeType.      ;This item is a "Time" parameter
        STAB    ItemType

        LDD     #MinCkHHMM.     ;Get the minimum time value
        STD     ItemLoLmt$

        LDD     #MaxCkHHMM.     ;Get the maximum time value
        STD     ItemHiLmt$

        LDD     #0000           ;Regardless of MinCkHHMM value, we need to
        STD     ItemMatch1$     ; make sure user can enter 00:00 to
        STD     ItemMatch2$     ; zero-out an alarm

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

; The code at the bottom of this routine wants to know if the pre-edit value
; of this alarm time was 00:00, in order to determine if user is adding
; or deleting an alarm, etc.  Get the existing value of Alarm[N].HHMMSS
; and save it into the PrgOrigHHMMSS variable for later reference.

        LDX     ItemSrcPtr$     ;Get the pointer to the Alarm[N].HHMMSS

        LDD     0,X             ;Get the actual HH:MM value
        STD     PrgOrigHHMMSS+0 ;Save it into PrgOrigHHMMSS variable
        LDAB    2,X
        STAB    PrgOrigHHMMSS+2

; Now reset the display timer and advance to the next step

        CLR     PrgDspTmr       ;Reset the programming display timer

        INC     PrgSubStep      ;Init done -- advance to next prg substep

AlmHHMMInitDone:

; Display the appropriate legend in the left-side digits

        LDAB    #MsgAlarms.
        ADDB    PrgAlmNbr
        LDX     #LDigits
        JSR     ShowMsg

; Now call the "Item Programming" routine

        JSR     DoItemProgram   ;Updates displays, handles key inputs,
                                ; validates entries, etc

; If done with THIS item, move on to the next or return to SelectProd step

AlmChkNext:
        LDAA    ItemStep        ;Are we done with the current item?
        CMPA    #99             ; (Is done ItemStep = 99?)
        BNE     AlmHHMMDone

; Yes -- done with HH:MM of current alarm -- move on to :SS step of this alarm

        INC     PrgStep
        CLR     PrgSubStep

AlmHHMMDone:

        RTS



;-----------------------------------------------------------------------------
;  P r o g A l m S S   (Program Alarm :SS time)  Subroutine
;
;  This routine takes care of programming the alarm SS time value for
;  the alarm indicated by PrgAlmNbr
;
;
;  Input:  PrgAlmNbr -- indicates which alarm we are programming
;          PrgSubStep -- indicates current "substep" of this programming step
;
;  Output:
```

```
;
;
;
; -----------------------------------------------------------------------------

PrgAlmSS:

; See if we need to initialize for new parameters.
; PrgSubStep = 0  ==>  we're just starting with this parameter.

AlmSSChkInit:
        LDAA    PrgSubStep        ;SubStep = 0  ==>  Need to initialize
        BNE     AlmSSInitDone     ; (If > 0, already initialized)

; Setup the item programming parameters and limits

        LDD     ItemSrcPtr$       ;Get pointer to the Alarm HHMM from prev step
        ADDD    #2                ;Add offset to the :SS field
        STD     ItemSrcPtr$       ;[D] points to program item -- Set Source Ptr

        LDD     #00               ;Get the minimum time value
        STD     ItemLoLmt$

        LDD     #59               ;Get the maximum time value
        STD     ItemHiLmt$

        LDD     #0000             ;Regardless of MinChkMMM value, we need to
        STD     ItemMatch1$       ; make sure user can enter 00:00 to
        STD     ItemMatch2$       ; zero-out an entire cook stage.

                                  ;------- NumDig routine uses ItemDigits ------
        LDX     #ItemDig3         ;Only uses 2 display digits for numeric entry
        STX     ItemNumPtr$       ; --> tell it which ones to use via ItemNumPtr$

        LDAA    #Char.Blank.      ;We want to display "  :" in the
        STAA    ItemDig1          ; left side of the display
        STAA    ItemDig2
        LDAA    #ColonLeds.
        STAA    ItemDigLeds

        CLR     ItemZeroBlanking  ;We do NOT want zero-blanking:
                                  ; want to show "  :00", "  :00", etc

        CLR     ItemStep          ;Make sure the item programming routine
                                  ; starts out on ITS init step...

; Now reset the display timer and advance to the next step

        CLR     PrgDspTmr         ;Reset the programming display timer

        INC     PrgSubStep        ;Init done -- advance to next prg substep


AlmSSInitDone:


; Display the appropriate legend in the left-side digits

; First, see if the display timer has counted down to 0 yet.  If so, reload.

        LDAA    PrgDspTmr         ;Get the display timer into [A]
        BNE     AlmDspTmrDone     ;If > 0, still counting down
        LDAA    #32
        STAA    PrgDspTmr         ;Else need to reload
AlmDspTmrDone:

        LDAB    #MsgAlarm.        ;At first part of cycle, we show alarm nbr msg
        ADDB    PrgAlmNdr
        CMPA    #20
        BHI     ShowAlmSSMsg

        LDAB    #MsgSec.          ;Else in next part, we show " sec"
        CMPA    #4
        BHI     ShowAlmSSMsg

        LDAB    #MsgBlanks.

ShowAlmSSMsg:
        LDX     #LDigits
        JSR     ShowMsg


; Call the item programming routine

;>>>
        LDAB    #NumDigType.      ;This item is a "2 digit number" parameter
        STAB    ItemType

        JSR     DoItemProgram     ;Updates displays, handles key inputs,
                                  ; validates entries, etc
;>>>


; If done with THIS item:
;
;
;  Otherwise, move on to the next item for the current cook stage.

AlmSSChkNext:
        LDAA    ItemStep          ;Are we done with the current item?
        CMPA    #99               ; (Is does ItemStep = 99?)
        BNE     AlmSSDone

; Yes -- done with current alarm!
;
; If current alarm value = 00:00:00, and pre-edit value was 00:00:00, then
; user obviously doesn't want to add any more alarms -- skip over the rest
; of the unused alarms (ie done with alarms).
;
; Else if current alarm value <> 00:00:00, then go on to next alarm, if any
; are left, else we are done with alarm programming.
;
; ==> If we ARE done with the alarms, we return to product select step.
;

        LDX     ItemSrcPtr$       ;Get the pointer to the current alarm SS item
```

```
        BNE     AnyAlmsLeft       ;If current value <> 00:00, see if more to do
        LDAB    2,X
        BNE     AnyAlmsLeft       ;(check the :SS value also...)

        LDD     PrgOrigHHMMSS+0   ;Else alarm now 00:00:00 -- was it 0 before?
        BNE     AnyAlmsLeft       ; If not, user just zeroed out this alarm
        LDAB    PrgOrigHHMMSS+2
        BNE     AnyAlmsLeft       ;(check the :SS value also...)

        BRA     DoneWithAlms      ; If it was 00:00:00 before, user passed
                                  ;  on chance to add a new alarm --
                                  ;  he is obviously done with alarms...
AnyAlmsLeft:
        LDAA    PrgAlmNdr         ;Else get the current alarm index
        CMPA    #NumAlm.          ;Were we already on the last alarm?
        BHS     DoneWithAlms      ; If so, we are done programming alarms

; If more alarms are left, we stay on this step and program next alarm

NextAlmTime:
        INC     PrgAlmNdr         ;Increment the program alarm index

        LDAB    #AlmHHMMStep.     ;Start out on the HH:MM step
        STAB    PrgStep           ; for the "next" alarm...
        CLR     PrgSubStep

        BRA     AlmSSDone


; After last item, we need to return to the "Select Product" step.
; (first see if we need to save the current PrgProduct back into ProdArray)

DoneWithAlms:

        JSR     SortAlms          ;Sort the alarms into proper order

        JSR     DoneWithProduct   ;This is the last step of prod programming...
                                  ; ...save product record, if necessary

        LDAA    #ProdSelStep.     ;Go back to "Select Product" step
        STAA    PrgStep
        CLR     PrgSubStep


AlmSSDone:

        RTS


;-----------------------------------------------------------------------------
;  D o S t a g e S e l e c t  (Do Stage Select) Subroutine
;
;  This routine lets the user specify a cook stage to program
;
;
;  Input:  PrgStageNdr -- Set to $FF to indicate "Hold" stage (not cook stage)
;          PrgSubStep -- indicates current "substep" of this programming step
;
;  Output: PrgProduct.HoldLoadTemp
;
;  Routines Called:
;  Exit State:          [A],[B],[X],CCR -- indeterminate
;
;
;  :
;-----------------------------------------------------------------------------

DoStageSelect:

; See if we need to initialize for new parameters.
; PrgSubStep = 0  ==>  we're just starting with this parameter.

StageChkInit:
        LDAA    PrgSubStep        ;SubStep = 0  ==>  Need to initialize
        BNE     StageInitDone     ; (If > 0, already initialized)

        LDD     #PrgStageNdr      ;Let user enter new stage number...
        STD     ItemSrcPtr$       ;[D] points to program item -- Set Source Ptr

        INC     PrgStageNdr       ;User wants to see index 0 as "Stage 1", etc
                                  ; (we will decrement the result again...)

        LDD     #0                ;Get the minimum stage number
        STD     ItemLoLmt$        ;(0 ==> return to product select)

        LDD     #99               ;Get the maximum stage number
        STD     ItemHiLmt$        ;( > 10 ==> stuff after 10th cook cycle)

        STD     ItemMatch1$
        STD     ItemMatch2$

                                  ;------- NumDig routine uses ItemDigits ------
        LDX     #ItemDig3         ;Only uses 2 display digits for numeric entry
        STX     ItemNumPtr$       ; --> tell it which ones to use via ItemNumPtr$

        LDAA    #Char.Blank.      ;We want to display "  " in the
        STAA    ItemDig1          ; left side of the display
        STAA    ItemDig2
        CLR     ItemDigLeds       ;No colons or decimal points

        LDAA    #$FF              ;We DO want zero-blanking
        STAA    ItemZeroBlanking

        CLR     ItemStep          ;Make sure the item programming routine
                                  ; starts out on ITS init step...

        CLR     PrgDspTmr         ;Reset the programming display timer

        INC     PrgSubStep        ;Init done -- advance to next prg substep


StageInitDone:
```

```
        STAA    LDig1
        LDAA    #Char.t.
        STAA    LDig2
        LDAA    #Char.Blank.
        STAA    LDig3
        LDAA    #Char.Equal.
        STAA    LDig4
        LDAA    #DigDot.
        STAA    LDigLeds


; Now call the "Item Programming" routine

;>>>
        LDAB    #NumDigType.    ;This item is a 2-digit numeric parameter
        STAB    ItemType

        JSR     DoItemProgram   ;Updates displays, handles key inputs,
                                ; validates entries, etc
;>>>


; If done with THIS item, move on to the next

StageChkNext:
        LDAA    ItemStep        ;Are we done with the current item?
        CMPA    #99             ; (ie does ItemStep = 99?)
        BNE     StageDone

; Yes -- done with current item!

        LDAA    PrgStageNbr     ;See where we're headed

        BEQ     BackToPred      ;  0 ==> go to select product step

        CMPA    #10             ; > 10 ==> past last cook stage
        BHI     PastLastStage

GoToCkStage:                    ; Else 1..10: go to indicated cook stage

        DECA                    ; Stage #1 is actually index = 0, etc
        STAA    PrgStageNbr     ; Save the new cook stage index

        LDAA    #CkIdentStep.   ; Go the the first step of that cook cycle
        STAA    PrgStep
        CLR     PrgSubStep

        BRA     StageDone

PastLastStage:                  ;User enters 11 to go past last stage

        JSR     DoneAllCkStages ;Sort cook stages, etc, then go to the
                                ; first step after cook stage programming
        BRA     StageDone

BackToPred:




        JSR     DoneWithProduct ;Save product, if necessary

        LDAA    #ProdSelStep.   ;Return to the product select step
        STAA    PrgStep
        CLR     PrgSubStep

;opt     BRA     StageDone


StageDone:


        RTS




;--------------------------------------------------------------------------
;  D o P r o d S e l e c t  (Do Product Select)  Subroutine
;
;  This routine lets the user chose a product for programming.
;  When a choice is made (by press of a product select key, #1..#10),
;  the indicated product will be read into the PrgProduct record,
;  the PrgChanged flag will be cleared, and PrgStep will advance to
;  the Item Programming step.
;
;  Input:
;
;  Output:
;
;  Routines Called:
;  Exit State:          [A],[B],[X],CCR  -  indeterminate
;
;
;
;--------------------------------------------------------------------------

DoProdSelect:

; See if we just entered "Select Product" step

ChkProdSelInit:

        LDAA    PrgSubStep
        BNE     ProdSelInitDone

        CLR     ScrollCode      ;Make sure we start fresh "Select Prod" msg

        INC     PrgSubStep      ;Advance to the next substep (wait for key)

ProdSelInitDone:


; First of all, update the displays:
;
; Cook/Hold leds should all be off.

        STAA    ModeLeds


; We want all product leds to be lit, to prompt user to select one...

        LDD     #$FFFF
        STD     ProdLeds1

; 7-segment displays...

ScrollProd:
        LDAB    ScrollCode      ;Already running "Select Product" message?
        BNE     DoSelPrMsg      ; (or the "Select Product Help" message?)

        LDAB    #1              ; If not running now, restart it...
        STAB    ScrollCode
        LDD     #SelPrScrMsg
        STD     ScrollSrcPtr1

DoSelPrMsg:
        LDX     #LDigits        ;Scrolling message in the left digits
        JSR     ShowScrollMsg

ShowTen:
        LDAA    #Char.Blank.    ; " 0-9" in the right digits
        STAA    RDig1
        LDAA    #0
        STAA    RDig2
        LDAA    #Char.Minus.
        STAA    RDig3
        LDAA    #9
        STAA    RDig4
        CLR     RDigLeds



; Now see if user has pressed a key yet:
;
; Number keys 1..10 select products 1..10.
; The "Set" key terminates program mode.

        JSR     GetKey          ;See if any keys have been pressed...
        BEQ     SelKeyDone

SelIsItSet:
        CMPA    #KeySet.        ;Is it the SET key?
        BNE     SelIsItNbr

        LDAA    #$FF            ; If so, start the "Exit Pending" operation
        STAA    ExitPending
        CLR     ExitPendClk     ;  (user must Press and Hold to do exit)

        LDAA    PrgProdNbr      ;  - Select the previously selected produ
        BRA     GoProdProg      ;       and commence with prod programmingct




; Number keys?

SelIsItNbr:                     ;Else is it a number key 1..10?
        CMPA    #10
        BHI     SelKeyOther     ;(If not, what is it?)

                                ;#1..#10: select that product for programming
        BRA     GoProdProg      ; (ie Product nbr 1..10 is already in [A])


SelKeyOther:                    ;Else what other key???
        JSR     BadKeySound

;opt    BRA     SelKeyDone

SelKeyDone:


        BRA     DoProdSelDone




;-----  G o P r o d P r o g  -----
;
; Product selected -- move on to the Product Programming stuff
; (Product Number 1..10 is currently in [A]...)

GoProdProg:

        CLR     ScrollCode      ;Make sure we terminate scrolling message

        JSR     GetPrgProduct   ;Get the product indicated by [A] into the
                                ; PrgProductRec (Programming Product record)

        CLR     PrgStageNbr     ;Start on first cook stage, when we get there

        CLR     PrgAlmNbr       ;Start out on first alarm, when we get there

        INC     PrgStep         ;Now move on to the next step of programming
                                ; (First step of Product Programming)

        CLR     PrgSubStep      ;Make sure we start on substep 0 (Init)


DoProdSelDone:


        RTS


;--------------------------------------------------------------------------
;  D o P a s s w d C h e c k  (Do Password Check)  Subroutine
;
;  This macro takes care of having the user enter the password, then
;  determining if the password is valid or not.  Depending on the
;  success of the password entry, this routine may advance PrgStep to
;  = 3 (Item programming) or to = 4 (edit special program).
```

```
;
; Output:
;
; Routines Called:
; Exit State:          [A],[B],[X],CCR  -  indeterminate
;
; Create Date:         4 June 92
; Revision Record:     A - 4 June 92 - Original
;----------------------------------------------------------------

DoPassWdCheck:

; If we are still on PrgStep 1 (Password Entry), the current value
; of PassWdStep should (must) be 0 (init), 1 (the entry steps),
; or in the range 2..6 -- the "post entry" result display steps.

        LDAA    PassWdStep      ;Steps 0 (init) & 1 are entry phase
        CMPA    #PwdInput.      ;Steps > 1 are post-entry result displays
        BHI     PwResult

PwEntry:
        JSR     DoPassWdEntry   ;Update displays, enter next key
        BRA     PwDisplDone

PwResult:
        JSR     DoPassWdResult  ;Update "result" displays (invalid,timeout,etc)

PwDisplDone:


; Now examine PassWdStep to see where we stand: are we done yet?

        LDAA    PassWdStep
        CMPA    #PwdOk.         ;If we got a "OK"...
        BEQ     GrantAccess     ; ...grant user proper access to programming

        CMPA    #PwdNoGo.       ;Else if we got a "No Go"...
        BEQ     DenyAccess      ; ...deny access to programming

        BRA     DoPwdDone       ;Else still on an Entry step, or Result display

GrantAccess:                    ;Complete, valid password entered:
        LDAA    #ProdSelStep.   ;
        STAA    PrgStep         ; - move on to the "Select Product" step
        CLR     PrgSubStep

        BRA     DoPwdDone

DenyAccess:                     ;Incomplete or invalid password:
        LDAA    #99             ; - request exit from Special Programming
        STAA    PrgStep

;opt    BRA     DoPwdDone

DoPwdDone:



        RTS


;----------------------------------------------------------------
; D o E x i t P e n d i n g   (Do Exit Pending)  Macro
;
; This routine handles the "Exit Pending" activity for entry to Program Mode.
;
; This routine is called in the Main Program Mode I/O loop ONLY if the
; "ExitPending" flag is currently true.  This flag is set to "true",
; and the corresponding clock is reset to 0, by the normal Program Mode
; key-handler routines when the SET key is first pressed.
;
; When already in Program Mode, the SET key is pressed and held for
; X seconds to call up Program Mode.  The individual key handlers will
; set the "Prg Exit Pending" flag to OFF, and reset the ExitPendClk to 0
; when the user presses the SET key.  This routine, then, will monitor the
; "hold" part of the press-and-hold requirement.  If the user is still
; holding the SET key when the ExitPendTmr hits X seconds, then this
; routine will signal a request to exit Program Mode by setting
; PrgStep = 99.
;
; Under certain circumstances, pressing the SET key WILL NOT activate
; the PrgPending flag.  Additionally, some circumstances will actually
; cancel a "ExitPending" already in progress.  These situations are
; generally Cook Alarms, Err's, or error conditions.
;
;
; Input:  KeyStat -- current bit status of key inputs
;         ExitPendClk -- 16-hz count-up clock; times how long SET key held
; Output:
;
; Routines Called:
; Exit State:          [A],[B],[X],CCR  -  indeterminate
;
; ,
;
;------------------------             ----------------------------

DoExitPending:
        .macro


; E x i t P e n d i n g
;
; Do we have a "pending" SET key press & hold to take care of?
; (Yes we do, or the main Program I/O loop would not have called this routine)
;


; First of all, see if the user is still holding the SET key

ChkReleased:
        LDAB    #KeySet.        ;Need to see if the SET key
        JSR     ChkKeyPressed   ; is still being held down...
        BNE     KeyStillHeld    ;If still held down, see if held X seconds yet

KeyReleased:                    ;Else user has released SET in < X seconds:
        CLR     ExitPending     ; Reset the "SET key Pending" flag
                                ; -- he gave up too soon

        BRA     ExitPendDone


; If SET is held for >= 1 seconds, we need to exit Program mode.

KeyStillHeld:
        LDAA    ExitPendClk     ;Has the user held the key for 1 seconds yet?
        CMPA    #1*16
        BLO     ExitPendDone    ;(If not, we need to keep waiting...)

; "SET key Pending Timer" has hit 1 second:
;   --> request Program mode exit.

; First, see if we need to save the current product record

ChkExitSave:
        LDAA    PrgStep         ;Get the CURRENT programming step
        CMPA    #FirstProdStep.
        BLO     ExitSaveDone    ; Is it >= first product parameter step?

        JSR     DoneWithProduct ;    If so, we need to "close" this product
ExitSaveDone:


; Now request exit by setting PrgStep = 99...

        LDAA    #99             ;Request exit from Program Mode by
        STAA    PrgStep         ; setting the Program Step = 99...

        CLR     ExitPending     ;Reset the "exit pending" flag (doing it now)

;opt    BRA     ExitPendDone


ExitPendDone:

        .endm



;----------------------------------------------------------------
; I n i t P r g M o d e   (Initialize Programming Mode)  Macro
;
; This routine initialize program mode.
;
; Input:
;
; Output:
;
; Routines Called:



; Exit State:          [A],[B],[X],CCR  -  indeterminate
;
;
;
;------     ----------------------------------    -------------------------

InitPrgMode:
        .macro

; Re-synchronize the blink timer

        CLR     BlnkTmr         ;This is a continuous-running countdown timer.
                                ;(will be all 1's within 1/16th second)


; Make sure the "Program Exit Pending" flag is cleared to start with

        CLR     ExitPending


; Default to the currently selected product as the default programming product,
; in case user just hits the SET key on the Product Select step

        LDX     StateVarsPtrS
        LDAB    _ProdNbr,X

        STAB    PrgProdNbr
                                ;Make sure we clear this flag out -- exit code
        CLR     PrgChanged      ; consults PrgChanged to see if we need to save
                                ; product record when exiting...


; Start on the "Password" step, unless the PrgModePassWd has a length of "0"

        LDAB    PrgModePassWd+0 ;Get the number of keys (N) in the sequence
        BEQ     StartOnProdSel  ;(If no keys, no password...)

        LDAB    MiscFlags
        BITB    #BurnInMode.    ;Else if "burn-in" mode...
        BNE     StartOnProdSel  ; ...password not required

; Start out on the Password entry step

StartOnPwd:
        LDAA    #CodeStep.      ;Move on to the password ("code") step
        STAA    PrgStep         ; User must enter valid password...
        CLR     PrgSubStep

        CLR     PassWdStep      ;Start out on "init" phase of passwd entry...

        LDX     #PrgModePassWd  ;Set the address of the "target" password
        STX     PassWdTargetPtrS

        BRA     InitPrgDone

; If password not required, start out on the "Select Product" step

StartOnProdSel:

        LDAA    #ProdSelStep.   ;Now move on to the Select Product step
```

```
    wt      BRA     InitPrgDone

InitPrgDone:

        .endm

;-----------------------------------------------------------------------
; E x i t P r g M o d e   (Exit Programming Mode) Subroutine
;
;  Input:  None
;
;  Output:
;
;  Routines Called:
;  Exit State:          [A],[B],[X],CCR  -  indeterminate
;
;
;
;---------------    -----------------------------------------------------

ExitPrgMode:
        .macro

; Cancel the "Program Exit Pending" Flag
; (no longer "pending" -- we're doing it now...)

        CLR     ExitPending


; Cancel any scrolling messages that may be in progress

        CLR     ScrollCode


; Make sure we turn the "Set" led Off

        LDAA    ModeLeds
        ANDA    #ZSetLed.
        STAA    ModeLeds


        .endm


;-----------------------------------------------------------------------
; D o P r o g U s e r I o   (Do regular Program User I/O)  Subroutine
;
;
;  Input:
;
;  Output:
;
;  Routines Called:
;  Exit State:          [A],[B],[X],CCR  -  indeterminate
;
;
;
; ----------------------------------------------------------------------


DoProgUserIo:


; First, see if we need to initialize the Programming mode

ChkInit:
        LDAA    PrgStep         ;If PrgStep already > 0,
        BNE     ChkInitDone     ; we don't need to initialize...

        InitPrgMode             ;Else we just got here -- initialize...
                                ; figure out if we need password step or not
                                ;(ie init routine advances PrgStep to
                                ;  "CodeStep" or to "SelProdStep")
ChkInitDone:


; We always have the "SET" led blinking while in Program Mode

        BlinkSetLed


; Keep the Sear/Cook/Hold leds OFF for the moment

        LDAA    ModeLeds
        ANDA    #ZSrCkHdLeds.
        STAA    ModeLeds

; After "Select Product" step, we should always be indicating
;  which product is currently selected for programming...

        LDAA    PrgStep         ;Get the current programming step
        CMPA    #ProdSelStep.   ;Are we on a parameter programming step?
        BLS     ProdLedDone     ;(ie past the Product Select step...)

        JSR     ShowProdLed     ;If so, light only the product led
                                ; of the product we are currently programming
ProdLedDone:


;M a n u a l   E x i t ?
;
; See if we have an "Exit Pending" operation to monitor:
; (user must press and hold SET key to exit program mode)

ChkSetKeyHold:
        LDAA    ExitPending     ;Do we have a "pending exit" to monitor?
        BEQ     ChkSetKeyDone   ;(ie user is holding SET key for exit...)

                                ;If user holds SET key long enough, signal
        DoExitPending           ; exit from Prog Mode by setting PrgStep = 99.
                                ;If released too soon, reset ExitPending to 0.
                                ;(If exit, this rtn DOES call DoneWithProduct)
ChkSetKeyDone:


;A u t o - E x i t ?
;
; Watch for auto-exit if no key activity for 60 seconds

ChkAutoExit:

        LDAA    CurKey          ;Are there currently "no keys" being held?
        BNE     ChkAutoDone

        LDAB    KeyHeldSec      ;Get the "key held" seconds (0..255 secs)
        CMPB    #60             ;Have we had "no key" for 60 seconds?
        BLO     ChkBeep

; Yes -- time to automatically exit from program mode

DoAutoExit:

; If we are on a product programming step, indicate we are now
;  "done" with that product (ie save back in ProdArray if necessary)

ChkAutoSave:
        LDAA    PrgStep         ;Get the CURRENT programming step
        CMPA    #FirstProdStep.
        BLO     AutoSaveDone    ; Is it >= first product parameter step?

        JSR     DoneWithProduct ;    If so, we need to "close" this product
AutoSaveDone:


        LDAA    #99             ;If "no key" for 60 seconds, signal exit
        STAA    PrgStep         ; from program mode by setting PrgStep = 99...

        BRA     ChkAutoDone


; Getting close to auto-exit? -- if so, start warning beeps

ChkBeep:
        CMPB    #52             ;Else are we close to exit time? (ie >= 52 sec)
        BLO     ChkAutoDone     ; If not, just exit

        BITB    #$01            ;If so, is this an even number? ($2,$4,$6,$8)
        BNE     ChkAutoDone
                                ;YES -- sound a short beep...

DoBeep: LDAB    KeyHeld100      ;Get the 1/100's byte
        CMPB    #5
        BHI     ChkAutoDone     ;If > 5/100's, leave buzzer off

        LDAB    #$FF            ;Else for 0/100 to 5/100's...
        STAB    SpkrReq         ; ...turn the buzzer ON

ChkAutoDone:


; What Programming step are we on?
;
;  0 = init (can't still be 0...)
;  1 = password entry
;  2 = product selection
; 3..15 = item programming
;
; 99 = exit Program requested (manual or automatic exit)
;

CodeStep.       .equ    1       ;Password entry

ProdSelStep.    .equ    2       ;Select product

PrhtTmpStep.    .equ    3

SelStageStep.   .equ    4

CkHOPWStep.     .equ    5
CkSSStep        .equ    6

CkTmpStep.      .equ    7
CkFanStep.      .equ    8
CkRadStep.      .equ    9
CkRTmpStep.     .equ    10
CkLCStep.       .equ    11

HdHOPWStep.     .equ    12
HdSSStep.       .equ    13

HdTmpStep.      .equ    14
HdFanStep.      .equ    15
HdRadStep.      .equ    16
HdRTmpSetp.     .equ    17
HdLCStep.       .equ    18

AlmHOPWStep.    .equ    19
AlmSSStep.      .equ    20

FirstProdStep.  .equ    3       ;First step of product programming...


; Now execute the appropriate programming step:

        CaseJSR PrgStep,20

        .word   0               ;0  (Can't be in step 0 still!)
        .word   DoPasswdCheck   ;1  Password entry
        .word   DoProdSelect    ;2  Product Selection

        .word   ProgPrhtTmp     ;3

        .word   DoStageSelect   ;4

        .word   ProgCkHOPW      ;5
        .word   ProgCkSS        ;6
```

```
        .word   ProgCkRadTmp     ;10
        .word   ProgCkLoadComp   ;11

        .word   ProgHoldHM       ;12
        .word   ProgHoldS        ;13

        .word   ProgCkTmp        ;14  -- "Hold" parameters can use
        .word   ProgCkFan        ;15  Cook cycle program routines here,
        .word   ProgCkRadiant    ;16  since these parameters are addressed
        .word   ProgCkRadTmp     ;17  via the PrgStagePtrS, which is set
        .word   ProgCkLoadComp   ;18  to point to HdStage by ProgHoldHM...

        .word   ProgAlarmHM      ;19
        .word   ProgAlarmS       ;20

                                  ;(99 = program exit requested)


; PrgStep = 99  ==>  exit from Programming is requested,
;  do to automatic timeout exit, password failure, or user requested exit.

ChkExitRequest:

        LDAA    PrgStep          ;Get the current step number
        CMPA    #99
        BLO     ChkExitDone      ; < 99 ==> stay in Program mode

; PrgStep DOES = 99: Exit program mode

        ExitPrgMode              ;Finish up -- prepare for Hold if programmed

        LDX     #0FFFF           ;Sound a 1-second beep as we exit
        LDAB    #16              ;  16/16 = 1 second long
        JSR     StartBzr         ;  Go for it...

        LDAA    MiscFlags        ;Leave Program mode by resetting flag to 0
        ANDA    #~PrgMode.
        STAA    MiscFlags

ChkExitDone:



IncPrgIdleDone:

        RTS



        .end ;(end of file)
```

To operate the controller, the POWER switch is turned to the ON position and the control executes self-tests. All displays are blank during internal self-tests, which may take 2–4 seconds. After self-tests are done, all displays and LEDs turn on briefly, and the speaker sounds an alarm, for example, 5 short beeps. Then, the top display scrolls "SELECT Product", to indicate that a product must be selected. All outputs (heat, fan, rotor, etc.) are OFF until a product is selected.

When the top display shows "SELECT product", a PRODUCT key (0–9) is pressed to select the desired product and the associated PRODUCT LED turns on. The control then begins to regulate the air to the PREHEAT temperature. The Top display flashes "Pre-", "HEAT", and the bottom display shows the air temperature in the cavity. A different product can be selected by pressing the associated PRODUCT key. Otherwise, the control begins a heater response test when the product is selected, during the PREHEAT stage. If the air temperature does not reach a predetermined temperature, for example, 150° F. within a predetermined time, for example, four minutes of product selection, then the control shows the message "Heat error" in the top display. This signals that there is some sort of error. Otherwise, the heat remains on, and normal operation can continue.

During PREHEAT, preferably the air heat and radiant heat are both turned on to regulate the air temperature in the cooking chamber to the programmed PREHEAT setpoint. Preferably, the air heat and radiant heat are independently controlling during PREHEAT, COOK and HOLD. Independent control of different types of heaters is disclosed, for example, in U.S. Pat. No. 5,182,439 which is incorporated herein by reference. Other examples of PREHEAT control are disclosed in application Ser. No. 07/746,760 filed Aug. 19, 1991 entitled "PREHEATING METHOD AND APPARATUS FOR USE IN A FOOD OVEN", which is incorporated herein by reference. During PREHEAT, preferably, the blower (fan) runs continuously, the rotor is always off and the vent is always closed. An excerpt of the PREHEAT subroutine is as follows.

```
.. "off" state and interface rtns

;-----------------------------------------------------------------------
;
;       S M O f f . S 0 8
;
; this file contains the code that takes care of processing state information,
; updating the display information and handling key presses for the "Preheat"
; state, which is basically a "standby" state before a cook cycle is started.
;-----------------------------------------------------------------------

        .include B:HMStd.L38

; External variables:

        .extern page0 ScrollCode, page0 ScrollSrcPtrS, page0 ScrollDigPtrS
        .extern page0 ScrollTmr, page0 ScrollDelay.

        .extern SelPrScrReq

        .extern page0 SloTmr, Tmr1msBit., Tmr8msBit., Tmr4msBit., Tmr8msBit.
        .extern page0 SpkrReq
        .extern page0 CurKey, page0 KeyHoldBS

        ; - - - C k S t a g e T y p e - - -

        .extern CkStageSz.
        .extern _HOURS, _SetptTmpFS, _RedPcnt, _RedTmpFS, _Flags.Fan.LC

        .extern _HOURS, _MINS, _MaxHOURS
        .extern FanOn., FanMostlyOff., FanVent., FanKeepOff.

        ; - - - P r o d u c t T y p e - - -

        .extern ProductSz.
        .extern _CkStages, _HdStage, _PreheatTmpFS, _AlmTimes

        .extern NbrCkStages., NbrAlms., NewCkStage., NewAlm.
        .extern _CookHOURS, _HoldHOURS

        ; - - - S t a t e V a r s T y p e - - -

        .extern StateVarsSz.
        .extern _SVProduct, _ProdNbr, _NeedProdUpd
        .extern _State, _SubState, _ExitFlag
        .extern _CookTmr, _LCAdj100
        .extern _RemHH, _RemMM, _RemSS
        .extern _CkStageNbr, _CkStagePtrS
        .extern _ReqSetptTmpFS, _ReqRedPcnt, _ReqRedTmpFS
        .extern _ReqFan, _ReqLoadComp, _ReqLCTmpFS
        .extern _AlmEocCode, _AlmEoc100mS

        .extern _StStePending, _StStpClk

        .extern _RemHOURS, _RemMMSS
        .extern OffState., PreheatState., CookState., HoldState.
        .extern CkCookStep., CkEocStep.
        .extern HdHoldStep., HdEocStep.

        ; - - - - - - - - - - - - - - - - - - -

        .extern StateVarsPtrS

        .extern PrgPending, PrgPendClk

        .extern ProdArray

        .extern AirTmpFS, RdyPlusLmtF, RdyMinusLmtF
        .extern NewSetptTmr, NewSetptDelay.

        .extern MinPrSelTmr, PrSelDelay.

        .extern CtrlDoorOpen, CustDoorOpen

        .extern TmrRunning.

        .extern LDigits, RDigits

        .extern ModeLeds. ZCookLed., ZHoldLed.

        .extern StatusLeds, ReadyLed., ZReadyLed.

        .extern ProdLedsS

        .extern KeySet.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.

        .extern page0 TempByte, page0 TempWordS, page0 SUMover6

;(from OfMsgs.S08:)

        .extern MsgOff., MsgBlanks., MsgNmr.

; External Routines:

        .extern SelectProd, GetProdLed
        .extern BinToBcd2Dig, BinToBcd3Dig, BinToBcd4Dig
        .extern DisplayTime, DisplayTmp, DisplayDoorOpen
        .extern GetKey
        .extern StartBzr, BadKeySound
        .extern ShowMsg, ShowMsgSeq, ShowScrollMsg
```

```
        .global DoOffDisplay, DoOffKeys

;=======================================================================
;=======================================================================
;
; S T A T E   R O U T I N E S :
;
; The routines below are called continually in Run mode to handle items
; that effectively run "in the background" even when the user is in Program
; mode, for example.  These items include turning the "ready" leds ON and OFF
; as appropriate, and watching for hold end of cycle, etc.
;
; For example, if we are in Program mode we let the programming routines
; take over the displays and key inputs, but the ready led's should still
; operate as normal, and the cook timers must be monitored so that we can
; interrupt the programming display when a cook alarm or eoc occurs.
;
;
;=======================================================================
;=======================================================================

;-----------------------------------------------------------------------
; I n i t O f f S t a t e  (Initialize "off" State)  Macro
;
; This macro performs "off" state initialization, including
; clearing the alarm/eoc code and the exit flag.
;
;
; Input:  [X] -- points to start of state variables for current side
;
; Output: _CookTmr._Sts set to 0 (make sure cook clock is not running)
;         _ExitFlag cleared
;
; Routines Called:
; Exit State:           [X] -- unchanged (points to state vars)
;                       [A],[B],CCR -- indeterminate
;
;
;
;----------- ---------------------              -----------------------

InitOffState:
        .macro

; [X] points to state variables for the current side

; Make sure the cook clock is not running (just to save processor time...)

        CLR     _CookTmr+_Sts,X ;Make sure cook clock is not running

; Alarm/Eoc code must be 0...
;
; (a non-zero alarm eoc code causes the main-loop user i/o selector to
;  give priority to normal display routines (Preheat/Cook/Hold) over
;  program mode, etc, so that Alarms and Eoc's can override the displays).

        CLR     _AlmEocCode,X   ;No alarms or Eoc's possible in Preheat mode

; Make sure the "exit" flag is cleared

        CLR     _ExitFlag,X     ;Reset the Exit flag again

; Make sure user can't accidentally start a Preheat too quickly here...

        LDAB    #PrSelDelay.
        STAB    MinPrSelTmr

; Make sure we cancel any previous "Scroll" messages...

        CLR     ScrollCode

        .endm

;-----------------------------------------------------------------------
; D o O f f S t a t e  (Do "Off" State) Subroutine
;
; This routine manages the activity needed in the "off" state.
;
; Input:  StateVarsPtr -- points to start of state vars for current side
;
; Output:
;
; Routines Called:
; Exit State:           [A],[B],[X],CCR -- indeterminate
;
;
;
;-----------------------------------------------------------------------

DoOffState:

;(Pointer to appropriate set of State variables is passed in StateVarsPtrS)

        LDX     StateVarsPtrS   ;Get pointer to current State Variables

; First, check to see if we just entered Preheat and need to initialize...

        LDAA    _SubState,X     ;Is Preheat Step = 0?
        BNE     OffInitDone     ;If not, already initialized...

; Starting a brand new "off" cycle -- cancel cook clock, if running

DoOffInit:
```

```
OffInitDone:

; See if the Product Record for this side has been reprogrammed.  Program Mode
; routines set a flag to indicate selected product has been edited.  If this
; flag is now set to true, we must have just exited Program Mode, or we must
; have been in Cook mode when the product was changed and are just now
; returning to Preheat mode.  (We never change the product parameters in
; the middle of a cook cycle, so the flag stays there until we exit cook...)

ChkProdUpdate:
        LDAA    _NeedProdUpd,X   ;Has selected product been reprogrammed?
        BEQ     ProdUpdDone      ; If not, nothing more to do here...

        LDAA    _ProdNbr,X       ;If product was edited, we need to "select" it
        JSR     SelectProd       ; again to get updated product parameters
                                 ;(Note: this resets the "NeedProdUpd" flag)

ProdUpdDone:                     ;([X] still points to state var's on return)


;Get Setpoint:
;
; Keep the proper temperature setpoint -- 0 deg F for "Off" state --
; installed in the "_SetptTmpF$" state variable.

GetSetpt:
        LDD     #0000            ;We'll keep the heat OFF in the "Off" state
        STD     _ReqSetptTmpF$,X ;(If setpoint is 0 deg F, heat will stay off)
        STD     _ReqRadTmpF$,X
        STD     _ReqLCTmpF$,X    ;(don't really need load comp tmp...)

        CLR     _ReqRadPcnt,X    ; Also, radiant duty cycle = 0%

        LDAA    #FanDampOff.     ; We want the fan really off (no pulses)
        STAA    _ReqFan,X        ;   with the vent closed...

        CLR     _ReqLoadComp,X   ; (We could probably ignore load comp...)

SetptTmpDone:


; Take care of the "Ready" Led -- should always be off here

        LDAA    StatusLeds
        ANDA    #ReadyLed.
        STAA    StatusLeds


; As a safety, keep the Alarm/Exc code reset to 0


        CLR     _AlmExcCode,X    ;No alarms or Exc's possible in Preheat mode


; Does user want "exit" to Preheat?...

        LDAA    _ExitFlag,X      ;Application sets "Exit" flag to indicate
        CMPA    #PreheatState.   ; state transitions requested by user...
        BEQ     OffGoPreheat

        BRA     OffStateDone     ;Else just stay in "Off" state --
                                 ;   nothing else to do...

; ------ Go To Preheat ------

OffGoPreheat:

        LDAA    #PreheatState.   ;Going to the "Preheat" state
        STAA    _State,X         ;Save the new state indicator
        CLR     _SubState,X      ;Start out on "init" step of next state

;;;;    BRA     OffStateDone


OffStateDone:

        RTS



;****************************************************************************
;****************************************************************************
;
; USER-IO ROUTINES:
;
; The routines below are called in Run mode to handle display updating
; and key input processing when no higher-priority task needs the displays.
; For example, if we are in Program mode then the Program routines take over
; the displays and key inputs, and the routines here ARE NOT called.
;
;
;****************************************************************************
;****************************************************************************



;****************************************************************************
;
;     Display Updating Routines
```

```
;----------------------------------------------------------------------------
; DoOffDisplay  (Do "Off" state Display updating)
;
; This routine updates the displays for the "Off" state.
;
; Input:  StateVarsPtr$ -- points to start of state variables
;
; Output: LDigits, RDigits, etc
;         ModeLeds: SearLed, CookLed, HoldLed
;
; Routines Called:
; Exit State:         [A],[B],[X],CCR  -  indeterminate
;
;
;
;----------------------------------------------------------------------------

DoOffDisplay:

; (NOTE: the Ready Led is controlled directly in the DoPreheatState routine,
; so that it operates appropriately even when the user is in program mode,
; etc. )

; On entry here, StateVarsPtr$ points to the state variables record

; First of all, show that no product are currently selected...

        LDD     #0000            ;Make sure all product leds are off
        STD     ProdLeds$


; Restore the state variables pointer value to [X]

        LDX     StateVarsPtr$    ;Get pointer to state variables into [X]

; Make sure NONE of the Sear/Cook/Hold leds are ON (all should be OFF)

        LDAA    ModeLeds
        ANDA    #ZCookLed.
        ANDA    #ZHoldLed.
        STAA    ModeLeds

; First, see if either door is open.  If so, override the displays

        LDAA    CtrlDoorOpen
        ORAA    CustDoorOpen
        BEQ     RegOffDisplay

DoorOpenDisplay:


        JSR     DisplayDoorOpen  ;If either door open, show "door" "open"

        CLR     ScrollCode       ;Keep scroll code clear to start fresh
                                 ; again when the door IS closed
        BRA     OffDispDone


; Regular display for "Off" mode:
; Scrolling "Select Product" message in the left-side displays

RegOffDisplay:

ScrollProd:
        LDAB    ScrollCode       ;Already running "Select Product" message?
        BNE     DoSelPrMsg       ; (ScrollCode clrs itself to 0 at end of msg)

        LDAB    #1               ; If not running now, restart it...
        STAB    ScrollCode
        LDD     #SelPrScrMsg
        STD     ScrollSrcPtr$

DoSelPrMsg:
        LDX     #LDigits         ;Scrolling message in the left digits
        JSR     ShowScrollMsg


; Display "Off" in the right-side display...

        LDAB    #MsgBlanks.      ;Assume the normal message situation
        LDX     #RDigits
        JSR     ShowMsg


OffDispDone:

        RTS



;----------------------------------------------------------------------------
;
;     Key Input Processing Routines
;
;----------------------------------------------------------------------------


;----------------------------------------------------------------------------
; TryToPreheatProd  (Try to Preheat Product)  Macro
;
; This routine tries to "select" the product indicated by the key code
; in [A], and then transition to the "Preheat" state.
;
; If the Sear+Cook+Hold times are > 00:00, then this code will select
; the indicated product into the state variables record pointed to by [X].
; Otherwise -- ie Sear+Cook+Hold time = 00:00 -- the product is NOT
; selectable, so this routine will simply "beep-beep" and leave the
```

```
;  Input:  [A] -- Key code of a number key (product key...)
;          Prod[A].CookHHMMSS, HoldHHMMSS -- programmed Ck/Hd times
;
;  Output: _ProdNbr, _Product -- new product selected (if selectable)
;
;  Routines Called:
;  Exit State:          [A],[B],[X],CCR  -  indeterminate
;
;
;  :
;------------          ---------------------------------------------------------

TryToPreheatProd:
        .macro

; On entry here, [X] points to the state variables record

; Key code (1..10) in [A] identifies the product we are trying to select.
; Look up that product in the product array, and see if it is selectable.
; If it is, select it now...

        PSHA                    ; +[Preserve the new product number]

; First of all, calculate the start address of Prod[A] in the ProdArray...

                                ;Index of product (1..10) is already in [A]
        LDAB    #ProductSz.     ;Get the size of each product record
        MUL                     ;multiply index by record size

        ADDD    #ProdArray      ;Add the start address of the product array
        STD     DBMove6         ;Transfer the Prod[A] address to [X]
        LDX     DBMove6         ;([X] now points directly to Product[A])

                                ;--- Test for all HH:MM:SS = 00:00:00 ---
        LDAB    _CookHHMMSS+0,X ;Get the programmed Cook time HH
        ORAB    _CookHHMMSS+1,X ;  "OR" in the Cook time MM...
        ORAB    _CookHHMMSS+2,X ;  "OR" in the Cook time SS...
        ORAB    _HoldHHMMSS+0,X ;  "OR" in the Hold time HH...
        ORAB    _HoldHHMMSS+1,X ;  "OR" in the Hold time MM...
        ORAB    _HoldHHMMSS+2,X ;  "OR" in the Hold time SS...

        BEQ     CantSelect      ;If sum = 00:00, no cook or hold cycle is
                                ; programmed, so product is not selectable
SelectNewProd:
        PULA                    ; -[Retrieve the Product Number we want]

        LDX     StateVarsPtrS   ;Restore pointer to StateVars record

        JSR     SelectProd      ;Select the new product...
                                ; ([X] still points to state vars on return)

        LDAB    #NewSetptDelay. ;Start the "new setpoint delay timer" so
        STAB    NewSetptTmr     ; that we don't click the contactor ON/OFF
                                ; as soon as user selects a new product

RequestPreheat:
        LDAB    #PreheatState.  ;New product selected -- new request a

        STAB    _ExitFlag,X     ; state transition to "Preheat" state
                                ;(all transitions handled by DoExitState rtne)

                                ;Start the "minimum product select" timer,
        LDAB    #PrSelDelay.    ; which is used to prevent an accidental
        STAB    MinPrSelTmr     ; "double bounce" on product selection
                                ; from starting a cook cycle.  (ie product
                                ; must be selected for X seconds before
                                ; the user can start a cook cycle...)

        LDAB    #0
        LDX     #%1000100000000000  ;( --> This destroys pointer in [X])
        JSR     StartBzr

        BRA     TryPrhtDone

; If Cook and Hold times are all = 00:00, this product is not
; selectable.  Simply "beep-beep" and leave things as they are.

CantSelect:
        PULA                    ; -[Get the requested product number]
                                ;      (just to clear the stack...)

        JSR     BadKeySound     ;Can't select the requested product
                                ; ( --> This destroys pointer in [X])

;opt    BRA     TryPrhtDone

TryPrhtDone:

;(On exit here, [X] DOES NOT point to the StateVars record!)

        .endm

;-------------------------------------------------------------------------------
;  D o O f f K e y s  (Do "Off" state Keys)  Subroutine
;
;  This routine handles key inputs for the "Off" state.
;
;
;  Input:  StateVarsPtrS -- points to start of state variables record
;
;
;  Output:
;
;  Routines Called:
;  Exit State:          [A],[B],[X],CCR  -  indeterminate
;
;
;
;-------------------------------------------------------------------------------

DoOffKeys:

; See if any new keys have been pressed:

        JSR     GetKey          ;Any new keys in the keyboard buffer?
        BEQ     KeyDone         ;(If not, nothing more to do here)

; Get the pointer to the State Variables Record

        LDX     StateVarsPtrS   ;Get pointer to the state variables

ChkNbrKey:
        CMPA    #KeyNbr1.       ;Is it any other number key 1..10? (10 = "0")
        BLO     ChkSetKey
        CMPA    #KeyNbr10.      ; If so, try to select product & go to Preheat
        BHI     ChkSetKey
                                ;If product selectable, go to Preheat...
        TryToPreheatProd        ; else simply "beep-beep" if not selectable
                                ;(this routine destroys [X] register)
        BRA     KeyDone

ChkSetKey:
        CMPA    #KeySet.        ;Else is it the SET key?
        BNE     KeyOther

        LDAA    #1              ;Need to hold "Set" for a few seconds to
        STAA    PrgPending      ; activate program mode.  Set flag to "1" to
        CLR     PrgPendClk      ; initiate a "Press & Hold SET key" operation.
                                ; (Mainline "DoPrgPending" code takes over...)
        BRA     KeyDone

KeyOther:
        JSR     BadKeySound     ;Else what could it be?  (BeepBeep...)

;opt    BRA     KeyDone
;

KeyDone:

        RTS

        .end
```

The READY LED turns on when the air temperature in the cavity is within 10° F. of the setpoint (but this can be changed in the SPECIAL PROGRAM mode.) This prompts the user to load the product. After the product is loaded, the user presses the desired PRODUCT switch to start the timer and enter the COOK mode. The top display shows time remaining in hours and minutes, until less than one hour remains. When less than one hour remains, the top display shows the time remaining in minutes and seconds. The bottom display shows the air temperature in the cavity. Also, the COOK LED turns on and the ROTOR starts turning automatically when the COOK timer is started.

In COOK mode, the selected PRODUCT is cooked during a COOK cycle. A COOK cycle is made up of one or more COOK stages or intervals and optimally, a HOLD stage. During a COOK cycle, the air heating elements are regulated according to the programmed AIR HEAT setpoint for each stage within the COOK cycle. The air heating elements are ON as long as the air temperature is less than the programmed AIR HEAT setpoint. If the air temperature is above the AIR HEAT setpoint, the air heating elements are turned OFF. Additionally, the radiant heat elements are pulsed at the programmed DUTY CYCLE as long as the air temperature in the cooking chamber is less than the programmed RADIANT HEAT setpoint. If the air temperature is above the RADIANT HEAT setpoint, the radiant heat elements are turned off. The spit motor (also called the rotor) is turned on during the COOK cycle. The blower (or fan) is regulated according to the programmed FAN setting for each stage of the COOK cycle. The blower (fan) can be programmed to one of three settings during a COOK cycle stage: ON, OFF or VENT. The ON setting causes the fan to run continuously with the vent closed. The VENT setting causes the fan to run continuously with the vent open. The OFF setting causes the fan to be OFF, except for a short period of time in which it will pulse on. For example, in the OFF state, the fan may pulse ON for 10 seconds every 2 minutes. This pulsing operation is desirable to enable a good sample of the cavity (cooking chamber) air temperature to be obtained, and to assist in cooling the control compartment. Additionally, the fan will turn ON whenever the air heat is ON, regardless of the programmed FAN stage setting. This is desirable to ensure heat transfer from the air heat elements to avoid damage. Additionally, whenever the door (or one of the doors) to the cooking chamber is open, the blower is turned OFF. This is done for safety and efficiency reasons.

Alarms during the COOK cycle cancel themselves. Alternatively, they can be cancelled by pressing the PRODUCT switch. During an alarm, the bottom display flashes "AL x", where "x" is the alarm number. The top display continues to show the COOK time remaining. The speaker sounds as the display flashes. Preferably, there are a total of 5 flashes.

If either or both doors are opened during the COOK cycle, preferably all process outputs are turned OFF and remain OFF until both doors are again closed. A door open detector of a known type may be used to detect these occurrences. Both displays are used to flash the "door open" message. The COOK timer keeps running while the doors are open, but the load compensation feature adjusts the COOK time accordingly due to the likely drop in temperature while the door(s) is open. Alternatively, the COOK timer is paused while the door is open.

To abort a COOK cycle, a user presses and holds the PRODUCT switch until the display shows "Select product." Otherwise, at the end of the COOK cycle, the top display flashes "0:00" and the bottom display flashes "DONE". The product LED also flashes and an alarm sounds. This prompts the user to push the PRODUCT switch to stop the alarm. The rotor stops automatically when the alarm is acknowledged. If no HOLD time is programmed, all process outputs turn OFF and the top display scrolls the "SELECT Product" message. If a HOLD time is programmed, it is not necessary to push the PRODUCT switch to stop the alarm—the alarm will sound and the HOLD mode will automatically be entered. In this case, at the end of the HOLD cycle, the top display flashes "0:00" and the bottom display flashes "Hold", "End". The speaker executes the end-of-hold (EOH) alarm, which is audibly different from the end-of-cycle (EOC) alarm. Again, the user presses the PRODUCT switch to stop this alarm. The ROTOR continues to turn until the EOH alarm is acknowledged. When the alarm is acknowledged, all outputs are turned off and the display displays "SELECT product."

If power is removed from the control at any time, the control will power up again, execute the self-tests, then resume the operation that was active at power-down. If a COOK cycle was timing, then the control will resume the COOK timer. If PREHEAT was active, then PREHEAT will be resumed.

In operation, the control uses the stored parameters for each stage of a COOK cycle to COOK and HOLD product. This is accomplished primarily by controlling the air heat elements, the radiant heat elements, the blower and the rotor in connection with running and monitoring the COOK timer (and other timers) and based on the probed temperature. By way of example, these operations are described below.

Figure 10:
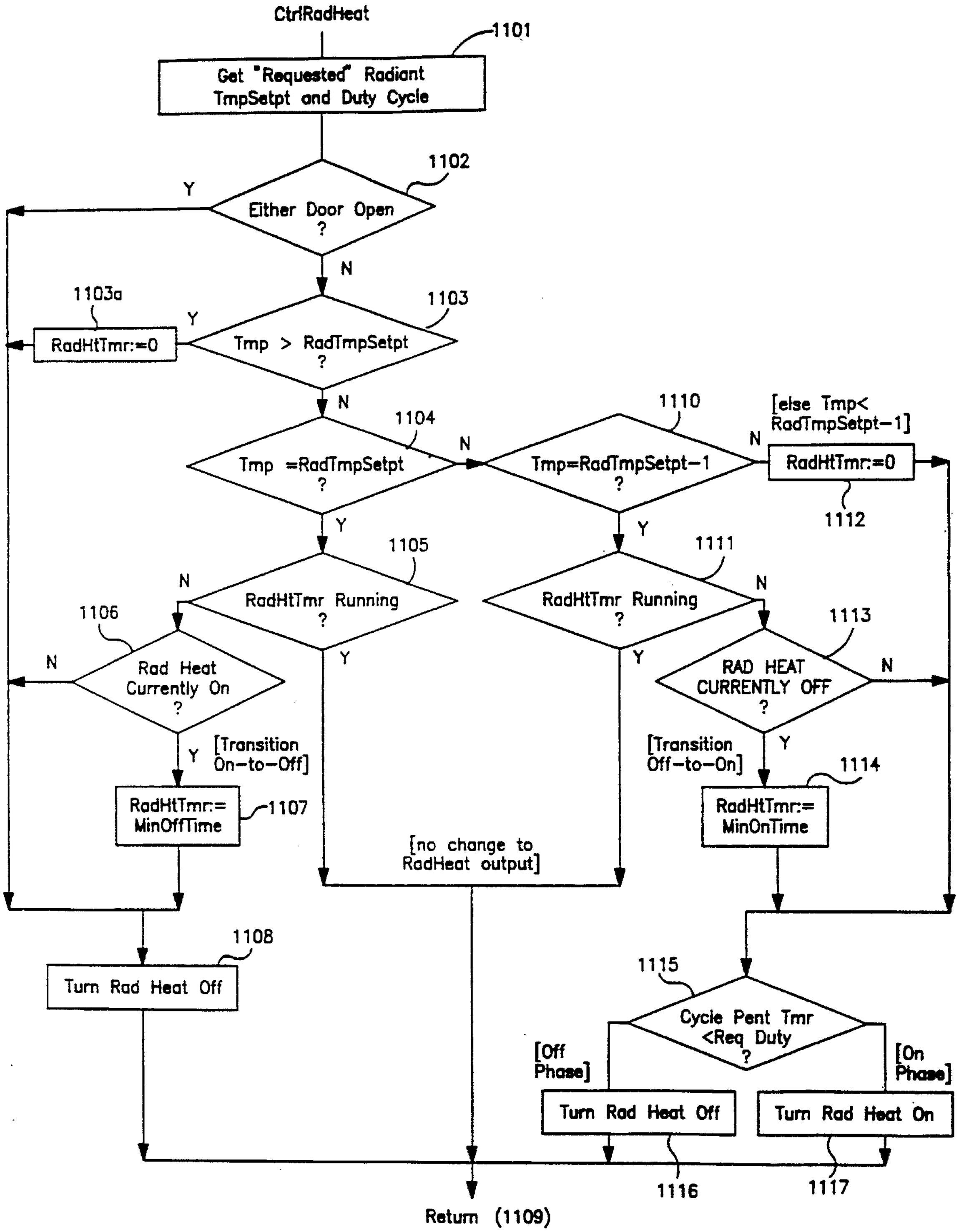
FIG. 10 is a flow chart of the RADIANT HEAT control.

As shown, for example, in connection with FIG. 10, the operation of the Air Heat is described. First, the AIR temperature setpoint for the current stage is obtained (step 1001). Then it is determined whether the (or either) door is open (step 1002). If a door is open the air heat elements are turned OFF (step 1009). Otherwise, it is determined whether the probed temperature is greater than the AIR setpoint temperature (step 1003). If yes, control passes to step 1004 and if not, control passes to step 1005. In step 1005, it is determined whether the probed temperature is equal to the AIR setpoint temperature. If no, control passes to step 1010, if yes, control passes to step 1006. In step 1006, it is determined whether the AIR HEAT TIMER is running. If it is, there is no change to the AIR HEAT output of the controller and control returns to the beginning of the subroutine (step 1016). If the AIR HEAT TIMER is not running, control passes to step 1007. In step 1007, it is determined if the AIR HEAT is ON. If it is not, control passes to step 1009. If it is ON, the AIR HEAT TIMER (off time) is set (step 1008), the AIR HEAT is turned OFF (step 1009) and control passes to step 1016. The AIR HEAT TIMER is used to limit the contactor cycling at the transition temperatures. From steps 1004 and 1007, control passes to step 1009.

If control passes from step 1005 to step 1010, it is determined whether the probed temperature is equal to the AIR setpoint-1. If not, control passes to step 1012. However, if it is, control passes to step 1011, where it is determined whether the AIR HEAT TIMER is running. If it is running, there is no change to the AIR HEAT output and control passes to step 1016. If the AIR HEAT TIMER is not running (step 1011), it is determined whether the AIR HEAT is currently OFF (step 1013). If it is, the AIR HEAT TIMER (on time) is set (step 1014), the AIR HEAT is turned ON-(step 1015) and control passes to step 1016. From step 1012 or if the response is negative to step 1013, control passes to step 1015.

By way of example, the following is an excerpt of a software routine that may be used to control the AIR heat elements of a cooking appliance.

```
                    -- Air Heater Control routines

;--------------------------------------------------------------------
;
;      R R A I R H T . S 0 8
;
; The routines in this file perform the various types of heat control for
; air heater outputs of the rotisserie.
;--------------------------------------------------------------------

        .include G:HHS4.LIB

; External Variables:

        .extern AirTmpFS, AirHtSetptTmpFS

        .extern CtrlDoorOpen, CustDoorOpen

        .extern AirHtTmr, AirHtOffMin., AirHtOnMin.

        .extern StateVarsRec, _ReqSetptTmpFS

        .extern paged IoByte, IoAirHt., zIoAirHt.

        .extern paged TempWordS, paged DDMoved
        .extern paged Math32, paged Math16


; External Routines:



; Routines Defined Here:

        .global InitAirHt

        .global CtrlAirHt, SetAirHtOn, SetAirHtOff



;--------------------------------------------------------------------
;  I n i t A i r H t  (Initialize Air Heat system)  Subroutine
;
;  This routine initializes variables pertinent to the air heater control
;  routines.
;
;  Input:
;
;  Output:
;
;  Routines Called:
;  Exit State:          [A],[B],[X],CCR  -  indeterminate
;
;
;
;-----  ------------------------------  ----------------------------

InitAirHt:

        JSR     SetAirHtOff     ;Make sure the heat output starts out OFF

        CLR     AirHtTmr        ; Make sure we start out with the minimum
                                ;  On/Off timer reset to 0

        RTS


;--------------------------------------------------------------------
;  S e t A i r H t O n  (Set Air Heat On) Subroutine
;
;  This routine simply takes care of turning ON the heat output.
;
;  Input:  none
;
;  Output: IoByte.IoAirHt. --  turned ON
;
;  Routines Called:
;  Exit State:          [B], [X] -- unchanged
;                       [A],CCR -- indeterminate
;
;
;                                            1
;----------------------------   ----------------------------------

SetAirHtOn:

        LDAA    IoByte          ;Get the Io Latch output byte
        ORAA    #IoAirHt.       ;Force the Heater bit to 1 (ON)
        STAA    IoByte          ;Update

        RTS


;--------------------------------------------------------------------
;  S e t A i r H t O f f  (Set Air Heat Off) Subroutine
;
;  This routine simply takes care of turning OFF the heat output.
;
;  Input:  none
;
;  Output: IoByte.IoAirHt. --  turned OFF
;
;  Routines Called:
;  Exit State:          [B], [X] -- unchanged
;                       [A],CCR -- indeterminate
;
;
;
;-- -----------------------  ---------  -------------------------

        LDAA    IoByte          ;Get the Io Latch output byte
        ANDA    #zIoAirHt.      ;Force the Heater bit to 0 (OFF)
        STAA    IoByte          ;Update

        RTS


;--------------------------------------------------------------------
;  G e t A i r H t S e t p t  (Get Air Heat regulating Setpoint)  Macro
;
;  This routine simply examines the state variables record(s) of the
;  currently product(s) and comes up with an appropriate regulating
;  temperature for the thermostatic heat output control routines.
;
;  Input:  StateVarsRec.SetptTmpFS
;
;  Output: RegSetptTmpFS
;
;  Routines Called:
;  Exit State:          [A],[B],[X],CCR -- indeterminate
;
;
;
;--------------------------------------------------------------------

GetAirHtSetpt:
        .macro

; At this point, we only have one set of state variables -- only one
; product can be selected at any given time.  Simply fetch the current
; setpoint from the StateVarsRec and save it into RegTmpFS variable.

        LDX     #StateVarsRec   ;Get setpoint tmp from StateVarsRec...
        LDD     _ReqSetptTmpFS,X

        STD     AirHtSetptTmpFS ; ...and save it as the regulating setpoint

        .endm


;--------------------------------------------------------------------
;  C t r l A i r H t (Control Air Heat Output) Subroutine
;
;  This routine takes care of updating the heater output and the Heat led
;  according to the currently selected mode of Heat control.
;
;  Input:  HeatMode, HeatModeStmp
;          AirTmpFS, SetptTmpFS
;          HeatTmr
;
;  Output: IoByte.IoHtr
;          StaLeds.HeatLed
;
;  Routines Called:
;  Exit State:          [A],[B],[X],CCR -- indeterminate
;
;
;
;--    -------------------------------------------------------------

CtrlAirHt:

; First of all, examine the currently selected product (or products), and
; and decide what the current regulating temperature should be.

        GetAirHtSetpt           ;Assign setpoint tmp into "AirHtSetptTmpFS"



; Check to see if either door is open:

        LDAA    CtrlDoorOpen    ;If both doors are closed...
        ORAA    CustDoorOpen
        BEQ     TStatCtrl       ; ...perform normal thermostatic control


DoorOpenHeatOff:                ;Else if either door is open...

        JSR     SetAirHtOff     ; ...keep the heater off

        JMP     CtrlAirHtDone   ; (exit)


; Regulate the temperature:
;
;  if AirTmpFS > AirSetptFS:        ( > Setpt )
;       then turn heat OFF
;
;  else if AirTmpFS < AirSetptFS-1:  ( < Setpt-1 )
;       then turn heat ON
;
;  else if AirHtTmr > 0 (*)     ( at Setpt or Setpt-1 )
;       then leave heat unchanged
;
;  else if AirTmpFS = AirHtSetptFS  ( = Setpt )
;           turn heat OFF  (*)
;
;  else turn heat ON (*)            ( = Sept-1 )
;
; (*) When we transition from ON-to-OFF or from OFF-to-ON, we start a
; AirHtTmr so that once we start an ON or OFF phase, the contactor will
; remain ON or OFF for a given time before it changes back to the other
; phase.  This is done to prevent contactor clicking when the temperature
; alternates between the transition temperature of Setpt and Setpt-1.
;
; NOTE: "AirHtSetptTmpFS" is the actual "regulating setpoint temperature.
; In systems which may allow multiple products to cook or hold at the same
; time, this temperature may be an average, or minimum, or maximum, etc.
; of the requested setpoints for all the individual products which are
; currently cooking or holding...
;
; The value of AirHtSetptTmpFS is continually re-evaluated above by the
; call to the "GetAirHtSetpt" routine, which examines all appropriate
; setpoint requests and assigns an appropriate value into AirHtSetptTmpFS.
;
```

```
..atCtrl:

        LDX     AirTmpF$            ;Get the current rotisserie temperature
        CPX     AirHtSetptTmpF$     ;Compare to the current regulating setpt tmp

        BHI     OverSetpt           ;If ABOVE setpoint, need heaters OFF
        BEQ     OnSetpt             ;If On setpoint, probably need heaters Off

        INX                         ;"AirTmpF$+1" now in [X]
        CPX     AirHtSetptTmpF$
        BEQ     OnSetptMinus1       ;PotTmp+1 = Setpt  -->  PotTmp = Setpt-1

;xxpt   BLO     UnderSetptMinus1


; If UNDER Setpt-1,
;  unconditionally turn the heat ON and cancel the minimum On/Off timer

UnderSetptMinus1:                   ;Need the heater turned ON (unconditionally)
        CLR     AirHtTmr            ; - clear the Minimum On/Off phase timer
        JSR     SetAirHtOn          ; - turn the heat ON

        BRA     ThStatDone          ;All Done...


; If OVER Setpoint,
;  unconditionally turn the heat OFF and cancel the minimum On/Off timer

OverSetpt:                          ;Need the heater turned OFF (unconditionally)
        CLR     AirHtTmr            ; - clear the Minimum On/Off phase timer
        JSR     SetAirHtOff         ; - turn the heat OFF

        BRA     ThStatDone          ;All Done...


; Exactly ON Setpt:
;  If AirHtTmr is running, make NO CHANGES -- could be finishing out
;    a minimum OFF phase if temperature is alternating Setpt/Setpt-1
;  Else we need to turn heat OFF:
;    If heat is currently ON, we are transitioning to OFF, so start
;       the minimum On/Off timer to guard against contactor clicking

OnSetpt:
        LDAA    AirHtTmr            ; If AirHtTmr is running...
        BNE     ThStatDone          ;  ...make no changes -- just exit now

        LDAA    IoByte              ; Else we want the heat OFF now:
        BITA    #IoAirHt.
        BEQ     SetptHeatOff        ;  If heat is currently ON...

        LDAA    #AirHtOffMin.       ;   ...we are transitioning from On to Off
        STAA    AirHtTmr            ;  - start the "minimum OFF phase" timer

SetptHeatOff:
        JSR     SetAirHtOff         ; Turn the heat OFF

        BRA     ThStatDone          ;All Done...


; Exactly On Setpt-1:
;  If AirHtTmr is running, make NO CHANGES -- could be finishing out
;    a minimum OFF phase if temperature is alternating Setpt/Setpt-1
;  Else we need to turn heat ON:
;    If heat is currently OFF, we are transitioning to ON, so start
;       the minimum On/Off timer to guard against contactor clicking

OnSetptMinus1:
        LDAA    AirHtTmr            ; If AirHtTmr is running...
        BNE     ThStatDone          ;  ...make no changes -- just exit now

        LDAA    IoByte              ; Else we want the heat ON now:
        BITA    #IoAirHt.
        BNE     SetptM1HeatOn       ;  If heat is currently OFF...

        LDAA    #AirHtOnMin.        ;   ...we are transitioning from OFF to On
        STAA    AirHtTmr            ;  - start the "minimum ON phase" timer

SetptM1HeatOn:
        JSR     SetAirHtOn          ; Turn the heat ON

;xxpt   BRA     ThStatDone          ;All Done...


ThStatDone:


CtrlAirHtDone:

        RTS


        .end
```

Figure 11:
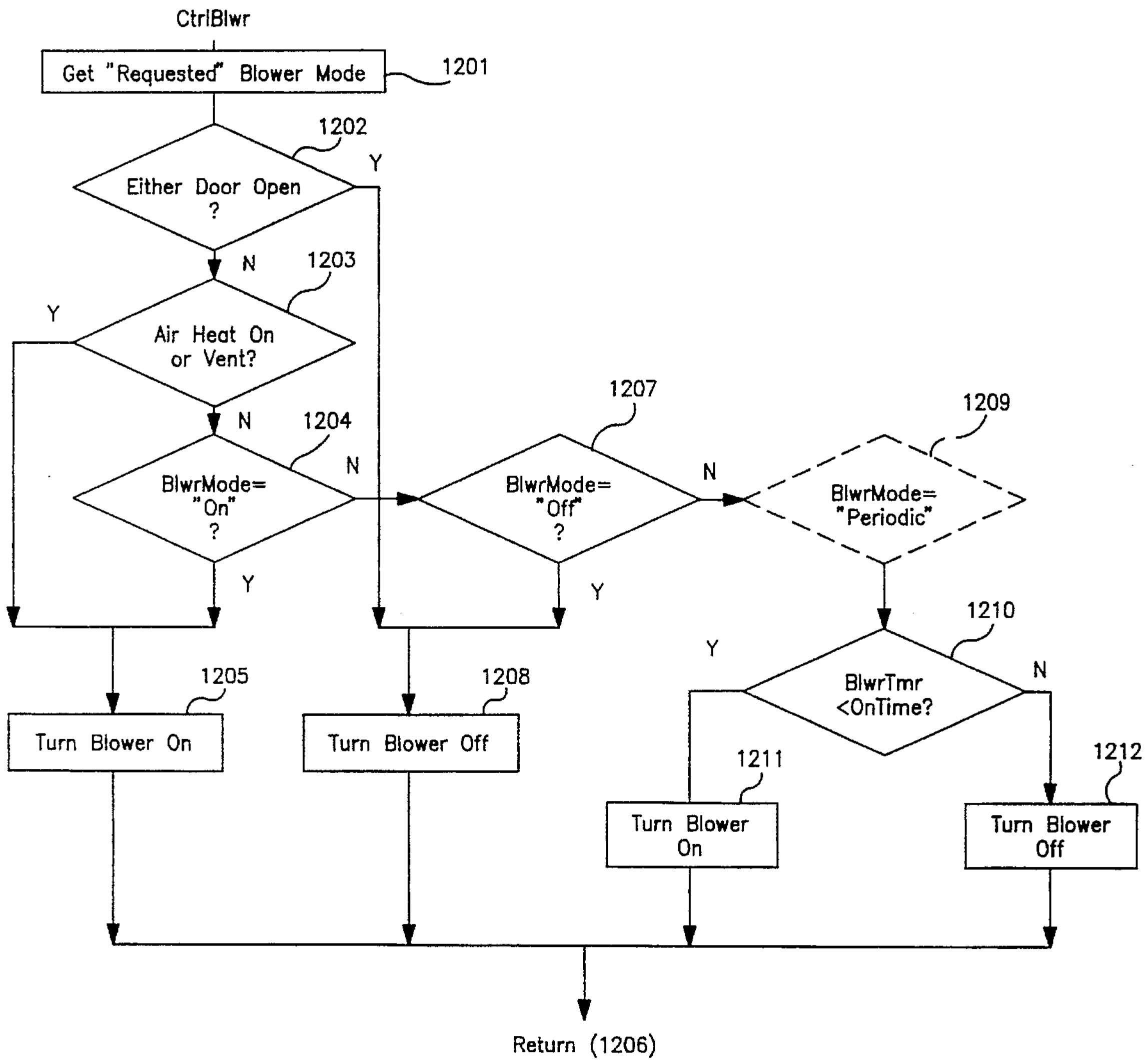
FIG. 11 is a flow chart of the BLOWER.

As shown, for example, in FIG. 11, the operation of the RADIANT HEAT element(s) is described. First, the programmed RADIANT HEAT setpoint and DUTY CYCLE are obtained (step 1101). Then it is determine whether a door is open (step 1102). If a door is open, the RADIANT HEAT is turned OFF (step 1108) and control passes to step 1109 which causes control to return to the beginning of the subroutine. If a door is not open, it is determined whether the probed temperature is greater than the RADIANT HEAT setpoint (step 1103). If yes, a RADIANT HEAT TIMER is set to "0" (step 1103*a*) and control passes to step 1108. If no, it is determined whether the probed temperature equals to the RADIANT HEAT setpoint (step 1104). If no, control passes to step 1110. If yes, it is determined whether the RADIANT HEAT TIMER is running (step 1105). If it is running, there is no change to the RADIANT HEAT output of the control and control passes to step 1109. If the RADIANT HEAT TIMER is not running (step 1105), it is determined whether the RADIANT HEAT is currently ON (step 1106). If not, control passes to step 1108, otherwise the RADIANT HEAT TIMER (off time) is set (step 1107), the RADIANT HEAT is turned OFF (step 1108) and control passes to step 1109.

In step 1110, it is determined whether the probed temperature equals the RADIANT HEAT setpoint-1. If not, control passes to step 1112, otherwise it is determined whether the RADIANT HEAT TIMER is running (step 1111). If it is running, there is no change to the RADIANT HEAT output and control passes to step 1109. If the RADIANT HEAT TIMER is not running (step 1111), it is determined whether the RADIANT HEAT is currently OFF (step 1113). If it is OFF, the RADIANT HEAT TIMER (on time) is set (step 1114) and control passes to step 1115. If it is ON (step 1113), control passes directly to step 1115. In step 1115, it is determined whether a cycle percent timer value is less than the requested DUTY CYCLE. If it is not, the RADIANT HEAT is turned OFF (step 1116) and control passes to step 1109. If it is, the RADIANT HEAT is turned ON (step 1117) and control passes to step 1109.

By way of example, the following is an excerpt of a software routine that may be used to control the radiant heat elements of a cooking appliance.

```
                    -- Radiant Heater Control routines

;----------------------------------------------------------------------
;
;       K R R a d H t . S O R
;
;  The routines in this file perform the various types of heat control for
;  radiant heater outputs of the rotisserie.
;----------------------------------------------------------------------

        .include B:KRStd.LIB

; External Variables:

        .extern RadHtDutyPcnt

        .extern AirTmpFS, RadHtSetptTmpFS

        .extern CtrlDoorOpen, CustDoorOpen

        .extern RadHtTmr, RadHtOffMin., RadHtOnMin.

        .extern RadHtCycPcnt, RadHtCyc100s, RadHt100sPerPcnt.

        .extern StateVarsRec, _ReqSetptTmpFS, _ReqRadPcnt, _ReqRadTmpFS

        .extern page0 IoByte, IoRadHt., xIoRadHt.

        .extern page0 TempWord5, page0 BDMove5
        .extern page0 Math32, page0 Math16


; External Routines:



; Routines Defined Here:

        .global InitRadHt

        .global CtrlRadHt, SetRadHtOn, SetRadHtOff




;----------------------------------------------------------------------
;  I n i t R a d H t  (Initialize Radiant Heat system)  Subroutine
;
;  This routine initializes variables pertinent to the radiant heater control
;  routines.




;
;  Input:
;
;  Output:
;
;  Routines Called:
;  Exit State:          [A],[B],[X],CCR  -  indeterminate
;
;
;
;- ---  -    -- -------------------------------------------------------

InitRadHt:

        JSR     SetRadHtOff     ;Make sure the Heat output starts out OFF

        CLR     RadHtTmr        ; Make sure we start out with the minimum
                                ;  On/Off timer reset to 0

        CLR     RadHtCycPcnt    ;Start at cycle time = 0%

        CLR     RadHtCyc100s    ;Start the 100's at 0


        RTS

;----------------------------------------------------------------------
;  S e t R a d H t O n  (Set Radiant Heat On) Subroutine
;
;  This routine simply takes care of turning ON the heat output.
;
;  Input:  none
;
;  Output: IoByte.IoRadHt. --  turned ON
;
;  Routines Called:
;  Exit State:          [B], [X] -- unchanged
;                       [A],CCR -- indeterminate
;
;
;
;------ ---------------------------- -----------------------------------

SetRadHtOn:

        LDAA    IoByte          ;Get the Io Latch output byte
        ORAA    #IoRadHt.       ;Force the Heater bit to 1 (ON)
        STAA    IoByte          ;Update

        RTS

;----------------------------------------------------------------------
;  S e t R a d H t O f f  (Set Radiant Heat Off) Subroutine
;
;  This routine simply takes care of turning OFF the heat output.
;
;  Input:  none
;
;  Exit State:          [B], [X] -- unchanged
;                       [A],CCR -- indeterminate
;
;
;
;---------------------------------------- -----------------------------

SetRadHtOff:

        LDAA    IoByte          ;Get the Io Latch output byte
        ANDA    #xIoRadHt.      ;Force the Heater bit to 0 (OFF)
        STAA    IoByte          ;Update

        RTS



;----------------------------------------------------------------------
;  G e t R a d H t D u t y A n d S e t p t
;               (Get Radiant Heat Duty cycle and regulating Setpoint) Macro
;
;  This routine simply examines the state variables record(s) of the
;  currently product(s) and comes up with an appropriate regulating
;  temperature and radiant heat duty cycle for the radiant heat output
;  control routines.
;
;  Input:  StateVarsRec.SetptTmpFS, RadPcnt
;
;  Output: RadHtSetptTmpFS, RadHtDutyPcnt
;
;  Routines Called:
;  Exit State:          [A],[B],[X],CCR -- indeterminate
;
;
;------------        ------------------------------------------------

GetRadHtDutyAndSetpt:
        .macro

; At this point, we only have one set of state variables -- only one
; product can be selected at any given time.  Simply fetch the current
; setpoint from the StateVarsRec and save it into RadHtSetptTmpFS variable.

        LDX     #StateVarsRec   ;Get radiant tmp limit from StateVarsRec...
        LDD     _ReqRadTmpFS,X

        STD     RadHtSetptTmpFS ; ...and save it as the regulating setpoint


        LDAB    _ReqRadPcnt,X   ;Get the requested radiant heat percent...

        STAB    RadHtDutyPcnt   ; ...and save it as the regulating duty pcnt

        .endm




;----------------------------------------------------------------------
;  C t r l R a d H t (Control Radiant Heat Output) Subroutine
;
;  This routine takes care of updating the heater output and the Heat led
;  according to the currently selected mode of Heat control.
;
;  Input:  AirTmpFS, RadHtSetptTmpFS
;          RadHtTmr
;
;  Output: IoByte.IoRadHtr
;
;  Routines Called:
;  Exit State:          [A],[B],[X],CCR -- indeterminate
;
;
;
;------          ------------------------------------------------------

CtrlRadHt:

; First of all, examine the currently selected product (or products), and
; and decide what the current regulating temperature should be.

        GetRadHtDutyAndSetpt    ;Assign setpoint tmp into "RadHtSetptTmpFS"
                                ;Assign duty cycle into "RadHtDutyPcnt"


; Check to see if either door is open:

        LDAA    CtrlDoorOpen    ;If both doors are closed...
        ORAA    CustDoorOpen
        BEQ     ThStatCtrl      ; ...perform normal thermostatic control


DoorOpenHeatOff:                ;Else if either door is open...

        JSR     SetRadHtOff     ; ...keep the heater off

        JMP     CtrlRadHtDone   ; (exit)



; Regulate the radiant temperature:
;
;  if AirTmpFS > RadSetptFS:            { > Setpt }
;       then turn heat OFF
;
;  else if AirTmpFS < RadSetptFS-1:  { < Setpt-1 }
;  ~`   then call for heat (turn heat ON/OFF according to duty cycle)
;
;  else if RadHtTmr > 0 (*)     { at Setpt or Setpt-1 }
;       then leave heat unchanged
;
;  else if AirTmpFS = RadHtSetptFS   { = Setpt }
;         turn heat OFF  (*)
;
;  else turn heat ON according to duty cycle (*)   { = Sept-1 }
;
```

```
; phase.  This is done to prevent contactor clicking when the temperature
; alternates between the transition temperature of Setpt and Setpt-1.
;
; NOTE: "RadHtSetptTmpF$" is the actual "regulating setpoint temperature".
; In systems which may allow multiple products to cook or hold at the same
; time, this temperature may be an average, or minimum, or maximum, etc.,
; of the requested setpoints for all the individual products which are
; currently cooking or holding...
;
; The value of RadHtSetptTmpF$ is continually re-evaluated above by the
; call to the "GetRadHtSetpt" routine, which examines all appropriate
; setpoint requests and assigns an appropriate value into RadHtSetptTmpF$.
;

ThStatCtrl:

        LDX     AirTmpF$          ;Get the current rotisserie temperature
        CPX     RadHtSetptTmpF$   ;Compare to the current regulating setpt tmp

        BHI     OverSetpt         ;If ABOVE setpoint, need heaters OFF
        BEQ     OnSetpt           ;If ON setpoint, probably need heaters OFF

        INX                       ;"AirTmpF$+1" now in [X]
        CPX     RadHtSetptTmpF$
        BEQ     OnSetptMinus1     ;AirTmp+1 = Setpt  -->  AirTmp = Setpt-1

;rqd    BLO     UnderSetptMinus1

; If UNDER Setpt-1,
;  call for heat (*) and cancel the minimum on/off timer

UnderSetptMinus1:                 ;Need the heater turned ON (unconditionally)
        CLR     RadHtTmr          ; - clear the minimum on/off phase timer

        BRA     CallForHeat       ; - turn the radiant call for heat ON (*)

; If OVER setpoint,
;  turn the call for heat OFF and cancel the minimum on/off timer

OverSetpt:                        ;Need the heater turned OFF (unconditionally)
        CLR     RadHtTmr          ; - clear the minimum On/Off phase timer

        BRA     NoCallForHeat     ; - turn the radiant call for heat OFF (*)

; Exactly ON Setpt:
;  If RadHtTmr is running, make NO CHANGES -- could be finishing out
;    a minimum ON phase if temperature is alternating Setpt/Setpt-1
;  Else we need to turn heat OFF:
;    If heat is currently ON, we are transitioning to OFF, so start
;       the minimum On/Off timer to guard against contactor clicking

OnSetpt:
        LDAA    RadHtTmr          ; If RadHtTmr is running...

        BNE     ThStatDone        ;  ...make no changes -- just exit now

        LDAA    IoByte            ; Else we want the heat OFF now:
        BITA    #IoRadHt.
        BEQ     SetptHeatOff      ;  If heat is currently ON...

        LDAA    #RadHtOffMin.     ;   ...we are transitioning from On to Off
        STAA    RadHtTmr          ;  - start the "minimum OFF phase" timer

SetptHeatOff:

        BRA     NoCallForHeat     ;  - turn the radiant call for heat OFF (*)

; Exactly On Setpt-1:
;  If RadHtTmr is running, make NO CHANGES -- could be finishing out
;    a minimum OFF phase if temperature is alternating Setpt/Setpt-1
;  Else we need to turn heat ON:
;    If heat is currently OFF, we are transitioning to ON, so start
;       the minimum On/Off timer to guard against contactor clicking

OnSetptMinus1:
        LDAA    RadHtTmr          ; If RadHtTmr is running...
        BNE     ThStatDone        ;  ...make no changes -- just exit now

        LDAA    IoByte            ; Else we want the heat ON now:
        BITA    #IoRadHt.
        BNE     SetptMinusOn      ;  If heat is currently OFF...

        LDAA    #RadHtOnMin.      ;   ...we are transitioning from Off to On
        STAA    RadHtTmr          ;  - start the "minimum ON phase" timer

SetptMinusOn:

        BRA     CallForHeat       ;  - turn the radiant call for heat ON (*)

;C a l l F o r H e a t :
;
; This code is executed when the thermostatic control portion of the radiant
; heat control routine has determined that the radiant heat should be
; enabled.
;
; Since the radiant heaters are additionally controlled by a duty cycle
; setting, the actual heating elements will be turned ON only while we are
; in the "ON" phase of the duty cycle time.

CallForHeat:

        LDX     RadHtCycPcnt      ;Get the current percent of cycle (0..99)
        CPX     RadHtDutyPcnt
        BHS     DutyOff           ;If above requested duty value, turn heat off

; If we are in the "ON" part of the duty cycle, then turn the radiant heat ON

DutyOn: JSR     SetRadHtOn        ;Duty = X, cycle count (0..99) is < X   (*)

        BRA     ThStatDone        ;All Done...

DutyOff:
        JSR     SetRadHtOff       ;Duty = X, cycle count (0..99) is >= X

        BRA     ThStatDone

;N o C a l l F o r H e a t :
;
; This code is executed when the thermostatic control portion of the radiant
; heat control routine has determined that the radiant heat should be off.

NoCallForHeat:

        JSR     SetRadHtOff       ;Turn the radiant heat output OFF

        BRA     ThStatDone

ThStatDone:

CtrlRadHtDone:

        RTS

; (*) Note: For radiant heat duty cycle = 100 (100%), the heat will always
; be on continuously, provided we are under setpoint.  Since the cycle
; percent count counts up from 0 to 99, we will never actually reach 100,
; so the "BHS DutyOff" branch will never occur.

        .end ;(of file)
```

Figure 12:
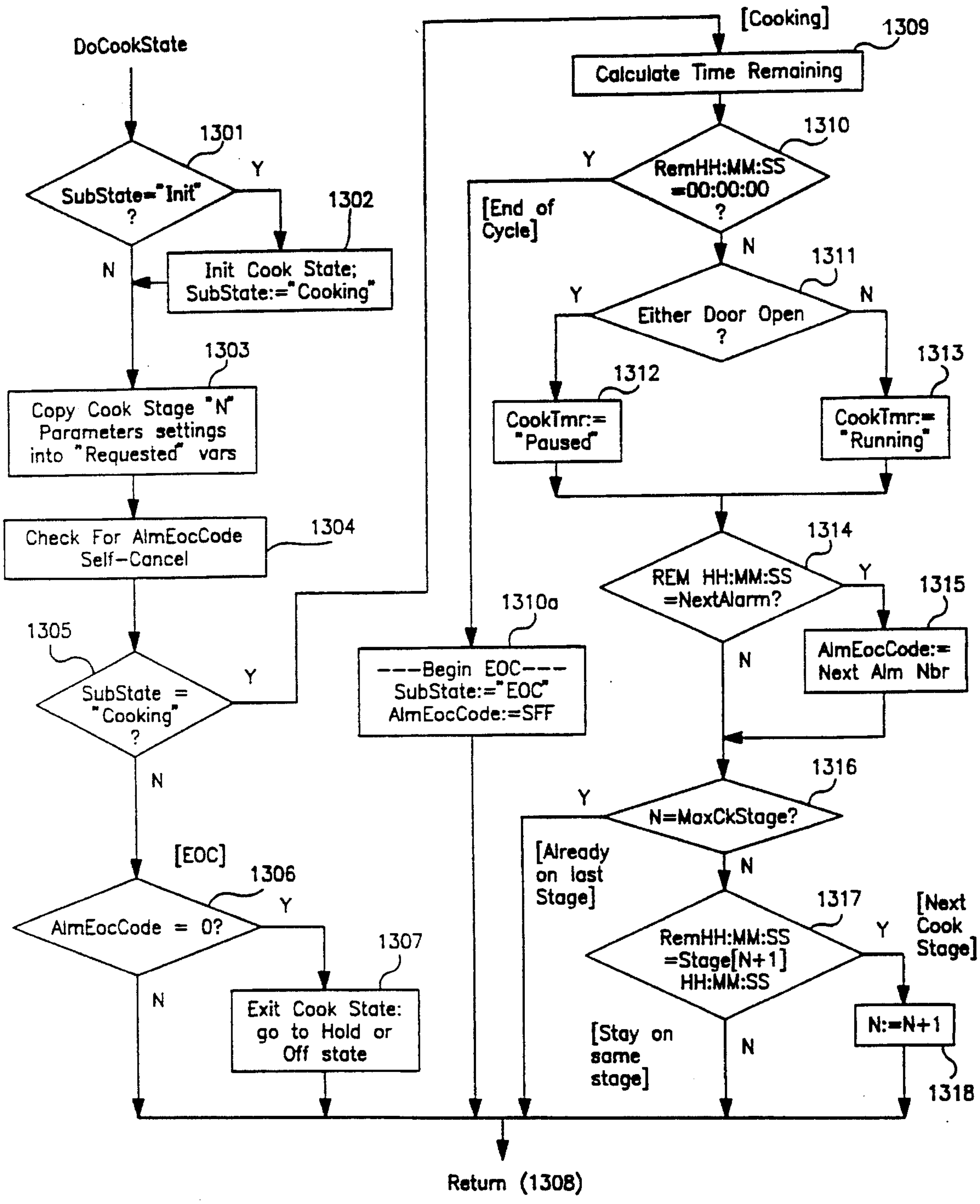
FIG. 12 is a flow chart of the COOK mode control.
Figure 5:
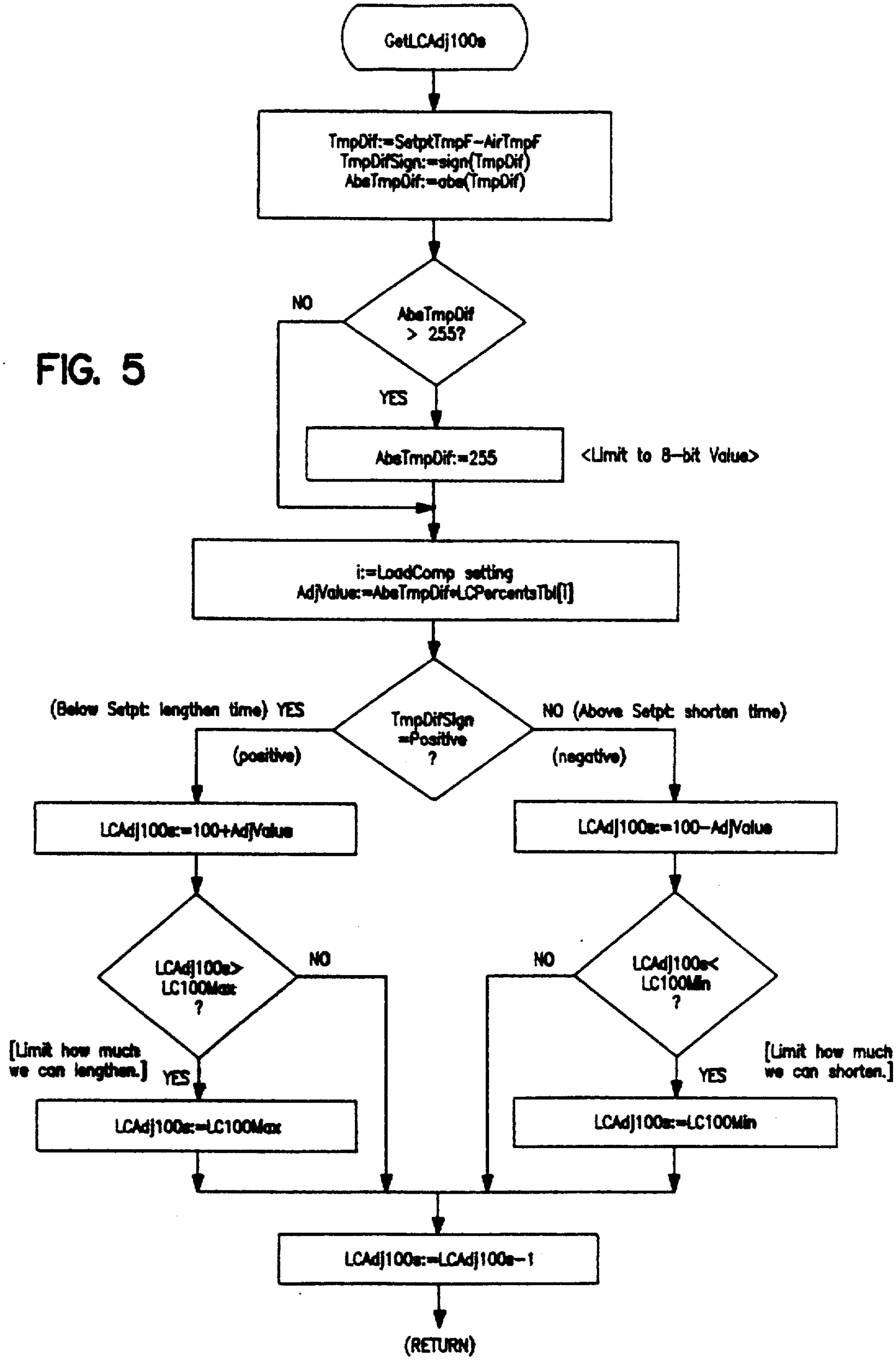
Figure 6:
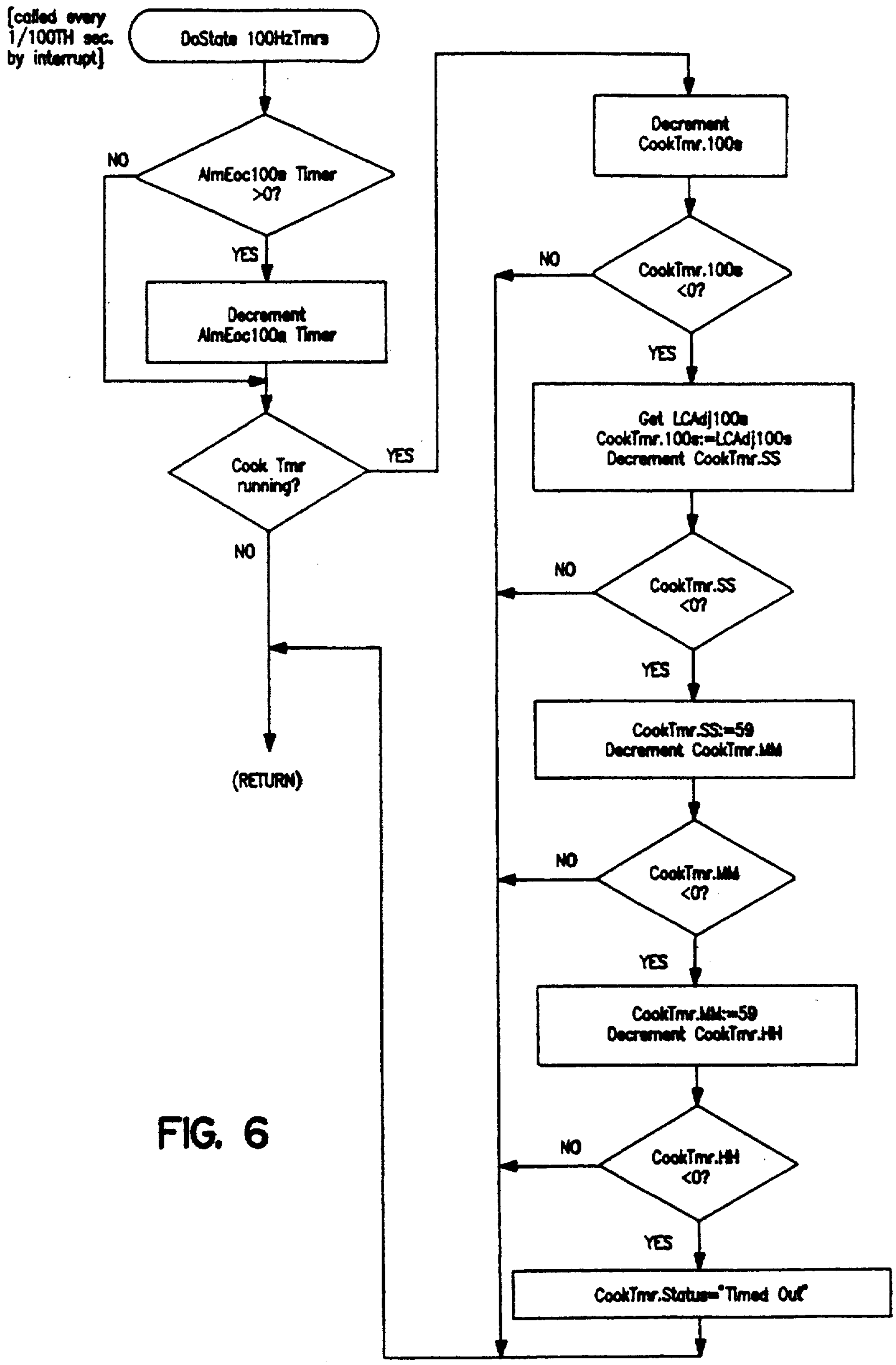

As shown, for example, in FIG. 12, the blower (FAN) may be operated as follows. The blower mode or setting for the current stage is obtained (step 1201). Then it is determined whether a door is open. If a door is open, the blower is turned off (step 1208) and control passes to step 1206. If not, it is determined whether the AIR HEAT is ON or if the vent is open. If yes, the blower is turned ON (step 1205) and control passes to step 1206. If the AIR HEAT is not ON (step 1203), it is then determined whether the blower setting for the current stage is ON (step 1204). If yes, the blower is turned ON (step 1205). Otherwise, it is determined whether the blower setting is OFF (step 1207). If yes, the blower is turned OFF (step 1208) and control passes to step 1206. If the response in step 1207 is no, the blower setting may be a periodic pulse mode (step 1209), in which case it is determined whether a blower timer is less than the ON time for the blower timer (step 1210). If it is, the blower is turned ON (step 1211), if not, the blower is turned OFF (step 1212). From steps 1211 and 1212, control passes to step 1206.

The following is an example of an excerpt of a software routine that may be used to control the blower (fan) of a cooking appliance.

```
                    -- Blower Control routines

;-----------------------------------------------------------------------
;
;     K R B L O W E R . S R A
;
; The routines in this file control the air circulation blower.
;-----------------------------------------------------------------------

        .include D:\RWStd.LIB

; External Variables:

        .extern StateVarsPtr$
        .extern _ReqFan, FanOn., FanMostlyOff., FanVent., FanKeepOff.

        .extern page0 IoByte, IoAirHt., IoRotor., IoBlwr., IIoBlwr.

        .extern Blwr100ms$, BlwrOn100ms., BlwrCycle100ms.

        .extern AirTmpF$

        .extern page0 CtrlDoorOpen, CustDoorOpen

        .extern page0 TempWord$, page0 TmpWord$
        .extern page0 Math32, page0 Math16


; External Routines:



; Routines Defined Here:

        .global InitBlwr

        .global CtrlBlwr, SetBlwrOn, SetBlwrOff



;-----------------------------------------------------------------------
; I n i t B l w r   (Initialize Blower system)  Subroutine
;
; This routine initializes variables pertinent to the blower control system.
;
; Input:
;
; Output:
;
; Routines Called:
; Exit State:          [A],[B],[X],CCR  -  indeterminate
;
;
;
;-----------------------------------------------------------------------

InitBlwr:

        JSR     SetBlwrOff      ;Make sure the blower output is off

        RTS

;-----------------------------------------------------------------------
; S e t B l w r O n   (Set Blower On)  Subroutine
;
; This routine simply takes care of turning ON the blower output.
;
; Input:  none
;
; Output: IoByte.IoBlower. --  turned ON
;
; Routines Called:
; Exit State:          [B], [X] -- unchanged
;                      [A].CCR -- indeterminate
;
;
;
;-----------------------------------------------------------------------

SetBlwrOn:

        LDAA    IoByte          ;Get the Io Latch output byte
        ORAA    #IoBlwr.        ;Force the BLOWER output bit to 1 (ON)
        STAA    IoByte          ;Update

        RTS

;-----------------------------------------------------------------------
; S e t B l w r O f f  (Set Blower Off) Subroutine
;
; This routine simply takes care of turning OFF the blower output.
;
; Input:  none
;
; Output: IoByte.IoBlwr. --  turned OFF
;
; Routines Called:
; Exit State:          [B], [X] -- unchanged
;                      [A],CCR -- indeterminate
;
;
;
;-----------------------------------------------------------------------

SetBlwrOff:

        STAA    IoByte          ;Update

        RTS


;-----------------------------------------------------------------------
; C t r l B l w r   (Control Blower) Subroutine
;
; This routine takes care of updating the blower output.  If the
; rotisserie is currently Preheating, Searing or Cooking, the blower is
; turned ON.  If the rotisserie is currently Holding, the blower is
; turned ON continuously when the air temperature is > 250 deg F or when
; the controller is calling for heat.  Otherwise, the blower is turned
; ON for 10 seconds out of every 2 minutes.
;
;
;
; Input:  StateVarsRecord.State
;
; Output: IoByte.IoMotor
;
; Routines Called:
; Exit State:          [A],[B],[X],CCR -- indeterminate
;
;
;
;-----------------------------------------------------------------------

CtrlBlwr:

; First of all, if either door is open, the blower should be OFF
; (Note: heat routines ensure that heat is also off when either door is open)

        LDAA    CtrlDoorOpen    ;If either door is open, blower stays off
        ORAA    CustDoorOpen
        BNE     WantItOff


; If there is currently a call for air heat, make sure the
; blower is ON, and keep the Blower100ms upcount clock stuffed to 0 to make
; sure the blower continues to run for a short while after the heat is
; turned off, even if the current state is requesting the blower off.

        LDAA    IoByte          ;Is control calling for heat?
        BITA    #IoAirHt.
        BNE     BlowerOn        ; If so, force blower ON
                                ;  (regardless of "fan" on/off/vent setting)

; Else see what the current state routines are requesting.
;
; If the current _ReqFan fan request is FanOn or FanVent, we want the
; blower on.
;
; If the fan request is "FanKeepOff", we want to definitely keep it off
; (ie control is currently in the Off state -- no heat, no rotor, no blower).
;
; Else if _ReqFan = "FanMostlyOff", we really have a "periodic pulse" mode --
; turn fan on briefly every so often to keep air stirred up.

        LDX     StateVarsPtr$   ;Get the current state variables pointer
        LDAB    _ReqFan,X

        CMPB    #FanOn.         ;Are the state routines requesting Fan="FanOn"?
        BEQ     WantItOn        ; If so, turn it on...

        CMPB    #FanVent.       ;Else are they requesting Fan="FanVent"?
        BEQ     WantItOn        ;(ie Blower on, Vent Open)?  If so, turn it ON

        CMPB    #FanMostlyOff.  ;Else are they requesting Fan="FanOff"?
        BEQ     BlowerPeriodic  ; If so, that's really the "mostly off" mode
                                ; (ie periodic "on" pulses on the blower)

;Opt    BRA     BlowerOff       ;Else "Keep Off" - keep the blower totally off


BlowerOff:                      ;Force upcount clock to the beginning of
        LDX     BlwrOn100ms.    ; the "off" phase of blower pulse clock
        STX     Blwr100ms$      ;(this probably isn't necessary)

        BRA     WantItOff       ;Make sure we turn the blower OFF


BlowerOn:                       ;Reset the blower upcount clock -- this
        LDX     #0000           ; effectively forces the blower ON for at
        STX     Blwr100ms$      ; least the next N seconds... or longer
                                ; if either test condition above persists.

        BRA     WantItOn        ;The make sure we have the blower ON


; Periodic blower operation:
;
; First, we need to maintain the blower cycle timer, which is incremented
; every 1/100 second by timer interrupt routine:
;
;    see if the blower clock has reached the end of the cycle.
;    If so, time to reset the clock and start a new cycle.

BlowerPeriodic:

        LDX     Blwr100ms$      ;Else has the blower clock hit the end of
        CPX     #BlwrCycle100ms. ;    the timing cycle?
        BLO     RstClkDone      ; if not, let the clock keep counting up...

ResetBlwrClk:                   ;Reset the blower upcount clock -- this
        LDX     #0000           ; effectively forces the blower ON for at
        STX     Blwr100ms$      ; least the next N seconds... or longer
                                ; if either test condition above persists.
RstClkDone:


; We will turn the blower ON for the first N seconds of the
;  upcount "Blwr100ms" clock cycle, and turn it OFF after the first N seconds
; (Note: if we have a call for heat, we just forced Blwr100ms to 0000 -- ON)
```

```
        BLS     WantItOn        ; if so, turn the blower on
.ot     BHI     WantItOff       ; else turn the blower off

; Door open, Fan=FanKeepOff, or "off" portion of "FanMostlyOff" periodic mode

WantItOff:
        JSR     SetBlwrOff

        BRA     CtrlBlwrDone

; Fan=FanOn, Fan=FanVent, or "on" portion of "FanMostlyOff" periodic mode

WantItOn:
        JSR     SetBlwrOn

.upt    BRA     CtrlBlwrDone

CtrlBlwrDone:

        RTS


        .end
```

Similarly, the rotor and vent may be controlled. For example, if a door is open, the rotor may be OFF and the vent closed. Preferably, whenever the control is in a COOK or HOLD mode, the rotor is ON. Otherwise, it should be OFF (unless control is overridden by manual rotor control). The vent position (open or closed) may be responsive to the programmed vent setting. Alternatively, a manual or automatic override may be used. For example, automatic override may be used to open the vent if the humidity (or some other sensed parameter) as sensed by a humidity sensor located in or in communication with the cooking chamber exceeds a predetermined level.

By way of example, excerpts of software routines for controlling the rotor and vent according to one embodiment of the present invention are as follows.

```
        ø -- Rotor Control routines

;--  ------------------------------------------------------------------------
;
;    · r o t o r . s 0 8
;
;  The routines in this file perform rotor control.
;----------------------------------------------------------------------------

        .include DiaStd.Lib

; External Variables:

        .extern StateVarsRec, _State
        .extern PreheatState., CookState., HoldState.

        .extern CtrlDoorOpen, CustDoorOpen

        .extern paged IoByte, IoRotor., ZIoRotor.

        .extern paged TempWordS, paged RAMmove6
        .extern paged Math32, paged Math16


; External Routines:



; Routines Defined Here:

        .global InitRotor

        .global CtrlRotor, SetRotorOn, SetRotorOff




;----------------------------------------------------------------------------
;  I n i t R o t o r   (Initialize Rotor system)  Subroutine
;
;  This routine initializes variables pertinent to the rotor control system.
;
;  Input:
;
;  Output:
;
;  Routines Called:
;  Exit State:          [A],[B],[X],CCR  -  indeterminate
;
;  Create Date:         12 Oct 92




;  Revision Record:     A - 12 Oct 92 - Original
;----------------------------------------------------------------------------

InitRotor:

        JSR     SetRotorOff     ;Make sure the rotor output is off


        RTS

;----------------------------------------------------------------------------
;  S e t R o t o r O n   (Set Rotor ON) Subroutine
;
;  This routine simply takes care of turning ON the rotor output.
;
;  Input:  none
;
;  Output: IoByte.IoRotor. --  turned ON
;
;  Routines Called:
;  Exit State:          [B], [X] -- unchanged
;                       [A],CCR -- indeterminate
;
;
;
;------.         ------------------------------------------------------------

SetRotorOn:

        LDAA    IoByte          ;Get the Io Latch output byte
        ORAA    #IoRotor.       ;Force the ROTOR bit to 1 (ON)
        STAA    IoByte          ;Update

        RTS

;----------------------------------------------------------------------------
;  S e t R o t o r O f f  (Set Rotor OFF) Subroutine
;
;  This routine simply takes care of turning OFF the rotor output.
;
;  Input:  none
;
;  Output: IoByte.IoRotor. --  turned OFF
;
;  Routines Called:
;  Exit State:          [B], [X] -- unchanged
;                       [A],CCR -- indeterminate
;
;  ,
;
;----------------------------------------------------------------------------

SetRotorOff:

        LDAA    IoByte          ;Get the Io Latch output byte
        ANDA    #ZIoRotor.      ;Force the ROTOR bit to 0 (OFF)
        STAA    IoByte          ;Update

;----------------------------------------------------------------------------
;  C t r l R o t o r  (Control Rotor) Subroutine
;
;  This routine takes care of updating the rotor output.  If the
;  rotisserie is currently Searing, Cooking, or Holding, the rotor is
;  turned ON.  If the rotisserie is merely in Preheat (ie "Standby"),
;  the rotor is turned OFF.
;
;  Input:  StateVarsRecord.State
;
;  Output: IoByte.IoRotor
;
;  Routines Called:
;  Exit Sta. .          [A],[B],[X],CCR  -  indeterminate
;
;
;  ,
;------                              . ------  -------------------------

CtrlRotor:


; See if the currently selected product is cooking or holding.
; If so, rotor should be ON; if not, rotor should be OFF.

        LDAA    CtrlDoorOpen    ;We will ALWAYS turn the rotor off
        ORAA    CustDoorOpen    ; when either Door is open
        BNE     WantItOff       ;(xxxxDoorOpen = $FF  -->  door IS open)

        LDX     #StateVarsRecord
        LDAA    _State,X        ;Else Get the current "State"

        CMPA    #CookState.     ;Cooking?   --> Rotor ON...
        BEQ     WantItOn

        CMPA    #HoldState.     ;Holding?   --> Rotor ON...
        BEQ     WantItOn

;opt    BRA     WantItOff       ; else no Cook or Hold, keep rotor OFF


; "OFF" state, Preheat (Standby), or invalid: rotor should be stopped

WantItOff:
        JSR     SetRotorOff

        BRA     CtrlRotorDone


; Cooking (incl Sear) or Holding: rotor should be turning

WantItOn:
        JSR     SetRotorOn




;opt    BRA     CtrlRotorDone

CtrlRotorDone:

        RTS


        .end
```

```
-- Vent Control routines

;-------------------------------------------------------------------------
;
;     E V E N T . S R C
;
;  The routines in this file control the air circulation venting system
;-------------------------------------------------------------------------

        .include BoxStd.LIB

; External Variables:

        .extern StateVarsPtrS
        .extern _ReqFan, FanOn., FanMostlyOff., FanVent., FanKeepOff.

        .extern page0 IoByte, IoVent., zIoVent., IoBlwr., zIoBlwr.

        .extern AirTempFS

        .extern page0 CtrlDoorOpen, CustDoorOpen

        .extern page0 TempWordS, page0 BHmovB
        .extern page0 Math32, page0 Math16


; External Routines:


; Routines Defined Here:

        .global InitVent

        .global CtrlVent, OpenVent, CloseVent




;-------------------------------------------------------------------------
; I n i t V e n t  (Initialize Vent system)  Subroutine
;
; This routine initializes variables pertinent to the vent control system.
;
; Input:
;
; Output:
;
; Routines Called:
; Exit State:         [A],[B],[X],CCR  -  indeterminate




;
; -
;
;---------       ----------  ---------------------------------------------

InitVent:

        JSR     CloseVent       ;Make sure the vent is closed


        RTS

;-------------------------------------------------------------------------
; O p e n V e n t  (Open Vent)  Subroutine
;
; This routine simply takes care of turning ON the vent output
; in order to open the vent.
;
; Input:  none
;
; Output: IoByte.IoVent. --  turned ON
;
; Routines Called:
; Exit State:         [B], [X] -- unchanged
;                     [A],CCR -- indeterminate
;
; Create Date:        18 Jan 93
; Revision Record:    A - 18 Jan 93 -- Original
;-------------------------------------------------------------------------

OpenVent:

        LDAA    IoByte          ;Get the Io Latch output byte
        ORAA    #IoVent.        ;Force the VENT output bit to 1 (ON)
        STAA    IoByte          ;Update

        RTS

;-------------------------------------------------------------------------
; C l o s e V e n t  (Close Vent) Subroutine
;
; This routine simply takes care of turning OFF the vent output
; in order to close the vent.
;
; Input:  none
;
; Output: IoByte.IoVent. --  turned OFF
;
; Routines Called:
; Exit State:         [B], [X] -- unchanged
;                     [A],CCR -- indeterminate
;
;
;
;-------------------------------------------------------------------------

CloseVent:

        RTS


;-------------------------------------------------------------------------
; C t r l V e n t   (Control Vent) Subroutine
;
; This routine controls the vent according to the current door status
; and the current ReqFan setting.
;
;
;
; Input:
;
; Output:
;
; Routines Called:
; Exit State:         [A],[B],[X],CCR -- indeterminate
;
;
;
;-----  ------------------  -------    -----------------------------------

CtrlVent:

; Before checking anything else --
;  If either door is open, the blower should be CLOSED
;   (since blower turns off when door is open...)

        LDAA    CtrlDoorOpen    ;If either door is open, vent stays closed
        ORAA    CustDoorOpen
        BNE     VentItClosed


; Now see what the current state routines are requesting.  If the current
; fan request is FanOn or FanVent, we want the blower on (regardless of the
; [illegible] stuff from above.)

        LDX     StateVarsPtrS   ;Get the current state variables pointer
        LDAA    _ReqFan,X

        CMPA    #FanVent.       ;Are they requesting Fan-Vent?
        BEQ     VentItOpen      ;(Is Blower on, Vent Open)?  If so, turn it ON

;opt    BRA     VentItClosed

; Off state or invalid: blower should be stopped

VentItClosed
        JSR     CloseVent

        BRA     CtrlVentDone


; Preheat, Cooking (incl Sear), Holding: blower should be ON




VentItOpen:
        JSR     OpenVent

;opt    BRA     CtrlVentDone

CtrlVentDone:

        RTS


        .end
```

In the COOK mode, the control performs the general procedure shown in FIG. 13. If the COOK state is not already initialized (step 1301), it is initialized (step 1302) and control passes to step 1303. In step 1303, the parameter settings for COOK stage N are copied into the "Requested Variables" Then the end of cycle (EOC) code check is performed (step 1304) and control passes to step 1305, where it is determined whether the substrate is "cooking". If it is, control passes to step 1309. Otherwise, it is determined whether the alarm EOC code is "0" (step 1306). If it is, the COOK state is exited, the HOLD or OFF state is entered (step 1307) and control passes to step 1308. If not, control passes directly to step 1308 which is a return step. In step 1309, the time remaining in the cook cycle is determined. Next, it is determined if the time remaining is 00:00:00 (step 1310). If yes, this is the end of cycle (EOC) and an EOC routine is performed (step 1310*a*) and control passes to step 1308. If the time remaining is not 00:00:00 (step 1310), it is determined if a door is open (step 1311). If a door is open, the timer is paused (step 1312). Optionally, however, the timer may continue to run, especially if load compensation is being used. In any event, if the door is not open (or the timer pause step is skipped) the COOK timer is running (step 1313). In either case, control passes as shown to step 1314 where it is determined whether the remaining time equals a programmed ALARM time. If yes, the alarm EOC code is set to the next alarm number (step 1315) and control passes to step 1316. If not, control passes directly to step 1316. If the COOK stage (N) is already the last stage (step 1316) control passes to step 1308. Otherwise, it is determined if the remaining time equals the time set for the next (N+1) stage (step 1317). If it is, N is incremented (N=N+1) (step 1318) and control passes to step 1308. If not, control passes to step 1308 and the current stage continues.

By way of example, an excerpt of a software routine for performing these functions and associated displays and key inputs is set forth below.

```
- Cook State display and key interface

;----------------------------------------------------------------------
;
;    K R C O O K . S O R
;
; This file contains the code that takes care of processing state variables,
; updating the display information and handling key presses for the "Cook"
; state.
;----------------------------------------------------------------------


; USE THE FOLLOWING .EQU TO INDICATE WHETHER OR NOT WE HAVE A Start/Stop KEY

StStpKeyAvail.  .equ $00        ; "$FF" if Start/Stop key is available
                                ; "$00" if Start/Stop key is NOT available



        .include D:KRStd.LIB

; External variables

        .extern page0 BlnTmr, TmrHHBit., TmrMMBit., TmrSSBit., TmrHHBit.
        .extern page0 SubrReq
        .extern page0 CurKey, page0 KeyHeldSS

        ;---CkStageType---

        .extern CkStageSz.
        .extern _HHMMSS, _SetptTmpF$, _RadPcnt, _RadTmpF$, _Flags.Fan.LC

        .extern _HHMMS, _HHSS, _NextHHMMSS
        .extern FanOn., FanMostlyOff., FanVent., FanKeepOff.

        ;---ProductType---

        .extern ProductSz., AlmTimeSz.
        .extern _CkStages, _HdStage, _PreheatTmpF$, _AlmTimes

        .extern NbrCkStages., NbrAlms., MaxCkStage., MaxAlm.
        .extern _CookHHMMSS, _HoldHHMMSS

        ;---StateVarsType---

        .extern StateVarsSz.
        .extern _StProduct, _PrgmNbr, _NeedPreheat
        .extern _State, _SubState, _ExitFlag
        .extern _CookTmr, _LCAdj100




        .extern _RemHH, _RemMM, _RemSS
        .extern _CkStageNbr, _CkStagePtr$
        .extern _ReqSetptTmpF$, _ReqRadPcnt, _ReqRadTmpF$
        .extern _ReqFan, _ReqLoadComp, _ReqLCTmpF$
        .extern _NextAlmNbr, _AlmEocCode, _AlmEoc100ms$
        .extern _StStpPending, _StStpClk

        .extern _RemHHMMS, _RemMMSS$
        .extern OffState., PreheatState., CookState., HoldState.
        .extern CkCookStep., CkEocStep.
        .extern HdHoldStep., HdEocStep.

        ;---------------------


        .extern StateVarsPtr$


        .extern StageCount

        .extern PrgPending, PrgPendClk

        .extern TmrRunning., TmrTimedOut.

        .extern AlmDuration$, EocDuration$

        .extern AirTmpF$

        .extern Blur100ms$

        .extern CtrlDoorOpen, CustDoorOpen

        .extern LDigits, RDigits
        .extern LDig1, LDig2, LDig3, LDig4, LDigLeds, ColonLeds., DigDOut.
        .extern _Dig1, _Dig2, _Dig3, _Dig4, _DigLeds

        .extern ModeLeds, CookLed., HoldLed., ZCookLed., ZHoldLed.

        .extern StatusLeds, ReadyLed., ZReadyLed.

        .extern ProdLeds$

        .extern page0 KeyStat
        .extern KeySet., KeyStStp.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.
        .
        .extern page0 TempByte, page0 TempWord$, page0 TempWord2$
        .extern page0 Index$

        .extern MsgAlarms., MsgCkEoc., MsgBlanks.

; External routines

        .extern GetProdLed

        .extern BinToBcd2Dig, BinToBcd3Dig, BinToBcd4Dig
        .extern DisplayTmp, DisplayTime, DisplayDoorOpen
```

```
; Routines defined here

        .global DoCookState

        .global DoCookDisplay, DoCookKeys, DoCookStStpPending


        .global CalcHoldRem, ShowRemTime, SetReqParms



;**********************************************************************
;**********************************************************************
;
; S T A T E   R O U T I N E S :
;
; The routines below are called continually in Run mode to handle items
; that effectively run "in the background" even when the user is in Program
; mode, for example.  These items include turning the "ready" leds ON and OFF
; as appropriate, and watching for cook alarms and end of cycle, etc.
;
; For example, if we are in Program mode we let the programming routines
; take over the displays and key inputs, but the Ready led's should still
; operate as normal, and the cook timers must be monitored so that we can
; interrupt the programming display when a cook alarm or eoc occurs.
;
;
;**********************************************************************
;**********************************************************************



;----------------------------------------------------------------------
; I n i t C o o k S t a t e   (Initialize Cook State)  Macro
;
; This macro performs Cook state initialization, clearing the alarm/eoc code,
; clearing the exit flag, initializing StageNbr and StagePtr$ to the
; first cook stage, and starting the CookTmr at "CkStage[0]._HHMMSS"
;
; Input:  [X] -- points to start of state variables
;
; Output: _CookTmr started at CookHHMMSS (TOTAL cook time...)
;         _NextAlmNbr, _AlmEocCode reset to 0
;         _ExitFlag reset to 0
;
; Routines Called:
; Exit State:          [X] -- unchanged (points to state vars)
;                      [A],[B],CCR -- indeterminate




;
;
;
;----------------------------------------------------------------------

InitCookState;
        .macro

;(On entry here, [X] points to the StateVars record)


; Starting a brand new cook cycle -- load the CookTmr w/ programmed Cook Time.
; The Timer ISR will signal CookTmr is "timed out" when trying to decrement
; below 00:00:00.00 (ie at -1/100 seconds).  The DoCookState subroutine,
; however, will signal EOC as soon as we see HH:MM:SS = 00:00:00.
;
; By starting the timer at HH:MM:SS.99, we will be on the actual starting
; value "HH:MM:SS" for 1 full second, then do the first seconds decrement.



; First of all, we need to activate the very first cook stage.
;
; The CkStages array is ALWAYS the very first item in the Product record,
; which is then the very first item in the State variables.  Therefore,
; the pointer we have in [X] (StateVarsPtr$) already points to the
; very first cook stage...

        STX     _CkStagePtr$,X  ;Set the pointer to the first cook stage

        CLR     _CkStageNbr,X   ;Reset the cook stage index to 0 (first stage)


; Now ready to actually start the timer:
; The overall cycle time is the time from the first interval (ptd to by [X])

        CLR     _CookTmr+_Sta,X ;Make sure CookTmr.Sta byte is 0 during access
                                ;(otherwise would have to disable interrupts)

        LDD     _HHMMSS+0,X     ;Get HH:MM time from CkStage pointed to by [X]

        STAA    _CookTmr+_HH,X  ;Set the Hours and Minutes
        STAB    _CookTmr+_MM,X  ; from programmed HH, MM values

        LDAA    _HHMMSS+2,X
        STAA    _CookTmr+_SS,X  ;Start Seconds at programmed SS value

        LDAA    #99
        STAA    _CookTmr+_100,X ;Start 1/100's at 99
        STAA    _LCAdj100,X     ;(First "second" has no load comp adj yet)

                                ;Clear the load comp factor for the moment --
        CLR     _ReqLoadComp,X  ; proper LC value will be installed by the
                                ; main code of DoCookState below...  (*)


        LDAA    #TmrRunning.    ;Now start the timer running...
        STAA    _CookTmr+_Sta,X

; (*) Note: assign a "load comp" value here in case the first timer
```

```
; Reset the Alarm/Eoc Code, "Exit" flag, and Start-Stop pending flag

        CLR     _AlmEocCode,X   ;Start out with no alarm activated...

        CLR     _NextAlmNbr,X   ;Start out watching for AlarmTime[0]

        CLR     _ExitFlag,X     ;Make sure the "Exit" flag is reset also

        CLR     _StStpPending,X ;Make sure "StartStop Pending" is reset

; Cook cycle may perform special blower control -- reset the blower timer

        LDD     #0000
        STD     Blwr100s$

        .endm


|---------------------------------------------------------------------------
;  S e t R e q P a r m s  (Set Requested Parameters) Subroutine
;
;  (Note: this routine called by Hold mode also...)
;
;  This routine sets all the "Reqxxx" parameters (ReqSetptTmpF$, etc)
;  for the state variables record pointed to by StateVarsPtr$,
;  to the values in the cook stage (hold stage) pointed to by [X].
;
;
;  Input:  [X] -- points to a cook stage record (may be a hold stage)...
;
;  Output: StateVarsPtr$:
;                 _ReqSetptTmpF$, _ReqRadPcnt, _ReqRadTmpF$
;                 _ReqFan, _ReqLoadComp
;
;  Routines Called:
;  Exit State:          [A],[B],[X],CCR -- indeterminate
;
;
;
|---------------------------------------------------------------------------

SetReqParms:

; First, get all the parameters from the cook stage pointed to by [X]...

        LDD     _SetptTmpF$,X   ; Get current cook stage setpoint
        STD     TempWord$       ; Save into TempWord$ for the moment

        LDD     _RadTmpF$,X     ; Get current cook stage radiant tmp limit
        STD     TempWord2$      ; Save into TempWord2$ for the moment

        LDAA    _RadPcnt,X      ; Get current cook stage radiant duty
        LDAB    _Flags.Fan.LC,X ; Get current cook stage Flags/Fan/LoadComp


; Now save the current cook stage values as current "request" values
; for the state variables record pointed to by StateVarsPtr$

        LDX     StateVarsPtr$   ;Get pointer to the StateVars record

        STAA    _ReqRadPcnt,X   ; Save the currently requested radiant duty

        TBA                     ;Copy the Flags/Fan/LoadComp byte into [A]

        ANDB    #$0F            ; Keep just the low 4 bits of Flags/Fan/LC:
        STAB    _ReqLoadComp,X  ; Save the currently requested load comp

        LSRA
        LSRA                    ; Shift Flags/Fan/LoadComp right 4 times
        LSRA                    ; to right-justify the current "Fan" setting
        LSRA
        ANDA    #$03            ; Keep just 2 bits (orig b5 & b4)
        STAA    _ReqFan,X       ; Save the currently requested fan value

        LDD     TempWord2$
        STD     _ReqRadTmpF$,X  ; Save the currently requested radiant tmp lmt

        LDD     TempWord$
        STD     _ReqSetptTmpF$,X ; Save the currently requested setpoint tmp


; Load Compensation temperature will be the greater of the air heat and
; radiant heat setpoints.  Presumeably, the user is trying to regulate
; to the higher of the two values.  For example, if SetptTmpF$ = 300,
; and RadTmpF$ = 375, then the user is trying to have the radiant heat
; regulate to 375, and wants the air heat to kick in if we drop to 300.
; Therefore, we should use 375 as the target setpoint, since that is
; the actual regulation temperature.

SetLCTmp:
        LDD     _ReqSetptTmpF$,X  ;Get the air heater temperature setpoint
        SUBD    _ReqRadTmpF$,X    ;Compare to the radiant heat setpoint
        BLO     LCTmpIsRad

LCTmpIsSetpt:                   ;Use the regular Air Heater Setpt for LC calcs
        LDD     _ReqSetptTmpF$,X
        STD     _ReqLCTmpF$,X
        BRA     LCTmpDone

LCTmpIsRad:                     ;Use the Radiant Heater Setpt for LC calcs
        LDD     _ReqRadTmpF$,X
        STD     _ReqLCTmpF$,X
;opt    BRA     LCTmpDone

LCTmpDone:


        RTS


|---------------------------------------------------------------------------
;  C a l c C o o k R e m  (Calculate Cook Remaining time) Subroutine
;
```

```
;  from the actual CookTmr values, and stores the answer into _RemHHMMSS.
;  Note that the HOLD timer uses this same timer variable, so this
;  routine is also called by the HOLD state routines to calculate the
;  time remaining in the hold cycle.
;
;  Input:  [X] -- points to start of state vars for the current side
;
;  Output: _RemHH, _RemMM, _RemSS -- set to HH:MM:SS of cook time remaining
;
;  Routines Called:
;  Exit State:          [X] -- unchanged (points to state vars)
;                       [A],[B],CCR -- indeterminate
;
;
;
;
|-- -----------------------------------------------------------------------

CalcCookRem:

CalcHoldRem:

;(On entry, [X] points to state variables)

        LDAA    _CookTmr+_Sta,X ;If timer has timed out... (*)
        BITA    #TmrTimeout.
        BNE     TimedOut        ; ...it must have timed out during pwr-up, etc


; Normally, we calculate time remaining from CookTimer values
; (Note: we MUST disable interrupts here to assure that the HH:MM:SS
; values we fetch here are read "simultaneously".)

        SEI                     ;/// Disable interrupts for a moment

        LDAB    _CookTmr+_HH,X  ;Note: running cook timer variables
        STAB    _RemHH,X        ; are defined in "SS, MM, HH" order,
                                ; but the time remaining variables
        LDAB    _CookTmr+_MM,X  ; are stored in HH, MM, SS order.
        STAB    _RemMM,X        ;

        LDAB    _CookTmr+_SS,X
        STAB    _RemSS,X

        CLI                     ;/// Enable interrupts once again

        BRA     CalcRemDone

; In the event that the timer actually times out while we weren't looking,
; as when it times out in the first few seconds of power-up, we need to
; for the _RemXX values all to 00's.  The CookTmr itself will have counted
; down to SS = -1, MM = -1, HH = -1.

TimedOut:
        CLR     _RemHH,X        ;If timer times out completely,
        CLR     _RemMM,X        ; set remaining time to 00:00:00...
        CLR     _RemSS,X


;opt    BRA     CalcRemDone

CalcRemDone:


;(On exit here, [X] still points to StateVars record)

        RTS


; (*) Note: during normal operation, we detect EOC as soon as the timer hits
; 00:00:00 remaining -- it still have 99/100's left to count down.  If the
; rotisserie is turned off while cooking and then powered up again, we might
; actually hit 00:00:00 while still in intro mode.  Therefore, we need to also
; check for timer actually timing out completely while we weren't watching it,
; and assure we get 00:00:00 remaining in that case.


|---------------------------------------------------------------------------
;  C h k A l m E o c S e l f C a n c e l
;                            (Check Alarm or EOC Self Cancel)  Macro
;
;  This routine checks the duration timer (_AlmEoc100s$) to see if its time
;  yet to automatically cancel an active alarm.  This routine doesn't bother
;  to see if any alarm is actually active -- if _AlmEoc100s$ has hit 0000,
;  it simply forces _AlmEocCode to 0.  (If no alarm or eoc is in progress,
;  then AlmEocCode will already be 0 anyway...)
;
;  In order to keep any Alarm or Eoc from being self-cancelling, the
;  application routines simply need to assign a negative value to AlmEoc100s$
;  countdown timer.  The TmrISR routine will not decrement any AlmEoc100s$
;  value which has b15 = 1 (ie "negative").  Consequently, such values will
;  never count down to 0000, and therefore will never be self-cancelling.
;
;  Input:  [X] -- points to start of state variables record
;          _AlmEoc100s$ -- duration countdown timer
;
;  Output: _AlmEocCode -- may be set to 0
;
;  Routines Called:
;  Exit State:          [X] -- unchanged (points to state vars)
;                       [A],[B],CCR -- indeterminate
;
;
;
|---------------------------------------------------------------------------

ChkAlmEocSelfCancel:
    - .  .macro

;(On entry, [X] points to state variables record)

        LDD     _AlmEoc100s$,X  ;Get current duration 1/100's countdown value
        BNE     SelfCancelDone  ;If not = 00:00, nothing to do here

        CLR     _AlmEocCode,X   ;Else if AlmEoc100s$ = 0000...
                                ; ...clear the Alarm/Eoc code to 0
SelfCancelDone:
```

```
;-----------------------------------------------------------------------------
; C h k C o o k A l m  (Check for Cook mode Alarm) Macro
;
; This routine compares the current time remaining values (already in
; _RemHH, _RemMM, _RemSS) to the "next" scheduled alarm time, as indicated
; by the "_NextAlmNbr" index.  If the time remaining is LESS THAN OR EQUAL TO
; the next alarm time, then that alarm is activated by setting AlmEocCode
; to the alarm index plus 1.  (ie AlmTime[0] ==> AlmEocCode #1, etc)
;
; If we DO activate an alarm, then the _NextAlmNbr index is advanced by 1.
; If _NextAlmNbr > NumAlm., then we have no more alarms to watch for.
;
;
; Note: alarm times in the Product record are always converted to the
; same format as the cook times -- either "strict HH:MM" values, or
; "Minutes Only" values.  Therefore, we can simply do direct comparisons
; here, without worrying about equivalent values in different formats.
; For example, if cook times are set to count down from 0:30 minutes,
; then the alarms also will be set to 0:20, 0:15, etc.  If instead the cook
; times are HH:MM values, like 1:30, then the alarms will be stored as
; 1:20, 1:00, etc.
;
;
;
; Input:  [X] -- points to start of state variables
;         StateVarsPtr$ -- same as [X]
;         _NextAlmNbr -- index of the next scheduled alarm
;         _AlmTimes -- array of scheduled alarm times (HH:MM:SS)
;         _RemHH,_RemMM,_RemSS -- HH:MM:SS remaining in cook cycle
;
; Output: _AlmEocCode -- set to "alarm index + 1" if alarm match found,
;                        else left unchanged
;
; Uses:   TempWord$
;
; Routines Called:
; Exit State:          [X] -- unchanged (points to state vars)
;                      [A],[B],CCR -- indeterminate
;
;
; ~
;-----  ---- -------------------    -        ---------------------------

ChkCookAlm:
        .macro

; ([X], StateVarsPtr$ point to currently selected State Variables)


; Remember, alarms are stored in DESCENDING order in the AlarmTimes array.
;
; We only need to look at the alarm time indicated by the "_NextAlmNbr" index,
; and trigger that alarm when the current time remaining is <= alarm time.
;



; When we trigger a new alarm, we set AlmEocCode = alarm index + 1,
; then advance "NextAlmNbr" by 1, so we immediately begin looking for
; the NEXT alarm the next time this routine is called
;
; Also, we won't trigger an alarm set to 00:00:00 because the state routine
; below checks for end-of-cycle before checking for an alarm trigger, and
; stops checking for alarms when end-of-cycle has been reached.


; First of all, see if we have already triggered all available alarms.

;opt     LDX     StateVarsPtr$   ;Get pointer to the state variables record

         LDAB    _NextAlmNbr,X   ;Get the index of the "next" alarm
         CMPB    #NumAlm.        ;Compare to the last alarm index
         BHI     ChkCkAlmDone    ;If "Next" > "MaxAlm", no more alarms left...

; Not past end of alarm array yet -- look up the next alarm time

                                 ;[X] already points to state variables record
         LDAA    #AlmTimeSz.
         MUL                     ; - Alarm index times number of bytes per alm
         ADDB    #_AlmTimes      ; - Add "offset to the start of alarms array"
         ABX
                                 ;--> [X] NOW points to next scheduled alarm
         LDD     0,X
         STD     TempWord$       ;Copy Alm[N].HHMM into TempWord$
         LDAB    2,X
         STAB    TempByte        ;Copy Alm[N].SS into TempByte

         LDX     StateVarsPtr$   ;Restore the pointer to the state vars record

         LDD     _RemHHMM,X      ;Get the current time remaining HH:MM
         SUBD    TempWord$       ;Compare to the alarm HH:MM

         BHI     ChkCkAlmDone    ;If RemHHMM > AlmHHMM, we aren't there yet...

         BLO     TrigNextAlm     ;Else if RemHHMM < AlmHHMM, trigger the alarm

         LDAB    _RemSS,X        ;Else RemHHMM = AlmHHMM -- need to compare SS
         CMPB    TempByte

         BHI     ChkCkAlmDone    ; If RemSS > AlmSS, we aren't there yet...


; YES! RemHHMMSS <= AlmHHMMSS -- Trigger the alarm!

TrigNextAlm:

         LDAB    _NextAlmNbr,X   ;Copy index (0..MaxAlm.) into [A]...
         INCB                    ; ...then increment by 1  (ie Alm 0 --> "1")

         STAB    _AlmEocCode,X   ; - Save into AlmEocCode of current State Vars

         STAB    _NextAlmNbr,X   ; - Save also as index of NEXT alarm to watch

         LDD     AlmDuraLmt$     ; - Start the Alarm duration timer
         STD     _AlmEoc100ms$,X ;   (for self-cancelling alarms, if chosen)
```

```
ChkCkAlmDone:

;( [X] still points to state variables record on exit here)

        .endm


;-----------------------------------------------------------------------------
; S t a r t C o o k E o c  (Start Cook mode End-of-Cycle) Macro
;
; This routine advances the SubState parameter to the "Cook End of Cycle"
; step (CkEocStep).  If a non-zero Hold time is specified, then this
; routine starts the AlmEoc100ms$ self-cancel timer at "EocDuraLmt".
; If Hold time IS programmed to 00:00, this routine loads the AlmEoc100ms$
; timer with $FFFF, a dummy value that provides infinite EOC duration.
;
;
; Input:  [X] -- points to start of state vars for the current side
;
; Output: SubState -- set to "CkEocStep." if EOC criteria met
;         AlmEoc100ms$ -- alm/eoc self-cancel timer
;
; Routines Called:
; Exit State:          [X] -- unchanged
;                      [A],[B],CCR -- indeterminate
;
;
;
;-          -------------------- ----------------------------------------

StartCookEoc:
        .macro

;(On entry here, [X] points to the start of the state variables record)

        LDAA    #CkEocStep.      ;Set cook step to "End of Cycle"
        STAA    _SubState,X
                                 ;Set the Alarm/Eoc code to 255
        LDAA    #0FF             ; to indicate we are now doing EOC...
        STAA    _AlmEocCode,X    ;Application will clear to 0 again when
                                 ; Eoc has been acknowledged...

        CLR     BlnTmr           ;Resynchronize the blink timer

; If no hold cycle is programmed, we'll need an "infinite" duration time
;  in order to force the user to acknowledge the eoc.
;
; Else if we DO have a hold planned, just give a momentary eoc and then
;  automatically transition into the hold cycle...

;opt    LDX     StateVarsPtr$

        LDAB    _HoldHHMMSS+0,X ;Is the Hold time programmed to 00:00:00?
        ORAB    _HoldHHMMSS+1,X
        ORAB    _HoldHHMMSS+2,X
        BEQ     NoHold           ; ...if so, we'll need "infinite" duration



YesHold:
        LDD     EocDuraLmt$      ;Else if going to hold, start the Alarm/Eoc
        BRA     SaveCkEocDura    ; duration timer with normal, progr'd value

NoHold:
        LDD     #0FFFF           ;Neg value in AlmEoc100ms$ is NOT decremented
;opt    BRA     SaveCkEocDura    ; by TmrISR -- results in infinite duration.


SaveCkEocDura:                   ;Start the Alarm/Eoc duration timer:

        STD     _AlmEoc100ms$,X


StartEocDone:

;(On exit, [X] still points to the State Vars record)


        .endm


;-----------------------------------------------------------------------------
; E x i t C o o k   (Exit Cook state) Macro
;
; Input:  StateVarsPtr$ -- points to current side state variables
;         _RemHHMMSS -- time remaining in this cook cycle
;
; Output: _State -- set to HoldState. or PreheatState.
;
; Routines Called:
; Exit State:          [A],[B],[X],CCR -- indeterminate
;
;
;
;-------  -----  -              --   --- ---------------------------------

ExitCook:
        .macro

; (On entry here, [X] and StateVarsPtr$ point to state variables record)


; First of all, make sure we turn Alarm/Eoc code off before leaving cook,
;  in case the user has done a manual exit with an Alarm or Eoc active

        CLR     _AlmEocCode,X    ;Cancel any alarms/eocs that may be active
  --

; See if we made it to Eoc: if so, we did a full cook...

        LDAA    _SubState,X      ;If we are on Eoc step...
        CMPA    #CkEocStep.
        BEQ     FullCook         ; ...then we must have done a full cook

;opt    BNE     AbortCook        ;Otherwise, cancel everything
```

```
; Abort the current cook cycle, don't accumulate filter or usage stats,
; don't start any hold timers.

AbortCook:

        JMP     CookGoOff       ;Go to "Off" state, even if a
                                ; hold cycle has been programmed...


; F u l l   C o o k :
;
; Completed a "full" cook (or close to it)...
; ([X] still points to State Variables)

FullCook:

;*** Add another count to the usage for this product

        LDAB    _ProdNbr,X      ;Get the current product number

        LDX     #UsageCounts    ;Get the address of the start of Counts array
                                ; (--> destroys StateVars ptr in [X])

        ABX                     ;Add product number offset to array pointer
        ABX                     ; (add twice -- two bytes per count value)

        LDD     0,X             ;Get the current count value
        ADDD    #1              ;Add 1
        STD     0,X             ;Save it back into the usage array

        LDX     StateVarsPtr$   ;Restore the pointer to the state vars record
;***


; If hold cycle is programmed, go to it now.  Otherwise, return to "off".

        LDAB    _HoldHHMMSS+0,X ;Get the programmed hold time HH
        ORAB    _HoldHHMMSS+1,X ; "OR" in the MM...
        ORAB    _HoldHHMMSS+2,X ; "OR" in the SS...

        BEQ     CookGoOff       ;If HoldTime = 00:00:00, return to "off" state

;opt    BRA     CookGoHold      ;Else go to the "Hold" state

; Transition from Cook mode to Hold mode

CookGoHold:
        LDAA    #HoldState.     ;Going to the "Hold" state:
        STAA    _State,X        ; Save the new state indicator
        CLR     _SubState,X     ; Start out on "init" step of Hold...
                                ;(DoHoldState will start the Hold timer, etc)
        BRA     ExitCookDone


; Transition from Cook mode to "off" mode

CookGoOff:


        LDAA    #OffState.      ;Going to the "Off" state:
        STAA    _State,X        ; Save the new state indicator
        CLR     _SubState,X     ; Start out on "init" step of PreHeat...

;opt    BRA     ExitCookDone


ExitCookDone:

        .endm


;--------------------------------------------------------------------------
:  D o C o o k S t a t e  (Do Cook State) Subroutine
;
;  This routine manages the automatic activity required in the Cook state,
;  including checking for Alarms and End-of-Cycle criteria (ie via time
;  remaining or via probe temperature).
;
;  Input:  StateVarsPtr$, OtherStateVars$
;
;  Output:
;
;  Routines Called:
;  Exit State:          [A],[B],[X],CCR  -  indeterminate
;
;
;
;--------------------------------------------------------------------------

DoCookState:

; (Pointer to appropriate set of State variables is passed in StateVarsPtr$)

        LDX     StateVarsPtr$   ;Get pointer to current State Variables


; I n i t ?

; First, check to see if we just entered cook state and need to initialize...

        LDAA    _SubState,X     ;Is SubState = 0? (ie Step = Init?)
        BNE     CookInitDone

DoCookInit:                     ;Initialize cook state:

        InitCookState           ; Init to first cook stage, start cook timer,
                                ; reset AlmEocCode to 0, etc

; Sound a short beep here as we begin a new cook cycle

        LDAB    #16             ;Sound a 1-second tone at start of cook
        LDX     #$FFFF          ;( --> This destroys pointer value in [X])
        JSR     StartBzr

        LDX     StateVarsPtr$   ;Restore state variables pointer to [X]

; Now ready to proceed with "Cooking" substate

CookInitDone:


; R e a d y L e d
;
; Keep the Ready led OFF during cook cycle

        LDAA    StatusLeds
        ANDA    #~ReadyLed.
        STAA    StatusLeds


; _ R e q S e t p t T m p F $ ,   _ R e q R a d P c n t ,
;
;          a n d   _ R e q L o a d C o m p
;
; Keep the proper Temperature setpoint, Radiant duty, and Load Compensation
; values stuffed into the _ReqSetptTmpF$, _ReqRadPcnt, and _ReqLoadComp.
;
; The "_Req" ("requested") parameters are the ones that "outsider" routines
; look at when querying our current setpoint and radiant heat requirements,
; performing load compensated cook timing, etc.
;
; By maintaining these "_Req" variables, we establish a single place for
; these outsider routines to find the data they need, without requiring
; them to have any knowledge of what cook stage we are in, or even whether
; we are currently in a Cook cycle or a Hold cycle, etc.
;
; NOTE: we are putting the CURRENT cook stage values into the _ReqParms.
; If we find out below that its time to move on to the NEXT cook stage,
; we won't get around to installing those values until the next time we
; come back to this routine (fractions of a second from now...)


        LDX     StateVarsPtr$   ;Get pointer to the State Vars record
        LDX     _CkStagePtr$,X  ;Get the pointer to the current cook stage

        JSR     SetReqParms     ;Copy values from CkStage pointed to by [X]
                                ; into the actual "request" parameters


; A l m / E o c  S e l f - C a n c e l

; If any alarm or eoc is in progress, see if its time to self-cancel it

        LDX     StateVarsPtr$
                                ;Some alarms or Eoc's may cancel themselves
        ChkAlmEocSelfCancel     ; after a specified time elapses.
                                ;([X] still pts to StateVars on return)

; C h k E x i t F l a g

; Check to see if user wants to CANCEL the current cook cycle...


; (ie pressed and held Stitp key to cancel, etc.)

ChkExitFlag:
        LDAA    _ExitFlag,X     ;If ExitFlag set <> 0 (by user to routine?)...
        BEQ     ChkExitDone

        JMP     LeaveCook       ; then we need to cancel the rest of the cook
ChkExitDone:


; C h k S u b S t a t e

; What cook state are we in now?  Cooking? already in EOC?

ChkSubState:
        LDAA    _SubState,X     ;Get the current cook step (Cook? Eoc?)

        CMPA    #CkCookStep.    ;Are we in still in "Cooking" step?
        BEQ     StillCooking

        JMP     AlreadyCookEoc  ;Else already in Eoc -- go right to it...


; ------  S t i l l C o o k i n g  ------
;
; Calculate cook time remaining;  check for Alarms
;  check for new End-of-cycle (0:00 remaining)

StillCooking:                   ;[X] still points to State Variables

; Calculate the time remaining now

        JSR     CalcCookRem     ;Calc time remaining, save in RemHHMMSS
                                ;([X] still points to StateVars on return)

; Did we just reach the end-of-cycle?  (Time remaining = 00:00:00?)

ChkCookEoc:                     ;([X] already points to StateVars)

        LDAA    _RemHH,X        ;If any of remaining Hours, Minutes,
        ORAA    _RemMM,X        ; or Seconds is <> 00...
        ORAA    _RemSS,X
        BNE     ChkEocDone      ;  ...then we're not at End-of-Cycle yet

        StartCookEoc            ;Else if we DO hit 0:00 remaining,
                                ; time to move on to EOC step

        JMP     DoCookDone      ; (that's all for now...)

ChkEocDone:


; NOT EOC YET...
;
; Cook timer not timed out or down to 00:00:00 yet -- if either door is
; currently open, pause the timer so that it stops counting down for the
; moment.  Otherwise, the cook timer SHOULD be counting down.
```

```
        LDX     StateVarsPtr$   ;(Make sure we have a pointer to state vars)

        LDAA    CtrlDoorOpen    ;Is either door open?
        ORAA    OutlDoorOpen
        BEQ     CookTmrRun

CookTmrPaused:
        CLR     _CookTmr+_Sts,X ; If so, "pause" the cook timer by
                                ;  clearing the status byte (ie "not running")
        BRA     RunPausedDone

CookTmrRun:
        LDAA    #TmrRunning.    ; Else if neither door is open, make sure
        STAA    _CookTmr+_Sts,X ;  the cook timer is currently running.

;opt    BRA     RunPausedDone

RunPausedDone:


; Do we need to signal a new alarm?

        ChkCookAlm              ;See if we need to signal a new alarm
                                ; ([X] still points to StateVars$ on return)

; Also, is it time to move on to the next cook stage?

ChkNextStage:

; To accommodate flexible timing values (ie CookHHMM = 0:90), we ensure that
; in Programming mode all cook times (and alarm times) are set uniformly to
; all "strict HH:MM" values or to "Minutes-Only" values. By doing this,
; we can always perform direct comparisons with the running cook clock and
; the "_NextHHMMSS" next stage cook time, etc. (That is, we will never have
; a running cook timer at 0:90 and a next cycle time of 1:30...).
;
; Also -- we don't need to worry about advancing on to an unused cook stage
; with time set to 00:00:00. If we have 00:00:00 remaining, we would have
; already switched to the ChEocStep above (see ChkCookEoc code).

;opt    LDX     StateVarsPtr$

        LDAB    _CkStageNbr,X   ;Are we on the last cook stage?
        CMPB    #MaxCkStage.
        BHS     ChkNextDone     ; If so, no more stages to advance to...


        LDX     _CkStagePtr$,X  ;Else get pointer to the current cook stage
                                ; (--> destroys state vars pointer)

        LDD     _NextHHMMSS+0,X ;Get the start HH:MM of the NEXT cook stage
        STD     TempWord$       ;  Save "Next HH:MM" into TempWord$
        LDAB    _NextHHMMSS+2,X ;Get the start SS of the NEXT cook stage
        STAB    TempByte        ;  Save "Next SS" into TempByte



        LDX     StateVarsPtr$   ;Restore pointer to StateVars record

        LDD     _RemHHMM,X      ;How much time currently remains?

        SUBD    TempWord$       ; If RemHHMM > NextHHMM...
        BHI     ChkNextDone     ;    ...then we aren't there yet

        BLO     GoNextStage     ; Else if RemHHMM < NextHHMM, go to Next Stage
                                ;  (missed it? maybe matched during pwr up?)

        LDAB    _RemSS,X        ; Else RemHHMM = NextHHMM --
        CMPB    TempByte        ;   need to compare RemSS to NextSS

        BHI     ChkNextDone     ; If RemSS > NextSS, we aren't there yet...
                                ; Else if RemSS <= NextSS -- go to next stage!

; If Time remaining = "NextHH:NextMM:00", time to start the "next" cook stage

GoNextStage:                    ; ...It is time to switch over to NEXT STAGE

        INC     _CkStageNbr,X   ; - move on to the next cook stage index

        LDD     _CkStagePtr$,X
        ADDD    #CkStageSz.     ; - advance the cook stage pointer as well
        STD     _CkStagePtr$,X

ChkNextDone:


        BRA     DoCookDone


; ------ A l r e a d y C o o k E o c -------
;
; Already in Cook End-of-Cycle...  Time to move on to Hold?

AlreadyCookEoc:                 ;[X] still points to State Variables

        LDAA    _AlmEocCode,X   ;Get the Alarm/Eoc code.  Was set to $FF when
                                ; Eoc started.  If now = 0, application is
        BEQ     LeaveCook       ; indicating Eoc was acknowledged or was
                                ; automatically cancelled after specified
                                ; time delay -- exit cook cycle.

        BRA     DoCookDone      ;Else still doing EOC -- simply exit



; ------ L e a v e   C o o k ------

LeaveCook:

        ExitCook                ;If < 1/2 cycle was executed, or if no hold
                                ; cycle is programmed, then return to Prommat.
                                ;Else if > 1/2 executed, and HoldHHMM > 00:00,
;opt    BRA     DoCookDone      ; then proceed with the Hold cycle.
```

```
;****************************************************************************
;****************************************************************************
;
; U S E R - I O   R O U T I N E S :
;
; The routines below are called in Run mode to handle display updating
; and key input processing when no higher-priority task needs the displays.
; For example, if we are in Program mode then the Program routines take over
; the displays and key inputs, and the routines here ARE NOT called.
;
;
;****************************************************************************
;****************************************************************************



;----------------------------------------------------------------------------
;
;     D i s p l a y   U p d a t i n g   R o u t i n e s
;
;----------------------------------------------------------------------------



;----------------------------------------------------------------------------
; S h o w R e m T i m e  (Show Remaining Time)  Subroutine
;
; The current time remaining is displayed in the left side digits.
;
; If the Hours remaining is greater than 1, then the display shows
; hours and minutes, with the colon blinking at the slow 1 Hz rate.
; This 1 Hz colon blink is based on the current Load Compensated second.
; Also, the minutes value displayed is one higher than the value in
; RemMM, to reflect the current minuted being counted down in RemSS.
; Carry-out into the HH digit is performed, if necessary.
;
; If the remaining time is 0 Hours, then the display is minutes and seconds,
; with the colons blinking at the fast (4Hz) rate.
;
; Input:  StateVarsPtr$ points to State variables
;         _RemHH, _RemMM, _RemSS
;         _LCAdj100, _CookTmr100   (for colon blinking at load comp rate)
;
; Output: LDigl, LDig2, LDig3, LDig4, LDigLeds
;

; Routines Called:
; Exit State:           [A],[B],[X],CCR  -  indeterminate
;
;
;
;----------------------------   --------------------------------------------

ShowRemTime:

        LDX     StateVarsPtr$   ;Get pointer to the state variables again

        LDAA    _RemHH,X        ;See how many hours remain
        BNE     HHMMTime        ;If HH > 0, display as HH:MM


; Minutes and Seconds display:
;
; If _RemHH = 0, we will display remaining time as Minutes and Seconds.
; Blink the colon at the fast (4Hz) rate.

MMSSTime:
        LDAA    BlnTmr          ;Colon should be ON if 4 Hz bit is = "1"
        ANDA    #Tmr4HzBit.     ;Keep just the 4 Hz bit, then add $FF.
        ADDA    #$FF            ;If Carry = 1 if 4 Hz bit = 1, else Carry = 0.

        LDD     _RemMMSS,X      ;Get Cook Time Remaining ([X] pts to StateVars)
        LDX     #LDigits        ;Want to display it in the left digits
        JSR     DisplayTime     ;Note: Colons ON/OFF determined by Carry bit
                                ;(--> this has destroyed StateVars ptr in [X])
        JMP     ShowRemDone


; Hours and Minutes display:
;
; We actually display 1 minute more than indicated by RemHH, RemMM,
; if the current value in RemSS is > 00.  That is, we round UP any
; fraction of a minute currently in the SS variable.

HHMMTime:
        LDD     _RemHHMM,X      ;Get Cook Time Remaining: RemHH & RemMM
        TST     _RemSS,X        ;Is there any fraction of a minute in RemSS?
        BEQ     SaveHHMM        ; If not, this is the value we will display

        INCB                    ;Else add 1 to MM (ie rounding up fract MM)

        CMPB    #59             ;Is new MM <= 59?
        BLS     SaveHHMM        ;  if so, ready to go
        ADDD    #256-60         ;  else add 1 to HH, sub 60 from MM
SaveHHMM:
        STD     TempWord$       ;Save the HH:MM value we want to display

; We want the colons to blink at the Load Compensated countdown rate.

        LDAB    _LCAdj100,X     ;Get the 1/100's reload value of this second
        LSRB                    ;Divide by 2 -- [A] = countdown 1/2-way value

        SUBB    _CookTmr+_100,X ;Subtract actual 1/100's from 1/2 point:
                                ; Actual > Halfway ==> Carry = 1  (Colons ON)

        LDD     TempWord$       ;Get the time we want to display...
```

```
;opt    BRA     ShowRemDone

ShowRemDone:

        RTS


;----------------------------------------------------------------------------
; C o o k L e d O n   (turn Cook Led ON)  Subroutine
;
; This routine turns on the Cook led and assures that the Hold led is OFF.
;
; Input:  [X] -- Points to State Variables
;
; Output: ModeLeds: CookLed, and HoldLed
;
; Routines Called:
; Exit State:           [X] -- unchanged
;                       [A],[B],CCR -- indeterminate
;
;
;
;---------------------------------------     -----------------------------------

CookLedOn

; On entry here, [X] points to the State Variables record


; Turn the Cook led on.

        LDAA    ModeLeds        ;Get the Status Leds into [A]
        ORAA    #CookLed.       ;We need the "Cook" led ON
        ANDA    #~HoldLed.      ; and the "Hold" led OFF
        STAA    ModeLeds

        RTS                     ;[X] still points to State variables record


;----------------------------------------------------------------------------
; S h o w C o o k A l a r m  (Show Cook Alarm) Macro
;
; The alarm message for the current alarm, as identified in [B], is
; displayed.  The left display shows blinking time remaining, while the
; right display shows the alarm message (ie "AL 1", etc).
;
; Input:  [X] -- Points to State Variables
;         [B] -- current AlmCode (1..4).
;
; Output: LDigits, RDigits, etc
;
; Routines Called:
; Exit State:           [A],[B],[X],CCR  -  indeterminate
;
;
;
;--------------                -----------  ----------------------------------

ShowCookAlarm:
        .macro

; On entry here, [X] points to the State Variables,
;  & [B] = Alarm index (0..Max)


; We display non-blinking time remaining countdown in the left digits

        PSHB                    ; +[Preserve the Alarm index for the moment]

        JSR     ShowRemTime     ;Display _RemHH:MM or _RemMM:SS in Left Digits
                                ; (--> This destroys StateVars ptr in [X])

        PULB                    ; -[Restore the active Alarm Index]


; Blink alarm message (in right-side digits) and ProdLed at 1 hz
;    (1/2 second ON, 1/2 second OFF)

        LDAA    BlnTmr          ;Get the Blink Timer
        BITA    #Tmr1HzBit.     ;Test the 1 hz bit
        BEQ     BlankAlarmMsg   ;If bit is OFF, blank the alarm message...
                                ;Else display the appropriate alarm message

; Calculate the correct "AL-X" message number.  The alarm messages are
;  always kept consecutive and in order in the message table.
; (Alarm Number 1..4 passed in [B]...)

ShowAlarmMsg:                   ;Alarm Index (0..MaxAlm) is in [B]

        DECB                    ;Convert alarm number (1..4) to 0-based (0..3)
        ADDB    #MsgAlarms.     ;Add message Nbr of first alarm to message...
        LDX     #RDigits
        JSR     ShowMsg


; Sound the buzzer in synch with the displays

        LDAA    #$FF            ;Request the buzzer ON whenever
        STAA    SpkrReq         ; we are in the "blink ON" phase of message


; Blink the Product led ON and OFF with the alarm message

        LDX     StateVarsPtr$   ;Restore pointer to the StateVars record

        LDAB    _ProdNbr,X      ;Get the currently selected product number

        JSR     GetProdLed      ;(This destroys the StateVars ptr in [X])
        STD     ProdLeds$

        BRA     AlarmDispDone
```

```
BlankAlarmMsg:

; Alarm display should be OFF

        LDD     #0000           ;Blink the selected product led ON and OFF
        STD     ProdLeds$       ; in synch with the alarm message


; now blank the right-side displays

        LDAB    #MsgBlanks.     ;Blank the right side digits
        LDX     #RDigits
        JSR     ShowMsg

;opt    BRA     AlarmDispDone


AlarmDispDone:

;(On exit here, [X] DOES NOT still point to the StateVars record!)

        .endm


;----------------------------------------------------------------------------
; S h o w C o o k E o c  (Show Cook Eoc) Macro
;
; The Eoc message for the current cook cycle is displayed, and the buzzer
; is beeped in synchronization with the display digits.
;
; Input:  [X] points to State Variables
;         XReadyLed -- bit mask = LReadyLed. or RReadyLed., as appropriate
;
; Output: XDig1, XDig2, XDig3, XDig4, XDigLeds
;
; Routines Called:
; Exit State:           [A],[B],[X],CCR  -  indeterminate
;
;
;
;---------------------------------------------  -------------------------------

ShowCookEoc:
        .macro

; On entry here, [X] points to the State Variables


; Blink EOC message at 2 hz (1/4 second ON, 1/4 second OFF)

        LDAA    BlnTmr          ;Get the Blink Timer
        BITA    #Tmr2HzBit.     ;Test the 2 hz bit
        BEQ     BlankEocMsg     ;If bit is OFF, blank the displays...
                                ;Else display the appropriate Eoc message


; RemHHMM (HH:MM) in left display, EOC message in right

ShowEocMsg:
        LDAA    #$FF            ;Request the buzzer ON whenever
        STAA    SpkrReq         ; we are in the "blink ON" phase of message

; Blink the Product led ON and OFF with the EOC message

        LDAB    _ProdNbr,X      ;Get the currently selected product number
        JSR     GetProdLed      ; ( --> This destroys the pointer in [X])
        STD     ProdLeds$

; Now update the 7-segment displays

        LDAB    #Char.Blank.    ;Display " 0:00" in the left digits
        STAB    LDig1

        CLR     LDig2
        CLR     LDig3
        CLR     LDig4

        LDAB    #ColonLeds.
        STAB    LDigLeds

        LDAB    #MsgCkEoc.      ;Display "Cook End of Cycle" message in right
        LDX     #RDigits
        JSR     ShowMsg

        BRA     EocDispDone


; Blink OFF phase of eoc display

BlankEocMsg:
        LDD     #0000           ;Blink the selected product led ON and OFF
        STD     ProdLeds$       ; in synch with the Eoc message

        LDAB    #MsgBlanks.     ;Blank the displays
        LDX     #LDigits
        JSR     ShowMsg

        LDAB    #MsgBlanks.
        LDX     #RDigits
        JSR     ShowMsg

;opt    BRA     EocDispDone


EocDispDone:

;(On exit here, [X] DOES NOT still point to the StateVars record!)

        .endm


;----------------------------------------------------------------------------
; S h o w T i m e A n d T m p  (Show Time and Temperature) Macro
;
; The current time remaining and the current temperature are displayed.
```

```
;  (Actually, colon blink is based on the current Load Compensated second...)
;
;  If the remaining time is 0 Hours, then the display is minutes and seconds,
;  with the colons blinking at the fast (4Hz) rate.
;
;  Input:  [X] points to State Variables
;
;  Output: LDigits, RDigits
;
;  Routines Called:
;  Exit State:          [A],[B],[X],CCR  -  indeterminate
;
;
;
;----  ------------------------------------------------------------------

ShowTimeAndTmp: .macro

; Display time remaining in the left digits

        JSR     ShowRemTime      ;Displays HHHH:MM or MM:SS in Left digits
                                 ; ( --> This destroys StateVars ptr in [X])

; Display the actual air temperature in the right digits

        LDD     AirTmpF$         ;Now display current temperature in right side
        LDX     #RDigits
        JSR     DisplayTmp

;(On exit here, [X] DOES NOT still point to the StateVars record!)

        .endm


;-----------------------------------------------------------------------
;  D o C o o k D i s p l a y   (Do Cook Display) Subroutine
;
;  This takes care of updating the display information during the Cook State,
;  including "Cook", and "CookEoc" steps.
;
;  Input:  StateVarsPtr$-- Points to start of State Variables record
;
;  Output: LDigits, RDigits
;          ModeLeds: CookLed, HoldLed.
;
;  Routines Called:
;  Exit State:          [A],[B],[X],CCR  -  indeterminate
;
;
;
;-----------------------------------------------------------------------

DoCookDisplay:




; (Pointer to currently-selected state variables passed in StateVarsPtr$)


; Note: Alarms and Eoc are monitored and triggered in the state routines,
; as indicated by the status of _AlmEocCode.
;
; This routine is merely responsible for handling normal display updating
; according to the current status of AlmEocCode.


; Update the display information:
;
;   If End-of-Cycle:
;      then do special EOC display
;
;   Else If Alarm currently active:
;      then do special Alarm display
;
;   Else update display to indicate cook time remaining, temperature
;



; Turn on the Cook led, as appropriate, and assure Hold is off

        LDX     StateVarsPtr$

        JSR     CookLedOn        ;Turn on the appropriate led
                                 ;([X] still points to state vars on return...)

; Determine if we are in Alarm or Eoc.  If so, special display & key handling.

;upt    LDX     StateVarsPtr$    ;Get pointer to current State Variables

        LDAA    _SubState,X      ;Get current step of cook cycle
        CMPA    #ChEocStep.      ;Are we in Cook End-of-Cycle?
        BEQ     DispEoc          ; If so, do special Eoc code...

        LDAA    _AlmEocCode,X    ;Else do we have any alarm in progress?
        BNE     DispAlm          ; If so, do special Alarm display...


        JMP     DispNormal


; ----- A l m -----
                                 ;(StateVars pointer still in [X]...)
DispAlm:                         ;(AlmCode still in [B]...)

        ShowCookAlm              ;Pass alarm code in [B].  Show alarm message.

        JMP     CookDispDone


; ----- E o c ------

        JMP     CookDispDone


; ----- N o r m a l -----     ;(StateVars pointer still in [X]...)

DispNormal:

; Due to load compensation, the cook clock may actually use longer or shorter
; "seconds", to speed up or slow down the clock.  The Load-Compensated
; 1/100s seconds reload value is available in _LCAdj100.  This value will
; be < 99 when overtemp and clock is running fast, or will be > 99 when
; undertemp and clock is running slow.  (Should be 99 exactly when no
; load compensation is specified, or when right on the setpoint temp).
;
; We'll use the LCAdj100 value as the reference of what a "second" is,
; so that our colon leds on and "on:or" display blink relative to
; load-compensated "seconds".  This will cause them to blink faster
; when the clock is running fast, and blink slower when the clock is
; running slow.

SetProdLed:
        LDX     StateVarsPtr$    ;Get pointer to state variables

        LDAB    _ProdNbr,X       ;Get the currently selected product number
        JSR     GetProdLed       ;Get corresponding product led mask
                                 ; ( --> This destroys the pointer in [X])

        STB     ProdLeds$        ;Light just the selected product's led


; See if either door is open.  If so, override the displays with "door open"

        LDAA    CtrlDoorOpen
        ORAA    CustDoorOpen
        BEQ     TimeTmpDisplay


; D o o r O p e n D i s p l a y

DoorOpenDisplay:

        JSR     DisplayDoorOpen ;If either door open, show "door" "open"

        JMP     CookDispDone


; T i m e T m p D i s p l a y
;
; The normal display, if no alarm or eoc, and the doors are closed,
; is to display the time remaining in the left digits, temperature in
; the right digits.

TimeTmpDisplay:

        ShowTimeAndTmp




CookDispDone:

        RTS


;=======================================================================
;
;      K e y   I n p u t   P r o c e s s i n g   R o u t i n e s
;
;=======================================================================



;-----------------------------------------------------------------------
;  A c k C o o k A l m  (Acknowledge Cook Alarm)  Macro
;
;  This routine acknowledges the current cook alarm by resetting the
;  AlmEocCode to 0.
;
;
;  Input:  AlmCode -- index of alarm currently activated
;          [X] -- points to State Variables for THIS side
;
;  Output: AlmEocCode
;
;  Routines Called:
;  Exit State:          [A],[B],[X] -- unchanged
;
;
;
;-----------  ---------  -- --- ---  -----  --- ------------------------

AckCookAlm:
        .macro

        CLR     _AlmEocCode,X   ; - reset the AlmEocCode to 0


        .endm



;-----------------------------------------------------------------------
;  A c k C o o k E o c  (Acknowledge Cook End-of-Cycle)  Macro
;
;  This routine simply acknowledges the cook end-of-cycle alarm by clearing
;  the AlmEocCode to 0.  In effect, this causes a transition out of cook
;  into the Hold State, if a non-zero hold time is programmed, or else back
;  into the Preheat (standby) State, if hold time = 00:00.
;
;  All state transitions are performed by the State Routines.  When the
;  State Routine detects the End of Cycle condition, it sets SubState =
;  "ChEocStep"  and sets the AlmEocCode = $FF.  When the State Routine sees
```

```
;  Hold, if a non-zero hold time is programmed for this product, or else
;  back to Preheat (standby).
;
;  Input:  [X] -- points to State Variables
;
;  Output: _AlmEocCode -- cleared to 0
;
;  Routines Called:
;  Exit State:           [A],[B],[X],CCR  -  indeterminate
;
;
;
; --------         ----------------------------------------------------------------

AckCookEoc:
        .macro

; Inform the State Routine that the user has acknowledged Eoc by clearing
; the AlmEocCode, which the State Routine set to $FF when it recognized the
; Eoc condition.  The State Routine, upon seeing that AlmEocFlag has been
; cleared, will immediately accumulate usage and filter statistics, then
; transition into the next state -- Hold or Idle -- as appropriate.

        CLR     _AlmEocCode,X   ;All transitions are performed by State Rtns.


        .endm




;-----------------------------------------------------------------------------------
;  H a n d l e A l m K e y s  (Handle Alarm Key Input)  Macro
;
;  This macro handles key input while a cook Alarm is currently active.
;
;  Input:  [A] -- new key from the key buffer
;          [X] -- pointer to state variables record
;
;  Output:
;
;  Routines Called:
;  Exit State:           [A],[B],[X],CCR  -  indeterminate
;
;
;
;-----          ------------- --  -------------------------------------------------

HandleAlmKeys:
        .macro

; On entry here, [X] points to the state variables record,
; and [A] holds the key code just removed from the key buffer.


; Only the Start/Stop key is valid at this point



;>>>...............................................................................
        .iftrue StStpKeyAvail.

        CMPA    #KeyStStp.      ;Is it the Start/Stop key?
        BNE     AlmInvKey

        .else

        CMPA    _ProdNbr,X      ;Is it the number key matching this product?
        BNE     AlmInvKey

        .endif
;>>>...............................................................................

; Eoc has been acknowledged -- inform State Routine to move us on to the
; next state: Hold State, if non-zero hold time programmed, else Idle State.

        AckCookAlm              ;Go to Hold (or back to preheat, if no hold)

        BRA     AlmKeyDone


; If not StartStop, key is invalid

AlmInvKey:
        JSR     BadKeySound     ; ==> sound the "invalid" beep

;opt    BRA     AlmKeyDone


AlmKeyDone:


        .endm


;-----------------------------------------------------------------------------------
;  H a n d l e E o c K e y s  (Handle End-of-cycle Key Input)  Macro
;
;  This macro handles key input while a cook End-of-cycle is currently active.
;
;  Input:  [A] -- new key from the key buffer
;          [X] -- pointer to state variables record
;
;  Output:
;
;  Routines Called:
;  Exit State:           [A],[B],[X],CCR  -  indeterminate
;
;
;
;----------------------------  ---------- -----------------------------------------

HandleEocKeys:
        .macro

; On entry here, [X] points to the state variables record,
; and [A] holds the key code just removed from the key buffer.

;>>>...............................................................................
        .iftrue StStpKeyAvail.

        CMPA    #KeyStStp.      ;Is it the Start/Stop key?
        BNE     EocInvKey

        .else

        CMPA    _ProdNbr,X      ;Is it the number key matching this product?
        BNE     EocInvKey

        .endif
;>>>...............................................................................


; Eoc has been acknowledged -- inform State Routine to move us on to the
; next state: Hold State, if non-zero hold time programmed, else Idle State.

        AckCookEoc              ;Go to Hold (or back to preheat, if no hold)

        BRA     EocKeyDone


; If not StartStop, NBotKey MUST be BNC or BCC: both are invalid keys here...

EocInvKey:
        JSR     BadKeySound     ; ==> sound the "invalid" beep

;opt    BRA     EocKeyDone


EocKeyDone:


        .endm



;-----------------------------------------------------------------------------------
;  H a n d l e R e g C o o k K e y s  (Handle Regular Cook Key Input)  Macro
;
;  This macro handles key input for normal cook operation, ie when no alarm
;  or Eoc is currently active
;
;  Input:  [X] -- points to current StateVars
;
;  Output: None
;
;  Routines Called:
;  Exit State:           [A],[B],[X],CCR  -  indeterminate
;
;  .
;
;-----------------------  ---------------------------------------------------------

HandleRegCookKeys:
        .macro




; On entry here, [X] points to current State Variables,
; and [A] holds the key code of the key just retrieved from the key buffer.

ChkStStpKey:

;>>>...............................................................................
        .iftrue StStpKeyAvail.

        CMPA    #KeyStStp.      ;"Start/Stop" key?
        BNE     ChkSetKey

        .else

        CMPA    _ProdNbr,X      ;"Start/Stop" key? (is this prod's nbr key?)
        BNE     ChkSetKey

        .endif
;>>>...............................................................................

        LDAA    #$FF            ;Need to hold StartStop for 1 second to
        STAA    _StStpPending,X ; cancel the cook cycle.  Set flag to indicate
        CLR     _StStpClk,X     ; this cancel operation is pending, and reset
                                ; the clock that times how long key is held.
        BRA     RegKeyDone

ChkSetKey:
        CMPA    #KeySet.        ;Is it the "Set" key?
        BNE     RegInvKey

        LDAA    #1              ;Need to hold "Set" for a few seconds to
        STAA    PrgPending      ; activate program mode.  Set flag to "1" to
        CLR     PrgPendClk      ; initiate a "Press & Hold SET key" operation.
                                ; (Mainline "DoPrgPending" code takes over...)
        BRA     RegKeyDone


; If not StartStop, not Set, must be invalid

RegInvKey:
        JSR     BadKeySound     ; ==> sound the "invalid" beep

;opt    BRA     RegKeyDone



RegKeyDone:

        .endm



;-----------------------------------------------------------------------------------
;  D o C o o k K e y s  (Do Cook Key Handling) Subroutine
;
;  This takes care of handling key inputs during the Cook state.
;
;  Input:  StateVarsPtr -- Points to start of State Variables record
;
```

```
;  Exit State:          [A],[B],[X],CCR  -  indeterminate
;
;
;
;----        ----------------------------------------------------------------

DoCookKeys:

; (Pointer to currently-selected state variables passed in StateVarsPtrS)


; Note: Alarms and Eoc are monitored and triggered in the state routines.
; This routine is merely responsible for handling normal display updating
; and switch processing while in cook mode.


; Process key input:
;
;   If End-of-Cycle:
;      then only Start/Stop is valid key
;
;   Else If Alarm currently active:
;      then only Start/Stop is valid key
;
;   Else process key inputs normally (Inc, Dec, StStp)
;


; First of all, see if there are any new keys there...

        JSR     GetKey          ;Any keys there?
        BNE     GotAKey
        JMP     CookKeysDone    ; If not, simply exit now...


; Okay, we got a new key (in [A]):
;
; Determine if we are in Eoc.  If so, special display & key handling

GotAKey:                        ;New Key Code is in [A] right now!

        LDX     StateVarsPtrS   ;Get pointer to current State Variables

        LDAB    _SubState,X     ;Get current step of cook cycle
        CMPB    #CkEocStep.     ;Are we in Cook End-of-Cycle?
        BEQ     EocKeys         ; If so, do special Eoc handling...

        LDAB    _AlmEocCode,X   ;Else do we have any alarm in progress?
        BEQ     NrmlKeys        ; If no alarm/eoc, do normal key handling
                                ; Else do Alarm handling...

; -----  A l m  -----
                                ;(StateVars pointer still in [X]...)
AlmKeys:                        ;(AlmCode still in [B]...)
        CLR     _StStpPending,X
        CLR     _StStpClk,X




        HandleAlmKeys           ;StStp to acknowledge Alarm

        JMP     CookKeysDone


; -----  E o c  ------

EocKeys:                        ;(StateVars pointer still in [X]...)
        CLR     _StStpPending,X
        CLR     _StStpClk,X

        HandleEocKeys           ;StStp to acknowledge EOC

        JMP     CookKeysDone


; -----  N o r m a l  -----     ;(StateVars pointer still in [X]...)

NrmlKeys:
        HandleRegCookKeys       ;Normal key handling for cook mode

;opt    JMP     CookKeysDone


CookKeysDone:

        RTS



; ------------------------------------------------------------------------
;  C a n c e l C o o k C y c l e (Cancel Cook Cycle)  Macro
;
;  This routine is called when the user wants to cancel the current cook
;  cycle.  We merely set the "Exit Flag" to inform the State Routines that
;  we want to exit (cancel) cook.
;
;  All state transitions are performed by the State Routines.  Since we are
;  leaving via the "Exit Flag", the state routine will decide whether we go
;  to Hold or back to Preheat.  If we almost completed the cook cycle, the
;  State Routine may advance us to the Hold state, if HoldTime <> 00:00.
;
;
;  Input:  [X] -- points to State Variables for THIS side
;
;  Output: ExitFlag set to #$FF
;          1/2-second buzzer pulse started
;
;  Routines Called:
;  Exit State:          [X] -- unchanged
;                       [A],[B],CCR -- indeterminate
;
;
;
;  ------------------------------------------------------------------------
```

```
; On entry here, [X] points to the State Variables record..

        PSHX                    ; --[Save a copy of the state vars pointer]

; Inform the State routines that we want to exit the cook cycle.

        LDAA    #$FF            ;Set the "Exit" flag -- all state transitions
        STAA    _ExitFlag,X     ; are performed by the state routines...

; Sound a 1/2 second beep to indicate the transition

        LDX     #$FFFF          ;Sound a 1/2-second beep as we cancel cook
        LDAB    #8              ;(8/16 = 1/2 second)
        JSR     StartBzr


        PULX                    ; --[Restore the state vars pointer on exit]


        .endm


;------------------------------------------------------------------------
;  D o C o o k S t S t p P e n d i n g  (Do Cook StartStop Pending) Subrtn
;
;  This routine handles the "StartStop Pending" activity for Cook mode.
;
;  This routine is called from the Main loop ONLY if the _StStpPending
;  flag for the state variables record is currently true.  This flag is set
;  to "true", and overrun clock is reset to 0 -- by the DoCookKeys routine
;  above whenever the Number key matching the currently selected product is
;  pressed.
;
;  The only function of the StartStop key in Cook mode (unless and alarm or
;  EOC is sounding) is to cancel the cook cycle when the StStp key
;  has been held for 1 second.  The code above sets the "pending" flag true
;  when the StStp key is first pressed, and this code monitors the key to see
;  if the user is still holding the key for the required time.
;
;
;  Input:  KeyStat$ -- current bit status of key inputs
;          StateVarsPtrS -- points to state variables for current side
;
;  Output:
;
;  Routines Called:
;  Exit State:          [A],[B],[X],CCR  -  indeterminate
;
;
;
;------ -----------------------------------------------------------------

DoCookStStpPending:

; S t S t p P e n d i n g
;




; Do we have a "pending" Start/Stop press & hold to take care of?
; (Yes we do, or the DoMainWork would not have called this routine)
;


; Is the user still holding the StStp key?

ChkReleased:

;>>>.......................................................................
        .iftrue StStpKeyAvail.

        LDAB    #KeyStStp.      ;Need to see if Start/Stop key
        JSR     ChkKeyPressed   ;  is still being held down...
        BNE     KeyStillHeld    ;If still held down, see how long its been held

        .else

        LDAB    _ProdNbr,X      ;Need to see if key matching current product
        JSR     ChkKeyPressed   ; number is still being held down...
        BNE     KeyStillHeld    ;If still held down, see how long its been held

        .endif
;>>>.......................................................................

KeyReleased:
        LDX     StateVarsPtrS   ;Else user has released StStp in < 1 seconds
        CLR     _StStpPending,X ; Reset the "StStp Pending" flag
                                ;  -- he gave up too soon
        BRA     StStpPendDone



; If StStp is held for >= 1 second, we need to cancel the current
;  Cook cycle, and return to the "Off" state...

KeyStillHeld:
        LDX     StateVarsPtrS   ;Get pointer to current state variables

        LDAA    _StStpClk,X     ;Has the user held the key for X seconds yet?
        CMPA    #16
        BLO     StStpPendDone   ;(If not X seconds, we need to keep waiting)

; StStp Pending Timer has hit X seconds:

CnclCook:                       ;Yes -- we've hit the 1 second mark!

        CLR     _StStpPending,X ; Now that we know what to do, reset the
                                ; "StStp Pending" flag (we're handling it now)

                                ; Cancel Cook cycle
        CancelCookCycle         ; (to tell State Routine we want to cancel --
                                ;  State Routine will decide where we go next)

;opt    BRA     StStpPendDone


StStpPendDone:
```

At the end of a cook cycle, the HOLD mode may be entered. An example of a software routine which may be performed in HOLD mode for cooking appliance is as follows.

```
-- Hold State Display and Key Interface

;--------------------------------------------------------------------------
;
;       K H H o l d . S R C
;
; This file contains the code that takes care of processing state variables,
; updating the display information and handling key presses for the "Hold"
; state.
;--------------------------------------------------------------------------


; USE THE FOLLOWING .EQU TO INDICATE WHETHER OR NOT WE HAVE A Start/Stop KEY

StStpKeyAvail,  .equ $00        ; "OFF" if Start/Stop key is available
                                ; "$00" if Start/Stop key is NOT available


        .include D:KHStd.LIB


; External variables

        .extern page0 BlnTmr, Tmr1HzBit., Tmr2HzBit., Tmr4HzBit., Tmr8HzBit.
        .extern page0 SpkrReq
        .extern page0 CurKey, page0 KeyHoldSS

        ; - - - C k S t a g e T y p e - - -

        .extern CkStageSz.
        .extern _HHMMSS, _SetptTmpF$, _RadPcnt, _RadTmpF$, _Flags.Fan.LC

        .extern _HHMM, _MMSS, _MaxHHMMSS
        .extern FanOn., FanMostlyOff., FanVent., FanRampOff.

        ; - - - P r o d u c t T y p e - - -

        .extern ProductSz.
        .extern _CkStages, _HdStage, _PreheatTmpF$, _AlmTimes

        .extern NbrCkStages., NbrAlms., MaxCkStages., MaxAlm.
        .extern _CookHHMMSS, _HoldHHMMSS

        ; - - - S t a t e V a r s T y p e - - -

        .extern StateVarsSz.
        .extern _SVProduct, _ProdNbr, _NeedProdUpd
        .extern _State, _SubState, _ExitFlag




        .extern _CookTmr, _LCAdj100
        .extern _RemHH, _RemMM, _RemSS
        .extern _CkStageNbr, _CkStagePtr$
        .extern _ReqSetptTmpF$, _ReqRadPcnt, _ReqRadTmpF$
        .extern _ReqFan, _ReqLoadComp, _ReqLCTmpF$
        .extern _NextAlmNbr, _AlmEocCode, _AlmEoc100s$
        .extern _StStpPending, _StStpClk

        .extern _RemHHMMS, _RemMMSS$
        .extern OffState., PreheatState., CookState., HoldState.
        .extern CkCookStep., CkEocStep.
        .extern HdHoldStep., HdEocStep.

        ; - - - - - - - - - - - - - - - - - - -


        .extern StateVarsPtr$



        .extern PrgPending, PrgPendClk

        .extern TmrRunning.

        .extern AlmDuraLmt$, EocDuraLmt$

        .extern AirTmpF$

        .extern Blwr100s$

        .extern CtrlDoorOpen, CvstDoorOpen

        .extern ModeLeds, CookLed., HoldLed., zCookLed., zHoldLed.

        .extern StatusLeds, ReadyLed., zReadyLed.

        .extern ProdLeds$

        .extern LDigits, RDigits
        .extern LDigLeds, ColonLeds.

        .extern page0 KeySta$
        .extern KeySet., KeyStStp.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.


        .extern page0 TempByte, page0 TempWord$

        .extern MsgAlarms., MsgHold., MsgHdEoc., MsgBlanks.


; External routines

        .extern SelectProd, GetProdLed

        .extern BinToBcd2Dig, BinToBcd3Dig, BinToBcd4Dig
        .extern DisplayTmp, DisplayTime, DisplayDoorOpen
```

```
        .extern CalcHoldRem, ShowRemTime, SetKeyParms


; Routines defined here

        .global DoHoldState

        .global DoHoldDisplay, DoHoldKeys, DoHoldStStpPending


;**************************************************************************
;**************************************************************************
;
; S T A T E   R O U T I N E S :
;
; The routines below are called continually in Run mode to handle items
; that effectively run "in the background" even when the user is in Program
; mode, for example.  These items include turning the "ready" leds on and off
; as appropriate, and watching for cook alarms and end of cycle, etc.
;
; For example, if we are in Program mode we let the programming routines
; take over the displays and key inputs, but the Ready led's should still
; operate as normal, and the cook timers must be monitored so that we can
; interrupt the programming display when a cook alarm or eoc occurs.
;
;
;**************************************************************************
;**************************************************************************




;--------------------------------------------------------------------------
; I n i t H o l d S t a t e  (Initialize Hold State)  Macro
;
; This macro performs Hold state initialization, clearing the alarm/eoc code,
; clearing the exit flag, and starting the CookTmr at "HoldHHMMSS".
;
; Input:  [X] -- points to start of state variables
;
; Output: _CookTmr started at HoldHHMMSS
;         _AlmEocCode reset to 0
;         _ExitFlag reset to 0
;         Buzzer timer started for 1 second
;
; Routines Called:
; Exit state:           [X] -- unchanged (points to state vars)
;                       [A],[B],CCR -- indeterminate
;
;
;
;--------------------------------------------------------------------------




InitHoldState;
        .macro

; Starting a brand new hold cycle -- load the CookTmr w/ programmed Hold Time.
; The Timer ISR will signal CookTmr is "timed out" when trying to decrement
; below 00:00.00 (ie at -1/100 seconds).  The DoHoldState subroutine, however,
; will signal EOC as soon as we see HH:MM = 00:00.
;
; By starting the timer at HH:MM:59.99, we will be ON the actual starting
; value "HH:MM" for 1 full minute, then do the first minutes decrement.


; First of all, set the "CkStage" pointer to HdStage
; (At this point, Hold mode is a single stage, but code still wants ptr...)

        LDD     StateVarsPtr$
        ADDD    #_HdStage
        STD     _CkStagePtr$,X

        CLR     _CkStageNbr,X


; Now ready to actually start the timer

        CLR     _CookTmr+_Sta,X ;Make sure Tmr.Sta = 0 during access here
                                ;(Otherwise would have to disable interrupts)

        LDD     _HoldHHMMSS+0,X ;Get HH:MM value for Hold cycle

        STAB    _CookTmr+_MM,X  ;Set the Hours and Minutes
        STAA    _CookTmr+_HH,X  ; from programmed HH, MM values

        LDAB    _HoldHHMMSS+2,X
        STAB    _CookTmr+_SS,X  ;Start Seconds at programmed SS value

        LDAB    #99
        STAB    _CookTmr+_100,X ;Start 1/100's at 99
        STAB    _LCAdj100,X     ;(First "second" has no load comp adj yet)

                                ;Clear the load comp factor for the moment --
        CLR     _ReqLoadComp,X  ; proper LC value will be installed by the
                                ; main code of DoHoldState below...  (*)


        LDAB    #TmrRunning.    ;Now start the timer running...
        STAB    _CookTmr+_Sta,X

; (*) Note: assign a "load comp" value here in case the first timer
; decrement occurs before we assign actual value in DoCookState routine below.


; Reset the "larm/Eoc Code, "Exit" flag, and Start-Stop pending flag

        CLR     _AlmEocCode,X   ;Start out with no EOC activated...

        CLR     _NextAlmNbr,X   ;(Actually, no alarms in hold mode...)

        CLR     _ExitFlag,X     ;Make sure the "Exit" flag is reset also
```

```
; Hold cycle may perform special blower control -- reset the blower timer

        LDD     #0000
        STD     Blwr100mS

; (On exit, [X] still points to state variables)

        .endm


;---------------------------------------------------------------------------
; C h k A l m E o c S e l f C a n c e l
;                                   (Check Alarm or EOC Self Cancel) Macro
;
; This routine checks the duration timer (_AlmEoc100mS) to see if its time
; yet to automatically cancel an active alarm.  This routine doesn't bother
; to see if any alarm is actually active -- if _AlmEoc100mS has hit 0000,
; it simply forces _AlmEocCode to 0.  (If no alarm or eoc is in progress,
; then AlmEocCode will already be 0 anyway...)
;
; In order to keep any Alarm or Eoc from being self-cancelling, the
; application routines simply need to assign a negative value to AlmEoc100mS
; countdown timer.  The TmrISR routine will not decrement any AlmEoc100mS
; value which has bit15 = 1 (ie "negative").  Consequently, such values will
; never count down to 0000, and therefore will never be self-cancelling.
;
; Input:   [X] -- points to start of state variables record
;          _AlmEoc100mS -- duration countdown timer
;
; Output: _AlmEocCode -- may be set to 0
;
; Routines Called:
; Exit State:            [X] -- unchanged (points to state vars)
;                        [A],[B],CCR -- indeterminate
;
;
;
;
;---------------------------------------------------------------------------

ChkAlmEocSelfCancel:
        .macro

;(On entry, [X] points to state variables record)

        LDD     _AlmEoc100mS,X  ;Get current duration 1/100's countdown value
        BNE     SelfCancelDone  ;If not = 00:00, nothing to do here

        CLR     _AlmEocCode,X   ;Else if AlmEoc100mS = 0000...
                                ; ...clear the Alarm/Eoc code to 0
SelfCancelDone:


;(On exit, [X] still points to state variables record)

        .endm


;---------------------------------------------------------------------------
; S t a r t H o l d E o c  (Start Hold mode End-of-Cycle) Macro
;
;
; Input:  [X] -- points to start of state vars for the current side
;
; Output: SubState -- set to "OkEocStep."
;
; Routines Called:
; Exit State:            [X] -- unchanged
;                        [A],[B],CCR -- indeterminate
;
;
;  .
;---------------------------------------------------------------------------

StartHoldEoc:
        .macro

;(On entry here, [X] points to the start of the state variables record)

        LDAA    #HdEocStep.     ; Set Hold step to "End of Cycle"
        STAA    _SubState,X
                                ;Set the Alarm/Eoc code to 255
        LDAA    #$FF            ; to indicate we are now doing EOC...
        STAA    _AlmEocCode,X   ;Application will clear to 0 again when
                                ; Eoc has been acknowledged...

        CLR     BlnkTmr         ;Resynchronize the blink timer

; End of Hold cycle is ALWAYS infinite duration  (ie user MUST acknowledge)

        LDD     #$FFFF          ;Neg value in AlmEoc100mS is NOT decremented
        STD     _AlmEoc100mS,X  ; by TmrISR routine, so $FFFF = infinite...


ChkHdEocDone:

;(On exit here, [X] still points to StateVars record)


        .endm


;---------------------------------------------------------------------------
; E x i t H o l d   (Exit Hold state) Macro
;
; Input:  [X] -- points to current side state variables
;
; Output: _State -- set to PreheatState.
;         _SubState -- reset to "0" to indicate "Initialize"
```

```
; Exit State:            [A],[B],[X],CCR -- indeterminate
;
; Create Date:           21 Sept 92
; Revision Record:       A - 21 Sept 92 - Original
;---------------------------------------------------------------------------

ExitHold:
        .macro

; (On entry here, [X] points to state variables record)

        CLR     _AlmEocCode,X   ;Cancel andy Alarm/Eoc that may be active


; Transition from Hold mode to "Off" mode

HoldtoOff:
        LDAA    #OffState.      ;Going to the "Off" state:
        STAA    _State,X        ; Save the new state indicator
        CLR     _SubState,X     ; Start out on "Init" step of Preheat...


ExitHoldDone:

        .endm



;---------------------------------------------------------------------------
; D o H o l d S t a t e  (Do Cook State) Subroutine
;
; This routine manages the automatic activity required in the Cook state,
; including checking for Alarms and End-of-Cycle criteria (ie via time
; remaining or via probe temperature).
;
; Input:  StateVarsPtr$, OtherStateVars$
;         XReadyLedMsk -- bit mask for LReadyLed or RReadyLed, as appropriate
;
; Output:
;
; Routines Called:
; Exit State:            [A],[B],[X],CCR  -  indeterminate
;
;
;
;---------------------------------------------------------------------------

DoHoldState:

; (Pointer to appropriate set of State variables is passed in StateVarsPtr$)

        LDX     StateVarsPtr$   ;Get pointer to current State Variables


; First, check to see if we just entered Hold state and need to initialize...

        LDAA    _SubState,X     ;Is SubState = 0? (ie Step = Init?)
        BNE     HoldInitDone

DoHoldInit:                     ;Initialize Hold state:

        InitHoldState           ; Start the Hold timer (using "Cook" timer)
                                ; Reset AlmEoc code to 0, etc

; Sound a short beep here as we begin a new hold cycle

        LDAB    #0              ;Sound a 1/2 -second tone at start of Hold
        LDX     #$FFFF          ;( --> This destroys pointer value in [X])
        JSR     StartBzr

        LDX     StateVarsPtr$   ;Restore state variables pointer to [X]

; Now ready to proceed with "Holding" substate

        INC     _SubState,X     ;Advance on to NEXT step -- "Holding"

HoldInitDone:


; R e a d y L e d
;
; Keep the Ready led OFF during Hold cycle

        LDAA    StatusLeds
        ANDA    #XReadyLed.
        STAA    StatusLeds


; _ R e q S e t p t T m p F $ ,   _ R e q R a d P c n t ,
;
;  _ R e q F a n ,   _ R e q L o a d C o m p ,   e t c
;
; Keep the proper Temperature setpoint, Radiant duty, and Load Compensation
; values stuffed into the _ReqSetptTmpF$, _ReqRadPcnt, and _ReqLoadComp.
;
; The "_Req" ("requested") parameters are the ones that "outsider" routines
; look at when querying our current setpoint and radiant heat requirements,
; performing load compensated cook timing, etc.
;
; N O T E :  Hold mode is currently a SINGLE-STAGE cycle.
;            If multiple stages are implemented for Hold mode,
; . .        the code here will have to be changed to look up
;            the current hold stage parameters


        LDX     StateVarsPtr$   ;Get pointer to the State Vars record
        LDX     _CkStagePtr$,X  ;Get the pointer to the current hold stage

        JSR     SetReqParms     ;Copy values from CkStage pointed to by [X]
                                ; into the actual "request" parameters
```

```
; (Hold mode currently has no alarms, no self-cancelling EOC's)
;
;; A l m  /  E o c   S e l f - C a n c e l
;
;; If any alarm or eoc is in progress, see if its time to self-cancel it
;
;;opt    LDX     StateVarsPtrS
;                               ;Some alarms or Eoc's may cancel themselves
;        ChkAlmEocSelfCancel    ; after a specified time elapses.
;                               ;([X] still pts to StateVars on return)
;
;>>>............................................................................


; C h k E x i t F l a g

; Check to see if user wants to CANCEL the current Hold cycle...
; (Ie pressed and held STStp key to cancel, etc.)

ChkExitFlag:
        LDX     StateVarsPtrS

        LDAA    _ExitFlag,X     ;If ExitFlag set <> 0 (by User I/O routine?)...
        BEQ     ChkExitDone

        JMP     LeaveHold       ; then we need to cancel the rest of the hold
ChkExitDone:


; C h k S u b S t a t e

; What cook state are we in now?  Holding? already in EOC?

ChkSubState:
        LDAA    _SubState,X     ;Get the current hold step (Holding? EoC?)

        CMPA    #sbHoldStep.    ;Are we in still in "Holding" step?
        BEQ     StillHolding

        JMP     AlreadyHoldEoc  ;Else already in Eoc -- go right to it...


; ------ S t i l l H o l d i n g ------
;
; Calculate hold time remaining;  (check for Alarms)
;  check for new End-of-cycle (0:00 remaining)

StillHolding:                   ;[X] still points to State Variables

; Calculate the time remaining now

        JSR     CalcHoldRem     ;Calc time remaining, save in RemHHMMSS
                                ;([X] still points to StateVars on return)


; Did we just reach the end-of-cycle?  (Time remaining = 00:00:00?)

ChkHoldEoc:                     ;([X] already points to StateVars)

        LDAA    _RemHH,X        ;If any of remaining Hours, Minutes,
        ORAA    _RemMM,X        ; or Seconds is <> 00...
        ORAA    _RemSS,X
        BNE     ChkEocDone      ;  ...then we're not at End-of-Cycle yet

        StartHoldEoc            ;Else if we DO hit 0:00 remaining,
                                ; time to move on to EOC step

        BRA     DoHoldDone      ; (that's all for now...)

ChkEocDone:

;..........................................................................
;
; (Hold currently has no alarms)
;
;; NOT EOC... Do we need to signal a new alarm?
;
;       ChkCookAlm              ;See if we need to signal a new alarm
;                               ; ([X] still points to StateVarsS on return)
;..........................................................................



;..........................................................................
;
; (Hold currently only has a single stage)
;
; Also, is it time to move on to the next cook stage?
;
;ChkNextStage:
;
;..........................................................................


        BRA     DoHoldDone


; ------ A l r e a d y H o l d E o c -------
;
; Already in Hold End-of-Cycle...  Time to return to Preheat?

AlreadyHoldEoc:                 ;[X] still points to State Variables

        LDAA    _AlmEocCode,X   ;Get the Alarm/Eoc code.  Was set to $FF when
                                ; Eoc started.  If now = 0, application is
        BEQ     LeaveHold       ; indicating Eoc was acknowledged or was
                                ; automatically cancelled after specified
                                ; time delay -- exit cook cycle.

        BRA     DoHoldDone      ;Else still doing EOC -- simply exit


; ------ L e a v e   H o l d ------

        ExitHold

;opt    BRA     DoHoldDone


DoHoldDone:

        RTS



;****************************************************************************
;****************************************************************************
;
; U S E R - I O   R O U T I N E S :
;
;  The routines below are called in Run mode to handle display updating
;  and key input processing when no higher-priority task needs the displays.
;  For example, if we are in Program mode then the Program routines take over
;  the displays and key inputs, and the routines here ARE NOT called.
;
;
;****************************************************************************
;****************************************************************************



;----------------------------------------------------------------------------
;
;       D i s p l a y   U p d a t i n g   R o u t i n e s
;
;----------------------------------------------------------------------------



;----------------------------------------------------------------------------
; S h o w H o l d E o c   (Show Hold Eoc) Macro
;
;  The Eoc message for the current hold cycle is displayed, and the buzzer
;  is beeped in synchronization with the display digits.
;
;  Input:  [X] points to State Variables
;
;  Outputs: LDigits, RDigits, ModeLeds.HoldLed


;
;  Routines Called:
;  Exit State:          [A],[B],[X],CCR  -  Indeterminate
;
;
;
;----------------------------------------------------------------------------

ShowHoldEoc:
        .macro

; On entry here, [X] points to the State Variables


; "Beep-Beeeep-Pause" type of end-of-cycle for Hold...


; 1111 1110 1101 1100 1011 1010 1001 1000
;  *    *              *    *    *    *
;
; 0111 0110 0101 0100 0011 0010 0001 0000
;

        LDAA    BlnTmr          ;Get the Blink Timer Byte
        BITA    #00001000b
        BEQ     BlankEoc        ;Blank whenever b4 is 0 (ie 0xxx)
        ANDA    #00000110b
        CMPA    #00000100b
        BEQ     BlankEoc        ;Blank whenever b2 & b1 are "10" (ie x10x)


; Remdown (00:00) in left display, EOC message in right

ShowEocMsg:

        LDAA    #$FF            ;Request the buzzer ON whenever
        STAA    SpkrReq         ; we are in the "blink ON" phase of message

; Blink the Product led ON and OFF with the EOC message

        LDAB    _ProdNbr,X      ;Get the currently selected product number
        JSR     GetProdLed      ;( --> This destroys the pointer in [X])
        STD     ProdLedsS


; Now update the 7-segment displays
;   " 0:00" in left side displays.
;   Alternate "Hold" / "End" in right side displays.

        LDD     #0000           ;Get the current time remaining
        LDX     #LDigits        ;Display it in the left-hand digits
        SEC                     ;We DO want the colons ON
        JSR     DisplayTime     ;(This has destroyed the [X] register)


        LDAA    BlnTmr          ;Alternate "Hold", "End" display in Right...

        LDAB    #msgHold.
        BITA    #$10            ;Check 1/2 Hz bit (= 1 for 1 sec, 0 for 1 sec)
        BNE     EocRDigits
```

```
        LDX     #RDigits
        JSR     ShowMsg

        BRA     EocDispDone

; Blink OFF phase of eoc display

BlankEoc:
        LDD     #0000           ;Blink the selected product led ON and OFF
        STD     ProdLeds$       ; in synch with the Eoc message

        LDAB    #msgBlanks.     ;Blank the displays
        LDX     #LDigits
        JSR     ShowMsg

        LDAB    #msgBlanks.
        LDX     #RDigits
        JSR     ShowMsg

;opt    BRA     EocDispDone

EocDispDone:

;(On exit here, [X] DOES NOT still point to the StateVars record!)

        .endm


;-------------------------------------------------------------------------------
;  D o H o l d D i s p l a y  (Do Hold Display) Subroutine
;
;  This takes care of updating the display information during the Hold State,
;  including "HdHoldStep", and "HdEocStep" steps.
;
;  Input:  StateVarsPtr$-- Points to start of State Variables record
;
;  Output: LDigits, RDigits
;          ModeLeds: CookLed, HoldLed.
;
;  Routines Called:
;  Exit State:           [A],[B],[X],CCR  -  indeterminate
;
;
;
;-------------                       -.------    -------------------------------

DoHoldDisplay:

; (Pointer to currently-selected state variables passed in StateVarsPtr$)


; Note: (Alarms) and Eoc are monitored and triggered in the state routines,
; as indicated by the status of _AlmEocCode.
;




; This routine is merely responsible for handling normal display updating
; according to the current status of AlmEocCode.


; Update the display information and process any input:
;
;   If End-of-Cycle:
;      then do special EOC display
;
;   (Else If Alarm currently active:               (*) alarms currently not
;      then do special Alarm display)                  implemented during Hold...
;
;   Else update display to indicate cook time remaining, temperature
;


; Make sure the "Hold" led is ON and Cook Leds is OFF

        LDAA    ModeLeds
        ANDA    #~CookLed.
        ORAA    #HoldLed.
        STAA    ModeLeds


; Determine if we are in Eoc.  If so, special display & key handling

        LDX     StateVarsPtr$   ;Get pointer to current State Variables

        LDAA    _SubState,X     ;Get current step of cook cycle
        CMPA    #HdEocStep.     ;Are we in Hold End-of-Cycle?
        BEQ     DispEoc         ; If so, do special Eoc Code...

;;;     LDAB    _AlmEocCode,X   ;Else do we have any alarm in progress?
;;;     BNE     DispAlm         ; If so, do special Alarm display...

        JMP     DispNormal



; -----  A l m  -----
;                               ;(StateVars pointer still in [X]...)
;DispAlm:                       ;(AlmCode still in [B]...)
;
;       ShowHoldAlm             ;Pass alarm code in [B].  Show alarm message.
;
;       JMP     HoldDispDone
;



; -----  E o c  ------

DispEoc:                        ;(StateVars pointer still in [X]...)

        ShowHoldEoc             ;Show HoldEoc message.

        JMP     HoldDispDone
```

```
DispNormal:

; Due to load compensation, the cook clock may actually use longer or shorter
; "seconds", to speed up or slow down the clock.  The Load-Compensated
; 1/100s seconds reload value is available in _LCAdj100.  This value will
; be < 99 when overtemp and clock is running fast, or will be > 99 when
; undertemp and clock is running slow.  (Should be 99 exactly when no
; load compensation is specified, or when right on the setpoint temp).
;
; We'll use the LCAdj100 value as the reference of what a "second" is, so
; that our product led and colon leds blink relative to load-compensated
; "seconds".  This will cause them to blink faster when the clock is running
; fast, and blink slower when the clock is running slow.
;
; (All of this is handled in the ShowTimeAndTmp display routine)


SetProdLed:
        LDX     StateVarsPtr$   ;Get pointer to state variables

        LDAB    _ProdNbr,X      ;Get the currently selected product number
        JSR     GetProdLed      ;Get corresponding product led mask
                                ; ( --> This destroys the pointer in [X])

        STD     ProdLeds$       ;Light just the selected product's led


; See if either door is open.  If so, override the displays with "door open"

        LDAA    CtrlDoorOpen
        ORAA    CustDoorOpen
        BEQ     TimeTmpDisplay


;D o o r O p e n D i s p l a y

DoorOpenDisplay:

        JSR     DisplayDoorOpen ;If either door open, show "door" "open"

        JMP     HoldDispDone


;T i m e T m p D i s p l a y
;
; The normal display, if no alarm or eoc, and the doors are closed,
; is to display the time remaining in the left digits, temperature in
; the right digits.

TimeTmpDisplay:


; Call the standard "remaining time" display routine defined in Cook routines.
; Display of HH:MM or MM:SS depends on how much time remains.

        LDX     StateVarsPtr$   ;Get pointer to the state variables again




        JSR     ShowRemTime     ;(This routine defined in 3xCook.ASM file)


; Display the actual air temperature in the right digits

        LDD     AirTmpF$        ;Now display current temperature in right side
        LDX     #RDigits
        JSR     DisplayTmp


;opt    BRA     HoldDispDone



HoldDispDone:

        RTS



;===============================================================================
;
;      K e y   I n p u t   P r o c e s s i n g   R o u t i n e s
;
;===============================================================================



;-------------------------------------------------------------------------------
;  A c k H o l d E o c  (Acknowledge Hold End-of-Cycle)  Macro
;
;  This routine simply acknowledges the Hold End-of-Cycle alarm by clearing
;  the AlmEocCode to 0.  In effect, this causes a transition out of Hold
;  back to the Preheat (standby) state.
;
;  All state transitions are performed by the State Routines.  When the
;  State Routine detects the End of Cycle condition, it sets SubState =
;  "HdEocStep"  and sets the AlmEocCode = $FF.  When the State Routine sees
;  that we are on the "Hold Eoc" step and that the AlmEocCode has been cleared
;  to 0 (by this user-i/o routine), it knows that the Eoc condition has been
;  acknowledged, and it immediately transitions to the appropriate next state.
;
;  Input:  [X] -- points to State Variables
;
;  Output: _AlmEocCode -- cleard to 0
;
;  Routines Called:
;  Exit State:           [A],[B],[X],CCR  -  indeterminate
;
;  Create Date:          21 Sept 92
;  Revision Record:      A - 21 Sept 92 - Original
;-------------------------------------------------------------------------------

AckHoldEoc:
        .macro

; Inform the State Routine that the user has acknowledged Eoc by clearing
; the AlmEocCode, which the State Routine set to $FF when it recognized the
```

```
        CLR     _AlmEocMode,X   ;All transitions are performed by State Rtns.

        .endm


;-----------------------------------------------------------------------------
; H a n d l e E o c K e y s   (Handle End-of-cycle Key input)  macro
;
;  This macro handles key input while a cook End-of-cycle is currently active.
;
;  Input:   [A] -- new key from the key buffer
;           [X] -- pointer to state variables record
;
;  Output:
;
;  Routines Called:
;  Exit State:          [A],[B],[X],CCR  -  indeterminate
;
;
;
;--------------------------------          ----------------------------------

HandleEocKeys:
        .macro

; On entry here, [X] points to the state variables record,
; and [A] holds the key code just removed from the key buffer.


; Only the Start/Stop key (ie this product's number key) is valid at this point

;>>>.........................................................................
        .iftrue StStpKeyAvail.

        CMPA    #KeyStStp.      ;Is it the Start/Stop key?
        BNE     EocInvKey

        .else

        CMPA    _ProdNbr,X      ;Is it the number key matching this product?
        BNE     EocInvKey

        .endif
;>>>.........................................................................


; Eoc has been acknowledged -- inform State Routine to move us on to the
; next state: Prehest

        AckHoldEoc              ;Go to Hold (or back to preheat, if no hold)

        BRA     EocKeyDone


; If not StartStop during eoc, key is invalid

EocInvKey:
        JSR     BadKeySound     ; ==> sound the "invalid" beep

;EOC    BRA     EocKeyDone


EocKeyDone:


        .endm


;-----------------------------------------------------------------------------
; H a n d l e R e g H o l d K e y s   (Handle Regular Hold Key input)  Macro
;
;  This macro handles key input for normal hold operation, ie when (no alarm
;  or) Eoc is currently active
;
;  Input:   [X] -- points to current StateVars
;
;  Output: None
;
;  Routines Called:
;  Exit State:          [A],[B],[X],CCR  -  indeterminate
;
;
;
;--     --------------- . . ----------------------------------------------------

HandleRegHoldKeys:
        .macro

; On entry here, [X] points to current State Variables,
; and [A] holds the key code of the key just retrieved from the key buffer.


ChkStStpKey:
;>>>.........................................................................
        .iftrue StStpKeyAvail.

        CMPA    #KeyStStp.      ;"Start/Stop" key?
        BNE     ChkSetKey

        .else

        CMPA    _ProdNbr,X      ;"Start/Stop" key? (ie this prod's nbr key?)
        BNE     ChkSetKey

        .endif
;>>>.........................................................................

        LDAA    #$FF            ;Need to hold StartStop for 1 second to
        STAA    _StStpPending,X ; cancel the cook cycle.  Set flag to indicate
        CLR     _StStpClk,X     ; this cancel operation is pending, and reset
                                ; the clock that times how long key is held.

        BRA     RegKeyDone

        LDAA    #1              ;Need to hold "Set" for a few seconds to
        STAA    PrgPending      ; activate program mode.  Set flag to "1" to
        CLR     PrgPendClk      ; initiate a "Press & Hold SET Key" operation.
                                ; (Mainline "DoPrgPending" code takes over...)

        BRA     RegKeyDone


; If not StartStop, not Set, must be invalid

RegInvKey:
        JSR     BadKeySound     ; ==> sound the "invalid" beep

;HOT    BRA     RegKeyDone


RegKeyDone:

        .endm


;-----------------------------------------------------------------------------
; D o H o l d K e y s   (Do Cook Key handling) Subroutine
;
;  This takes care of handinling key inputs during the Cook state.
;
;  Input:   StateVarsPtrS -- Points to start of State Variables record
;
;  Output:
;
;  Routines Called:
;  Exit State:          [A],[B],[X],CCR  -  indeterminate
;
;
;
;-------------------------------------  -------------------------------------

DoHoldKeys:

; (Pointer to currently-selected state variables passed in StateVarsPtrS)


; Note: (Alarms and) Eoc are monitored and triggered in the state routines.
; This routine is merely responsible for handling normal display updating
; and switch processing while in cook mode.


; Process key input:
;
;   If End-of-Cycle:
;      then only Start/Stop is valid key
;
;  ( Else If Alarm currently active:
;      then only Start/Stop is valid key )
;
;   Else process key inputs normally (StStp, Set)
;


; First of all, see if there are any new keys there...

        JSR     GetKey          ;Any keys there?
        BNE     GotAKey
        JMP     HoldKeysDone    ; If not, simply exit now...


; Okay, we got a new key (in [A]):
;
; Determine if we are in Eoc.  If so, special display & key handling

GotAKey:                        ;Key is already in [A] right now!

        LDX     StateVarsPtrS   ;Get pointer to current State Variables

        LDAB    _SubState,X     ;Get current step of cook cycle
        CMPB    #HdEocStep.     ;Are we in Hold End-of-Cycle?
        BEQ     EocKeys         ; If so, do special Eoc handling...

;(No alarms implemented for Hold mode)

        BRA     NrmlKeys

;............................................................................
;
;       LDAB    _AlmEocCode,X   ;Else do we have any alarm in progress?
;       BEQ     NrmlKeys        ; If no alarm/eoc, do normal key handling
;                               ; Else do Alarm handling...
;
;
;; ----- A l m -----
;                               ;(StateVars pointer still in [X]...)
;AlmKeys:                       ;(AlmCode still in [B]...)
;       CLR     _StStpPending,X
;
;       HandleAlmKeys           ;StStp to acknowledge Alarm
;
;       JMP     HoldKeysDone
;...................................................


; ----- E o C -----

EocKeys:                        ;(StateVars pointer still in [X]...)
        CLR     _StStpPending,X
        CLR     _StStpClk,X

        HandleEocKeys           ;StStp to acknowledge EOC

        JMP     HoldKeysDone


; ----- N o r m a l -----      ;(StateVars pointer still in [X]...)

NrmlKeys:
```

```
HoldKeysDone:

        .RTS



;---------------------------------------------------------------------------
; C a n c e l H o l d C y c l e (Cancel Hold Cycle)  Macro
;
; This routine is called when the user wants to Cancel the current hold
; cycle.  We merely set the "Exit Flag" to inform the State Routines that
; we want to exit (cancel) cook.
;
; All state transitions are performed by the State Routines.
; In the case of exiting from Hold, however, there is only one place we
; can go -- to the "Preheat" (standby) state.
;
; Input:  [X] -- points to State Variables for THIS side
;
; Output: ExitFlag set to #$FF
;         1/2-second buzzer pulse started
;
; Routines Called:
; Exit State:          [X] -- unchanged
;                      [A],[B],CCR -- indeterminate
;
;
;
;---------------------------------------------------------------------------

CancelHoldCycle:
        .macro

; On entry here, [X] points to the State Variables record..

        PSHX                    ; ++[Save a copy of the state vars pointer]

; Inform the State routines that we want to exit the hold cycle.

        LDAA    #$FF            ;Set the "Exit" flag -- all state transitions
        STAA    _ExitFlag,X     ; are performed by the State routines...

; Sound a 1/2 second beep to indicate the transition

        LDX     #$FFFF          ;Sound a 1/2-second beep as we cancel cook
        LDAB    #8              ;(8/16 = 1/2 second)
        JSR     StartBzr        ;(destroys [X] register)


        PULX                    ; --[Restore the state vars pointer on exit]




        .endm


;---------------------------------------------------------------------------
; D o H o l d S t S t p P e n d i n g  (Do Hold StartStop Pending) Subrtn
;
; This routine handles the "StartStop Pending" activity for Hold mode.
;
; This routine is called from the Main loop ONLY if the _StStpPending
; flag for the state variables record is currently true.  This flag is set
; to "true", and corresp clock is reset to 0 -- by the DoHoldKeys routine
; above whenever the Number key matching the currently selected product is
; pressed.
;
; The only function of the StartStop key in Cook mode (unless and alarm or
; CDC is sounding) is to cancel the sear or cook cycle when the StStp key
; has been held for 1 second.  The code above sets the "pending" flag true
; when the StStp key is first pressed, and this code monitors the key to see
; if the user is still holding the key for the required time.
;
;
; Input:  KeyStat -- current bit status of key inputs
;         StateVarsPtrS -- points to state variables for current side
;
; Output:
;
; Routines Called:
; Exit State:          [A],[B],[X],CCR  -  indeterminate
;
;
;
;---------------------------------------------------------------------------

DoHoldStStpPending:

; S t S t p P e n d i n g
;
; Do we have a "pending" Start/Stop press & hold to take care of?
; (Yes we do, or the DoHoldKeys would not have called this routine)
;

; Is the user still holding the StStp key?

ChkReleased:
;>>>.........................................................................
        .iftrue StStpKeyAvail.

        LDAB    #KeyStStp.      ;Need to see if Start/Stop key
        JSR     ChkKeyPressed   ;  is still being held down...
        BNE     KeyStillHeld    ;If still held down, see how long its been held

        .else

        LDAB    _ProdNbr,X      ;Need to see if key matching current product
        JSR     ChkKeyPressed   ; number is still being held down...
        BNE     KeyStillHeld    ;If still held down, see how long its been held

        .endif
;>>>.........................................................................

        LDX     StateVarsPtrS   ;Else user has released StStp in < 1 second:
        CLR     _StStpPending,X ; Reset the "StStp Pending" flag
                                ;  -- he gave up too soon
        BRA     StStpPendDone


; If StStp is held for X seconds, we need to cancel the current hold cycle

KeyStillHeld:
        LDX     StateVarsPtrS   ;Get pointer to current state variables

        LDAA    _StStpClk,X     ;Has the user held the key for X seconds yet?
        CMPA    #16
        BLO     StStpPendDone   ;(if not X seconds, we need to keep waiting)

; StStp Pending Timer has hit X seconds:

CnclHold:
        CLR     _StStpPending,X ; Now that we know what to do, reset the
                                ; "StStp Pending" flag (we're handling it now)

                                ; Cancel Hold cycle
        CancelHoldCycle         ; (to tell State Routine we want to cancel --
                                ;  State Routine will decide where we go next)

;opt    BRA     StStpPendDone


StStpPendDone:


        RTS



        .end ;(of file)
```

According to another feature of this embodiment, a SPECIAL PROGRAM mode is used to set parameters that are not changed very often, and are more system-oriented than the PRODUCT parameters. SPECIAL PROGRAM mode is entered by pressing and holding the PROGRAM switch for a predetermined period of time until the displays show "SPCL" "Prog". The top display then shows "Code", indicating that the control is waiting for the user to enter the access code. The behavior if the code is not entered, or is entered incorrectly, is the same as that described in the PROGRAM MODE section above.

On entry to SPECIAL PROGRAM mode, the PROGRAM mode message ("Prod Set") will be displayed first. By continuing to hold the PROGRAM key until "SPCL Prog" is displayed SPECIAL PROGRAM mode can be exited at any time by pressing and holding the PROGRAM switch. SPECIAL PROGRAM mode will be exited automatically if no switches are pressed for a predetermined time, for example, one minute. Prior to this latter mentioned predetermined time, for example, at 50 seconds, the control causes the speaker to beep to alert the user that SPECIAL PROGRAM mode is about to be exited. Once SPECIAL PROGRAM mode is entered, the PROGRAM switch is used to step through the parameters that may be set and/or displayed. The top display shows a parameter label, and the bottom display shows the current setting.

SPECIAL PROGRAM mode is used, for example, to set or display the following items:

1. Temperature display/programming units: °F. or °C. The top display shows "deg". The bottom display shows the current setting. Any key may be pressed to toggle the temperature units.
2. Probe calibration. The top display shows "Calib". The bottom display shows the current air temperature. The desired air temperature is entered using the PRODUCT switches. The air temperature can be set +/−15 degrees from nominal to take into account component tolerances, etc.
3. Speaker volume. The top display shows "Loud". The bottom display shows the current setting. The desired volume setting is entered with the PRODUCT keys. The volume can be set from 1 to 10. 1 is minimum volume, 10 is maximum volume. When the PROGRAM key is pressed, the speaker will sound the frequency for three short beeps. If this setting is satisfactory, the PROGRAM switch is pressed to advance to the next item.
4. Speaker frequency. The top display shows "tone", and the bottom display shows the current frequency in Hz. The frequency can be set from 50 to 2000 Hz or some other suitable range. When the PROGRAM key is pressed, the speaker will sound the frequency for three short beeps. If this setting is satisfactory, the PROGRAM switch is pressed to advance to the next item.
5. READY LED range limits. The READY LED range limits are programmed in two steps—the upper limit and the lower limit. The two limits need not be symmetrical about the setpoint. When programming the upper limit, the top display shows "rdy", and the bottom display shows the upper limit in degrees. When programming the lower limit, the top display shows "-rdy", and the bottom display shows "-xx", where "xx" is the lower limit in degrees. The desired limits are entered with the PRODUCT keys. The limits can be set from 0° to 25°, or other suitable values.
6. Usage values. This keeps track of a product usage, by product, in cycles. The top display shows "USED". The bottom display shows the number of times the cycle was cooked since the count was last reset. The PRODUCT keys are pressed to display the usage for the different products. The product LED turns on to show which product is selected. To reset the usage to zero the PRODUCT switch is pressed to select the product, then it is released and pressed again and held until the display flashes, then shows 0.
7. Control ambient temperature, current and maximum. The bottom display shows "CPU", and the top display shows the current control ambient temperature. The maximum ambient temperature recorded by the control can be displayed by pressing and holding the "1" PRODUCT switch. In this case, the top display shows "Hi =", and the bottom display shows the maximum recorded ambient. To reset this maximum, the "1" and "0" PRODUCT keys are pressed and held simultaneously.
8. System initialization. This step is used to initialize a parameter RAM to the product constants stored in the program EPROM. The top display shows "init", and the bottom display shows "sys". Any PRODUCT key may be pressed and held to initialize the RAM. As the switch is held, the displays flash "init in x", where "x" is the number of seconds remaining until initialization. "x" starts at 5 seconds. The speaker sounds during this display. To abort the initialization, the key is released. If the key is held until the system is initialized, then the control does a complete reset after initializing the parameter RAM. After the usual power-up sequence, the displays will show "SYS init" for one second as the speaker sounds.

An example of an excerpt of the software routines used in SPECIAL PROGRAM mode is as follows.

```
-- Special Programming Mode

;----------------------------------------------------------------------------
;
;       K R S P P R O G . S O R
;
;  The routines in this file provide the special programming mode,
;  by which the system parameters like DegC/DegF and alarm duration modes
;  are programmed.  Also, RTD calibration is provided here.
;
;----------------------------------------------------------------------------


        .include B:[illegible].LIB


; External Variables:

;>>>
        .extern page0 ScrollCode, page0 ScrollSrcPtr$, page0 ScrollDigPtr$
        .extern page0 ScrollTmr, page0 ScrollDelay.

        .extern SelPrScrMsg
;>>>

        .extern page0 BlxTmr, Tmr1[illegible]Bit., Tmr[illegible]Bit., Tmr[illegible]Bit., Tmr[illegible]Bit.
        .extern page0 CurKey, page0 KeyHold$$, page0 KeyHoldIdle
        .extern page0 DspTmr

        .extern page0 SpkrReq, page0 SpkrReqVol, page0 SpkrReqTone
        .extern StdTone., StdVol., Tone.Good., Tone.Bad.


        .extern LDigits, RDigits
        .extern LDig1, LDig2, LDig3, LDig4, LDigLeds
        .extern RDig1, RDig2, RDig3, RDig4, RDigLeds
        .extern _Dig1, _Dig2, _Dig3, _Dig4, _DigLeds, ColonLeds.

        .extern ModeLeds, CookLed., HoldLed., SetLed.
        .extern ZCookLed., ZHoldLed., Z[illegible]Led., ZSetLed.

        .extern ProdLeds$

        .extern page0 KeySta$
        .extern KeySet., KeyStStp.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.

        .extern MiscFlags
        .extern IntroMode., ErrMode., BurnInMode.
        .extern SpPrgMode., PrgMode., NeedInitMsg.
        .extern ZIntroMode., ZErrMode., ZBurnInMode.
        .extern ZSpPrgMode., ZPrgMode., ZNeedInitMsg.

        .extern PrgPending, PrgPendClk




        .extern ExitPending, ExitPendClk

        .extern PrgStep, PrgSubStep, PrgChanged

        .extern PrgDegCMode, PrgSpkrVol, PrgSpkrFreq$, PrgRdyLmt

        .extern ItemStep
        .extern ItemType, ItemSrcPtr$, ItemPrDigPtr$, Item[illegible]Ptr$
        .extern ItemDigits, ItemDig1,ItemDig2,ItemDig3,ItemDig4,ItemDigLeds
        .extern ItemZeroBlanking
        .extern ItemMatch1$, ItemMatch2$, ItemLoLmt$, ItemHiLmt$
        .extern ItemMsgSeq$
        .extern ItemListMax


        .extern UncalAirTmpF$, AirTmpF$, CalibTmpF$, PrbCalibOfsF$, MaxCalibF.

        .extern DegCMode, DegSymb

        .extern UserSpecVol, UserSpecFreq$, UserSpecPeriod$

        .extern UsageCounts$, UsageStep, UsageProdNbr

        .extern RdyPlusLmtF, RdyMinusLmtF, MinRdyLmtF., MaxRdyLmtF.

        .extern AlmDuraLmt$

        .extern PrgModePassWd, SpPrgModePassWd, IeTestPassWd

        .extern PassWdStep, PassWdTargetPtr$, PassWdSz.
        .extern PWdInput., PWdInvalid., PWdValid., PWdTimeout., PWdCancel.
        .extern PWdNo., PWdNoGo.

        .extern page0 TempByte, page0 TempWord$, page0 DXSave$
        .extern page0 IndexI, page0 IndexJ, page0 PtrI$, page0 PtrJ$

        .extern ChkSum1$, ChkSum2$, Data1Data2Ofs.

        .extern UserInitCnt$

        .extern RAMInitID

; (from NRCust00.SOR)

        .extern PgmVerID



; From NRItemPr.SOR:

        .extern NumDigType., PcntType.
        .extern TimeType., TmpType., Num4DigType.



; Messages

        .extern MsgProdPrg., MsgSpPrg., MsgIo.
        .extern MsgCalib.

:
        .extern MsgProd.
        .extern MsgInit., MsgSys.
        .extern MsgUsage.
        .extern MsgLoud., MsgTone.
        .extern MsgRdyHi., MsgRdyLo.


; External routines:

        .extern ProgListItem

        .extern DoItemProgram

        .extern DoPassWdEntry, DoPassWdResult

        .extern ShowScrollMsg

        .extern DoAmbientTest   ;(From IeTest module...)

        .extern CalcFreqPeriod

        .extern SetProdLed
        .extern CopyProduct, CalcChk1, CalcChk2
        .extern UpdBacWord, UpdBacByte
        .extern BlockCopyITaJ

        .extern BinToBcd[illegible]Dig, BinToBcd[illegible]Dig, BinToBcd4Dig
        .extern DisplayTmp, DisplayTime
        .extern GetKey, ChkKeyPressed
        .extern BadKeySound, StartSpkr
        .extern ShowMsg, ShowMsgSeq


        .extern PwrUpStart   ;(pwr-on init jump label -- not a subroutine)


; Routines declared here:

        .global DoSpProgModeIo



; Definitions internal to this routine



;----------------------------------------------------------------------------
; U p d S p I n t r o M s g  (Update Special program Intro message)  Macro
;
; A three-stage message is displayed upon entering Special Program mode.
;
; Input:  DspStep
;


; Output: LDig1..LDig4, RDig1..RDig4
;         DigLeds.ColonLeds turned off
;
; Routines Called:
; Exit State:         [A],[B],[X],CCR  -  indeterminate
;
;
;
;----------------------------------------------------------------------------

UpdSpIntroMsg:
        .macro

; The "Entry Msg" is a 3-stage msg: "SPCL Prog", version number, "blanks"


; Do the left side first

        LDAA    DspTmr          ;Get the current display timer value

        LDAB    #MsgSpPrg.
        CMPA    #20             ;26..21: "SPCL"
        BHI     EntryMsgL

        CMPA    #4              ; 20..5: Version Number display
        BHI     VerNbrL

        LDAB    #MsgBlanks.     ;  4..1: blanks

EntryMsgL:
        LDX     #LDigits        ;Display current ID sequence message
        JSR     ShowMsg         ; in the Left side digits

        BRA     EntryLDone

VerNbrL:                        ;Display left-half version nbr in Left digits
        LDD     PgmVerID+0      ;Get first two characters of Pgm Version ID
        STD     LDig1           ; Copy into display digits 1 & 2
        LDD     PgmVerID+2      ;Get the next two characters
        STD     LDig3           ; Copy into display digits 3 & 4
        CLR     LDigLeds

;opt    BRA     EntryLDone

EntryLDone:


; Now do the right side

        LDAA    DspTmr          ;Get the current display timer value

        LDAB    #MsgSpPrg.+1
        CMPA    #20             ;26..21: "Prog"
        BHI     EntryMsgR

        CMPA    #4              ; 20..5: (actual version nbr)
        BHI     VerNbrR

        LDAB    #MsgBlanks.     ;  4..1: blanks
```

```
        JSR     ShowMsg         ; to the Right side digits

        BRA     EntryNDone

VerNbrR:                        ;Display right-half version nbr in Right digits
        LDD     PgmVer1D+4      ;Get next two characters of Pgm Version ID
        STD     RDig1           ; Copy into display digits 1 & 2
        LDD     PgmVer1D+6      ;Get the last two characters
        STD     RDig3           ; Copy into display digits 3 & 4
        CLR     RDigLeds

;opt    BRA     EntryNDone

EntryNDone:

; Keep the Product leds off

        LDD     #0000
        STD     ProdLeds$

; Also, keep the Door/Cook/Hold leds OFF

        LDAA    ModeLeds
        ANDA    #xDrCkHdLed.
        STAA    ModeLeds

        .endm


;------------------------------------------------------------------------
; P r o g D e g U n i t s   (Program Degree Units) Subroutine
;
; This routine takes care of programming the Celsius/Fahrenheit option value.
;
;
; Input:  PrgSubStep -- indicates current "substep" of this programming step
;
; Output: DegCMode, DegSymbol
;
; Routines Called:
; Exit State:           [A],[B],[X],CCR -- indeterminate
;
;
;
;------------------------------------------------------------------------

; Option 0 is "Deg F", option 1 is "Deg C"

DegOptionMsgs:  .byte   MsgDegF., MsgDegC.


MaxDegOption    .equ    1


ProgDegUnits:

; See if we need to initialize for new parameters.
; PrgSubStep = 0  -->  we're just starting with this parameter.

DegChkInit:
        LDAA    PrgSubStep      ;SubStep = 0  -->  Need to initialize
        BNE     DegInitDone     ; (if > 0, already initialized)

        CLRB                    ;Assume Fahrenheit mode (list option #0)
        LDAA    DegCMode        ;If DegCMode = 0, we're right...
        BEQ     GotDegCInit
        INCB                    ; Else make that option #1 -- Celsius

GotDegCInit:
        STAB    PrgDegCMode     ;Save into the utility prog variable

; Set "List Item" parameters

        LDX     #PrgDegCMode    ;Utility variable for programming list item
        STX     ItemSrcPtr$     ;[X] points to program item -- Set Source Ptr

        LDAB    #MaxDegOption.  ;Set the maximum list index
        STAB    ItemListMax

        LDX     #DegOptionMsgs  ;Set a pointer to the list of "option" msgs
        STX     ItemWordPtr$

        LDX     #RDigits        ;We ALWAYS do programming in the
        STX     ItemPrDigPtr$   ; right side display digits

        CLR     PrgChanged      ;Reset the "changed" indicator

        CLR     ItemStep        ;Make sure the item programming routine
                                ; starts out on ITS init step...

        INC     PrgSubStep      ;Init done -- advance to next prg substep

DegInitDone:

; Display the appropriate legend in the left-side digits

        LDAB    #MsgDeg.
        LDX     #LDigits
        JSR     ShowMsg

; Keep the product leds off

        LDD     #0000
        STD     ProdLeds$


; Now call the "Item Programming" routine


; If done with THIS item, move on to the next

DegChkNext:
        LDAA    ItemStep        ;Are we done with the current item?
        CMPA    #99             ; (Is does ItemStep = 99?)
        BNE     DegDone

; Yes -- done with current item!

ChkCModeSave:
        LDAA    PrgChanged      ;Did the previous value get changed?
        BEQ     CModeSaveDone   ; (If no changes, no new value to save...)

        CLRA                    ;Assume Fahrenheit...
        LDAB    #Char.Degrees.  ; ...and the normal degree symbol

        TST     PrgDegCMode     ;Get the selected "Degree Celsius Mode" option
        BEQ     CModeSave       ;If PrgDegCMode = 0, we ARE set to Fahrenheit

        LDAA    #0FF            ;Else change to Celsius mode...
        LDAB    #Char.Celsius.  ; ...and the Celsius degree character
CModeSave:
        STD     DegCMode        ;Save DegCMode ([A]) and DegSymb ([B]) into
        JSR     CalcChk1        ; the primary data area, and calculate a
        STD     ChkSum1$        ; new checksum for the primary data area

        LDX     #DegCMode       ;Now update both variables in the
        JSR     UpdBackWord     ; secondary data area (DegCMode and DegSymb
                                ; may be handled together as a WORD variable)
CModeSaveDone:


; Now move on to the next programming step

        INC     PrgStep         ;Move on to the next programming step
        CLR     PrgSubStep      ;Start out on the "Init" step


;opt    BRA     DegDone


DegDone:


        RTS


;------------------------------------------------------------------------
; P r o g P r b C a l i b   (Program Probe Calibration) Subroutine
;
; This routine takes care of programming the probe calibration.
;
; The probe is calibrated by letting the user modify the displayed


; air temperature value.  The "existing value" of the programmed parameter,
; therefore, is continually updated to reflect the current air temperature.
; The acceptance range limits are also continually updated to reflect a
; plus/minus deviation from the current real-time uncalibrated air
; temperature input.
;
;
; Input:  PrgSubStep -- indicates current "substep" of this programming step
;
; Output: PrbCalibOfs$
;
; Routines Called:
; Exit State:           [A],[B],[X],CCR -- indeterminate
;
;
;
;------------------------------------------------------------------------

ProgPrbCalib:

; See if we need to initialize for new parameters.
; PrgSubStep = 0  -->  we're just starting with this parameter.
;
; NOTE: range limits, etc. are continually updated (below) to track the
; current air temperature input.

PrbChkInit:
        LDAA    PrgSubStep      ;SubStep = 0  -->  Need to initialize
        BNE     PrbInitDone     ; (if > 0, already initialized)

        LDX     #CalibTmpF$     ;Utility variable for programming tmp calib
        STX     ItemSrcPtr$     ;[X] points to program item -- Set Source Ptr

        LDX     #RDigits        ;We ALWAYS do programming in the
        STX     ItemPrDigPtr$   ; right side display digits

        CLR     ItemStep        ;Make sure the item programming routine
                                ; starts out on ITS init step...

        CLR     PrgChanged      ;Reset the "changed" indicator

        INC     PrgSubStep      ;Init done -- advance to next prg substep

PrbInitDone:


; Since the probe calibration is a real-time value, we need to continually
; update the "existing value" variable, and to update the acceptance range
; limits to track the current temperature input.

PrbRealTime:
        LDAB    PrgChanged      ;If user has just entered a new value into
        BNE     PrbRTDone       ; CalibTmpF$, then don't mess with it...  (*)

        LDD     AirTmpF$        ;Else stuff real time air tmp into the
        STD     CalibTmpF$      ; CalibTmpF$ variable (for existing value disp)

        LDD     UncalAirTmpF$   ;Get the current "uncalibrated" temperature
        ADDD    #MaxCalibF.
        STD     ItemHiLmt$      ;Set high limit to "raw tmp + Max calib offset"
```

```
        SUBD    #MaxCalibF.
        STD     ItemLoLmt$
        STD     ItemNotch$$
?CalibDone:

; (*) Note: when user enters a new value, the item programming routine pauses
; briefly to assure the new entry is displayed for a moment.  At that point,
; we must stop putting real-time values into CalibTmpF$ or we'll clobber the
; value that the user just entered there...  Once ItemStep advances to "99",
; we'll use the new value to install a new calibration offset.


; Display the appropriate legend in the left-side digits

        LDAB    #MsgCalib.
        LDX     #LDigits
        JSR     ShowMsg

; Keep the product leds off

        LDD     #0000
        STD     ProdLeds$

; Call the appropriate item programming routine

;>>>
        LDAA    #TmpType.
        STAA    ItemType

        JSR     DoItemProgram
;>>>

; If ItemStep = 99, we are done with this item.  Calculate new offset,
; update data areas, then reset this step so we keep displaying the newly
; calibrated temperature so user can verify proper setting.

PrbChkNext:
        LDAA    ItemStep        ;Are we done with the current item?
        CMPA    #99             ; (is done ItemStep = 99?)
        BNE     PrbCalibDone

; If the PrgChanged flag is now true, user has just now entered a new
; probe calibration setting -- update the actual calibration offset
; variables, and reset this step to allow another entry.
;
; If no new calibration entered, simply move on to the next program step.

ChkNewCalib:

        LDAA    PrgChanged      ;Did the previous value get changed?
        BEQ     NoNewCalib      ; (If no changes, is user done with calib...)

; Need to calculate actual temperature OFFSET by comparing the value the
; user entered to the value we are currently reading (less the current offset)

YesNewCalib:                    ;Calc calib OFFSET from tmp value user entered:

        LDD     CalibTmpF$      ; - Get the tmp value the user just entered
        STD     AirTmpF$        ; - Save as the "new" current temperature (*)

        SUBD    UncalAirTmpF$   ; - Subtract the uncalibrated tmp reading
        STD     PrbCalibOfsF$   ; - Save difference as the new calib offset

        JSR     CalcChk1        ;Calculate new checksum for primary data area
        STD     ChkSum1$        ;Save it into the primary checksum variable

        LDX     #PrbCalibOfsF$  ;Get pointer to the calibration offset variable
        JSR     UpdSecWord      ;Update the same (word) variable in the
                                ; secondary data area (recalc's ChkSum2, etc)

; For the calibration step, STAY on this same step so user has a chance to
;  see the new calibration setting in action.

        CLR     PrgSubStep      ;Go back to Step #0 with the new calib offset,
                                ; so the user has time to verify calibration.
        BRA     PrbCalibDone    ;(Ie stay on this same PrgStep...)

; If ItemStep = 99, but PrgChanged = 0, then user has not entered a new
; calibration value -- he's ready to move on...

NoNewCalib:

        INC     PrgStep         ;Move on to the next programming step

        CLR     PrgSubStep      ;Start out on the "init" step

cont    BRA     PrbCalibDone


PrbCalibDone:

        RTS

;----------------------------------------------------------------------------
; P r o g S p k r V o l   (Program Speaker Volume) Subroutine
;
; This routine takes care of programming the standard speaker volume.
;
; If a new volume value is entered, this routine sounds a brief "sample" of
; the new volume setting and remains on this step, giving the user the
; opportunity to try out different volume settings and then move on to the
; next step when he has found a satisfactory value.
;
;
; Input:  PrgSubStep -- indicates current "substep" of this programming step
;
; Output: UserSpecVol
;
; Routines Called:
; Exit State:       [A],[B],[X],CCR -- indeterminate
;----------------------------------------------------------------------------

ProgSpkrVol:

; See if we need to initialize for new parameters.
; PrgSubStep = 0  -->  we're just starting with this parameter.

VolChkInit:
        LDAA    PrgSubStep      ;SubStep = 0  -->  Need to initialize
        BNE     VolInitDone     ; (If > 0, already initialized)

        LDX     #PrgSpkrVol     ;Utility variable for programming new volume
        STX     ItemSrcPtr$     ;[X] points to program item -- Set Source Ptr

        LDAB    UserSpecVol     ;Copy the CURRENT speaker volume setting
        STAB    PrgSpkrVol      ; into the programming utility variable

        LDD     #10             ;Maximum speaker volume setting is "10"
        STD     ItemHiLmt$
        STD     ItemNotchHi$

        LDD     #1              ;Low limit is 1 -- don't allow an "OFF" setting
        STD     ItemLoLmt$
        STD     ItemNotchLo$

        LDX     #RDigits        ;We ALWAYS do programming in the
        STX     ItemPrDigPtr$   ; right side display digits

                                ;------ NumDig routine uses ItemDigits ------
        LDX     #ItemDig3       ;Only uses 2 display digits for numeric entry
        STX     ItemNumPtr$     ; --> tell it which ones to use via ItemNumPtr$

        LDAA    #Char.Blank.    ;Blank both leading displays
        STAA    ItemDig1        ; - Blank the unused displays
        STAA    ItemDig2
        CLR     ItemDigLeds     ; - no colons or leds

        LDAA    #$FF            ;We DO want leading zero-blanking
        STAA    ItemZeroBlanking


        CLR     ItemStep        ;Make sure the item programming routine
                                ; starts out on ITS init step...

        CLR     PrgChanged      ;Reset the "changed" indicator

        INC     PrgSubStep      ;Init done -- advance to next prg substep

VolInitDone:

; Display the appropriate legend in the left-side digits

        LDAB    #MsgLoud.
        LDX     #LDigits
        JSR     ShowMsg


; Keep the product leds off

        LDD     #0000
        STD     ProdLeds$

; Call the item programming routine

;>>>
        LDAA    #NumDigType.
        STAA    ItemType

        JSR     DoItemProgram
;>>>


; If the PrgChanged flag is now true, user has just now entered a new
; speaker volume setting -- update the actual volume value, sound a short
; sample of the new volume, and reset this step to allow another entry.
;
; (Note: ItemStep will not be 99 yet -- we are currently on the
; "display new value" step.  We are doing it this way simply so we
; can sound the "beep-beep-beep" sample as soon as the new value is
; entered, rather than a fraction of a second later when the "display
; new value" step is over...  We can then immediately return to the
; "existing value" step without waiting for ItemStep to be set to 99.)

ChkNewVol:
        LDAA    PrgChanged      ;Did the previous value get changed?
        BEQ     VolChkNext      ; (If no changes, is user done with vol?...)

; User entered a new volume setting -- sound a brief "sample" of the new
; setting, then remain on this step to let user try again...

YesNewVol:
        LDAB    PrgSpkrVol      ;Get the value just entered by the user
        STAB    UserSpecVol     ;Update "UserSpecVol" in primary data area

        JSR     CalcChk1        ;Update the checksum for the
        STD     ChkSum1$        ; primary data area

        LDX     #UserSpecVol    ;Now get the primary address of the new
        JSR     UpdSecByte      ; volume value, and call the UpdSecWord to
                                ; update data area 2 value and checksum

        LDX     #%1110111001110000
        LDAB    #14             ;Sound a little beep-beep-beep to give
        JSR     StartSnr        ; user a sample of the new volume


        CLR     PrgSubStep      ;Go back to Step #0 with the new volume,
                                ; so the user has a chance to try again

        BRA     ProgVolDone     ;(Ie stay on this same PrgStep...)


; If the user pressed the SET key without entering a new value, we will
; see ItemStep = 99 without seeing PrgChanged set to true -- time to move on

VolChkNext:
```

```
; Yes -- done with current item!

        INC     PrgStep         ;Move on to the next programming step

        CLR     PrgSubStep      ;Start out on the "init" step

;xxt    BRA     ProgVolDone


ProgVolDone:

        RTS

;-----------------------------------------------------------------------------
; P r o g S p k r F r e q  (Program Speaker Frequency) Subroutine
;
; This routine takes care of programming the standard speaker frequency.
;
; If a new frequency value is entered, this routine sounds a brief "sample"
; of the new frequency setting and remains on this step, giving the user the
; opportunity to try out different settings and before moving on to the
; next step (when he has found a satisfactory value).
;
;
; Input:  PrgSubStep -- indicates current "substep" of this programming step
;
; Output: UserSpecFreq$, UserSpecPeriod$
;
; Routines Called:
; Exit State:           [A],[B],[X],CCR -- indeterminate
;
;
;
;-----------------------------------------------------------------------------

ProgSpkrFreq:

; See if we need to initialize for new parameters.
; PrgSubStep = 0  ==>  we're just starting with this parameter.

FreqChkInit:
        LDAA    PrgSubStep      ;SubStep = 0  ==>  Need to initialize
        BNE     FreqInitDone    ; (if > 0, already initialized)

        LDX     #PrgSpkrFreq$   ;Utility variable for programming new frequency
        STX     ItemSrcPtr$     ;[X] points to program item -- Set Source Ptr

        LDAB    UserSpecFreq$   ;Copy the CURRENT speaker frequency setting
        STAB    PrgSpkrFreq$    ; into the programming utility variable

        LDX     #RDigits        ;We ALWAYS do programming in the
        STX     ItemPrDigPtr$   ; right side display digits

        LDD     #2000           ;Maximum speaker frequency setting is 2000 Hz

        STD     ItemHiLmt$
        STD     ItemMatch1$

        LDD     #50             ;Low limit is 50 Hz
        STD     ItemLoLmt$
        STD     ItemMatch2$

        CLR     ItemStep        ;Make sure the item programming routine
                                ; starts out on ITS init step...

        CLR     PrgChanged      ;Reset the "changed" indicator

        INC     PrgSubStep      ;Init done -- advance to next prg substep

FreqInitDone:


; Display the appropriate legend in the left-side digits

        LDAA    #MsgTone.
        LDX     #LDigits
        JSR     ShowMsg

; Keep the product leds off

        LDD     #0000
        STD     ProdLeds$


; Call the appropriate item programming routine

;>>>
        LDAA    #Num4DigType.
        STAA    ItemType

        JSR     DoItemProgram
;<<>


; If the PrgChanged flag is now true, user has just now entered a new
; speaker frequency setting -- update the actual frequency and period values,
; sound a short sample of the new frequency, and reset this step to allow
; another entry.
;
; (Note: ItemStep will not be 99 yet -- we are currently on the
; "display new value" step.  We are doing it this way simply so we
; can sound the "beep-beep-beep" sample as soon as the new value is
; entered, rather than a fraction of a second later when the "display
; new value" step is over...  We can then immediately return to the
; "existing value" step without waiting for ItemStep to be set to 99.)

ChkNewFreq:
        LDAA    PrgChanged      ;Did the previous value get changed?
        BEQ     FreqChkNext     ; (If no changes, is user done with freq?...)

; User entered a new volume setting -- sound a brief "sample" of the new
; setting, then remain on this step to let user try again...

ResNewFreq:

; We need to calculate the corresponding "period" in usec.
;
;   ie UserSpecPeriod$ := 1000000 * ( 1 / UserSpecFreq$ )

;upt    LDD     UserSpecFreq$   ;Get the user programmed frequency value
        JSR     CalcFreqPeriod  ;Calculate corresponding "period" (usec)

        STD     UserSpecPeriod$ ;Save the new period.

        JSR     CalcChk1        ;Update the checksum for the
        STD     ChkSum1$        ; primary data area

        LDD     #UserSpecFreq$  ;Calculate the data area2 address of Freq
        ADDD    #Data1Data2Ofs.

        STD     DDMove$
        LDX     DDMove$         ;[X] now points to data area2 UserSpecFreq$

        LDD     UserSpecFreq$   ;Get the newly entered value
        STD     0,X             ;Copy into the backup data area

        LDX     #UserSpecPeriod$ ;Now get the primary address of the new
        JSR     UpdBackword     ; Period value, and call the UpdBackword to
                                ; update data area 2 value and checksum

        LDX     #1100011000110000b
        LDAB    #14             ;Sound a little beep-beep-beep to give
        JSR     StartBzr        ; user a sample of the new tone


        CLR     PrgSubStep      ;Go back to Step 00 with the new Volume,
                                ; so the user has a chance to try again

        BRA     ProgFreqDone    ;(ie stay on this same PrgStep...)


; If the user pressed the SET key without entering a new value, we will
; see ItemStep = 99 without seeing PrgChanged set to true -- time to move on

FreqChkNext:
        LDAA    ItemStep        ;Are we done with the current item?
        CMPA    #99             ; (ie does ItemStep = 99?)
        BNE     ProgFreqDone

; Yes -- done with current item!

        INC     PrgStep         ;Move on to the next programming step

        CLR     PrgSubStep      ;Start out on the "init" step

;upt    BRA     ProgVolDone


ProgFreqDone:

        RTS


;-----------------------------------------------------------------------------
; I n i t R d y S t u f f  (Initialize Ready limit Stuff) Subroutine
;
; Initialize the ready range item programming acceptance limits.  If
; Celsius mode, convert existing value and limits to Celsius.
;
;
; Input:  [B] -- current RdyPlusLmtF or RdyMinusLmtF setting
;         DegCMode -- <> 0 ==> currently doing Celsius mode.
;
; Output: PrgRdyLmt
;         ItemLoLmt$, ItemHiLmt$, ItemMatch1$, ItemMatch2$
;
; Routines Called:
; Exit State:           [A],[B],[X],CCR -- indeterminate
;
;
;
;-----------------------------------------------------------------------------

InitRdyStuff:

; Current Ready limit (F) setting passed in [B].

        STAB    PrgRdyLmt       ;Save the current (Fahrenheit) setting

; Set the acceptance range limits for item programming.
; We will check for Celsius requirements below.

        LDD     #MaxRdyLmtF.
        STD     ItemHiLmt$
        STD     ItemMatch1$

        LDD     #MinRdyLmtF.
        STD     ItemLoLmt$
        STD     ItemMatch2$

; Are we currently in Celsius mode?  If so, convert value, limits.

        LDAA    DegCMode        ;Celsius mode?
        BEQ     RdyInitDone     ; If not, we're all set

; Convert the "existing value" from Fahrenheit to Celsius

        LDAA    PrgRdyLmt       ;Multiply DeltaF by 5/9 to get DeltaC
        LDAB    #142            ; (5/9*256 = 142.2  ==> 142)
        MUL
        ADCA    #0              ;   (Round up, if necessary)
        STAA    PrgRdyLmt

; Note: we'll only mess with low bytes of 16-bit limit values --
; the STD's above took care of clearing out the high bytes of the limits.

        LDAA    ItemHiLmt$+1
        LDAB    #142            ;Multiply DeltaF by 5/9 to get DeltaC
```

```
        STAA    ItemMatchIS+1

        LDAA    ItemLoLmtS+1
        LDAB    #142            ;Multiply DeltaF by 5/9 to get DeltaC
        MUL
        ADCA    #0              ;   (Round up, if necessary)
        STAA    ItemLoLmtS+1
        STAA    ItemMatchIS+1

RdyInitDone:

        RTS


;-----------------------------------------------------------------------
; P r o g R d y P l u s   (Program Ready limit Plus-side) Subroutine
;
; This routine takes care of programming the ready range plus limit.
;
; This value is an unsigned Fahrenheit temperature offsets.  The Celsius
; equivalent value is simply 5/9 * Fahrenheit value, since this parameter
; is a "delta" temperature value, not an actual temperatures.
;
; This routine takes care of converting the initial F setting to Celsius,
; if necessary, and converting the entered value from Celsius back to F.
; Similarly, the programming limits must be adjusted for Celsius operation.
;
; Input:  PrgSubStep -- indicates current "substep" of this programming step
;         DegCMode -- <> 0 ==> currently doing Celsius mode.
;
; Output: RdyLmtPlus, RdyLmtMinus
;
; Routines Called:
; Exit State:          [A],[B],[X],CCR -- indeterminate
;
;
;
;--   -------------------------------------------------------------------

ProgRdyPlus:

; See if we need to initialize for new parameters.
; PrgSubStep = 0  ==>  we're just starting with this parameter.

RdyPChkInit:
        LDAA    PrgSubStep      ;SubStep = 0  ==>  Need to initialize
        BNE     RdyPInitDone    ; (if > 0, already initialized)

        LDX     #PrgRdyLmt      ;Utility variable for programming new rdy lmt
        STX     ItemSrcPtrS     ;[X] points to program item -- Set Source Ptr

        LDAB    RdyPlusLmtF     ;Get the current ready plus limit setting
        JSR     InitRdyStuff    ;Save current setting, set hi/low limits,
                                ; then convert all to Celsius, if necessary.

; Finish up the other initialization stuff

        LDX     #RDigits        ;We ALWAYS do programming in the
        STX     ItemPrDigPtrS   ; right side display digits

                                ;------ NumDig routine uses ItemDigits ------
        LDX     #ItemDig2       ;Only uses 2 display digits for numeric entry
        STX     ItemAuxPtrS     ; --> tell it which ones to use via ItemAuxPtrS

        LDAA    #Char.Blank.    ; - "blank" for a plus sign in Dig1
        STAA    ItemDig1
        LDAA    DegSymb         ; - current tmp unit symbol in Dig4
        STAA    ItemDig4        ;
        CLR     ItemDigLeds     ; - no colons or leds

        LDAA    #$FF            ;We DO want leading zero-blanking
        STAA    ItemZeroBlanking


        CLR     ItemStep        ;Make sure the item programming routine
                                ; starts out on ITS init step...

        CLR     PrgChanged      ;Reset the "changed" indicator

        INC     PrgSubStep      ;Init done -- advance to next prg substep

RdyPInitDone:

; Display the appropriate legend in the left-side digits

        LDAB    #MsgRdyHi.
        LDX     #LDigits
        JSR     ShowMsg

; Keep the product leds off

        LDD     #0000
        STD     ProdLedsS


; Call the item programming routine

;<<<

RdyPItemPrg:

        LDAA    #NumBigType.
        STAA    ItemType

        JSR     DoItemProgram
;>>>


; If the user is done with item programming, time to move on

RdyPChkNext:
        LDAA    ItemStep        ;Are we done with the current item?
        CMPA    #99             ; (to done ItemStep = 99?)
        BNE     ProgRdyPDone

        BEQ     RdyPSaveDone    ; (If no changes, don't need to save anything)

; User entered a new ready plus limit

        LDAA    PrgRdyLmt       ;Get the value the user just entered

        TST     DegCMode        ;If not in Celsius mode, ready to save new lmt
        BEQ     RdyPSave
                                ;Else multiply DeltaC by 9/5 to get DeltaF
        LDAB    #205            ; Method: DeltaF = 9/5 * DeltaC
        MUL                     ;              = 4/5*DeltaC + 5/5*DeltaC
        ADCA    PrgRdyLmt       ;(4/5*256 = 204.8  ==> 205)
                                ;(Note: "ADCA" gets round-up from multiply)

RdyPSave:
        STAA    RdyPlusLmtF     ;Save the new Fahrenheit ready plus limit

        JSR     CalcChk1        ;Update the checksum for the
        STD     ChkSum1S        ; primary data area

        LDX     #RdyPlusLmtF
        JSR     UpdSecByte      ;Update data area 2 value and checksum

RdyPSaveDone:


; Done with current item!

        INC     PrgStep         ;Move on to the next programming step

        CLR     PrgSubStep      ;Start out on the "init" step


ProgRdyPDone:

        RTS


;-----------------------------------------------------------------------
; P r o g R d y M i n u s   (Program Ready limit Minus-side) Subroutine
;
; This routine takes care of programming the ready range minus limit.
;
; This value is an unsigned Fahrenheit temperature offsets.  The Celsius
; equivalent value is simply 5/9 * Fahrenheit value, since this parameter
; is a "delta" temperature value, not an actual temperatures.
;
; This routine takes care of converting the initial F setting to Celsius,
; if necessary, and converting the entered value from Celsius back to F.
; Similarly, the programming limits must be adjusted for Celsius operation.
;
; Input:  PrgSubStep -- indicates current "substep" of this programming step
;         DegCMode -- <> 0 ==> currently doing Celsius mode.
;
; Output: RdyLmtMinus
;
; Routines Called:
; Exit State:          [A],[B],[X],CCR -- indeterminate
;
; r
;
;-----------------------------------------------------------------------

ProgRdyMinus:

; See if we need to initialize for new parameters.
; PrgSubStep = 0  ==>  we're just starting with this parameter.

RdyMChkInit:
        LDAA    PrgSubStep      ;SubStep = 0  ==>  Need to initialize
        BNE     RdyMInitDone    ; (if > 0, already initialized)

        LDX     #PrgRdyLmt      ;Utility variable for programming new rdy lmt
        STX     ItemSrcPtrS     ;[X] points to program item -- Set Source Ptr

        LDAB    RdyMinusLmtF    ;Get the current ready plus limit setting
        JSR     InitRdyStuff    ;Save current setting, set hi/low limits,
                                ; then convert all to Celsius, if necessary.

; Finish up the other initialization stuff

        LDX     #RDigits        ;We ALWAYS do programming in the
        STX     ItemPrDigPtrS   ; right side display digits

                                ;------ NumDig routine uses ItemDigits ------
        LDX     #ItemDig2       ;Only uses 2 display digits for numeric entry
        STX     ItemAuxPtrS     ; --> tell it which ones to use via ItemAuxPtrS

        LDAA    #Char.Minus.    ; - "minus" for sign in Dig1
        STAA    ItemDig1
        LDAA    DegSymb         ; - current tmp unit symbol in Dig4
        STAA    ItemDig4        ;
        CLR     ItemDigLeds     ; - no colons or leds

        LDAA    #$FF            ;We DO want leading zero-blanking
        STAA    ItemZeroBlanking


        CLR     ItemStep        ;Make sure the item programming routine
                                ; starts out on ITS init step...

        CLR     PrgChanged      ;Reset the "changed" indicator

        INC     PrgSubStep      ;Init done -- advance to next prg substep

RdyMInitDone:

; Display the appropriate legend in the left-side digits

        LDAB    #MsgRdyLo.
        LDX     #LDigits
        JSR     ShowMsg

; Keep the product leds off
```

```
; Call the item programming routine

;>>>

RdyMItemPrg:

        LDAA    #RunMDigType.
        STAA    ItemType

        JSR     DoItemProgram
;>>>

; If the user is done with item programming, time to move on

RdyMChkNext:
        LDAA    ItemStep        ;Are we done with the current item?
        CMPA    #99             ; (is does ItemStep = 99?)
        BNE     ProgRdyMDone

ChkUnchRdyM:
        LDAA    PrgChanged      ;Did the previous value get changed?
        BEQ     RdyMSaveDone    ; (If no changes, don't need to save anything)

; User entered a new ready plus limit

        LDAA    PrgRdyLmt       ;Get the value the user just entered

        TST     DegCMode        ;If not in Celsius mode, ready to save new lmt
        BEQ     RdyMSave
                                ;Else multiply DeltaC by 9/5 to get DeltaF
        LDAB    #205            ; Method: DeltaF = 9/5 * DeltaC
        MUL                     ;               = 4/5*DeltaC + 5/5*DeltaC
        ADCA    PrgRdyLmt       ;(4/5*256 = 204.8  --> 205)
                                ;(Note: "ADCA" gets round-up from multiply)

RdyMSave:
        STAA    RdyMinusLmtF    ;Save the new Fahrenheit ready plus limit

        JSR     CalcChk1        ;Update the checksum for the
        STD     ChkSum1S        ; primary data area

        LDX     #RdyMinusLmtF
        JSR     UpdSecByte      ;Update data area 2 value and checksum

RdyMSaveDone:

; Done with current item!

        INC     PrgStep         ;Move on to the next programming step

        CLR     PrgSubStep      ;Start out on the "init" step

ProgRdyMDone:

        RTS

;------------------------------------------------------------------------
; D o S p P r g I n t r o   (Do Special Program Intro)  Subroutine
;
;
;
; Input:
;
; Output:
;
; Routines Called:
; Exit State:           [A],[B],[X],CCR  -  indeterminate
;
;
;
;------------------------------------------------------------------------

DoSpPrgIntro:

; Display "Special Program" intro message: "SPCL" "Prog", Version nbr, blanks

        UpdDspIntroMsg

; We stay in intro mode for at least 1 second.  After 1 second,
; we stay in intro mode until user releases the Set key (go to password step)
; or until Set key has been held for a total of 10 seconds (go to Spcl Prog)

        LDAA    DspTmr          ;Has the DspTmr decremented to 0 yet?
        BNE     DoIntroDone     ; If still counting down (1 sec), stay in intro

; Else done with the introductory message display.  Go on to the "Password"
; step, unless the SpPrgmodePassword has a length of "0", which indicates
; the password is not required.

        LDAB    SpPrgmodePasswd+0 ;Get the number of keys (N) in the sequence
        BEQ     IntroToItemPrg    ;(If no keys, no password...)

        LDAB    MiscFlags
        BITB    #BurnInMode.    ;Else if "burn-in" mode...
        BNE     IntroToItemPrg  ; ...password not required

; Move on to Password step (unless Password is not required)

IntroToPwd:

        CLR     PasswdStep      ;Start out on "init" phase of passwd entry...

        LDX     #SpPrgmodePasswd ;Set the address of the "target" password
        STX     PasswdTargetPtrS

        BRA     DoIntroDone

; Else skip Password (if not required) and move on to Item Programming step

IntroToItemPrg:

        LDAA    #FirstParmStep. ; - advance PrgStep to begin item programming
        STAA    PrgStep
        CLR     PrgSubStep

;opt    BRA     DoIntroDone

DoIntroDone:

        RTS

;------------------------------------------------------------------------
; D o P a s s W d C h e c k  (Do Password Check)  Subroutine
;
; This macro takes care of having the user enter the password, then
; determining if the password is valid or not.  Depending on the
; success of the password entry, this routine may advance PrgStep to
; "ItemPrgStep" (item programming) or to "99" (exit special program).
;
; Note that the "good password", "bad password", etc. responses are included
; as part of this state, as defined in the "DoPasswdResult" routine.
;
; Input:
;
; Output:
;
; Routines Called:
; Exit State:           [A],[B],[X],CCR  -  indeterminate
;
;
;
;------------------------------------------        -----------------------

DoPasswdCheck:

; Keep the Product & Mode leds Off

        LDD     #0000
        STD     ProdLedsS

        CLR     ModeLeds

; If we are still on PrgStep 1 (Password Entry), the current value
; of PasswdStep should (must) be 0 (init),  1 (the entry steps),
; or in the range 2..5 -- the "post entry" result display steps.

        LDAA    PasswdStep      ;Steps 0 (init) & 1 are entry phase
        CMPA    #PwdInput.      ;Steps > 1 are post-entry result displays
        BHI     PwResult

PwEntry:
        JSR     DoPasswdEntry   ;Update displays, enter next key
        BRA     PwDispDone

PwResult:
        JSR     DoPasswdResult  ;Update "result" displays (invalid,timeout,etc)

PwDispDone:

; Now examine PasswdStep to see where we stand: are we done yet?

        LDAA    PasswdStep
        CMPA    #PwdOk.         ;If we got a "Ok"...
        BEQ     GrantAccess     ; ...grant user proper access to programming

        CMPA    #PwdNoGo.       ;Else if we got a "No Go"...
        BEQ     DenyAccess      ; ...deny access to programming

        BRA     DoPwdDone       ;Else still on an Entry step, or Result display

GrantAccess:                    ;Complete, valid password entered:
        LDAA    #FirstParmStep. ; - advance PrgStep to begin item programming
        STAA    PrgStep         ;
        CLR     PrgSubStep

        BRA     DoPwdDone

DenyAccess:                     ;Incomplete or invalid password:
        LDAA    #99             ; - request exit from Special Programming
        STAA    PrgStep

;opt    BRA     DoPwdDone

DoPwdDone:

        RTS

;------------------------------------------------------------------------
; D o U s a g e S t e p  (Do Usage Step)  Subroutine
;
; This routine lets the user view and reset the usage values.
; PrgProdNbr is used as a prod index, to indicate which product is selected.
;
; Input:
;
; Output:
```

```
;
;  '
;
;---  ----------------------------------------------------------------------

;=<UsageStep>

; Did we just enter the usage step?

UsgChkInit:
        LDAA    UsageStep
        BNE     UsgInitDone

        LDAA    #1              ;Start out with 1st product selected
        STAA    UsageProdNbr

        INC     UsageStep       ;"UsageStep" indicates product number 1..10

UsgInitDone:


; UsageProdNbr keeps track of the currently selected product for usage
; UsageStep keeps has two basic phases:
;    #1: "Display only" step
;    #2: "Reset Pending" step
;
; When user first selects product N, UsageStep is set to 1.
;
; If the user presses the N key when N is already selected,
;  then UsageStep is set to 2.
;
; If UsageStep = 2 and key number N is still held down,
;  the displayed count value blinks.  If the key is held down
;  for a certain number of seconds, then usage count N is reset to 0.
;  If key N is released too soon, then UsageStep is set back to 1.

; First of all, if we are currently doing a "usage step 2" (reset pending)
; operation, see if its time to do the reset, or if the key has been
; released and its time to go back to step 1.

UsgPendingReset:
        LDAB    UsageStep       ;Are we doing a Step 2 operation?
        CMPB    #2
        BNE     UsgPndRstDone

        LDAA    CurKey          ;If so, is the user holding (only) key N?
        CMPA    UsageProdNbr
        BEQ     UsgStillHoldingN

        LDAA    #1              ;If not holding "N" any longer...
        STAA    UsageStep       ; ...return to normal Step 1 of this product
        BRA     UsgPndRstDone

UsgStillHoldingN:
        LDAA    KeyHeldSecs     ;Else has he held "N" for 3 seconds yet?
        CMPA    #3
        BLO     UsgPndRstDone



UsgResetCnt:                    ;YES!  Reset the count value; back to step 1.
        LDX     #UsageCounts
        LDAB    UsageProdNbr    ;Get product index
        ABX
        ABX                     ;Add offset to point to current product's total
        CLR     0,X
        CLR     1,X             ;Clear the double-byte count value

        LDAA    #1              ;Go back to usage step #1 (display only)
        STAA    UsageStep

        LDAB    #4              ;Sound a short buzzer tone
        LDX     #$FFFF          ; to indicate we did something
        JSR     StartBzr

UsgPndRstDone:


; Do the normal usage display

        LDAB    UsageProdNbr    ;Get the currently selected product number
        JSR     GetProdLed      ;Get corresponding product led mask
        STD     ProdLeds$       ;Light just the selected product's led

        CLR     ModeLeds

; Display the "Usage" message in the left digits

        LDAB    #MsgUsage.
        LDX     #LDigits
        JSR     ShowMsg

; Display the usage count -- up to 9999 -- in the right side digits
; If we are currently doing a "step 2" (reset pending) operation,
; we need to blink the usage count in the right digits.

        LDAA    UsageStep       ;Are we on step 2?
        CMPA    #2
        BNE     UsgShowCnt      ; If not, do normal count display

        LDAB    BlnTmr          ;Else we ARE on step 2:
        BITB    #TmrHzBit.
        BNE     UsgShowCnt      ; Are we in the ON or OFF blink cycle?


UsgBlankCnt:                    ;In the "blink off" cycle of blinking display
        LDAB    #MsgBlanks.
        LDX     #RDigits
        JSR     ShowMsg

        BRA     UsgRDigitsDone


UsgShowCnt:
        LDAB    UsageProdNbr    ;Get the index of the current product
        LDX     #UsageCounts    ;Get the address of the start of the array
        ABX                     ;Add offset to the current product
        ABX                     ;(add twice -- two bytes per count)

        CPX     #9999
        BLS     UsgBinToBcd     ;If Count <= 9999, we can display it

        LDD     #9999           ;Else if > 9999, show it as 9999

UsgBinToBcd:
        SEC                     ;We DO want zero-blanking
        JSR     BinToBcd4Dig    ;Convert count to 4 displayable digits

        STX     RDig1           ;Save top two digits into RDig1 & RDig2
        STD     RDig3           ;Save bottom two digits into RDig3 & RDig4
        CLR     RDigLeds

;opt    BRA     UsgRDigitsDone

UsgRDigitsDone:



; K e y   I n p u t

        JSR     GetKey
        BEQ     UsgKeyDone

; SET key -- moves on to next I-O Test item

UsgChkSet:
        CMPA    #KeySet.
        BNE     UsgChk1To10
;>>>
;       LDAA    #InitSysStep
;       STAA    PrgStep         ;Advance to the next step of Special Prg...
;>>>

;>>> Go to the ambient temperature display

        LDAA    #AmbientStep.   ;Ambient temperature display step
        STAA    PrgStep
        CLR     PrgSubStep
        CLR     ItemStep        ;Make sure "ItemStep" starts out = 0...

;>>>

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     UsgKeyDone


; NUMBER KEYS 1..10 -- select indicated product.
; If indicate product already selected, set up for pending reset operation.

UsgChk1To10:
        CMPA    #KeyNbr10.      ;Number key 1..10:
        BHI     UsgOtherKey



        CMPA    UsageProdNbr    ;Is it same number as already selected?
        BEQ     UsgSameProd

UsgNewProd:                     ;New number: save indicated key code
        STAA    UsageProdNbr    ; as the new selected product
        LDAA    #1
        STAA    UsageStep       ;Set for UsageStep #1 ("display")
        BRA     UsgKeyDone

UsgSameProd:                    ;If same number as already selected product,
        LDAA    #2              ; we advance to step #2 -- "reset pending"
        STAA    UsageStep
        CLR     BlnTmr          ;Resynchronize the blink timer
        BRA     UsgKeyDone


UsgOtherKey:
        JSR     BadKeySound

UsgKeyDone:


        RTS


;---------------------------------------------------------------------------
; D o S p A m b i e n t S t e p  (Do Special Program Ambient Step) Subroutine
;
; This routine lets the user view the current CPU ambient temperature,
; as well as view and reset the current recorded maximum temperature.
;
; Input:
;
; Output:
;
; Routines Called:      DoAmbientTest (from IoTest module)
; Exit State:           [A],[B],[X],CCR  -  indeterminate
;
;
;  .
;---------  ----------------------------------------------------------------

DoSpAmbientStep:

; Call the ambient temperature display routine (in the IoTest module)

        JSR     DoAmbientTest


; On return from "DoAmbientTest" routine, see if ItemStep = 99 (signals "done")

ChkAmbFinished:
        LDAA    ItemStep        ;If ItemStep has been set to "99"...
        CMPA    #99
        BNE     DoSpAmbDone

AmbGoInit:                      ; ...then quit ambient, advance to "sys init"
        LDAA    #InitSysStep
        STAA    PrgStep
```

```
        RTS

;------------------------------------------------------------------------
; D o I n i t S t e p   (Do Initialize Step)   Subroutine
;
; This routine handles I/O for the "init sys" step of Special Program mode.
; If the user presses and holds ANY NUMBER KEY, the init display message
; begins blinking.  If the user holds the key for 5 seconds, this routine
; performs a TOTAL initialization by clearing the 4-byte RamInitId area and
; then JUMPing to the power-up start vector (like a cold power-up).  This
; forces a complete reinitialize, including assigning default values to all
; programmable parameters, resetting calibration values and passwords, and
; cancelling any cook or hold cycles currently in progress.
;
;
; IF THE INIT IS ACTUALLY PERFORMED, THIS ROUTINE NEVER ACTUALLY RTS'S TO
; THE CALLER -- IT JUMPS DIRECTLY TO THE COLD-START CODE AND DOES A COMPLETE
; INITIALIZE AND POWER-UP.
;
; Input:
;
; Output:
;
; Routines Called:
; Exit State:           [A],[B],[X],CCR  -  indeterminate
;
;
;
;------------------------------------------------------------------------

InitHoldSS.     .equ    5       ;Need to hold number key for 5 seconds
                                ; in order to do the initialize operation.

DoInitStep:

; Keep the Product and Mode leds OFF

        LDD     #0000
        STD     ProdLeds$

        CLR     ModeLeds

; See if the user is now holding a number key (only one key).
; If so, we need to blink the "init" message and show the countdown.
; If the user has held for 5 seconds, we need to do the actual system init.

ChkNbrKeyHeld:
        LDAA    CurKey          ;Check the "current key" variable to see
                                ; what key is currently held down
        CMPA    #KeyNbr1.       ;(note: mult keys held ==> CurKey = 256)
        BLO     NbrNotHeld
        CMPA    #KeyNbr10.      ;If number key 1..10 is held down,

        BHI     NbrNotHeld      ; we're on our way to doing the init...

NbrKeyHeld:
        LDAA    KeyHeldSS       ;If the key has been held for 5 seconds (*)
        CMPA    #InitHoldSS.
        BHS     DoTheInit       ; ...then do the total init step

; Now see if we are in the ON or OFF phase of the blinking countdown display

        LDAA    BlnTmr          ;Else see if we are in the "blink on"
        BITA    #TmrHiBit.      ; or "blink off" step of the display
        BEQ     ShowInitBlanks

; Show blinking "init in 5" (4, 3, 2, 1...) message

ShowInitCountdown:

        LDAB    #MsgInit.       ;Display "init" in the left digits
        LDX     #LDigits
        JSR     ShowMsg

        LDAA    #Char.i.        ;Display "in" in the right-side digits 1 & 2
        LDAB    #Char.n.
        STD     RDig1

        LDAB    #InitHoldSS.    ;Calculate the seconds remaining in countdown
        SUBB    KeyHeldSS       ; [B] := Seconds left

                                ;Now display the countdown seconds
        SEC                     ; (SEC ==> We DO want zero-blanking)
        JSR     BinToBcdDig
        STD     RDig3

        CLR     RDigLeds        ;No Colons on...

        LDAA    #OFF            ; ...we will turn the buzzer on in synch
        STAA    SpkrReq         ; with the "on" phase of the display message

        BRA     InitDispDone

ShowInitBlanks:

        LDAB    #MsgBlanks.     ;("off" phase of blinking countdown sequence)
        LDX     #LDigits
        JSR     ShowMsg

        LDAB    #MsgBlanks.
        LDX     #RDigits
        JSR     ShowMsg

        BRA     InitDispDone


; Perform a complete system reset & init
; ( ---> jumps directly to cold start code...)

DoTheInit:
        LDX     UserInitCntS    ;Tally another user-requested initialize
        INX                     ; (note: no check for rollover here)
        STX     UserInitCntS

        STX     RamInitId+2     ; a total system initialization.
        STX     RamInitId+4

        JMP     PwrUpStart      ;Jump to the cold-start code


; If no number key is currently held down, do normal display ("init" "sys")

NbrNotHeld:

        LDAB    #MsgInit.
        LDX     #LDigits
        JSR     ShowMsg

        LDAB    #MsgSys.
        LDX     #RDigits
        JSR     ShowMsg

;opt    BRA     InitDispDone

InitDispDone:


; Handle key inputs:
; SET key moves us on to next step of Special Programming
; Number keys must be HELD to do anything.

        JSR     GetKey          ;Any new keys in the buffer?
        BEQ     InitKeyDone     ;(If no new keys, nothing to do here)

InitChkSet:
        CMPA    #KeySet.        ;Is it the SET key?
        BNE     InitChkNbr

        LDAA    #FirstParmStep. ; ==> Return to the first program parameter
        STAA    PrgStep         ;
        CLR     PrgSubStep

        LDAA    #OFF            ; Also, start the "Exit Pending" operation
        STAA    ExitPending     ; in case user is trying to exit Program mode.
        CLR     ExitPendClk     ;  (user must Press and Hold to do exit)

        BRA     InitKeyDone

InitChkNbr:
        CMPA    #KeyNbr1.       ;Any number key?  -- make sure no beep-beep
        BLO     InitOtherKey
        CMPA    #KeyNbr10.
        BHI     InitOtherKey

        CLR     BlnTmr

        BRA     InitKeyDone

InitOtherKey:                   ;What other key?  -- invalid
        JSR     BadKeySound

InitKeyDone:


DoInitDone:

        RTS


;------------------------------------------------------------------------
; D o E x i t P e n d i n g   (Do Program Mode Exit Pending)   Macro
;
; This routine handles the "Exit Pending" activity for entry to Program Mode.
;
; This routine is called in the main Special Program I/O loop ONLY if the
; "ExitPending" flag is currently true.  This flag is set to "true",
; and the corresponding clock is reset to 0, by the normal Program Mode
; key-handler routines when the SET key is first pressed.
;
; When already in Program Mode, the SET key is pressed and held for
; X seconds to call up Program Mode.  The individual key handlers will
; set the "Prg Exit Pending" flag to OFF, and reset the ExitPendClk to 0
; when the user presses the SET key.  This routine, then, will monitor the
; "hold" part of the press-and-hold requirement.  If the user is still
; holding the SET key when the ExitPendTmr hits X seconds, then this
; routine will signal a request to exit Program Mode by setting
; PrgStep = 99.
;
; Under certain circumstance, pressing the SET key WILL NOT activate
; the PrgPending flag.  Additionally, some circumstances will actually
; cancel a "ExitPending" already in progress.  These situations are
; generally Cook Alarms, Err's, or error conditions.
;
;
; Input:  KeyStat -- current bit status of key inputs
;         ExitPendClk -- 16-Hz count-up clock; times how long SET key held
; Output:
;
; Routines Called:
; Exit State:           [A],[B],[X],CCR  -  indeterminate
;
;
;
;------------------------------------------------------------------------

DoExitPending:
        .macro


;P r g E x P e n d i n g
```

```
;

; First of all, see if the user is still holding the SET key

ChkReleased:
        LDAB    #KeySet.            ;Need to see if the SET key
        JSR     ChkKeyPressed       ; is still being held down...
        BNE     KeyStillHeld        ;If still held down, see if held X seconds yet

; User has released the SET key -- cancel the "SET key press & hold" operation

KeyReleased:                        ;Else user has released SET in < X seconds:
        CLR     ExitPending         ; Reset the "SET key Pending" flag
                                    ;  -- he gave up too soon
        BRA     ExitPendDone

; If SET is held for >= 3 seconds, we need to exit Program mode.

KeyStillHeld:
        LDAA    ExitPendClk         ;Has the user held the key for 3 seconds yet?
        CMPA    #3*16
        BLO     ExitPendDone        ;(If not, we need to keep waiting...)

; "SET key Pending Timer" has hit 3 seconds Request Special Program mode exit.

        LDAA    #99                 ;Request exit from Program Mode by
        STAA    PrgStep             ; setting the Program Step = 99...

;rpt    BRA     ExitPendDone

ExitPendDone:

        .endm

;--------------------------------------------------------------------------
;  I n i t S p P r g M o d e  (Initialize Special Programming Mode)  Macro
;
;  This routine initializes Special Program mode.
;
;  Input:
;
;  Output:
;
;  Routines Called:
;  Exit State:          [A],[B],[X],CCR  -  Indeterminate
;
;
;
;--  -------------------  ------       -------------------------------------

InitSpPrgMode:
        .macro

; Re-synchronize the blink timer

        CLR     BlnTmr              ;This is a continuous-running countdown timer.
                                    ;(will be all 1's within 1/16th second)

; Make sure the "Program Exit Pending" flag is cleared to start with

        CLR     ExitPending

        .endm

;--------------------------------------------------------------------------
;  E x i t S p P r g M o d e  (Exit Special Programming Mode) Subroutine
;
;  Input:  None
;
;  Output:
;
;  Routines Called:
;  Exit State:          [A],[B],[X],CCR  -  Indeterminate
;
;
;
;--------   --------------------------------------------------------------

ExitSpPrgMode:
        .macro

; Cancel the "Program Exit Pending" flag
; (no longer "pending" -- we're doing it now...)

        CLR     ExitPending

; Cancel any scrolling messages that may be in progress

        CLR     ScrollCode

        .endm

;--------------------------------------------------------------------------
;  D o S p P r o g U s e r I o  (Do Special Program User I/O)  Subroutine
;
;
;  Input:  ProgStep, ProgSubStep
;
;  Output:
;
;  Routines Called:
;  Exit State:          [A],[B],[X],CCR  -  Indeterminate
;
;

DoSpProgUserIo:

; First, see if we need to initialize the Special Programming mode

ChkInit:
        LDAA    PrgStep             ;If PrgStep already > 0,
        BNE     ChkInitDone         ; we don't need to initialize...

        InitSpPrgMode               ;Else we just got here -- initialize...

        INC     PrgStep             ;Now move on to the Introduction step
        LDAA    #16+16+4
        STAA    DspTmr              ;(DspTmr used to time the entry message)

        CLR     ScrollCode

        LDX     #$FFFF              ;Sound a 2 second tone as we
        LDAB    #32                 ; enter Special Programming Mode
        JSR     StartBzr

ChkInitDone:

;>>>

; Keep the Cook/Hold leds off while in Special Program Mode

        LDAA    ModeLeds
        ANDA    #255-CkHdLeds.
        STAA    ModeLeds

;>>>

; M a n u a l   E x i t ?
;
; See if we have an "Exit Pending" operation to monitor:
; (user must press and hold SET key to exit Special Program mode)

ChkSetKeyHeld:
        LDAA    ExitPending         ;Do we have a "pending exit" to monitor?
        BEQ     ChkSetKeyDone       ;(ie user is holding SET key for exit...)

                                    ;If user holds SET key long enough, signal
        DoExitPending               ; exit from Prog Mode by setting PrgStep = 99.
                                    ;If released too soon, reset ExitPending to 0.
ChkSetKeyDone:

; A u t o - E x i t ?
;
; Watch for auto-exit if no key activity for 60 seconds

ChkAutoExit:

        LDAA    CurKey              ;Are there currently "no keys" being held?
        BNE     ChkAutoDone

        LDAB    KeyHeldSS           ;Get the "key held" seconds (0..255 secs)
        CMPB    #60                 ;Have we had "no key" for 60 seconds?
        BLO     ChkBeep

DoAutoExit:
        LDAA    #99                 ;If "no key" for 60 seconds, signal exit
        STAA    PrgStep             ; from program mode by setting PrgStep = 99...

        BRA     ChkAutoDone

ChkBeep:
        CMPB    #52                 ;Else are we close to exit time? (ie >= 52 sec)
        BLO     ChkAutoDone         ; If not, just exit

        BITB    #$01                ;If so, is this an even number? (52,54,56,58)
        BNE     ChkAutoDone
                                    ;YES -- sound a short beep...

DoBeep: LDAB    KeyHeld100          ;Get the 1/100's byte
        CMPB    #5
        BHI     ChkAutoDone         ;If > 5/100's, leave buzzer off

        LDAB    #$FF                ;Else for 0/100 to 5/100's...
        STAB    SpkrReq             ; ...turn the buzzer ON

ChkAutoDone:

; What Programming step are we on?

IntroStep.      .equ    1           ;Introduction (Entry message)
CodeStep.       .equ    2           ;Password "code" entry
DegUnitsStep.   .equ    3           ;Deg F / Deg C mode
PrbCalibStep.   .equ    4           ;Probe calibration
SpkrVolStep.    .equ    5           ;Speaker volume
SpkrFreqStep.   .equ    6           ;Speaker frequency
RdyPlusStep.    .equ    7           ;Ready limit plus side
RdyMinusStep.   .equ    8           ;Ready limit minus side
UsageStep.      .equ    9           ;Usage reporting
AmbientStep.    .equ    10          ;View CPU ambient temperature
InitSysStep.    .equ    11          ;System init option

; 99 = exit Program requested (manual or automatic exit)

FirstParmStep   .equ    3           ;First "parameter" is step #3

; Now execute the appropriate programming step:
```

```
        .word   [illegible]      ; 1  Introduction (Entry message display)
        .word   [illegible]      ; 2  Password check for access
        .word   [illegible]      ; 3  Select Fahrenheit/Celsius mode
        .word   [illegible]      ; 4  Temperature probe calibration
        .word   [illegible]      ; 5  Speaker volume setting
        .word   [illegible]      ; 6  Speaker frequency (tone) setting
        .word   [illegible]      ; 7  Ready limit plus side
        .word   [illegible]      ; 8  Ready limit minus side
        .word   [illegible]      ; 9  Usage reporting
        .word   [illegible]      ; 10  View CPU Ambient Temperature
        .word   [illegible]      ; 11  System init -- hold [illegible] key for total init
                                 ;(99 = program exit requested)


; PrgStep = 99  -->  exit from Programming is requested,
;  due to automatic timeout exit, password failure, or user requested exit.

[illegible]:

        LDAA    PrgStep          ;Get the current step number
        CMPA    #99
        BLO     [illegible]      ; 1 or 2 --> stay in Program mode

; PrgStep = 99  -->  Exit

        [illegible]              ;Finish up -- prepare for [illegible]/Hold

        LDX     #$FFFF           ;Sound a short 1/2-second beep as we exit
        LDAB    #8               ;  8/16 = 1/2 second long
        JSR     [illegible]      ;  Go for it...

        LDAA    MiscFlags        ;Leave Special Prg mode by resetting flag to 0
        ANDA    #[illegible].
        STAA    MiscFlags

[illegible]:



[illegible]:

        RTS


        .END ;(end of file)
```

Other parameter data may be logged as well. These may be accessed in SPECIAL PROGRAM mode or in another convenient way.

For example, the control may log individual variables (e.g. usage statistics, e.g., for individual components, cycles and stages) and overall system items (number of times powered-up, initialized, etc.). An example of a subroutine for logging such parameters in a cooking appliance is as follows.

```
; Our CPU card provides 2 Kbytes of non-volatile external RAM at address
; $4000-$47FF. Variables addressed here require only a double-byte
; "extended" addressing, and for some instructions require more code space
; and execute more slowly.

; Variables wich either require non-volatility, or which simply will not
; fit in the internal RAM, will be declared here. The system stack will
; be declared at the end of this RAM area. Its speed is unaffected by its
; location within the memory map (so stack is not any faster in Page0).

        .ORG    $4000

;===== S Y S T E M   M O N I T O R I N G   V A R I A B L E S =====
;
; These variables, which accumulate Usage and Hours statistics, etc. are
; located at the very beginning of the NOVRAM to assure that they will
; probably remain undisturbed and in the same location even if software
; is upgraded and RAM variables are added or removed.


;----- M A X   R E C O R D E D   A M B I E N T -----

MaxCtrlAmbTemp$ .word           ;Keep track of the maximum control ambient
                                ; temperature observed during operation.


;----- H O U R S   L O G G I N G ------
;
; The following variables accumulate running hours for the various outputs,
; such as the rotor motor, blower motor, etc. These figures may be useful
; for service records, etc., in seeing how many hours a rotor motor actually
; runs, etc.
;
; These timers will be implemented in the timer interrupt code directly,
; and will not require any attention from any higher level routine. The
; lower-order words count 1/16ths of seconds, up to 57,600/16ths (1 hour).
; The higher-order words count hours, up to 65,535 hours.
;
; 65,536 hours = approximately 7-1/2 years continuous running time
;

                                ;--- POWER ON LOG ---
PwrOnLog16$     .word           ;1/16ths seconds (0..57599; 57600 = 1 Hr)
PwrOnLogHr$     .word           ;0..65,535 hours

                                ;--- AIR HEATER LOG ---
AirHtLog16$     .word           ;1/16ths seconds (0..57599; 57600 = 1 Hr)
AirHtLogHr$     .word           ;0..65,535 hours

                                ;--- RADIANT HEATER LOG ---
RadHtLog16$     .word           ;1/16ths seconds (0..57599; 57600 = 1 Hr)
RadHtLogHr$     .word           ;0..65,535 hours

                                ;--- BLOWER MOTOR LOG ---
BlwrLog16$      .word           ;1/16ths seconds (0..57599; 57600 = 1 Hr)
BlwrLogHr$      .word           ;0..65,535 hours

                                ;--- ROTOR MOTOR LOG ---
RotorLog16$     .word           ;1/16ths seconds (0..57599; 57600 = 1 Hr)
RotorLogHr$     .word           ;0..65,535 hours

                                ;--- VENT LOG ---
VentLog16$      .word           ;1/16ths seconds (0..57599; 57600 = 1 Hr)
VentLogHr$      .word           ;0..65,535 hours


; U S A G E :
;
; We keep track of the number of cook cycles completed for each product.

NMaxProd.       .equ    10      ;This better match the "MaxProd." declared
                                ; below with the product array!
                                ;(We can't forward reference here...)

UsageCounts$:   .blkb   2*(NMaxProd.+1) ;Array of double-byte counters
                                        ; for products 0..10 (0 not used)


; C H E S U M   S E L F - C O R R E C T I O N
;
; These variables track how many times the checksum protected data areas
; detect a problem and quietly fix themselves.

PwrOnCnt$:      .word           ;Number of times control powers up or resets

SysInitCnt$:    .word           ;Number of times sytem initialized
                                ;(this includes manual AND automatic inits)

UserInitCnt$:   .word           ;Number of times manually initialized
                                ; (ie the "sys init" in Special Program mode)

Data1FixCnt$:   .word           ;Counts the number of times DataArea1 was
                                ; found corrupted and was self-corrected by
                                ; calling the Copy2To1 routine...

Data2FixCnt$:   .word           ;Counts the number of times DataArea2 was
                                ; found corrupted and was self-corrected by
                                ; calling the Copy1To2 routine...


;----- Ram test indicators -----
; This is the first copy of the "unrestored ram" indicators.
; We MUST guarantee that these "X" indicators are not in the same
; 128-byte test block as the "Y" indicators (RamTstYFlag$/RamTstYPtr$).
; See the "Ram Test Variables" below for details.

RamTstXFlag$:   .word           ;"UR" ==> unrestored data held in RamSave128
RamTstXPtr$:    .word           ;Indicates source address of unrestored data
```

```
;-----------------------------------------------------------------------------
;  L o g H o u r s 1 6 H z  (Log output Hours @ 16 Hz) Macro
;
;  This routine -- called every 16th of a second, examines the current
;  status of the IoByte, and logs the "ON" time of certain outputs, including
;  the Air heat, Radiant heater, Blower motor, and Motor motor.  In addition,
;  a continuous-running "powered on" time is logged (ie total hours unit is
;  powered on.)
;
;  Note on the hours logging clocks:
;  ---------------------------------
;  Each hours-logging clock consists of two, double-byte components.
;  The lower order word counts 1/16ths of seconds, up to 57,600/16ths (1 Hr).
;  The higher order word counts Hours, up to 65,535 hours (approx 7-1/2 yrs).
;
;  Input:   IoByte -- current status of each output (1 = ON, 0 = OFF)
;           PwrOnLog16$, PwrOnLogHr$
;           AirHtLog16$, AirHtLogHr$
;           RadHtLog16$, RadHtLogHr$
;           MotorLog16$, MotorLogHr$
;           BlwrLog16$,  BlwrLogHr$
;           VentLog16$,  VentLogHr$
;
;
;  Output: (log variables listed above)
;
;  Routines Called:     None
;  Exit State:          [A],[B],[X],CCR  -  indeterminate
;
;  '
;
;-----------------------------------------------------------------------------

LogHours16Hz: .macro

; The "PwrOn" log variables keep track of total power-on time.

PwrOnLog:
        LDX     PwrOnLog16$     ;Get the 16 Hz counter
        INX                     ;Add another 1/16th second
        STX     PwrOnLog16$     ;Save the newly incremented value

        CPX     #57600          ;Have we hit 1 hour yet?  (57600 cnts/hr)
        BLO     PwrOnLogDone    ;(57600 = 16 Cnts/Sec * 60 Sec/Min * 60 Min/Hr)

        LDX     #0              ;YES -- Just counted another HOUR of 1/16ths
        STX     PwrOnLog16$     ; --> Reset the 16 Hz count value to 0000

        LDX     PwrOnLogHr$     ; --> Increment the HOURS count value
        INX
        BEQ     PwrOnLogDone    ;(If incr just rolled over to 0000, don't save)
        STX     PwrOnLogHr$     ;     (ie don't count past 65535)
PwrOnLogDone:

; Fetch the current IoByte to see which outputs are currently ON...

        LDAA    IoByte          ;Get the current outputs on/off status byte

; The "AirHt" log variables keep track of actual ON time of the Air Heaters

AirHtLog:
        BITA    #IoAirHt.       ;IoByte value already in [A]:
        BEQ     AirHtLogDone    ; If AirHt is not currently on, don't log time

        LDX     AirHtLog16$     ;Get the 16 Hz counter
        INX                     ;Add another 1/16th second
        STX     AirHtLog16$     ;Save the newly incremented value

        CPX     #57600          ;Have we hit 1 hour yet?  (57600 cnts/hr)
        BLO     AirHtLogDone    ;(57600 = 16 Cnts/Sec * 60 Sec/Min * 60 Min/Hr)

        LDX     #0              ;YES -- Just counted another HOUR of 1/16ths
        STX     AirHtLog16$     ; --> Reset the 16 Hz count value to 0000

        LDX     AirHtLogHr$     ; --> Increment the HOURS count value
        INX
        BEQ     AirHtLogDone    ;(If incr just rolled over to 0000, don't save)
        STX     AirHtLogHr$     ;     (ie don't count past 65535)
AirHtLogDone:

; The "RadHt" log variables keep track of actual ON time of the Radiant Heaters

RadHtLog:
        BITA    #IoRadHt.       ;IoByte value already in [A]:
        BEQ     RadHtLogDone    ; If RadHt is not currently on, don't log time

        LDX     RadHtLog16$     ;Get the 16 Hz counter
        INX                     ;Add another 1/16th second
        STX     RadHtLog16$     ;Save the newly incremented value

        CPX     #57600          ;Have we hit 1 hour yet?  (57600 cnts/hr)
        BLO     RadHtLogDone    ;(57600 = 16 Cnts/Sec * 60 Sec/Min * 60 Min/Hr)

        LDX     #0              ;YES -- Just counted another HOUR of 1/16ths
        STX     RadHtLog16$     ; --> Reset the 16 Hz count value to 0000
        STX     RadHtLogHr$     ;     (ie don't count past 65535)
RadHtLogDone:

; The "Blwr" log variables keep track of actual ON time of the Blower motor

BlwrLog:
        BITA    #IoBlwr.        ;IoByte value already in [A]:
        BEQ     BlwrLogDone     ; If Blower not currently on, don't log time

        LDX     BlwrLog16$      ;Get the 16 Hz counter
        INX                     ;Add another 1/16th second
        STX     BlwrLog16$      ;Save the newly incremented value

        CPX     #57600          ;Have we hit 1 hour yet?  (57600 cnts/hr)
        BLO     BlwrLogDone     ;(57600 = 16 Cnts/Sec * 60 Sec/Min * 60 Min/Hr)

        LDX     #0              ;YES -- Just counted another HOUR of 1/16ths
        STX     BlwrLog16$      ; --> Reset the 16 Hz count value to 0000

        LDX     BlwrLogHr$      ; --> Increment the HOURS count value
        INX
        BEQ     BlwrLogDone     ;(If incr just rolled over to 0000, don't save)
        STX     BlwrLogHr$      ;     (ie don't count past 65535)
BlwrLogDone:

; The "Motor" log variables keep track of actual ON time of the Motor motor

MotorLog:
        BITA    #IoMotor.       ;IoByte value already in [A]:
        BEQ     MotorLogDone    ; If Motor is not currently on, don't log time

        LDX     MotorLog16$     ;Get the 16 Hz counter
        INX                     ;Add another 1/16th second
        STX     MotorLog16$     ;Save the newly incremented value

        CPX     #57600          ;Have we hit 1 hour yet?  (57600 cnts/hr)
        BLO     MotorLogDone    ;(57600 = 16 Cnts/Sec * 60 Sec/Min * 60 Min/Hr)

        LDX     #0              ;YES -- Just counted another HOUR of 1/16ths
        STX     MotorLog16$     ; --> Reset the 16 Hz count value to 0000

        LDX     MotorLogHr$     ; --> Increment the HOURS count value
        INX
        BEQ     MotorLogDone    ;(If incr just rolled over to 0000, don't save)
        STX     MotorLogHr$     ;     (ie don't count past 65535)
MotorLogDone:

; The "Vent" log variables keep track of actual ON time of the Vent output

VentLog:
        BITA    #IoVent.        ;IoByte value already in [A]:
        BEQ     VentLogDone     ; If Blower not currently on, don't log time

        LDX     VentLog16$      ;Get the 16 Hz counter
        INX                     ;Add another 1/16th second
        STX     VentLog16$      ;Save the newly incremented value

        CPX     #57600          ;Have we hit 1 hour yet?  (57600 cnts/hr)
        BLO     VentLogDone     ;(57600 = 16 Cnts/Sec * 60 Sec/Min * 60 Min/Hr)

        LDX     #0              ;YES -- Just counted another HOUR of 1/16ths
        STX     VentLog16$      ; --> Reset the 16 Hz count value to 0000

        LDX     VentLogHr$      ; --> Increment the HOURS count value
        INX
        BEQ     VentLogDone     ;(If incr just rolled over to 0000, don't save)
        STX     VentLogHr$      ;     (ie don't count past 65535)
VentLogDone:

        .endm
```

The control implements several self-tests and error messages. When an error occurs preferably the speaker sounds continuously at the maximum volume. Pressing any key turns the speaker off. The top display shows a standard error code, and the bottom display flashes a description of the error. All process outputs are turned off. The error display continues until the error is cleared. Timers keep running during error conditions. For example, some errors which may occur are:

-continued

| | |
|---|---|
| "Prob Err" | The air temperature probe has opened or shorted. |
| "ctrl hot" | Control ambient temperature limit exceeded. |
| "CPU Chip" | Internal CPU RAM error. |
| "-rA- CHIP" | External RAM error. |
| "-ro- CHIP" | External ROM error. |
| "dAtA Err" | Data corruption error. |
| "too hot" | Software high limit (excessive air temperature). |

An example of excerpts of the software routines relating to ERROR MESSAGES is as follows.

```
                              -- Error Monitoring and Response Routines

;-----------------------------------------------------------------------------
;
;       E R R O R S . S O R
;
;  This file provides the Error Monitoring and Response routines.  These
;  routines check for RTD errors (open/shorted/hi-limit), controller ambient
;  overheating (as indicated by the thermistor), data corruption of the
;  checksum-protected data area, etc.  When errors are detected, the ErrMode
;  flag bit is set, indicating that an error condition exists.  Other routines,
;  like those that take care of heat regulation, etc, should monitor this
;  flag bit to determine when the heat outputs should be disabled.
;
;
;-----------------------------------------------------------------------------

        .include D:KRStd.LIB

; External Variables:

        .extern page0 BlnTmr, page0 BepTmr

        .extern page0 SpkrReq, page0 SpkrReqVol, page0 SpkrReqTone
        .extern Tone.Alert.

        .extern page0 StdRspCode

        .extern ChkSum1$, ChkSum2$

        .extern Data1FixCnt$, Data2FixCnt$

        .extern page0 CurKey

        .extern ErrorStep
        .extern ErrorFlags, ErrorCode
        .extern ErrRom., ErrRam.
        .extern ErrSoftHiLmt., ErrCtlAmb., ErrData., ErrPrbRtd.

        .extern RamErrPtr$

        .extern MiscFlags, ErrMode., xErrMode.

        .extern page0 LDigits
        .extern page0 LDig1, page0 LDig2, page0 LDig3, page0 LDig4
        .extern page0 LDigLeds

        .extern page0 RDigits
        .extern page0 RDig1, page0 RDig2, page0 RDig3, page0 RDig4
        .extern page0 RDigLeds

        .extern StateVarsRec
        .extern _StStpPending

        .extern PrgPending

        .extern PrbAdFltr$
        .extern PrbErrAdFltr$, RtdOpenAd., RtdShortAd.
        .extern ThmstrAdFltr$

        .extern AirTmpF$, SoftHiLmtF.

        .extern CtrlAmbTmpF$, CtrlAmbHiLmt.

        .extern RAMInitIO

        .extern page0 DDMove6

; (From DfMsgs.SOR:)

        .extern MsgBlanks.
        .extern MsgRomErr., MsgRamIntErr., MsgRamExtErr.
        .extern MsgSoftHiLmtErr., MsgCtlAmbErr.
        .extern MsgDataErr., MsgPrbRtdErr.

; External Routines:

        .extern CalcChk1, CalcChk2
        .extern Copy1To2, Copy2To1

        .extern GetKey

        .extern ShowMsg, ShowMsgSeq

        .extern PwrUpStart

; Routines Defined Here:

        .global InitErrors, ChkForErrors

        .global DoErrorWarnInfo

;-----------------------------------------------------------------------------
;  I n i t E r r o r s   (Initialize Errors system)  Subroutine
;
;  Description of macro or subroutine
;
;  Input:  None
;
;  Output: None
;
;  Routines Called:
;  Exit State:          [A],[B],[X],CCR  -  Indeterminate
;
;  .
;
; -------                                     ---------------------------

        STAA    ErrorCode
        STAA    ErrorStep
        STAA    ErrorFlags

        RTS

;-----------------------------------------------------------------------------
;  C h k D a t a E r r o r (Check for Data Error)  Macro
;
;  This routine calculates checksums for each of the data areas and compares
;  the newly calculated checksums with the stored checksums to check the
;  integrity of the data areas.  If both areas are good, no further action is
;  taken.  If one area is good and one area is bad, the good area is copied
;  into the bad area.  If both data areas are bad, an E41 error is generated.
;
;
;  Input:  DataArea1, ChkSum1$
;          DataArea2, ChkSum2$
;
;  Output: ErrorFlags.ErrData.
;          DataArea1, ChkSum1$
;          DataArea2, ChkSum2$
;
;  Routines Called:
;  Exit State:          [A],[B],[X],CCR  -  Indeterminate
;
;
;  .
;-------------                          .     ----------------------

ChkDataError:
        .macro

; Error flags byte passed in [A] -- Save flags byte on the stack.

        PSHA                            ;+[Save flags byte on the stack]

; Calculate checksums & compare to values stored with data

ChkD1:  JSR     CalcChk1                ;Calculate checksum for DataArea1 (ret in [D])
        STD     DDMove6
        LDX     DDMove6                 ;Transfer checksum to [X]

        CLRB                            ;([B] will hold "Bad Data" flags)

        CPX     ChkSum1$                ;Compare [X] to stored checksum
        BEQ     ChkD1Done               ;If checksums don't agree...
        ORAB    #$01                    ; ...set the LSB bit ON
ChkD1Done:

ChkD2:  PSHB                            ;.+[Save the "Bad Data" flags on the stack]

        JSR     CalcChk2                ;Calculate checksum for DataArea2
        STD     DDMove6

        LDX     DDMove6                 ;Transfer checksum to [X]

        PULB                            ;.-[Retrieve the "Bad Data" flags]

        CPX     ChkSum2$                ;Compare [X] to stored checksum
        BEQ     ChkD2Done               ;If checksums don't agree...
        ORAB    #$02                    ; ...set the 2nd lowest bit ON
ChkD2Done:

; Now see what errors we have:

        TSTB                            ;If no bits are ON...
        BEQ     ChkDataDone             ;...then no data errors were detected

        CMPB    #$03                    ;If both bits are ON...
        BEQ     BothBad                 ; ...then both data areas are bad
        CMPB    #$01                    ;Else if only LSB bit ON...
        BEQ     D1Bad                   ; ...then just DataArea1 is bad
        CMPB    #$02                    ;Else if only 2nd lowest bit ON...
        BEQ     D2Bad                   ; ...then just DataArea2 is bad

; Both areas bad -- signal E41

BothBad:
        PULA                            ;-[Retrieve the "Error Flags" byte]
        ORAA    #ErrData.               ;Set the "Data Error" Error bit
        PSHA                            ;+[Save back on the stack]

        BRA     ChkDataDone

; DataArea1 bad -- fix up with data from DataArea2

D1Bad:  JSR     Copy2To1                ;Copy DataArea2 into DataArea1

        LDX     Data1FixCnt$            ;Tally another "self-fix" count
        INX
        STX     Data1FixCnt$            ;(note: no check for rollover here)

        BRA     ChkDataDone

; DataArea2 bad -- fix up with data from DataArea1

D2Bad:  JSR     Copy1To2                ;Copy DataArea1 into DataArea2

        LDX     Data2FixCnt$            ;Tally another "self-fix" count
        INX
        STX     Data2FixCnt$            ;(note: no check for rollover here)

;opt    BRA     ChkDataDone

ChkDataDone:
        PULA                            ;-[Retrieve the "Error Flags" byte]

        .endm

;-----------------------------------------------------------------------------
```

```
;  the ThmstrAdLmt. value.  If ThmstrAdFltrS <= ThmstrAdLmt, the E04 error
;  will be signalled by setting the ErrCtlAmb bit in (A).  This condition
;  signifies that the control area has overheated.
;
;  Input:  (A) -- "Errors" bit flags
;          ThmstrAdFltrS
;
;  Output: (A).ErrCtlAmb -- set to "1" if ThmstrAdFltrS is <= ThmstrAdLmt.
;
;  Routines Called:
;  Exit State:          (A) -- Error flags
;                       (B),(X) -- unchanged
;                       CCR -- indeterminate
;
;
;  ;
;------------------------------------------------------------------------

ChkCtlAmbientError:
        .macro

;>>> OLD METHOD:
; compared a-to-d bit value to limit (higher heat ==> lower a-to-d bits)
;
;       LDX     ThmstrAdFltrS   ;Get the current oven error channel value
;       CPX     #ThmstrAdLmt.   ;Compare to the "over-heated" limit
;       BHI     CtlAmbDone      ;If ThmstrAd > ThmstrAdLmt, everything is ok
;
;       ORAA    #ErrCtlAmb.     ;Else control area is too hot --
;                               ;  set the E04 bit to "1"
;>>>

; Compare the current ambient temperature to the maximum acceptable value

        LDX     CtrlAmbTmpFS    ;Get the current Controller Ambient Tmp value
        CPX     #CtrlAmbHiLmt.  ;Compare to the "over-heated" limit
        BLS     CtlAmbDone      ;If AmbTmpFS <= AmbHiLmt, we're ok

        ORAA    #ErrCtlAmb.     ;Else control area is too hot --


CtlAmbDone:

        .endm


;------------------------------------------------------------------------
;  C h k P r b R t d E r r o r   (Check for Probe RTD Error)  Macro
;
;  This routine examines the current PrbErrAdFltrS value and compares it to
;  upper and lower reasonable limits.  If the PrbErrAdFltrS value is outside
;  either limit, an E06 (Main temperature probe failure) is signalled.
;
;  Input:  (A) -- "Errors" bit flags
;          PrbErrAdFltrS
;
;  Output: (A).ErrPrbRtd. -- set to "1" if PrbErrAdFltrS is outside of limits
;
;  Routines Called:
;  Exit State:          (A) -- Error flags
;                       (B),(X) -- unchanged
;                       CCR -- indeterminate
;
;
;
;
;------------------------------------------------------------------------

ChkPrbRtdError:
        .macro

        LDX     PrbErrAdFltrS   ;Get the error channel "raw" a-to-d value

ChkPrbShort:
        CPX     #RtdShortAd.    ;Compare to lower reasonable limit
        BLS     PrbRtdShorted   ;If Ad <= low limit, probe is shorted...

ChkPrbOpen:
        CPX     #RtdOpenedAd.   ;Else compare to upper reasonable limit
        BHS     PrbRtdOpened    ;If Ad >= high limit, probe is open...

        BRA     PrbRtdDone      ;Else everything here looks okay... exit...

; We treat OPEN and SHORTED probes the same: signal E06

PrbRtdShorted:
PrbRtdOpened:

        ORAA    #ErrPrbRtd.     ;Set the E06 bit to "1"


PrbRtdDone:

        .endm


;------------------------------------------------------------------------
;  C h k S o f t H i L m t E r r o r   (Check for Software High Limit)  Macro
;
;  This routine examines the current PrbErrAdFltrS value and compares it to
;  the HiLmtAd. value.  If PrbErrAdFltrS >= HiLmtAd. the E08 error will be
;  signalled by setting the ErrSoftHiLmt. bit in (A).
;
;  Input:  (A) -- "Errors" bit flags
;          PrbAdFltrS
;
;  Output: (A).ErrSoftHiLmt. -- set to "1" if PrbErrAdFltrS is >= HiLmtAd.
;
;  Routines Called:
;  Exit State:          (A) -- Error flags
;                       (B),(X) -- unchanged
;                       CCR -- indeterminate
;
;  ;
;
;------------------------------------------------------------------------

;>>> Old Methods ..........................................................
;
;       LDX     PrbErrAdFltrS   ;Get the current oven error channel value
;       CPX     #SoftHiLmtAd.   ;Compare to software high-limit value
;       BLO     SoftHiLmtDone   ;If PrbErrAdFltrS < HiLmtAd., everything is ok
;
;       ORAA    #ErrSoftHiLmt.  ;Else rotis. too hot -- set the E08 bit to "1"
;>>> ......................................................................

; On New CPU-1 board, we have a very high temperature range -- over 600 Deg F.
; For this reason, we can use normal temperature channel to check for
; E-08 "too hot" error.

        LDX     AirTmpFS        ;Get the current air temperature
        CPX     #SoftHiLmtF.    ;Compare to software high-limit value
        BLO     SoftHiLmtDone   ;If AirTmpFS < HiLmtF., everything is ok

        ORAA    #ErrSoftHiLmt.  ;Else rotis. too hot -- set the E08 bit to "1"


SoftHiLmtDone:

        .endm


;------------------------------------------------------------------------
;  C h k F o r E r r o r s   (Check for Errors)  Subroutine
;
;  This routine examines several variables looking for error conditions.
;  Only the Error flags for conditions checked here are cleared by this
;  routine (ie Ram and Rom error flags are not altered here). Only those
;  errors that currently exist are indicated by the flags upon exit from here
;  (ie errors that were indicated before but now have vanished will auto-
;  matically be reset by this code).
;
;  If any errors are currently detected, ErrorCode is set to the index of the
;  highest priority error.  If an error exists and Flags.ErrMode is currently
;  "0", the ErrMode bit will be set to "1" and ErrorStep will be reset to "0"
;  (ie this is a brand new error -- must now enter error mode).
;
;  Input:
;
;  Output: Errors
;
;  Routines Called:
;  Exit State:          (A),(B),(X),CCR  -  indeterminate
;
;
;
;------------------------------------------------------------------------

ChkForErrors:


; Work with "Errors" bit flags directly in (A) --
;  initially clear all the errors we are about to check for...

        LDAA    #ErrData.       ;Get "Data Error" bit...
        ORAA    #ErrCtlAmb.     ;...Ctrl Ambient error bit
        ORAA    #ErrPrbRtd.     ;...Meat Probe error bit
        ORAA    #ErrSoftHiLmt.  ;...and Soft Hi-limit bit

        COMA                    ;Negate, so we have 0's in those bit positions

        ANDA    ErrorFlags      ;"AND" the "Error Flags" into (A), zeroing out
                                ; the appropriate bits and preserving all
                                ; other bits (ie Ram and Rom error bits)


; First, check for RAM Data Corruption errors:
; We have two copies of the checksum-protected data areas.  If only one of
; them is corrupted, quietly fix the problem by copying the good data area
; into the bad data area.  If both areas are corrupted, signal E41.

        ChkDataError            ;E41 -- Data error


; Now check for control ambient too hot

        ChkCtlAmbientError      ;E04 -- ctrl hot


; Now check for RTD errors.  See if the raw (filtered) a-to-d value for the
; RTD is outside of reasonable limits.  If so, this indicates that
; the RTD is probably a short circuit or an open circuit.  Signal a bad
; RTD with an E06 error.

        ChkPrbRtdError          ;E06 -- oven probe


; If the RTD is in good shape, check for E08 Software High-Limit
; (ie will get a false E08 if the probe is known to be open-circuit)

        BITA    #ErrPrbRtd.
        BNE     ChkHiLmtDone

        ChkSoftHiLmtError       ;E08 -- too hot

ChkHiLmtDone:


; Save the new Error bit flags (currently in [A]).
; If we have any errors now, is this a brand new error?

        CLR     ErrorCode       ;Clear the error code until we can re-assess

        STAA    ErrorFlags      ;Save the bit flags
        BEQ     ChkErrorsDone   ;If no errors, exit
                                ;(ErrorCode has already been reset to 0...)


; We have at least ONE error -- set the Error code.  If more than one error,
; set code to the highest priority.  If we did not already have an error,
; turn the ErrorMode bit ON and reset ErrorStep to 0.
```

```
                                ; the error code for the MSB bit position)
 ...     LDAA    ErrorFlags     ;Get the error bit flags  (already in [A])

...SrchLp:
         BMI     FoundTopErr    ;All done when top bit in [A] is a "1"
         DECB                   ;Else decrement the Error code...
         ROLA                   ;...Rotate the flags left one position...
         BRA     ErrSrchLp      ;...and repeat

FoundTopErr:                    ;[B] indicates current highest priority error
         STAB    ErrorCode      ;Save [B] as the NEW ErrorCode

; We do have error(s) now -- are we already in error mode?

         LDAA    MiscFlags      ;Get the status flags
         BITA    #ErrMode.      ;Is "Error Mode" already set?
         BNE     ChkErrorsDone  ; If so, nothing more to do

         ORAA    #ErrMode.      ; Else need to set ErrorMode to "1"...
         STAA    MiscFlags
         CLR     ErrorStep      ;  ...and reset the ErrorStep to 0 ("init")

ChkErrorsDone:

         RTS


;---------------------------------------------------------------------------
; S h o w C o d e A n d S e q   (Show error Code and msg Sequence)  Subroutine
;
; This routine takes care of actually updating the displays.  The error code
; message number is passed here in the [B] register and is displayed in the
; left display digits.  A pointer to the message sequence definition is
; passed in the [X] register and the message sequence is displayed in the
; right-side displays.
;
; Note: to improve speed and reduce code size, most callers simply JUMP here
; and let the RTS here return to THEIR caller.
;
; Input:   [B] -- message number of error code message ("E-50" msg, etc)
;          [X] -- pointer to appropriate message sequence
;
; Output:  LDigits, RDigits
;
; Routines Called:
; Exit State:          [A],[B],[X],CCR  -  indeterminate
;
;
; .
;---------------------------------------------------------------------------


ShowCodeAndSeq:

; On entry here, [B] is the message number of the error code message,
; (ie "E-50"), and [X] points to the start of the appropriate message sequence
; (ie "CPU", "Chip", etc)

         PSHX                   ; ->[Save the message sequence pointer]

; Display the error code in the left digits

         LDX     #LDigits       ;Error code (E-50 or E-51) currently in [B]
         JSR     ShowMsg        ;Display the error code in left digits


; Now display the appropriate sequence ("CPU", "Err", etc)
; in the right-side display digits.

         PULX                   ; <-[Restore the message sequence pointer]
         LDD     #RDigits
         JSR     ShowMsgSeq     ;Display the error sequence in the right digits


         RTS


;---------------------------------------------------------------------------
; S h o w R o m E r r   (Show Rom Error)  Subroutine
;
; This routine takes care of updating the displays to indicate that an error
; with the rom checksum.
;
;
; Input:
;
; Output:
;
; Routines Called:
; Exit State:          [A],[B],[X],CCR  -  indeterminate
;
;
;
; ----------------------------------    ------------------------------------


RomErrSeq       .byte   'R', 32,MsgRomErr.+1, 20,MsgRomErr.+2, 8,MsgBlanks., 0


ShowRomErr:

; We always show the error code (ie "E-53") in the left digits, and cycle
; through a 3-step message ("ro" "chip", blanks) in the right display.
; We display the each word for 3/4 second (12/16ths), and leave blank
; for 1/2 second, for a total message cycle time of 2 seconds.

         LDAB    #MsgRomErr.+0  ;Load the message nbr of error code display

         LDX     #RomErrSeq     ;Display the error sequence in the right digits
```

```
                                ; return us to OUR caller...
;opt     RTS


;---------------------------------------------------------------------------
; S h o w R a m E r r   (Show Ram Error)  Subroutine
;
; This routine takes care of updating the displays to indicate that an error
; with the ram walking bit test.  The address stored in RamErrPtr$ indicates
; the failure address.  If this address is <= $00FF, an E-50 internal ram
; error message is generated;  otherwise an E-51 external ram error message
; is generated.  If any switch is pressed, the actual failure address will
; be displayed in hex (for as long as the switch is pressed).
;
; Input:
;
; Output:
;
; Routines Called:
; Exit State:          [A],[B],[X],CCR  -  indeterminate
;
;
;
;---------------------------------------------------------------------------

IRamErrSeq  .byte  'R', 32,MsgRamIntErr.+1, 30,MsgRamIntErr.+2, 8,MsgBlanks., 0

XRamErrSeq  .byte  'R', 32,MsgRamExtErr.+1, 30,MsgRamExtErr.+2, 8,MsgBlanks., 0


ShowRamErr:

; If the user is pressing any switch, show the bad ram location's
; address (in hex).  Otherwise, show the normal message sequence.

         LDAA    CurKey         ;Any key pressed right now?
         BNE     RamShowAddr    ; If so, show the bad ram address...


RamShowSeq:

; We always show the error code (ie "E-50" or "E-51")) in the left digits,
; and cycle through a 3-step message ("CPU " or " rA ", "CHIP", blanks)
; in the right display.  We display the each word for 3/4 second, and leave
; blank for 1/2 second, for a total message cycle time of 2 seconds.

         LDX     RamErrPtr$     ;Get the bad ram location:
         CPX     #$00FF
         BLS     InternalRam    ;If address <= $FF, must be 6803 int ram...


ExternalRam:                    ;External Ram ==> external to 6803 chip
         LDAB    #MsgRamExtErr.+0
         LDX     #XRamErrSeq

         JMP     ShowCodeAndSeq ;JUMP to the code that displays the error code
```

```
                                ; and the message sequence.  Let RTS there
;opt     RTS                    ; return us to OUR caller...


InternalRam:                    ;Internal Ram ==> internal on 6803 chip
         LDAB    #MsgRamIntErr.+0
         LDX     #IRamErrSeq

         JMP     ShowCodeAndSeq ;JUMP to the code that displays the error code
                                ; and the message sequence.  Let RTS there
;opt     RTS                    ; return us to OUR caller...


; Display the ram error address... failure address stored in RamErrPtr$

RamShowAddr:
         LDAA    #Char.A.       ;"Addr" in left displays
         STAA    LDig1
         LDAA    #Char.d.
         STAA    LDig2
         STAA    LDig3
         LDAA    #Char.r.
         STAA    LDig4
         CLR     LDigLeds


         LDAA    RamErrPtr$+0   ;Actual address shown in Hex in right displays
         LSRA
         LSRA
         LSRA
         LSRA
         STAA    RDig1

         LDAA    RamErrPtr$
         ANDA    #$0F
         STAA    RDig2

         LDAA    RamErrPtr$+1
         LSRA
         LSRA
         LSRA
         LSRA
         STAA    RDig3

         LDAA    RamErrPtr$+1
         ANDA    #$0F
         STAA    RDig4

         CLR     RDigLeds

;opt     BRA     ShowRamDone


ShowRamDone:

         RTS
```

```
;
.  This routine takes care of updating the displays to indicate that an error
.  with the Probe RTD has been observed.
;
;
;  Input:
;
;  Output:
;
;  Routines Called:
;  Exit State:          [A],[B],[X],CCR  -  indeterminate
;
;
;
; ------------------------------------------------------------------------

PrbRtdErrSeq    .byte   "R", 32, MsgPrbRtdErr.+1, 20, MsgPrbRtdErr.+2
                .byte   8, MsgBlanks., 0

ShowPrbRtdErr:

; We always show the error code (ie "E-4") in the left digits, and cycle
; through a 3-step message ("Prbr" "Err ", blanks) in the right display.
; We display the each word for 3/4 second, and leave blank for 1/2 second,
; for a total message cycle time of 2 seconds.

        LDAB    #MsgPrbRtdErr.+0 ;Load the message nbr of error code display

        LDX     #PrbRtdErrSeq   ;Display the error sequence in the right digits

        JMP     ShowCodeAndSeq  ;JUMP to the code that displays the error code
                                ; and the message sequence.  Let RTS there
                                ; return us to OUR caller...
;opt    RTS


;-------------------------------------------------------------------------
;  S h o w D a t a E r r    (Show Probe RTD Error)  Subroutine
;
;  This routine takes care of updating the displays to indicate that an error
;  with the programmed parameters has been observed.
;
;
;  Input:
;
;  Output:
;
;  Routines Called:
.  Exit State:          [A],[B],[X],CCR  -  indeterminate
;
;
;
; ------------------------------------------------------------------------


DataErrSeq      .byte   "R", 32, MsgDataErr.+1, 20, MsgDataErr.+2
                .byte   8, MsgBlanks., 0

ShowDataErr:

; We always show the error code (ie "E-41") in the left digits, and cycle
; through a 3-step message ("data" "err ", blanks) in the right display.
; We display the each word for 3/4 second, and leave blank for 1/2 second,
; for a total message cycle time of 2 seconds.

        LDAB    #MsgDataErr.    ;Load the message nbr of error code display

        LDX     #DataErrSeq     ;Get pointer to the above message sequence

        JMP     ShowCodeAndSeq  ;JUMP to the code that displays the error code
                                ; and the message sequence.  Let RTS there
                                ; return us to OUR caller...
;opt    RTS


;-------------------------------------------------------------------------
;  S h o w C t l A m b E r r    (Show Control Ambient Error)  Subroutine
;
;  This routine takes care of updating the displays to indicate that the
;  control ambient temperature is too high.
;
;
;  Input:
;
;  Output:
;
;  Routines Called: -
;  Exit State:          [A],[B],[X],CCR  -  indeterminate
;
;
;
;-------------------------------------------------------------------------

CtlAmbErrSeq    .byte   "R", 32, MsgCtlAmbErr.+1, 20, MsgCtlAmbErr.+2
                .byte   8, MsgBlanks., 0

ShowCtlAmbErr:

; We always show the error code (ie "E-6") in the left digits, and cycle
; through a 3-step message ("ctrl" "hot ", blanks) in the right display.
; We display the each word for 3/4 second, and leave blank for 1/2 second,
; for a total message cycle time of 2 seconds.

        LDAB    #MsgCtlAmbErr.  ;Load the message nbr of error code display

        LDX     #CtlAmbErrSeq   ;Get pointer to the above message sequence

        JMP     ShowCodeAndSeq  ;JUMP to the code that displays the error code
                                ; and the message sequence.  Let RTS there
                                ; return us to OUR caller...
;opt    RTS
```

```
;-------------------------------------------------------------------------
;  S h o w S o f t H i L m t E r r (Show Software High Limit Error) Subroutine
;
;  This routine takes care of updating the displays to indicate that the
;  oven cabinet temperature is too high.
;
;
;  Input:
;
;  Output:
;
;  Routines Called:
;  Exit State:          [A],[B],[X],CCR  -  indeterminate
;
;
;
;-------------------------------------------------------------------------

SoftHLErrSeq    .byte   "R", 32, MsgSoftHiLmtErr.+1, 20, MsgSoftHiLmtErr.+2
                .byte   8, MsgBlanks., 0

ShowSoftHiLmtErr:

; We always show the error code (ie "E-8") in the left digits, and cycle
; through a 3-step message ("too " "hot ", blanks) in the right display.
; We display the each word for 3/4 second, and leave blank for 1/2 second,
; for a total message cycle time of 2 seconds.

        LDAB    #MsgSoftHiLmtErr. ;Load the message nbr of error code display

        LDX     #SoftHLErrSeq   ;Get pointer to the above message sequence

        JMP     ShowCodeAndSeq  ;JUMP to the code that displays the error code
                                ; and the message sequence.  Let RTS there
                                ; return us to OUR caller...
;opt    RTS


;-------------------------------------------------------------------------
;  I n i t E r r o r M o d e  (Initialize Error Mode)  Macro
;
;  This routine basically takes care of saving the display information that
;  we need to restore when we exit Error mode.
;
;  Input:
;
;  Output:
;
;  Routines Called:
;  Exit State:          [A],[B],[X],CCR  -  indeterminate
;
;
;
;-------------------------------------------------------------------------


InitErrorMode:
        .macro

        CLR     DspTmr          ;Re-synchronize the display timer
                                ; (msg seq will restart within 1/16th second)

        CLR     PrgPending      ;Clear the "SET key pending" flag, in case
                                ; user is attempting to enter Program mode

        LDX     #StateVarsRec   ;Clear the "StartStop Pending" flags since
        CLR     _StStpPending,X ; we have interrupted normal RunMode User I/O

        CLR     StaDspCode      ;If currently doing the power-up status
                                ; display, cancel it now...

        .endm


;-------------------------------------------------------------------------
;  E x i t E r r o r M o d e  (Exit Error Mode)  Macro
;
;  This routine restores the display information that we saved when we first
;  entered Error Mode.
;
;  Input:
;
;  Output:
;
;  Routines Called:
;  Exit State:          [A],[B],[X],CCR  -  indeterminate
;
;
;
;-------------------------------------------------------------------------

ExitErrorMode:
        .macro
                                ;Reset the display timer, in case any outer
        CLR     DspTmr          ; routine was using it when the error display
                                ; routine was invoked.  This basically forces
                                ; "Repeating" message sequences to restart.
        .endm


;-------------------------------------------------------------------------
;  D o E r r o r U s e r I O  (Do Error mode User I/O)  Subroutine
;
;  This routine takes care of updating the display information and processing
;  user key input while some system error is detected.
;
;  This routine should be called anytime the MiscFlags.ErrorMode bit is "1",
;  even if all ErrorFlags bits = 0's.  This situation occurs when an error is
;  detected and signalled, but disappears before the user acknowledges the
;  error.
;
;
;
;  Input:  ErrorFlags -- bit flags signalling error conditions
;          ErrorCode --  0 ==> no error
```

```
;  Output: ErrorStep
;          ErrorIndex
;
;  Routines Called:
;  Exit State:         [A],[B],[X],CCR  -  Indeterminate
;
;  *
;
; -------------------------------------------------------------------------

DoErrorMode:

; First of all, see if we just now entered Error mode.
; If so, we need to initialize error mode now.

        LDAA    ErrorStep
        BNE     InitErrDone

InitErr:

        InitErrorMode           ;Save display variables, etc.
                                ;Establish the Error blink rate

        INC     ErrorStep       ;Advance to next step of error handling

InitErrDone:

; If the error has disappeared, exit Error mode.

        LDAA    ErrorCode       ;If ErrorCode now = 0...
        BEQ     ExitErr         ; ...time to exit the Error mode

; If still in step 1, turn the buzzer on in synch with the display blinking.
; (Once we get beyond step 1, the buzzer is kept silent)

ErrBzr: LDAA    ErrorStep       ;If we are no longer in step #1...
        CMPA    #1
        BHI     ErrBzrDone      ; ...leave the speaker off

        LDAA    #$FF            ;Else set the Speaker Request flag
        STAA    SpkrReq

        LDAA    #10             ; - request maximum volume
        STAA    SpkrReqVol

        LDAB    #Tone.Alert.    ; - use the special "Alert" tone
        STAB    SpkrReqTone

ErrBzrDone:

; U p d a t e   D i s p l a y s :

; Update the displays to reflect the current highest-priority error

ShowErrMsgs:
        CaseJSR ErrorCode,7     ;(Error codes listed low prior. to high prior.)

        .word   0000            ;  0(Can't have ErrorCode = 0 here...)
        .word   ShowPrbRtdErr   ;  1  Product probe RTD error (E11)
        .word   ShowDataErr     ;  2  Data scrambled (E41)
        .word   ShowCtlAmbErr   ;  3  Control ambient temperature (E04)
        .word   ShowSoftHiLimErr ; 4  Software high limit (E05)
        .word   0000            ;  5  (mechanical) high limit (E10))
        .word   ShowRamErr      ;  6  Ram walking bit test error
        .word   ShowRomErr      ;  7  Rom checksum error

ErrDispDone:

; K e y   I n p u t s :

; See if the user has pressed any keys...

        JSR     GetKey          ;See if any keys are available
        BEQ     KeyDone

        LDAB    #2              ;If any key pressed, advance to step 2
        STAB    ErrorStep       ; -- acknowledged, keep the buzzer off

; If key is the Tmp Display key, start the tmp override sequence

;ChkTmp:        CMPA    #KeyTmp.        ;Is it the "Temperature" key?
;       BNE     KeyOther
;
;       LDAB    #1              ;Start the temperature display sequence
;       STAB    TmpDspCode      ; by setting TmpDspCode = 1...
;
;       BRA     KeyDone

; Only for Data Error: fix the error by performing a complete re-initialize...

KeyOther:
        LDAB    ErrorFlags
        BITB    #ErrData.
        BEQ     KeyDone

        LDX     #0              ;Force a system reset by clearing the
        STX     RAMInitID+0     ; init flags and performing a cold start
        STX     RAMInitID+2
        STX     RAMInitID+4
        JMP     PwrUpStart      ;Jump to a complete system restart...

KeyDone:

        BRA     DoErrorIoDone   ;Exit...

ExitErr:

        ExitErrorMode           ;Restore display information

        LDAA    MiscFlags       ;Finally, exit Error mode by
        ANDA    #~ErrMode.      ; resetting the Flags.ErrorMode bit to 0
        STAA    MiscFlags

DoErrorIoDone:

        RTS

        .end ;(of file)
```

SYSTEM INITIALIZATION SETTINGS

By way of example, the control may set the various parameters for each product to the following values after a system initialization.

| | |
|---|---|
| Preheat | 375° F. |
| Stage 1 time | 0:55 |
| Stage 1 air temperature | 360° F. |
| Stage 1 fan | on |
| Stage 1 radiant heat | 100% |
| Stage 1 radiant temperature setpoint | 360° F. |
| Stage 1 load compensation | 0 |
| Stages 2–10 time | 0:00 |
| HOLD time | 0:00 |
| HOLD air temperature setpoint | 200° F. |
| HOLD fan | on |

-continued

| | |
|---|---|
| HOLD radiant heat | 100% |
| HOLD radiant temperature setpoint | 200° |
| HOLD load compensation | 0 |
| Alarm 1 | 0:01 |
| Alarms 2–4 | 0:00 |

Of course, other settings may be used.

The TEST mode enables a user (or preferably a service technician) to check the operation of the components individually without having to actually enter a PREHEAT COOK or HOLD stage. It enables the components to be checked directly by operation of the control panel. Preferably, entry to this mode requires a special access code. An example of an exerpt of a software routine for operating a cooking appliance in this mode is as follows.

```
-- Input/Output test mode

;-----------------------------------------------------------------------------
;
;       K R I o T e s t . S O R
;
; The routines in this file provide the Inputs/Outputs Test mode of
; operation, whereby outputs may be directly and individually controlled
; from the control panel, and inputs may be monitored directly, in order
; to assist in hardware debugging and checkout.
;
;-----------------------------------------------------------------------------


        .include D:KRStd.LIB

; External variables:

        .extern page0 BlnTmr, Tmr100mBit., Tmr200mBit., Tmr400mBit., Tmr800mBit.
        .extern page0 CurKey, page0 KeyHold33, page0 KeyHold100
        .extern page0 DspTmr
        .extern ScrollCode

        .extern page0 SpkrFreq, page0 SpkrFreqVol, page0 SpkrFreqTone
        .extern Tone.C1.,Tone.D1.,Tone.E1.,Tone.F1.,Tone.G1.
        .extern Tone.A2.,Tone.B2.,Tone.C2.,Tone.D2.,Tone.E2.,Tone.F2.,Tone.G2.
        .extern Tone.A3.,Tone.B3.,Tone.C3.,Tone.D3.,Tone.E3.,Tone.F3.,Tone.G3.
        .extern Tone.A4.,Tone.B4.,Tone.C4.,Tone.D4.,Tone.E4.,Tone.F4.,Tone.G4.
        .extern Tone.A5.,Tone.B5.,Tone.C5.

        .extern LDigits, RDigits
        .extern LDig1, LDig2, LDig3, LDig4, LDigLeds
        .extern RDig1, RDig2, RDig3, RDig4, RDigLeds
        .extern _Dig1, _Dig2, _Dig3, _Dig4, _DigLeds, ColonLeds.

        .extern ModeLeds, SearLed., CookLed., HoldLed., SetLed.
        .extern ZSearLed., ZCookLed., ZHoldLed., ZSrCHoldLed., ZSetLed.

        .extern StatusLeds, ReadyLed., ZReadyLed.

        .extern ProdLeds$
        .extern Prod1Led., Prod2Led., Prod3Led., Prod4Led., Prod5Led.
        .extern Prod6Led., Prod7Led., Prod8Led., Prod9Led., Prod10Led.

        .extern page0 KeyImg$, page0 KeyStat
        .extern KeySet., KeyStStp.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.

        .extern MiscFlags
        .extern IntroMode., ErrMode., IoTestMode., BurnInMode.
        .extern SpPrgMode., PrgMode., NeedInitMsg.
        .extern ZIntroMode., ZErrMode., ZIoTestMode., ZBurnInMode.
        .extern ZSpPrgMode., ZPrgMode., ZNeedInitMsg.


        .extern ExitPending, ExitPendClk

        .extern ShRngInp$, DigCtrlHner., DigCmtHner.
        .extern CtrlHnerOpen, CmtHnerOpen

        .extern IoByte, IoByteNTL.
        .extern IoAirHt., IoRadHt., IoBzr., IoRotor., IoBlwr., IoVent.
        .extern ZIoAirHt., ZIoRadHt., ZIoBzr., ZIoRotor., ZIoBlwr., ZIoVent.

        .extern IoTestStep, IoTestItem
        .extern IoTestOutputs

        .extern ItemStep, ItemSubStep

        .extern UncalAirTmpF$, AirTmpF$, PrbCalibrFxF$
        .extern PrbErrAdFltr$, RtdShortAd., RtdOpenAd.

        .extern CtrlAmbTmpF$, MaxCtrlAmbTmpF$
        .extern MaxCalibF.

        .extern PwrOnLog16$, PwrOnLog64$
        .extern AirHtLog16$, AirHtLog64$
        .extern RadHtLog16$, RadHtLog64$
        .extern BlwrLog16$,  BlwrLog64$
        .extern RotorLog16$, RotorLog64$
        .extern VentLog16$,  VentLog64$

        .extern PwrOnCnt$, SysInitCnt$, UserInitCnt$
        .extern Data1FixCnt$, Data2FixCnt$


        .extern IoPrbCalibStar.
        .extern IoMinCalF., IoMaxCalF.
        .extern IoMinUncalF., IoMaxUncalF.
        .extern IoMinPrbErrAd., IoMaxPrbErrAd.
        .extern IoMinAmbF.,IoMaxAmbF.

        .extern DegCMode, DegSymb

        .extern IoTestPsswd

        .extern PasswdStep, PasswdTargetPtr$, PasswdSz.
        .extern PwdInput., PwdInvalid., PwdValid., PwdTimeout., PwdCancel.
        .extern PwdGo., PwdNoGo.

        .extern page0 TempByte, page0 TempWord$, page0 DIMove$
        .extern page0 IndexI, page0 IndexJ, page0 PtrI$, page0 PtrJ$

; from KRCustom.SOR

        .extern PgmVerID


; Messages

        .extern MsgBlanks., MsgCant.
        .extern MsgDegC., MsgDegF., MsgCalib.
```

```
        .extern MsgPushBtns.
        .extern MsgRtdTest., MsgOpen., MsgShort., MsgOffset.
        .extern MsgAmbientTest., MsgRemoteTest.
        .extern MsgErrLog., MsgCntLog

; External routines:


        .extern SetProdLed

        .extern BinToBCDDig, BinToBcd3Dig, BinToBcd4Dig
        .extern DegFToDegC
        .extern DisplayTmp, DisplayTime
        .extern GetKey, ChkKeyPressed
        .extern BadKeySound, StartBzr
        .extern ShowMsg, ShowMsgSeq

        .extern DoPasswdEntry, DoPasswdResult

        .extern UpdSecByte, UpdSecWord

        .extern SetAirHtOff, SetAirHtOn
        .extern SetRadHtOff, SetRadHtOn
        .extern SetRotorOff, SetRotorOn
        .extern SetBlwrOff,  SetBlwrOn


; Routines declared here:

;>>> For now, we will make ambient tmp available in Special Program mode

        .global DoAmbientTest
;>>>

        .global DoIoTestWhile

        .global ShowLedsSequence, MaxLedsSeq. ;(make available to burn-in, etc)


; Definitions internal to this routine


; Special Programming Steps (indicated by IoTestStep):

IntroStep.      .equ    1       ;Introduction (Entry message)
CodeStep.       .equ    2       ;Password "code" entry
ItemTestStep.   .equ    3       ;Test steps


MaxTestItem.    .equ    9       ;Last item in the test sequence


;-----------------------------------------------------------------------------
;
; L e d s S e q T b l   (Leds Sequence Table)   Data Table
;
; This table lists the led bit masks for the individual leds turned on during
; the steps of the Leds Sequence, which turns on 1 led at a time, in a
; sequence that is complimentary to the layout of the leds on the board.
;
; (Step 0 is always "NO LED".)
;-----------------------------------------------------------------------------

; Each entry here indicates "leds variable index" and "mask"
; The indicated "leds variable index" will be used to fetch the appropriate
; leds variable address from the LedsVarsTbl.  The mask will then be
; save into the indicated led variable.

LedsMasksTbl:
        .byte   0,0             ;0 -- no leds lit at all

        .byte   0,CookLed.      ;1 \
        .byte   0,HoldLed.      ;2  \ MODE leds
        .byte   0,SetLed.       ;3  /

        .byte   1,>Prod1Led.    ;4 -- product leds
        .byte   1,>Prod2Led.    ;5
        .byte   1,>Prod3Led.    ;6 (products 1..8 are in ProdLeds$+0)
        .byte   1,>Prod4Led.    ;7
        .byte   1,>Prod5Led.    ;8
        .byte   1,>Prod6Led.    ;9
        .byte   1,>Prod7Led.    ;10
        .byte   1,>Prod8Led.    ;11

        .byte   2,<Prod9Led.    ;12 (products 9 & 10 are in ProdLeds$+1)
        .byte   2,<Prod10Led.   ;13

        .byte   3,ReadyLed.     ;14 -- Status Leds


MaxLedsSeq.     .equ    14


LedsVarsTbl:
        .word   ModeLeds        ;0 -- Mode leds
        .word   ProdLeds$+0     ;1 -- Product leds 1..8
        .word   ProdLeds$+1     ;2 -- Product leds 9 & 10
        .word   StatusLeds      ;3 -- Status leds


;-----------------------------------------------------------------------------
;  S h o w L e d s S e q u e n c e  (Show Led Sequence)  Macro
;
;  This routine updates the 3 led variables (StatusLeds, SetLeds, and ProdLeds$)
;  based on the current value of BurnInSubStep (assuming BurnInStep = 0 -- the
;  scrolling message/sequencing leds step).
;
;  Input:  [A] -- step number -- 0 = none; 1..MaxLedsSeq. = led; > Max = none.
;
;  Output: SetLeds, StatusLeds, ProdLeds$
;
;  Routines Called:
```

```
Revision Record:      A - 4 Aug 92 -- Original
;------------------------------------------------------------------------

ShowLedsSequence:

        CMPB    #NumLedSteps.   ;Is the requested step past
        BLS     GetLedMask      ;     the end of the led sequence?
        CLRB                    ; If so, use step 0 (no leds on)

GetLedMask:
        LDX     #LedsMaskTbl    ;Get base address of the table of leds
        ABX                     ;Add substep offset to table address
        ABX                     ;(Add twice -- two bytes per table entry)

        LDAB    0,X             ;Get the led variable identifier for this
                                ; sequence step -- this is VarsTbl index.

        LDAA    1,X             ;Get the led bit mask for this step --
                                ; will be applied to indicate led variable

        LDX     #LedsVarsTbl    ;Get the address of the Leds Variables table
        ABX                     ;Add the led variable identifier index
        ABX                     ; (Add twice -- two bytes per entry)

        LDX     0,X             ;Get the address of the actual led variable

; At this point, we have an led bit mask (typically with 1 bit on) in [A],
; and we have the address of the led variable it belongs to in [X].
;
; We need to save the [A] value into the address pointed to by [X], and
; then make sure all the OTHER led variables are zeroed out.  The easiest
; way to do this is to disable interrupts momentarily (so no display updates
; will occur) and zero out ALL led variables, then save the [A] value into
; the [X]-addressed led variable, and finally, enable interrupts again.

SetTheLeds:
        SEI                     ;/// Disable interrupts momentarily

        CLRB                    ;(CLRB / STAB AnyVar quicker than CLR AnyVar)
        STAB    ModeLeds
        STAB    StatusLeds
        STAB    ProdLeds$+0     ;Turn off all the leds...
        STAB    ProdLeds$+1

        STAA    0,X             ; ...then turn on led in var pointed to by [X]

        CLI                     ;/// Enable interrupts again

LedsSeqDone:

        RTS

;------------------------------------------------------------------------


; D i s p A m b T m p  (Display Ambient Temperature)  Subroutine
;
;  This routine simply displays the temperature passed in [D] in the
;  right-side display digits.  A special routine is required here for
;  temperatures in the "ambient" range, since these temperatures are so
;  low that they would result in " to " displays if the normal DisplayTmp
;  routine was called.
;
;  Input:  [D] -- temperature value
;
;  Output: RDig1..RDig4 -- temperature value displayed
;          DigLeds -- all right-side digit leds turned off
;
;  Routines Called:
;  Exit State:          [A],[B],[X],CCR  -  indeterminate
;
;
;
;------------       -----------------------------------------------------

DispAmbTmp:
                                ;Temperature (in deg F) is in [D]
        TST     DegCMode        ;Are we configured for Celsius operation?
        BEQ     AmbTmpToBcd
                                ;If so...
        JSR     DegFToDegC      ; convert F temperature (in [D]) to Celsius
                                ;     (Celsius value returned in [D])
AmbTmpToBcd:
        SEC                     ;We DO want zero-blanking
        JSR     BinToBcd3Dig    ;Convert [D] to 3 displayable digits
        STD     RDig2           ;Store 2 least sig digits in Dig2 & Dig3

        STX     D8Move$         ;Copy top digits (ret'd in [X]) into [D]
        LDD     D8Move$
        STAB    RDig1           ;Store most sig digit (orig {X}.lo) into Dig1

        LDAB    DegSymb         ;Display "degrees" symbol in rightmost digit
        STAB    RDig4           ;(elevated "o" for Fahrenheit, "C" for Celsius)

        CLR     RDigLeds        ;Make sure the colons are off...

        RTS                     ;All done -- return to caller


;------------------------------------------------------------------------
; D i s p R t d O f f s e t  (Display Rtd Calibration Offset)  Subroutine
;
;  This routine simply displays the current rtd probe calibration offset
;  in the right-side display digits, and an identifying legend in the
;  left-side display digits.
;
;  Input:  ProCalibOfsFS -- calibration offset value
;
;  Output: LDig1..LDig4 -- identifying legend displayed
;          RDig1..RDig4 -- temperature value displayed
;
;  Routines Called:
;  Exit State:          [A],[B],[X],CCR  -  indeterminate
;

DispRtdOffset:

; Display the identifying legend in the left-side digits

        LDAB    #MsgOffset.     ;Display the "ofst" message in the left digits
        LDX     #LDigits
        JSR     ShowMsg

; Now display the signed offset value in the right side digits:

        LDD     ProCalibOfsFS   ;Get the signed offset value --
        BMI     NegOffset       ;  16-bit offset ALWAYS smaller than +/-255
        BNE     PosOffset       ;(So we can really work with value in [B])

ZeroOffset:
        LDAA    #Char.Blank.    ;No sign character for "0" offset
        BRA     ShowOffsetValue

PosOffset:
        LDAA    #Char.Blank.    ;No sign character for "+" sign
        BRA     ShowOffsetValue

NegOffset:
        NEGB                    ;Negate the value in [B] to get a positive val
        LDAA    #Char.Minus.    ;Use "-" for the sign character
;opt    BRA     ShowOffsetValue


ShowOffsetValue:                ;Sign character is in [A], offset value in [B]

        CMPB    #9              ;Do we have a single digit, 0..9?
        BHI     Offset2Dig      ;If > 9, we have a two digit display

Offset1Dig:
        STD     RDig2           ;Put Sign [A] into Dig2, Offset [B] into Dig3

        LDAA    #Char.Blank.
        STAA    RDig1           ;Blank the first character
        LDAA    #Char.Degrees.
        STAA    RDig4           ;Degrees F symbol in Dig 4

        BRA     RtdOfsDispDone

Offset2Dig:                     ;Sign character in [A], ofs >= 10 is in [B]

        STAA    RDig1           ;Display the sign character in Dig1

;opt    SEC                     ;(zero blanking irrelevant -- 2 digits to show)
        JSR     BinToBcd2Dig    ;Convert abs(offset) into displayable chars
                                ;(Two BCD digits returned in [D] register)

        STD     RDig2           ;Display 2-digit offset value in Dig2 & Dig3

        LDAA    #Char.Degrees.  ;Display the Degrees F symbol in Dig4
        STAA    RDig4


;opt    BRA     RtdOfsDispDone

RtdOfsDispDone:

        RTS                     ;return to caller


;------------------------------------------------------------------------
; U p d I o T e s t I n t r o M s g  (Update I/O Test Intro Message)  Macro
;
;  A three-stage message is displayed upon entering I/O Test Mode.
;
;  Input:  DspStep
;
;  Output: LDig1..LDig4, RDig1..RDig4
;          DigLeds.ColonLeds turned off
;
;  Routines Called:
;  Exit State:          [A],[B],[X],CCR  -  indeterminate
;
;
;
;-- ---------------------------------------------------------------------

UpdIoTestIntroMsg:
        .MACRO

; The "Entry Msg" is " Io  test", then "blanks"

        LDAA    DspTmr          ;Get the current display timer value
        CMPA    #4
        BLS     EntryBlanks

EntryWords:
        LDAB    #MsgIo.
        LDX     #LDigits
        JSR     ShowMsg

        LDAB    #MsgTest.
        LDX     #RDigits
        JSR     ShowMsg

        BRA     EntryMsgDone


EntryBlanks:
        LDAB    #MsgBlanks.
        LDX     #LDigits
        JSR     ShowMsg

        LDAB    #MsgBlanks.
        LDX     #RDigits
        JSR     ShowMsg

;opt    BRA     EntryMsgDone
```

```
;Also, keep all other leds OFF

        LDD     $0000
        STD     ProdLedsS
        STAA    ModeLeds
;>>>  ' STAA    StatusLeds

        .endm


;-----------------------------------------------------------------------
; G o N o G o T e s t   (Go No-Mode Test)  Subroutine
;
; This routine provides Go-Mode input checking for the rtd temperature input,
; raw rtd divider input, and thermistor temperature input, when a standard
; probe simulator is installed and the control is operated at a normal
; room temperature ambient.
;
;
;
; Input:  ItemStep
;
; Output: ItemStep
;
; Routines Called:
; Exit State:           [X] -- unchanged
;                       [A],[B],CCR -- indeterminate
;
;
;
;-----------------------------------------------------------------------

GoNoGoModeTest:

; See if we just started this i/o test step

        LDAA    ItemStep
        BNE     GNGInitDone

        INC     ItemStep        ;Advance to Go-Mode step #1 -- regular disp

GNGInitDone:


;Update Digit Displays

; If the user is currently holding the "1" key, we override the display
; and show the current temperature offset value.

GNGChkCalib:
        LDAA    ItemStep        ;Are we on the "Calib" step
        CMPA    #2


        BNE     GNGChkNoCalib   ; (If not, see if the "1" key is pressed...)

                                ;Else we ARE on the "calib" message step:
        LDAB    DspTmr          ; Has the display timer timed-out yet?
        BNE     GNGCalibLegend  ;   If not, display the "calib" message

        LDAB    #KeyNbr1.       ;Else Display timer done: still holding "1"?
        JSR     ChkKeyPressed   ;
        BNE     GNGCalibOfs     ;   If so, display new offset value
        BRA     GNGCalibEnd     ;     (until "1" key is released...)

GNGCalibLegend:

        LDAB    #MsgCalib.      ;Display "Calib" in the left digits
        LDX     #LDigits
        JSR     ShowMsg

        LDD     AirTmpFS        ;Display current temperature in the right
        LDX     #RDigits
        JSR     DisplayTmp

        JMP     GNGDigitsDone

GNGCalibOfs:                    ;Last part of display shows the calib offset
        JSR     DispRtdOffset

        JMP     GNGDigitsDone


GNGCalibEnd:

        LDAA    #1              ; If timer counted down to 0...
        STAA    ItemStep        ;  ...return to the normal display step
        BRA     GNGChk1Held     ;  ...and check for normal display options


;"Can't calibrate" message

GNGChkNoCalib:
        LDAA    ItemStep        ;Are we on the "Can't Calib" step
        CMPA    #3
        BNE     GNGChk1Held     ; (If not, see if the "1" key is pressed...)

                                ;Else we ARE on the "can't calib" message step:
        LDAB    DspTmr          ; Has the display timer timed-out yet?
        BEQ     GNGCalibEnd     ;   If so, cancel msg, return to norm

        LDAB    #MsgCant.
        LDX     #LDigits
        JSR     ShowMsg

        LDAB    #MsgCalib.
        LDX     #RDigits
        JSR     ShowMsg

        JMP     GNGDigitsDone


GNGNoCalEnd:


;Press and hold "1" to display rtd temperature input

GNGChk1Held:
        LDAB    #KeyNbr1.       ;Number "1" key to show current temperature
        JSR     ChkKeyPressed
        BEQ     GNGChk2Held     ;If key is not pressed, see if "2" pressed

        LDAB    #MsgGoNoGoTest.+1
        LDX     #LDigits
        JSR     ShowMsg

        LDD     AirTmpFS
        LDX     #RDigits        ; ...do the regular temperature display
        JSR     DisplayTmp      ;(does F or C, takes care of Hi and Lo, etc)

        JMP     GNGDigitsDone


;Press and hold "2" to display rtd divider input

GNGChk2Held:
        LDAB    #KeyNbr2.       ;Number "2" key to show rtd divider
        JSR     ChkKeyPressed
        BEQ     GNGChk3Held     ;If key is not pressed, see if "3" pressed

        LDAB    #MsgGoNoGoTest.+2
        LDX     #LDigits
        JSR     ShowMsg

        LDD     PrbErrAdFltrS   ;Get the a-to-d filter value (101:6F)

        LSRD
        LSRD
        LSRD                    ;Shift right 6 times to get integer portion
        LSRD
        LSRD
        LSRD

        SEC                     ;Convert to displayable digits
        JSR     BinToBcdAbig
        STX     RDig1
        STD     RDig3           ; ...and display in the right-side display

        JMP     GNGDigitsDone


;Press and hold "3" to display uncalibrated tmp input

GNGChk3Held:
        LDAB    #KeyNbr3.       ;Number "3" key to show current temperature
        JSR     ChkKeyPressed
        BEQ     GNGChk4Held     ;If key is not pressed, see if "4" pressed


        LDAB    #MsgGoNoGoTest.+3
        LDX     #LDigits
        JSR     ShowMsg

        LDD     UncalAirTmpFS   ;Get the current uncalibrated air temperature
        LDX     #RDigits        ; ...do the regular temperature display
        JSR     DisplayTmp      ;(does F or C, takes care of Hi and Lo, etc)

        JMP     GNGDigitsDone


;Press and hold "4" to display ambient temperature input

GNGChk4Held:
        LDAB    #KeyNbr4.       ;Number "4" key to show current CPU temperature
        JSR     ChkKeyPressed
        BEQ     GNGRegDisp      ;If key is not pressed, see if "5" pressed


; Left-side displays indicate we are on the Ambient Temperature test:

        LDAB    #MsgGoNoGoTest.+4
        LDX     #LDigits
        JSR     ShowMsg

        LDD     CtrlAmbTmpFS    ;Get the current ambient temperature
        JSR     DispAmbTmp      ; display it in the right-side digits

        JMP     GNGDigitsDone


;Regular Go-Mode display

GNGRegDisp:

; Cycle the normal test sequence in the left digits

        LDAB    #MsgGoNoGoTest.+0
        LDX     #LDigits
        JSR     ShowMsg

; Display "y" or "n" for each of the limit-checked inputs

TmpGoNoGo:
        LDAB    #Char.n.        ;Assume we have a "no-go"

        LDX     AirTmpFS        ;Get the current (calibrated) "Air" temperature

        CPX     #TmMaxCalF.     ;Compare to "high" limit
        BHI     SaveTmpYN       ;If too high, we DO have "no-go"

        CPX     #TmMinCalF.     ;Compare to "low" limit
        BLO     SaveTmpYN       ;If too low, we DO have "no-go"

        LDAB    #Char.y.        ;Else looks okay -- change that to "go"

SaveTmpYN:
        STAB    RDig1           ;Save into the first right-side digit

RtdGoNoGo:
```

```
        CPX     #[illegible].  ;Compare to "high" limit
        BHI     [illegible]     ;If too high, we DO have "no-go"

        CPX     #[illegible].  ;Compare to "low" limit
        BLO     [illegible]     ;If too low, we DO have "no-go"

        LDAB    #Char.y.        ;Else looks okay -- change that to "go"

[illegible]:
        STAB    RDig2           ;Save into the second right-side digit


[illegible]:
        LDAB    #Char.n.        ;Assume we have a "no-go"

        LDX     UncalAirTmpFS   ;Get the current uncalibrated air temperature

        CPX     #[illegible]UncalF.  ;Compare to "high" limit
        BHI     SaveUCalTN      ;If too high, we DO have "no-go"

        CPX     #[illegible]UncalF.  ;Compare to "low" limit
        BLO     SaveUCalTN      ;If too low, we DO have "no-go"

        LDAB    #Char.y.        ;Else looks okay -- change that to "go"

SaveUCalTN:
        STAB    RDig3           ;Save into the third right-side digit

[illegible]:
        LDAB    #Char.n.        ;Assume we have a "no-go"

        LDX     CtrlAmbTmpFS    ;Get the current ambient temperature value

        CPX     #[illegible]Ambf.  ;Compare to "high" limit
        BHI     SaveAmbTN       ;If too high, we DO have "no-go"

        CPX     #[illegible]Ambf.  ;Compare to "low" limit
        BLO     SaveAmbTN       ;If too low, we DO have "no-go"

        LDAB    #Char.y.        ;Else looks okay -- change that to "go"

SaveAmbTN:
        STAB    RDig4           ;Save into the last right-side digit

; Else, make sure to right-side colons are on

        CLR     RDigLeds

[illegible]  BRA     [illegible]DigitsDone


[illegible]DigitsDone:




; Else, keep all the discrete leds off

        LDD     #0
        STD     ProdLeds[illegible]
        STAB    ModeLeds
[illegible]  STAB    StatusLeds



; Handle Key Inputs

; Now handle the key input:
;  The SET key moves on to the next in test step.
;  All other keys are invalid

        JSR     GetKey          ;Any new keys pressed?
        BEQ     [illegible]KeyDone  ;(If no keys in the buffer, nothing to do)

[illegible]Nk1234:                 ;Number keys "1", "2", "3", and "4"
        CMPA    #KeyNbr4.       ; are all valid "press and hold" keys,
        BLS     [illegible]KeyDone  ; so we need to make sure we don't sound
                                ; the "beep-beep" when they are pressed

[illegible]ChkSet:
        CMPA    #KeySet.        ;Is it the SET key?
        BNE     [illegible]

        LDAA    #99             ;If so, signal "Done with this test item"
        STAA    ItemStep

        LDAA    #$FF .          ; Also, start the "Exit Pending" operation
        STAA    ExitPending     ; in case user is trying to exit Program mode.
        CLR     ExitPendClk     ;  (user must Press and Hold to do exit)

        BRA     [illegible]KeyDone

[illegible]Chk0:                ;If "0" (key code 10) is pressed when
        CMPA    #KeyNbr10.      ; "1" is already held, perform the
        BNE     [illegible]OtherKey  ; "calibrate to std value" operation

        LDAB    #KeyNbr1.
        JSR     ChkKeyPressed   ; If "1" key is not currently held...
        BEQ     [illegible]OtherKey  ;  ...then "0" is not valid

        LDD     #[illegible]ProCalibStdF.  ;Get the calibration standard value (std res)
        SUBD    UncalAirTmpFS   ;Subtract the current raw temperature value

        STD     TempWord6       ;[D], TempWord6 = new calibration offset

        BPL     ChkCalibRange   ;If offset >= 0, ready to check

        COMB                    ;Else calculate absolute value
        COMA                    ; of the new offset by doing 2's complement
        ADDD    #1

[illegible]CalibRange:          ;Absolute value of new offset is in [D]
        SUBD    #MaxCalibF.     ;Compare to max allowed offset (destroys [D])
```

```
        LDD     TempWord6       ;Retrieve the newly calculated offset
        STD     ProCalibOfsFS   ;Save as the new calibration offset

        LDX     #ProCalibOfsFS  ;Update the secondary data area as well
        JSR     UpdSecWord
                                ;Update the actual air-temperature value
        LDD     #[illegible]ProCalibStdF.  ; immediately, so we don't have to wait
        STD     AirTmpFS        ; for next 1/4 second temperature update

        LDAA    #1              ;Execute the "Calib" display message
        STAA    ItemStep        ; step for a few seconds...

        LDAA    #1*16           ;Display "Calib" "[illegible]" for 1 second, then
        STAA    DspTmr          ; display new offset till "1" key released

        LDAB    #4              ;Sound a short beep here to
        LDX     #$FFFF          ; indicate that we did something
        JSR     StartBzr

        BRA     [illegible]KeyDone

RejectNewCalib:

        LDAA    #2              ;Execute the "Cant Calib" display message
        STAA    ItemStep        ; step for a few seconds...

        LDAA    #3*16
        STAA    DspTmr

        LDAB    #2*16           ;Sound a long beep here to
        LDX     #$FFFF          ; indicate that we couldn't calibrate
        JSR     StartBzr

        BRA     [illegible]KeyDone



[illegible]OtherKey:                ;Else other keys are invalid...
        JSR     BadKeySound

[illegible]  BRA     [illegible]KeyDone


[illegible]KeyDone:



[illegible]TestDone:


        RTS




;-----------------------------------------------------------------------
; D o O u t s T e s t   (Do Outputs Test)  Subroutine
;
; This routine performs the outputs testing operations, whereby the user
; is given direct on/off control of the heater, blower, and rotor outputs.
;
;
;
;
; Input:  ItemStep
;
; Output: ItemStep
;
; Routines Called:
; Exit State:          [X] -- unchanged
;                      [A],[B],CCR -- indeterminate
;
;
;
;-----------------------------------------------------------------------


OutsLegends:
        .byte   1, Char.A., Char.i., Char.r.     ;(0) Step 1
        .byte   2, Char.r., Char.t., Char.r.     ;(1) Step 2
        .byte   3, Char.b., Char.l., Char.o.     ;(2) Step 3
        .byte   4, Char.r., Char.x., Char.d.     ;(3) Step 4
        .byte   Char.U., Char.o., Char.n., Char.t.   ;(4) Setp 5
        .byte   Char.t., Char.e., Char.S., Char.t.   ;(5) Step 6 (*)
        .byte   Char.C., Char.y., Char.C., Char.L.   ;(6) Step 7 (**)


; (*) note: Step 6 only exists when we enter this testing step, so that
;     we display "outs" "test" for a moment, before we start cycling the
;     "legends" messages in the right-side displays.  Once automatic
;     legend cycling begins, we stay in the loop 1..5.

; (**) Step 7 is provided to assist Dick Jones with his UL and DGL testing
;     This step provides automatic cycling of selected outputs.


; - - - - - - Code starts here:  - - - - -

DoOutsTest:

; See if we just started this outputs test step

        LDAA    ItemStep
        BNE     OutsInitDone

        LDAB    #6              ;Start out displaying "test" on right side
        STAB    ItemStep
        LDAA    #2*16
        STAA    DspTmr

OutsInitDone:


;>>>...................................................................
```

```
;  Step number 6 repeats 3-second output cycles (1 second ON, 2 seconds OFF).
;
; When on step 6, we simply reload the DspTmr when it reaches 0, without
; moving on to another step.  The code below examines the current value
; of the DspTmr: for the last 2 seconds of the cycle, all bits of IoByte
; are cleared to 0's.  For the first second, the IoByte is set to the value
; it had when the automatic cycling was started (as indicated by the value
; stored in IoTestOutputs.)

AutoCycling:

        LDAB    ItemStep          ;Are we on Step #7?
        CMPB    #7
        BNE     ChkOutsDspTmr

        LDAA    DspTmr            ;If the cycle timer has counted down to 0...
        BNE     AutoTmrDone
        LDAA    #3*16             ; ...then reload it at 3 seconds
        STAA    DspTmr
AutoTmrDone:

; Set the value of IoByte:
;  last 2 seconds of cycle, turn all outputs OFF
;

        CLRB                      ;Assume we are in the "OFF" part of cycle

;opt    LDAA    DspTmr            ;Get the current timer value
        CMPA    #2*16             ;Are we in the last 2 seconds?
        BLS     AutoSetOuts

        LDAB    IoTestOutputs     ;Else we are in the "ON" part of cycle --
                                  ; set outputs to match starting IoByte value
AutoSetOuts:
        STAB    IoByte            ;Save the new "IoByte" setting

AutoCycleDone:
        BRA     OutsDspTmrDone    ;Now continue with regular code...
;>>>..................................................................


; The "ItemStep" value is generally used to cycle through the legends
; which indicate which outputs are controlled by which keys.
;
; See if the display timer (DspTmr) has timed out.  If so, move on to the
; next step of the automatic legend display cycling.

ChkOutsDspTmr:

        LDAA    DspTmr            ;Has the display timer timed-out?
        BNE     OutsDspTmrDone    ;If not, stay on the current sub-step

        LDAA    #2*16             ;Else reload the display timer...
        STAA    DspTmr

        LDAB    ItemStep
        INCB                      ; ...and advance to the next legend step
        CMPB    #5
        BLS     SaveNewOutsStep

        LDAB    #1                ; (after step 5, cycle back to step 1)

SaveNewOutsStep:
        STAB    ItemStep

OutsDspTmrDone:


;Update Digit Displays

; Left-side displays indicate we are on the Outputs Test step

        LDAB    #MsgOuts.
        LDX     #LDigits
        JSR     ShowMsg

; Now display the appropriate legend in the right-side displays...

        LDAB    ItemStep          ;Get the current sub step (typ 1..4)
        DECB                      ; Convert to 0-based (typ 0..3)
        ASLB                      ;Multiply by 4
        ASLB                      ;(4 bytes per message definition)

        LDX     #OutsLegends      ;Get address of the legends table above
        ABX                       ;Add offset to the appropriate message

        LDD     0,X               ;Get the first two characters
        STD     RDigits+0         ;Save into RDig1 and RDig2
        LDD     2,X               ;Get the other two characters
        STD     RDigits+2         ;Save into RDig3 and RDig4
        CLR     RDigLeds          ;Make sure the colon is turned off


;Update Leds

; Update the product leds to indicate which outputs are currently ON

        LDD     #0
        STD     TempWord6

AirHtLed:
        LDAA    IoByte
        BITA    #IoAirHt.
        BEQ     AirHtLedDone

        LDD     TempWord6
        ADDD    #ProdHtLed.
        STD     TempWord6
AirHtLedDone:

MotorLed:
        LDAA    IoByte
        BITA    #IoMotor.
        BEQ     MotorLedDone

        LDD     TempWord6
        ADDD    #ProdMLed.
        STD     TempWord6
MotorLedDone:

BlwrLed:
        LDAA    IoByte
        BITA    #IoBlwr.
        BEQ     BlwrLedDone

        LDD     TempWord6
        ADDD    #ProdBLed.
        STD     TempWord6
BlwrLedDone:


RadHtLed:
        LDAA    IoByte
        BITA    #IoRadHt.
        BEQ     RadHtLedDone

        LDD     TempWord6
        ADDD    #ProdRLed.
        STD     TempWord6
RadHtLedDone:

VentLed:
        LDAA    IoByte
        BITA    #IoVent.
        BEQ     VentLedDone

        LDD     TempWord6
        ADDD    #ProdVLed.
        STD     TempWord6
VentLedDone:

;>>>..................................................................
;
; CODE TO SUPPORT DICK'S UL/DLS TESTING

AutoCycleLed:
        LDAA    ItemStep          ;Are we on the "auto-cycling" step?
        CMPA    #7
        BNE     AutoLedDone

        LDAA    DspTmr            ;If so, is the 4 Hz bit in the ON phase?
        BITA    #Tmr4HzBit.
        BEQ     AutoLedDone

        LDD     TempWord6         ;If so, then turn the led ON
        ADDD    #ProdAutoLed.
        STD     TempWord6

AutoLedDone:
;>>>..................................................................

; Now update the actual product leds...

        LDD     TempWord6
        STD     ProdLeds$

; Also, keep all other leds OFF

        CLR     ModeLeds
;>>>    CLR     StatusLeds


;Handle Key Inputs

; Now handle the key inputs:
;  The SET key moves on to the next io test step.
;  The first 5 number keys toggle the 5 relay outputs.

        JSR     GetKey            ;Any new keys pressed?
        BNE     OutsWhatKey

        JMP     OutsKeyDone       ;If not, all done here...

OutsWhatKey:

OutsChkSet:
        CMPA    #KeySet.          ;Is it the SET key?
        BNE     OutsChk1

        LDAA    #99               ;If so, signal "Done with this test item"
        STAA    ItemStep          ;(code below will turn outputs off...)

        LDAA    #$FF              ; Also, start the "Exit Pending" operation
        STAA    ExitPending       ; in case user is trying to exit Program mode.
        CLR     ExitPendClk       ;  (user must Press and Hold to do exit)

        JMP     OutsKeyDone

OutsChk1:
        CMPA    #KeyNbr1.
        BNE     OutsChk2

        LDAA    IoByte
        EORA    #IoAirHt.
        STAA    IoByte

        LDAA    #1
        BRA     StartNewStep

OutsChk2:
        CMPA    #KeyNbr2.
        BNE     OutsChk3

        LDAA    IoByte
        EORA    #IoMotor.
        STAA    IoByte

        LDAA    #2
        BRA     StartNewStep
```

```
        LDAA    IoByte
        EORA    #IoBlwr.
        STAA    IoByte

        LDAA    #3
        BRA     StartNewStep

OutsChk4:
        CMPA    #KeyNbr4.
        BNE     OutsChk5

        LDAA    IoByte
        EORA    #IoRadHt.
        STAA    IoByte

        LDAA    #4
        BRA     StartNewStep

OutsChk5:
        CMPA    #KeyNbr5.
        BNE     OutsChk10

        LDAA    IoByte
        EORA    #IoVent.
        STAA    IoByte

        LDAA    #5
        BRA     StartNewStep

;---> For Dick's UL & OGL testing: ..........................................

OutsChk10:
        CMPA    #KeyNbr10.      ;The "0" key starts automatic cycling of
        BNE     OutsOtherKey    ; all outputs that are already on...

        LDAA    ItemStep        ;Are we already on step #7 auto-cycling?
        CMPA    #7
        BEQ     StopAutoCycle   ; If so, want to CANCEL the auto-cycling

StartAutoCycle:
        LDAB    IoByte          ;Get the current I/O outputs bits
        STAB    IoTestOutputs   ;Save into the "IoTestOutputs" variable

        LDAA    #7              ;Step "7" will be the automatic outputs
        STAA    ItemStep        ; cycling step...

        LDAB    #3*16
        STAB    DspTmr          ;Start the cycle timer for 3 seconds cycle

        BRA     OutsKeyDone

StopAutoCycle:                  ;CANCEL auto-cycling operation:
        LDAB    IoTestOutputs
        STAB    IoByte          ; - restore IoByte to value at start of auto

        LDAA    #1              ; - go back to normal legend cycling stuff
        STAA    ItemStep

        LDAB    #2*16           ;  (start out right away with 2 second steps)
        STAB    DspTmr

        BRA     OutsKeyDone

;;.........................................................................

StartNewStep:
        STAA    ItemStep        ;Save the new step number
        LDAA    #5*16
        STAA    DspTmr          ;Start a 5 second timer for the new step
        BRA     OutsKeyDone

OutsOtherKey:
        JSR     BadKeySound

;opt    BRA     OutsKeyDone

OutsKeyDone:


; Exit Outputs Test step: make sure we turn all outputs off...

OutsExit:
        LDAA    ItemStep        ;Get the current Item Step...
        CMPA    #99             ;Are we done with this test item?
        BLO     OutsExitDone

;YES -- we are leaving outputs test mode:

        LDAA    IoByte          ;Make sure all the outputs
        ANDA    #ZIoAirHt.      ; we dealt with are turned off
        ANDA    #ZIoMotor.
        ANDA    #ZIoBlwr.
        ANDA    #ZIoRadHt.
        ANDA    #ZIoVent.
        STAA    IoByte

        LDD     #0              ;And make sure the corresponding
        STD     ProdLeds$       ; Product Leds are turned off also

OutsExitDone:

;opt    BRA     OutsTestDone


OutsTestDone:

        RTS
```

```
; D o R t d T e s t   (Do RTD probe Test)  Subroutine
;
; This routine handles the RTD temperature probe testing and checkout.
; The displays normally show the current probe temperature, unless in the
; "Hi" or "Lo" range, or we have an "open" or "short" probe condition.
;
; If the "1" key is pressed and held, the current temperature probe
; offset value will be displayed.
;
;
;
; Input:  ItemStep
;
; Output: ItemStep
;
; Routines Called:
; Exit State:          [X] -- unchanged
;                      [A],[B],CCR -- indeterminate
;
;
;
;---------------------------------------------------------------------------

DoRtdTest:

; See if we just started this outputs test step

        LDAA    ItemStep
        BNE     RtdInitDone

        CLR     DspTmr          ;Only thing to do is reset the display timer
        INC     ItemStep

RtdInitDone:


;Update  Digit  Displays

; If the user is currently holding the "1" key, we override the display
; and show the current temperature offset value.

RtdChkHold:
        LDAB    #KeyNbr1.       ;Is it the "1" key?
        JSR     ChkKeyPressed
        BEQ     RtdRegDisplay   ;If key is not pressed, do regular display


; RTD OFFSET DISPLAY:

RtdOffsetDisplay:

        JSR     DispRtdOffset

        BRA     RtdDigitsDone


; REGULAR RTD TEMPERATURE DISPLAY:

RtdRegDisplay:

; Left-side displays indicate we are on the Rtd Prob test:

        LDAB    #MsgRtdTest.
        LDX     #LDigits
        JSR     ShowMsg


; Show the temperature value in the right side displays, unless OPEN or SHORT.
; The Display Tmp takes care of doing "Hi" or "Low", as appropriate.

        LDX     PrbErrAdFltr$   ;Get the error channel "raw" a-to-d value

ChkPrbShort:
        CPX     #RtdShortAd.    ;Compare to lower reasonable limit
        BHI     ChkPrbOpen      ;If Ad <= low limit, probe is shorted...

        LDAB    #MsgShort.      ;Get the "Shorted" message...
        BRA     RtdShowMsg      ; ...and display it in the right-side digits

ChkPrbOpen:
        CPX     #RtdOpenAd.     ;Else compare to upper reasonable limit
        BLO     RtdDoTmpDisp    ;If Ad >= high limit, probe is open...

        LDAB    #MsgOpen.       ;Get the "Open" message...
;opt    BRA     RtdShowMsg      ; ...and display it in the right-side digits

RtdShowMsg:
        LDX     #RDigits        ;Message code already in [B]
        JSR     ShowMsg         ; --> display it in the right-side digits

        BRA     RtdRegDone

RtdDoTmpDisp:                   ;If not OPEN or SHORTED...
        LDD     AirTmpF$
        LDX     #RDigits        ; ...do the regular temperature display
        JSR     DisplayTmp      ;(does F or C, takes care of Hi and Lo, etc)

;opt    BRA     RtdRegDone

RtdRegDone:


RtdDigitsDone:


; Also, keep all the discrete leds OFF

        LDD     #0
        STD     ProdLeds$
        STAB    ModeLeds
;>>>    STAB    StatusLeds
```

```
; Now handle the key input:
;  The SET key moves on to the next in test step.
;  All other keys are invalid

        JSR     GetKey          ;Any new keys pressed?
        BEQ     RtdKeyDone      ;(If no keys in the buffer, nothing to do)

RtdChkSet:
        CMPA    #KeySet.        ;Is it the SET key?
        BNE     RtdChk1

        LDAA    #99             ;If so, signal "Done with this test item"
        STAA    ItemStep        ;(code below will turn outputs off...)

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     RtdKeyDone

RtdChk1:
        CMPA    #KeyNbr1.       ;The "1" key is valid --
        BNE     RtdOtherKey     ; press and hold to see probe offset

        BRA     RtdKeyDone      ;(nothing here -- just make sure no beep-beep)

RtdOtherKeys:
        JSR     BadKeySound

;opt    BRA     RtdKeyDone

RtdKeyDone:


RtdTestDone:


        RTS



;--------------------------------------------------------------------------
;  D o A m b i e n t T e s t    (Do Ambient (Thermistor) Test)  Subroutine
;
;  This routine handles the thermistor control ambient temperature sensor
;  testing.   This step will display the control temperature value.
;
;  If the "0" key is pressed and held, the current temperature probe
;  offset value will be displayed.
;
;
;  Input:   ItemStep
;
;  Output:  ItemStep
;
;  Routines Called:
;  Exit State:          [X] -- unchanged
;                       [A],[B],CCR -- indeterminate
;
;
;
;  ------------------------------------      -----------------------------

DoAmbientTest:

; See if we just started this i/o test step

        LDAA    ItemStep
        BNE     AmbInitDone

        CLR     DispTmr         ;Only thing to do is reset the display timer
        INC     ItemStep

AmbInitDone:



;U p d a t e   D i g i t   D i s p l a y s

; If the user is currently holding the "1" key, we override the display
; and show the current temperature offset value.

AmbChkHeld:
        LDAB    #KeyNbr1.       ;Number "1" key to show max recorded ambient
        JSR     ChkKeyPressed
        BEQ     AmbRegDisplay   ;If key is not pressed, do regular display

; MAX RECORDED AMBIENT DISPLAY:

AmbMaxDisplay:

        LDAB    #MsgAmbientTest.+1      ;Display the "Hi-" message
        LDX     #LDigits                ;       in the left-side digits
        JSR     ShowMsg

; Now display the maximum recorded ambient temperature

        LDD     MaxCtrlAmbTmpF$
        JSR     DispAmbTmp

        BRA     AmbDigitsDone



; REGULAR AMBIENT TEMPERATURE DISPLAY:

AmbRegDisplay:

; Left-side displays indicate we are on the Ambient Temperature test:

        LDAB    #MsgAmbientTest.+0

; Show the temperature value in the right side displays, unless OPEN or SHORT.
; The Display Tmp takes care of doing "Hi" or "Low", as appropriate.

        LDD     CtrlAmbTmpF$
        JSR     DispAmbTmp

;opt    BRA     AmbDigitsDone

AmbDigitsDone:


; Also, keep all the discrete leds off

        LDD     #0
        STD     ProdLeds$
        STAB    ModeLeds
;>>>    STAB    StatusLeds



;H a n d l e   K e y   I n p u t s

; Now handle the key inputs
;  The SET key moves on to the next in test step.
;  All other keys are invalid

        JSR     GetKey          ;Any new keys pressed?
        BEQ     AmbKeyDone      ;(If no keys in the buffer, nothing to do)

AmbChkSet:
        CMPA    #KeySet.        ;Is it the SET key?
        BNE     AmbChk10

        LDAA    #99             ;If so, signal "Done with this test item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     AmbKeyDone

AmbChk10:
        CMPA    #KeyNbr10.      ;The "0" key (key code 10) is valid --
        BNE     AmbChk1         ; if max ambient displayed, reset it

        LDAB    #KeyNbr1.       ;Is the "1" key currently held down?
        JSR     ChkKeyPressed   ;  (press and hold "1" to show max rec amb)
        BEQ     Amb10Inv        ;If "1" key NOT already held, can't reset max

        LDD     #0              ;Else if "0" pressed while max displayed,
        STD     MaxCtrlAmbTmpF$ ; then zero-out the max recorded amb tmp

        LDX     #$FFFF          ;Sound a little beep here
        LDAB    #0              ; to show we did something
        JSR     StartBzr

        BRA     AmbKeyDone

Amb10Inv:                       ;If the "0" key is pressed when the "1"
        JSR     BadKeySound     ; key is NOT already held, ==> invalid

        BRA     AmbKeyDone      ;

AmbChk1:
        CMPA    #KeyNbr1.       ;The "1" key is valid --
        BNE     AmbOtherKey     ; press and hold to see max recorded ambient

        BRA     AmbKeyDone      ;(nothing here -- just make sure no beep-beep)

AmbOtherKey:
        JSR     BadKeySound

;opt    BRA     AmbKeyDone

AmbKeyDone:


AmbTestDone:


        RTS



;--------------------------------------------------------------------------
;  D o C t r l D o o r T e s t    (Do Control-side Door Test)  Subroutine
;
;  This routine displays the raw and the debounced open/closed status of
;  the door input switch on the control-side of the rotisserie.
;
;
;  Input:   ItemStep
;
;  Output:  ItemStep
;
;  Routines Called:
;  Exit State:          [X] -- unchanged
;                       [A],[B],CCR -- indeterminate
;
;
;
;---------------      ----------------------      ---------------------------

CtrlDoorSeq:    .byte   'R', 22, MsgCtrlDoor., 20, MsgCtrlDoor.+1
                .byte   0, MsgBlanks., 0


DoCtrlDoorTest:

; See if we just started this outputs test step
```

```
        CLR     DspTmr          ;Only thing to do is reset the display timer
        INC     ItemStep

CtrlDoorInitDone:


;Update Digit Displays

; Left-side displays indicate we are on the "Ctrl Door"

        LDD     #LDigits
        LDX     #CtrlDoorSeq
        JSR     ShowMsgSeq


; Show the raw input switch status in RDig1

        CLRB                    ;Assume door input is "0" -- door switch closed

        LDAA    ShRegInput+0    ;Get the current shift register input byte
        BITA    #BitCtrlDoor.   ;Test the control-side door input
        BEQ     SaveCtrlDoor    ; If bit = "0", we're ready to save into Dig1

        LDAB    #1              ; Else we need to change digit to "1"

SaveCtrlDoor:
        STAB    RDig1           ;Save "0" or "1" into display digit 1

; RDig2 is always blank.  We want the colons ON.

        LDAB    #Char.Blank.    ;Second digit is always blank
        STAB    RDig2

        LDAB    #ColonLeds.     ;Turn the colons ON to separate "raw/debounced"
        STAB    RDigLeds


; Now display the debounced (smoothed) door open/closed status flag
;   in digits RDig3 and RDig4

        LDAA    #Char.C.        ;Assume the door is currently "Closed"
        LDAB    #Char.L.

        TST     CtrlDoorOpen    ;If CtrlDoorOpen = "0"...
        BEQ     SaveCtrlDBncd   ; ...we're right -- the door is Closed

        LDAA    #Char.O.
        LDAB    #Char.P.        ;Else change the display to show "OPen"

SaveCtrlDBncd:
        STD     RDig3           ;Save two chars into RDig3 & RDig4


; Also, keep all the discrete leds OFF

        LDD     #0
        STD     ProdLeds5
        STAB    ModeLeds
;>>>    STAB    StatusLeds


;Handle Key Inputs

; Now handle the key input:
;   The SET key moves on to the next to test step.
;   All other keys are invalid

        JSR     GetKey          ;Any new keys pressed?
        BEQ     CtrlKeyDone     ;(If no keys in the buffer, nothing to do)

CtrlChkSet:
        CMPA    #KeySet.        ;Is it the SET key?
        BNE     CtrlOtherKey

        LDAA    #99             ;If so, signal "Done with this test item"
        STAA    ItemStep        ;(code below will turn outputs off...)

        LDAA    #OFF            ; Also, start the "Exit Pending" operation
        STAA    ExitPending     ; in case user is trying to exit Program mode.
        CLR     ExitPendClk     ;  (user must Press and Hold to do exit)

        BRA     CtrlKeyDone

CtrlOtherKey:
        JSR     BadKeySound

;opt    BRA     CtrlKeyDone

CtrlKeyDone:


CtrlDoorTestDone:

        RTS

;-----------------------------------------------------------------------
; DoCustDoorTest   (Do Customer-side Door Test)  Subroutine
;
; This routine displays the raw and the debounced open/closed status of
; the door input switch on the customer-side of the rotisserie.
;
;
; Input:  ItemStep
;
; Output: ItemStep
;
; Routines Called:
; Exit State:           [X] -- unchanged
;                       [A],[B],CCR -- indeterminate
```

```
;-----------------------------------------------------------------------

CustDoorSeq:    .byte   "R", 28, MsgCustDoor., 28, MsgCustDoor.+1
                .byte   0, MsgBlanks., 0

DoCustDoorTest:

; See if we just started this outputs test step

        LDAA    ItemStep
        BNE     CustDoorInitDone

        CLR     DspTmr          ;Only thing to do is reset the display timer
        INC     ItemStep

CustDoorInitDone:


;Update Digit Displays

; Left-side displays indicate we are on the "Customer Door"

        LDD     #LDigits
        LDX     #CustDoorSeq
        JSR     ShowMsgSeq


; Show the raw input switch status in RDig1

        CLRB                    ;Assume door input is "0" -- door switch closed

        LDAA    ShRegInput+0    ;Get the current shift register input byte
        BITA    #BitCustDoor.   ;Test the customer-side door input
        BEQ     SaveCustDoor    ; If bit = "0", we're ready to save into Dig1

        LDAB    #1              ; Else we need to change digit to "1"

SaveCustDoor:
        STAB    RDig1           ;Save "0" or "1" into display digit 1

; RDig2 is always blank.  We want the colons ON.

        LDAB    #Char.Blank.    ;Second digit is always blank
        STAB    RDig2

        LDAB    #ColonLeds.     ;Turn the colons ON to separate "raw/debounced"
        STAB    RDigLeds


; Now display the debounced (smoothed) door open/closed status flag
;   in digits RDig3 and RDig4

        LDAA    #Char.C.        ;Assume the door is currently "Closed"
        LDAB    #Char.L.

        TST     CustDoorOpen    ;If CustDoorOpen = "0"...
        BEQ     SaveCustDBncd   ; ...we're right -- the door is Closed

        LDAA    #Char.O.
        LDAB    #Char.P.        ;Else change the display to show "OPen"

SaveCustDBncd:
        STD     RDig3           ;Save two chars into RDig3 & RDig4


; Also, keep all the discrete leds OFF

        LDD     #0
        STD     ProdLeds5
        STAB    ModeLeds
;>>>    STAB    StatusLeds


;Handle Key Inputs

; Now handle the key input:
;   The SET key moves on to the next to test step.
;   All other keys are invalid

        JSR     GetKey          ;Any new keys pressed?
        BEQ     CustKeyDone     ;(If no keys in the buffer, nothing to do)

CustChkSet:
        CMPA    #KeySet.        ;Is it the SET key?
        BNE     CustOtherKey

        LDAA    #99             ;If so, signal "Done with this test item"
        STAA    ItemStep        ;(code below will turn outputs off...)

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     CustKeyDone

CustOtherKey:
        JSR     BadKeySound

;opt    BRA     CustKeyDone

CustKeyDone:


CustDoorTestDone:

        RTS
```

```
;------------------------------------------------------------------------
: D o L e d s T e s t   (Do Leds Test)  Subroutine
;
;  This routine performs the leds testing operations, whereby the user
;  is given direct ON/OFF control of the various groups of leds.
;
;
;  Input:   ItemStep
;
;  Output:  ItemStep
;
;  Routines Called:
;  Exit State:         [X] -- unchanged
;                      [A],[B],CCR -- indeterminate
;
;
;
;------------------------------------------------------------------------

; The LedsCharTbl gives the actual sequence of characters that should be
; displayed for the digit test sequence.

LedsCharTbl:    .byte   1,2,3,4,5,6,7,8,9,0
                .byte   Char.A., Char.b., Char.c., Char.d.
                .byte   Char.e., Char.f., Char.g.
                .byte   Char.Blank.

CharTblSz.      .equ    $-LedsCharTbl


; This digit table gives the addresses of the digit display variables which
; correspond to ItemStep values 1..8 -- the digit display tests.
; Step 0 is included in this table in order to allow indexing
; directly by the ItemStep value -- Step 0 is never really accessed.

LedsDigMapTbl:  .word   0
                .word   LDig1, LDig2, LDig3, LDig4
                .word   RDig1, RDig2, RDig3, RDig4



; - - - - - - Code starts here: - - - - -

DoLedsTest:

; See if we just started this leds test step

        LDAA    ItemStep
        BNE     LedsInitDone

        LDAA    #9              ;Select the individual leds step
        STAA    ItemStep        ; to start out on...
        CLR     ItemSubStep

LedsInitDone:




;U p d a t e   D i g i t   D i s p l a y s

; If the "*" button is held down, we override by turning ALL displays on.

        LDAB    #KeyAsterisk.   ;Is the "*" key currently held down?
        JSR     ChkKeyPressed
        BNE     LedsAllOnDisplay ; If so, override -- all displays on

; Else the "ItemStep" indicates the output we are currently dealing with:
;   Step 1..8 ==>  Digits 1..8 display the current digit test character
;   Step  9   ==>  Discrete leds

        LDAB    ItemStep        ;Else leds test step #9 is the
        CMPB    #9              ; discrete leds test (individual leds lit)
        BEQ     LedsIndivDisplay

        CMPB    #8              ;If > 8...  (what else could it be???)
        BHI     LedsLegendsOnly ; ...we aren't doing a digit display step

                                ;If step = 1..8, we ARE on digit test:
        LDAB    DspTmr          ; BUT... if the Display timer has expired
        BEQ     LedsLegendsOnly ;         then return to the legends display

        BRA     LedsDigTestDisplay ;Else (Step = 1..8) and (DspTmr > 0):
                                ;   ==> show digit test display


;L e d s L e g e n d s O n l y

LedsLegendsOnly:

        LDAB    #MsgLeds.
        LDX     #LDigits
        JSR     ShowMsg

        LDAB    #MsgTest.
        LDX     #RDigits
        JSR     ShowMsg

        CLRB
        STAB    ModeLeds
        STAB    StatusLeds
        STAB    ProdLeds$+0
        STAB    ProdLeds$+1

        JMP     LedsDispDone

;L e d s A l l O n
;
;_Override display by turning EVERYTHING on.

LedsAllOnDisplay:

        LDD     #$8888          ;Load "88"
        STD     LDig1           ;Save into LDig1 & LDig2
        STD     LDig3           ;Save into LDig3 & LDig4
```

```
        LDAB    #ColonLeds.     ;Turn on all the colon leds
        STAB    LDigLeds
        STAB    RDigLeds

        LDAB    #$FF            ;Turn on ALL discrete leds
        STAB    ModeLeds
        STAB    StatusLeds
        STAB    ProdLeds$+0
        STAB    ProdLeds$+1

        JMP     LedsDispDone


;L e d s I n d i v D i s p l a y
;
; The discrete leds are sequenced individually,
; based on the value of the ItemSubStep.

LedsIndivDisplay:

        LDAB    #MsgLeds.
        LDX     #LDigits
        JSR     ShowMsg

        LDAB    #MsgTest.
        LDX     #RDigits
        JSR     ShowMsg

        LDAB    ItemSubStep     ;Get the current led seq step
        JSR     ShowLedsSeq     ; ...and display that one individual led

        BRA     LedsDispDone


;L e d s D i g T e s t D i s p l a y
;
; Pressing keys 1..8 cause numbers to be displayed in digits 1..8.
; ItemStep keeps track of the current digit, and ItemSubStep indicates
; the character currently displayed.
;
; When a number key 1..8 is pressed:
;
;   - If the key matches the currently selected digit (ItemStep),
;       the current display character (ItemSubStep) is incremented.
;
;   - If the key DOES NOT match the current digit (ItemStep), then the new
;       digit is selected and the display character (ItemSubStep) is reset.
;
;   - The DspTmr (display timer) is reloaded with a new count.
;       The DspTmr is kept "stuffed full" for as long as the key is held
;       down, so the digit test display will always persist for "N"
;       seconds after the key is released.
;

LedsDigTestDisplay:




;opt    LDAA    ItemStep        ;Is the key matching item step pressed?
        JSR     ChkKeyPressed
        BEQ     LedsKeyHeldDone ; If not still held, let DspTmr run down...

        LDAB    #2*16           ;Else keep the display timer stuffed full
        STAB    DspTmr

LedsKeyHeldDone:


; Get the current digit test display character from the table above
; (indexed by ItemSubStep)

        LDX     #LedsCharTbl    ;Get the address of the digits table
        LDAB    ItemSubStep     ;Get the "sub-step" index
        ABX                     ;Add offset -- [X] points to current disp char
        LDAB    0,X             ;Get the actual display character into [B]

        PSHB                    ; +[Save the display character on the stack]

; Now get a pointer to the digit that matches the current ItemStep

        LDX     #LedsDigMapTbl  ;Get the address of the digit addresses table
        LDAB    ItemStep        ;Get the digit number, 1..8
        ABX                     ;Add the offset value to the table address
        ABX                     ; (two bytes per table entry)
        LDX     0,X             ;Get the pointer to the actual digit variable

; At this point, [X] points to a digit variable (LDig1, LDig2, etc)
; and [B] holds the character we want to display there.  All other displays
; should be blank.  Easiest way to do this is to disable interrupts
; for a moment (so no hardware display updates can occur), blank out all
; 8 display digits, then store the character in [B] into the digit
; pointed to by [X].

        SEI                     ;/// Disable interrupts for a moment

        LDD     #Char.Blank.*256+Char.Blank.
        STD     LDig1
        STD     LDig3           ;Blank all 8 characters
        STD     RDig1
        STD     RDig3

        PULB                    ; -[Retrieve the display char from the stack]

        STAB    0,X             ;Put the next digit test character into
                                ; the digit pointed to by [X]

        CLI                     ;/// Enable interrupts once again

; Now-make sure all the discrete leds are turned off...

        CLRB
        STAB    LDigLeds
        STAB    RDigLeds
        STAB    ModeLeds
        STAB    StatusLeds
        STAB    ProdLeds$+0
        STAB    ProdLeds$+1
```

```
.. HDispDone:


;Key Input

        JSR     GetKey
        BEQ     LedsKeyDone

; SET key -- moves on to next I-O Test Item

LedsChkSet:
        CMPA    #KeySet.
        BNE     LedsChk1To8

        LDAA    #99             ; If so, signal "Done with this test item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     LedsKeyDone


; NUMBER KEYS 1..8 -- perform digit test steps

LedsChk1To8:
        CMPA    #KeyNbr9.
        BHI     LedsChk9

        LDAB    #8              ;Reload the display timer...
        STAB    DspTmr


        CMPA    ItemStep        ;Is this key the same as current digit?
        BNE     LedsNewDig

; If same key as already selected digit, increment the display character

LedsNextChar:
        INC     ItemSubStep     ;Advance the display character index

        LDAB    ItemSubStep     ;Cycle from 0..TblSz-1
        CMPB    #CharTblSz.-1
        BLS     LedsKeyDone

        CLR     ItemSubStep     ;(If past end of table, reset to start)

        BRA     LedsKeyDone

; IF NOT same key as already selected digit, go to new digit & reset character

LedsNewDig:




        STAA    ItemStep        ;New digit number is same as key (1..8)

        CLR     ItemSubStep     ;Start out displaying the first character

        BRA     LedsKeyDone


; NUMBER 9 key -- perform individual leds testing

LedsChk9:
        CMPA    #KeyNbr9.
        BNE     LedsKeyOther

        CMPA    ItemStep        ;Are we already on the individual leds step?
        BNE     LedsNewIndivStep

; If same key as already selected digit, increment the display character

LedsNextLed:
        INC     ItemSubStep     ;Already on the "individual leds" step

        LDAB    ItemSubStep     ;Advance to the next led in the sequence
        CMPB    #MaxLedsSeq.
        BLS     LedsKeyDone     ;If past the last led sequence step...

        LDAB    #0
        STAB    ItemSubStep     ; ...then return to the first sequence step

        BRA     LedsKeyDone

; If NOT same key as already selected digit, go to new digit & reset character

LedsNewIndivStep:
        STAA    ItemStep        ;Save the new ItemStep (to set ItemStep = 9)

        LDAB    #1              ;Start out on step 1 of the led sequence
        STAB    ItemSubStep     ; (sequence step 0 is "all leds off" step)

        BRA     LedsKeyDone


LedsKeyOther:


LedsKeyDone:


        RTS



;-----------------------------------------------------------------------------
;  D o K e y T e s t   (Do Key Inputs Test)  Subroutine
;
;  This routine uses the discrete leds to indicate the low-level (raw) input
;  status of the display board keys (pushbuttons).
;
;
;  Input:   ItemStep
;  Routines Called:
;  Exit State:          [X] -- unchanged
;                       [A],[B],CCR -- indeterminate
;
;
;
;
;-----------------------------------------------------------------------------

DoKeysTest:

; See if we just started this outputs test step

        LDAA    ItemStep
        BNE     KeyInitDone

        INC     ItemStep

KeyInitDone:



;Update Digit Displays

; Digit displays indicate we are on the "PUSH BTNS" test step

        LDX     #LDigits
        LDAB    #MsgPushBtns.
        JSR     ShowMsg

        LDX     #RDigits
        LDAB    #MsgPushBtns.+1
        JSR     ShowMsg



;Update Discrete Leds

; The discrete leds are lit according to the raw input status of
; corresponding key inputs.

; First of all, copy the raw switch status bytes into TempWord$.
; The first 10 bits correspond to number keys 1..9, 0.
; Product leds 1..9 are defined in ProdLeds$+0 (not in order, though).
; Product leds 9 & 10 are defined in ProdLeds$+1

        LDD     KeyInp$         ;Get the raw key inputs bits...
        STD     TempWord$       ; ...and copy into TempWord$

        LDX     #0              ;Start out with no tone requested


; First group of keys indicated via the Product leds

        LDD     #0000           ;Start with no Prod Leds on in [D]

        LSL     TempWord$+0     ;Work with the LSB byte first --
        BCC     Key1Done        ; key codes 1..8, in order MSB..LSB




        ADDD    #Prod1Led.
        LDX     #Tone.A3.
Key1Done:

        LSL     TempWord$+0
        BCC     Key2Done
        ADDD    #Prod2Led.
        LDX     #Tone.B3.
Key2Done:

        LSL     TempWord$+0
        BCC     Key3Done
        ADDD    #Prod3Led.
        LDX     #Tone.C3.
Key3Done:

        LSL     TempWord$+0
        BCC     Key4Done
        ADDD    #Prod4Led.
        LDX     #Tone.D3.
Key4Done:

        LSL     TempWord$+0
        BCC     Key5Done
        ADDD    #Prod5Led.
        LDX     #Tone.E3.
Key5Done:

        LSL     TempWord$+0
        BCC     Key6Done
        ADDD    #Prod6Led.
        LDX     #Tone.F3.
Key6Done:

        LSL     TempWord$+0
        BCC     Key7Done
        ADDD    #Prod7Led.
        LDX     #Tone.G3.
Key7Done:

        LSL     TempWord$+0
        BCC     Key8Done
        ADDD    #Prod8Led.
        LDX     #Tone.A4.
Key8Done:

        LSL     TempWord$+1     ;Now doing key codes 9..10
        BCC     Key9Done
        ADDD    #Prod9Led.
        LDX     #Tone.B4.
Key9Done:

        LSL     TempWord$+1
        BCC     Key10Done
        ADDD    #Prod10Led.
        LDX     #Tone.C4.
Key10Done:

        STD     ProdLeds$       ;Save the product leds value
```

```
;   START/STOP is indicated with the SEAR led (top left corner of board).

        CLRB                    ;Start with all Mode leds off

        LSL     TempWord$+1     ;Key Code 11 = "SET" key
        BCC     Key11Done
        ORAB    #SetLed.        ; ==> indicate with the SET led
Key11Done:

        LSL     TempWord$+1     ;Key Code 12 = "START/STOP" key
        BCC     Key12Done
        ORAB    #SearLed.       ; ==> indicate with nearest led: SEAR led
Key12Done:

        STAB    ModeLeds        ;Save the Mode leds value


; At this point, no keys are associated with the "Status" leds

;>>>    CLR     StatusLeds

;>>>
; Now set the speaker tone and request...

        STX     TempWord$       ;Save tone request, if any, into TempWord$
        BEQ     ToneDone        ;If [X] = 0, no tone requested

        LDAA    #$FF            ;Else Request the speaker ON
        STAA    SpkrReq
        LDAB    TempWord$+1     ;Set the appropriate Tone value ([X].Lo byte)
        STAB    SpkrReqTone     ; (we'll use the default volume level)
ToneDone:
;>>>


;Handle  Key  Inputs

; Now handle the key input:
;   The SET key moves on to the next io test step.
;   All other keys are ignored (may be pressed to light leds...)

        JSR     GetKey          ;Any new keys pressed?
        BEQ     KeyKeyDone      ;(If no keys in the buffer, nothing to do)

KeyChkSet:
        CMPA    #KeySet.        ;Is it the SET key?
        BNE     KeyOtherKey

        LDAA    #99             ;If so, signal "Done with this test item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     KeyKeyDone



KeyOtherKey:                    ;No Beep-Beep for other keys...

;opt    BRA     KeyKeyDone      ; ...user is allowed to press any key for test


KeyKeyDone:


KeysTestDone:


        RTS



;------------------------------------------------------------------------
; R e s e t H o u r s P a r m   (Reset Hours Parameter)  Macro
;
;  This routine simply resets to 0 the "hours log" associated with the
;  key currently held down (ie keys 1..5 are associated with hours values).
;  The current item number is passed here in the [B] register.
;
;  Each hours log value is constructed of two double-byte counters:
;  XxxLog16$ and XxxLogHr$.  The XxxLog16$ variable counts 1/16ths of seconds,
;  up to 57600 ( = 1 hour).  The XxxLogHr$ variable counts hours, up to 65535
;  (approx 7-1/2 years).
;
;  The XxxLog16$ bytes are always allocated directly before XxxLogHr$.
;
;  Input:  [B] -- currently selected Hour item number (1..5) (corresp to table)
;
;  Output: associated XxxLog16$ and XxxLogHr$ words are reset to 0000
;
;  Routines Called:
;  Exit State:          [A],[B],[X],CCR -- indeterminate
;
;
;
;------------------------------------------------------------------------

ResetHoursParm: .macro

; Parameter number (1..5) is passed here in [B]

        LDX     #HoursParmTbl   ;Get address of the log parameters table
        ABX                     ;Add offset (two bytes per table entry)
        ABX                     ;[X] points to address of corresp log parm

        LDX     0,X             ;[X] now points to the actual parameter

        CLR     0,X             ;Clear all 4 bytes of log pointed to by [X]
        CLR     1,X             ;  XxxLog16$ is at [X]+0,+1
        CLR     2,X             ;  XxxLogHr$ is at [X]+2,+3
        CLR     3,X

        .endm


;------------------------------------------------------------------------
; D o H o u r s L o g   (Do Hours Log)  Subroutine
;
;  This routine provides the ability to view and reset the "hours log"
;  variables.  These variables basically log power-on time, rotor hours,
;  blower hours, air-heater hours, and radiant heater hours.
;
;
;  Input:  ItemStep
;
;  Output: ItemStep
;
;  Routines Called:
;  Exit State:          [X] -- unchanged
;                       [A],[B],CCR -- indeterminate
;
;
;
;------------------------------------------------------------------------

; This table lists the hours logging parameter associated with each key.
; The code below will use ItemStep to indicate which key (1..5) is pressed.
; Note that each hours logging parameter consists of 2 double-byte variables:
;    XxxLog16$, which counts 1/16ths of seconds (0..57600 -- 1 hour)
;    XxxLogHr$, which counts hours (0..65535, approx 7-1/2 years)

HoursParmTbl:
        .word   TempWord$       ;0 (ItemStep can't be 0 still)
        .word   AirHtLog16$     ;1 -- Air Heat hours
        .word   RotorLog16$     ;2 -- Rotor hours
        .word   BlwrLog16$      ;3 -- Blower hours
        .word   RadHtLog16$     ;4 -- Radiant heat hours
        .word   VentLog16$      ;5 -- Vent hours
        .word   PwrOnLog16$     ;6 -- Power On hours



DoHoursLog:

; See if we just started this i/o test step

        LDAA    ItemStep
        BNE     HrsInitDone

        LDAA    #7
        STAA    ItemStep        ;Advance to hours step #6 -- regular disp

HrsInitDone:


; Find the first key from 1..5 currently being pressed, set ItemStep to



; that number, and then display the corresponding hours value.
; If none of keys 1..5 is pressed, set ItemStep to "6" and do normal display.

        LDAA    #1              ;Assume we'll see key number 1 pressed...
        STAA    ItemStep
        LDAB    #KeyNbr1.       ;Is key number 1 actually held down?
        JSR     ChkKeyPressed
        BNE     GotHrsParm      ; ...if so, display the corresp hours value

        INC     ItemStep        ;Else assume we'll see number 2 is pressed...
        LDAB    #KeyNbr2.
        JSR     ChkKeyPressed   ; ...is it?
        BNE     GotHrsParm

        INC     ItemStep        ;Else assume we'll see number 3 is pressed...
        LDAB    #KeyNbr3.
        JSR     ChkKeyPressed   ; ...is it?
        BNE     GotHrsParm

        INC     ItemStep        ;Else assume we'll see number 4 is pressed...
        LDAB    #KeyNbr4.
        JSR     ChkKeyPressed   ; ...is it?
        BNE     GotHrsParm

        INC     ItemStep        ;Else assume we'll see number 5 is pressed...
        LDAB    #KeyNbr5.
        JSR     ChkKeyPressed   ; ...is it?
        BNE     GotHrsParm

        INC     ItemStep        ;Else assume we'll see number 6 is pressed...
        LDAB    #KeyNbr6.
        JSR     ChkKeyPressed   ; ...is it?
        BNE     GotHrsParm

;Regular  Hours  display

HrsRegDisp:

        INC     ItemStep        ;Else set ItemStep to 6 to indicate no parm
                                ; currently selected or viewed.

; Display "Hour"  "Log" in the digital displays

        LDAB    #MsgHrsLog.+0
        LDX     #LDigits
        JSR     ShowMsg

        LDAB    #MsgHrsLog.+1
        LDX     #RDigits
        JSR     ShowMsg

        BRA     HrsDigitsDone


;Hours  Parm  display

; This takes care of items that need to display an hours tally

GotHrsParm:
```

```
        JSR     ShowHrs

; Now look up the pointer to the hours parm that corresponds to ItemStep nbr

        LDX     #HoursParmTbl   ;Get address of the log parameters table
        LDAB    ItemStep        ;Get the item number (1..5)
        ABX                     ;Add offset (two bytes per table entry)
        ABX                     ;[X] points to address of corresp log parm

        LDX     0,X             ;[X] now points to the actual log variables

        LDD     2,X             ;Get the HOURS count value (second dbl-byte)
                                ;(X+0,X+1 are XxxLog100; X+2,X+3 are XxxLog000)
;***
; -> We really need "5 digit" display routine here, up to 65,535

        SEC                     ;We do want leading zero blanking
        JSR     BinToBcdDig     ;Convert to 4 displayable digits
        STX     RDig1
        STD     RDig3           ;Display up to 9999 in the right side digits

        CLR     RDigLeds
;***

;*** BRA    HrsDigitsDone

HrsDigitsDone:


; Also, keep all the discrete leds OFF

        LDD     #0
        STD     ProdLeds5
        STAA    ModeLeds
        STAB    StatusLeds


; H a n d l e   K e y   I n p u t s

; Now handle the key inputs:
;   The SET key moves on to the next in test step.
;   All other keys are invalid

        JSR     GetKey          ;Any new keys pressed?
        BEQ     HrsKeyDone      ;(If no keys in the buffer, nothing to do)

HrsChk123456:                   ;Number keys "1", "2", "3", "4", "5", & "6"
        CMPA    #KeyNbr6.       ; are all valid "press and hold" keys,
        BLS     HrsKeyDone      ; so we need to make sure we don't sound
                                ; the "beep-beep" when they are pressed


HrsChkSet:
        CMPA    #KeySet.        ;Is it the SET key?
        BNE     HrsChk0

        LDAA    #99             ;If so, signal "Done with this test item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     HrsKeyDone


HrsChk0:                        ;If "0" (key code 10) is pressed when
        CMPA    #KeyNbr10.      ; "1".."6" is already held, perform the
        BNE     HrsOtherKey     ; "reset hours log parm" operation

        LDAB    ItemStep        ;Are we displaying a parameter (1..6)?
        CMPB    #6              ; (note -- ItemStep can't be 0 anymore...)
        BHI     Hrs0Invalid
                                ;If an item 1..6 is currently selected...
        ResetHoursParm          ; ...Reset the currently displayed hours count
                                ; (item number 1..6 passed in [B])
        BRA     HrsKeyDone

Hrs0Invalid:                    ;If none of 1..6 is currently held...
        JSR     BadKeySound     ; ...then the "0" key is invalid

        BRA     HrsKeyDone


HrsOtherKey:                    ;Else other keys are invalid...
        JSR     BadKeySound

;opt    BRA     HrsKeyDone

HrsKeyDone:


HrsLogDone:

        RTS


;-------------------------------------------------------------------------
; R e s e t C n t s P a r m   (Reset Counts Parameter) Macro
;
;  This routine simply resets to 0 the counter associated with the
;  key currently held down (ie keys 1..5 are associated with hours values).
;  The current item number is passed here in the [B] register.
;
;  Inputs  [B] -- currently selected Hour item number (1..5) (corresp to table)
;
;  Output: associated XxxCntS is reset to 0000
;
;  Routines Called:
;  Exit State:          [A],[B],[X],CCR -- indeterminate
;
;
;
;-------------------------------------------------------------------------

ResetCntsParm .macro

; Parameter number (1..5) is passed here in [B]

        LDX     #CountsParmTbl  ;Get address of the log parameters table
        ABX                     ;Add offset (two bytes per table entry)
        ABX                     ;[X] points to address of corresp log parm

        LDX     0,X             ;[X] now points to the actual parameter

        CLR     0,X             ;Clear both bytes of count pointed to by [X]
        CLR     1,X             ;  XxxCntS is at [X]+0,+1

        LDAA    #4              ;Sound a short beep here to
        LDX     #$FFFF          ; indicate that we did something
        JSR     StartBzr

        .endm


;-------------------------------------------------------------------------
; D o C o u n t s L o g   (Do Counts Log)  Subroutine
;
;  This routine provides the ability to view and reset the "counts log"
;  variables.  These variables basically count the number of system
;  power-up's, system resets, etc.
;
;  Input:  ItemStep
;
;  Output: ItemStep
;
;  Routines Called:
;  Exit State:          [X] -- unchanged
;                       [A],[B],CCR -- indeterminate
;
;
;
;-------------------------------------------------------------------------

; This table lists the counts logging parameter associated with each key.
; The code below will use ItemStep to indicate which key (1..5) is pressed.
; Note that each hours logging parameter consists of a double-byte variable:

CountsParmTbl:
        .word   TempWord0       ;0 (ItemStep can't be 0 still?)
        .word   SysInitCntS     ;1 -- number of "total system inits"
        .word   UserInitCntS    ;2 -- number of user-requested inits
        .word   Data1FixCntS    ;3 -- number of times data area1 auto-fixed
        .word   Data2FixCntS    ;4 -- number of times data area2 auto-fixed
        .word   PwrOnCntS       ;5 -- number of times powered up

DoCountsLog:

; See if we just started this i/o test step

        LDAA    ItemStep
        BNE     CntsInitDone

        LDAA    #6
        STAA    ItemStep        ;Advance to Hours step #6 -- regular disp

CntsInitDone:

; Find the first key from 1..5 currently being pressed, set ItemStep to
; that number, and then display the corresponding hours value.
; If none of keys 1..5 is pressed, set ItemStep to "6" and do normal display.

        LDAA    #1              ;Assume we'll see key number 1 pressed...
        STAA    ItemStep
        LDAB    #KeyNbr1.       ;Is key number 1 actually held down?
        JSR     ChkKeyPressed
        BNE     GetCntsParm     ; ...if so, display the corresp count value

        INC     ItemStep        ;Else assume we'll see number 2 is pressed...
        LDAB    #KeyNbr2.
        JSR     ChkKeyPressed   ; ...is it?
        BNE     GetCntsParm

        INC     ItemStep        ;Else assume we'll see number 3 is pressed...
        LDAB    #KeyNbr3.
        JSR     ChkKeyPressed   ; ...is it?
        BNE     GetCntsParm

        INC     ItemStep        ;Else assume we'll see number 4 is pressed...
        LDAB    #KeyNbr4.
        JSR     ChkKeyPressed   ; ...is it?
        BNE     GetCntsParm

        INC     ItemStep        ;Else assume we'll see number 5 is pressed...
        LDAB    #KeyNbr5.
        JSR     ChkKeyPressed   ; ...is it?
        BNE     GetCntsParm


; R e g u l a r   H o u r s   d i s p l a y

CntsRegDisp:

        INC     ItemStep        ;Else set ItemStep to 6 to indicate no parm
                                ; currently selected or viewed.

; Display "Hour"  "Log" in the digital displays
```

```
        LDAB    #MsgCntsLog.+1
        LDX     #RDigits
        JSR     ShowMsg

        BRA     CntsDigitsDone

; C o u n t s   P a r m   d i s p l a y

; This takes care of items that need to display a count tally

CntsParm:
        LDX     #LDigits        ;Display the appropriate legend in left digits
        LDAB    #MsgCntsLog.+1
        ADDB    ItemStep        ; (Item #1 is MsgCntsLog+2, etc)
        JSR     ShowMsg

; Now look up the pointer to the hours parm that corresponds to ItemStep nbr

        LDX     #CountsParmTbl  ;Get address of the log parameters table
        LDAB    ItemStep        ;Get the item number (1..5)
        ABX                     ;Add offset (two bytes per table entry)
        ABX                     ;[X] points to address of corresp log parm

        LDX     0,X             ;[X] now points to the actual log variables

        LDD     0,X             ;Get the HOURS count value (second dbl-byte)
                                ;(X+0,X+1 are XxxLog16B; X+2,X+3 are XxxLogged)
;***
;  -> We really need "5 digit" display routine here, up to 65,536

        SEC                     ;We DO want leading zero blanking
        JSR     BinToBcd4Dig    ;Convert to 4 displayable digits
        STX     RDig1
        STD     RDig3           ;Display up to 9999 in the right side digits

        CLR     RDigLeds
; **

;*nt    BRA     CntsDigitsDone

CntsDigitsDone:



; Also, keep all the discrete leds off

        LDD     #0
        STD     ProdLeds5
        STAB    MenuLeds
;***    STAB    StatusLeds




; H a n d l e   K e y   I n p u t s

; Now Handle the key inputs:
;   The SET key moves on to the next io test step.
;   All other keys are invalid

        JSR     GetKey          ;Any new keys pressed?
        BEQ     CntsKeyDone     ;(If no keys in the buffer, nothing to do)

CntsChk12345:                   ;Number keys "1", "2", "3", "4", and "5"
        CMPA    #KeyNbrs.       ; are all valid "press and hold" keys,
        BLS     CntsKeyDone     ; so we need to make sure we don't sound
                                ; the "beep-beep" when they are pressed


CntsChkSet:
        CMPA    #KeySet.        ;Is it the SET key?
        BNE     CntsChk0

        LDAA    #99             ;If so, signal "Done with this test item"
        STAA    ItemStep

        LDAA    #$FF            ; Also, start the "Exit Pending" operation
        STAA    ExitPending     ; in case user is trying to exit Program mode.
        CLR     ExitPendClk     ;  (user must Press and Hold to do exit)

        BRA     CntsKeyDone



CntsChk0:                       ;If "0" (key code 10) is pressed when
        CMPA    #KeyNbr10.      ; "1".."5" is already held, perform the
        BNE     CntsOtherKey    ; "reset hours log parm" operation

        LDAB    ItemStep        ;Are we displaying a parameter (1..5)?
        CMPB    #5              ; (note -- ItemStep can't be 0 anymore...)
        BHI     Cnts0Invalid
                                ;If an item 1..5 is currently selected...
        ResetCntsParm           ; ...Reset the currently displayed hours count
                                ; (Item number 1..5 passed in [B])
        BRA     CntsKeyDone

Cnts0Invalid:                   ;If none of 1..5 is currently held...
        JSR     BadKeySound     ; ...then the "0" key is invalid

        BRA     CntsKeyDone



CntsOtherKey:                   ;Else other keys are invalid...
        JSR     BadKeySound

;*nt    BRA     CntsKeyDone

CntsKeyDone:
```

```
        RTS




;-----------------------------------------------------------------------------
;  N e x t T e s t I t e m    (Next Test Item)  Macro
;
;  This routine advances to the next test item.  If there are no more items
;  left, it returns to the first test item (#0).
;
;  Input:  IoTestItem
;
;  Output: IoTestItem
;
;  Routines Called:
;  Exit State:          [X] -- unchanged
;                       [A],[B],CCR -- indeterminate
;
;
;
;-----------------------------------------------------------------------------

NextTestItem:
        .macro

; Done with current step:

        LDAB    IoTestItem      ;Get the current item number
        INCB                    ;Advance to "next" test item

        CMPB    #MaxTestItem.
        BLS     SaveNewItem     ;If not past last item, ready to go

; Return to first test item:
;
; Test item #0 is the Elec Assy Go-NoGo test of probe & thermistor inputs,
; and is available ONLY if a burn-in jumper is installed.  If not in
; burn-in mode, we always skip step #0 and proceed to step #1.

        CLRB                    ;Assume we'll start on item #0...

        LDAA    MiscFlags       ;Are we in burn-in mode?
        BITA    #BurnInMode.
        BNE     SaveNewItem     ; If so, we DO want item #0 (ready to go...)

        INCB                    ; Else if NOT burn-in, skip item #0, do item #1

; Save the new item number, reset the item step index




SaveNewItem:
        STAB    IoTestItem      ;Save the new item number

        CLR     ItemStep        ;Start on the "init" item step


        .endm




;-----------------------------------------------------------------------------
;  D o I t e m T e s t  (Do Item Test step)  Subroutine
;
;  This macro initializes the appropriate variables when beginning the
;  "Item Programming" step of special program mode.  This macro has been
;  established because we may "go to Item Test" either from the "Password"
;  step, or directly from the "Intro" step, if the password is zeroed out.
;  By making this macro, we assure that both transitions are identical.
;
;  Input:
;
;  Output:
;
;  Routines Called:
;  Exit State:          [A],[B],[X],CCR  -  indeterminate
;
;
;
;-----------------------------------------------------------------------------

DoItemTest:


; What item are we testing?  Call the appropriate io routine...


        CaseJSR IoTestItem,9

        .word   DoGoNoGoTest    ;0 -- Go-NoGo test (with probe simulator) (*)
        .word   DoOutsTest      ;1 -- outputs test (heaters, blower, etc)
        .word   DoRtdTest       ;2 -- rtd temperature input
        .word   DoAmbientTest   ;3 -- thermistor ambient temperature sensor
        .word   DoCtrlDoorTest  ;4 -- control-side door input
        .word   DoCustDoorTest  ;5 -- customer-side door input
        .word   DoLedsTest      ;6 -- leds/displays tests
        .word   DoKeysTest      ;7 -- key inputs
        .word   DoHoursLog      ;8 -- hours logs, view and reset
        .word   DoCountsLog     ;9 -- event counts, view and reset


; (*) NOTE: the Go-NoGo probe simulator test and one-button calibration step
; is available ONLY if in burn-in mode.  If not in burn-in mode, this step
; is completely omitted from the I/O test items sequence.



; See if we just finished up with the current test item
```

```
        CMPA    #99             ; ItemStep = 99 --> Done with current item
        BLO     DoneWithItemDone

; Yes -- done with current item!
; Move on to the next item to be tested

        NextTestItem

DoneWithItemDone:



        RTS

;-----------------------------------------------------------------------
; G o I t e m T e s t   (Go to Item Test step)  macro
;
; This macro initializes the appropriate variables when beginning the
; "Item Programming" step of special program mode.  This macro has been
; established because we may "go to Item Test" either from the "Password"
; step, or directly from the "Intro" step, if the password is zeroed out.
; By making this macro, we assure that both transitions are identical.
;
; Input:
;
; Outputs:
;
; Routines Called:
; Exit State:           [A],[B],[X],CCR  -  indeterminate
;
;
;
; ----------------------------------------------------------------------

GoItemTest:
        .macro

        LDAA    #ItemTestStep.
        STAA    IoTestStep      ; - set IoTestStep to "Item Testing" step

; Test item #0 is the Elec Assy Go-Mode test of probe & thermistor inputs,
; and is available ONLY if a burn-in jumper is installed.  If not in
; burn-in mode, we always skip step #0 and proceed to step #1.

        CLR     IoTestItem      ;Assume we'll start on item #0...

        LDAA    MiscFlags       ;Are we in burn-in mode?
        BITA    #BurnInMode.
        BNE     ItemRdy         ; If so, we DO want item #0 (ready to go...)

        INC     IoTestItem      ; Else if NOT burn-in, skip item #0, do item #1
ItemRdy#:

        CLR     ItemStep        ; - start on the "init" step of this test item




        CLR     ScrollCode

        .endm


; ----------------------------------------------------------------------
; D o I o T e s t I n t r o  (Do I/O Test mode Intro)  Subroutine
;
;
;
; Input:
;
; Outputs
;
; Routines Called:
; Exit State:           [A],[B],[X],CCR  -  indeterminate
;
;
;
;-----------------------------------------------------------------------

DoIoTestIntro:

; Display "Special Program" intro message: "SPCL" "Prog", Version nbr, blanks

        UpdIoTestIntroMsg

; Throw away any keys that are pressed during the introduction message display

        JSR     GetKey          ;If any key in the buffer, get it...
                                ; ...and simply ignore it


; We stay in intro mode for at least 1 second.  After 1 second,
; we stay in intro mode until user releases the Set key (go to password step)
; or until Set key has been held for a total of 10 seconds (go to Spcl Prog)

        LDAA    DspTmr          ;Has the DspTmr decremented to 0 yet?
        BNE     DoIntroDone     ; If still counting down (1 sec), stay in intro

; Else done with the introductory message display.  Go on to the "Password"
; step, unless the IoTestPassword has a length of "0", which indicates
; the password is not required.

        LDAB    IoTestPasswd+0  ;Get the number of keys (N) in the sequence
        BEQ     IntroGoItemTest ;(If no keys, no password...)

        LDAB    MiscFlags
        BITB    #BurnInMode.    ;Else if "burn-in" mode...
        BNE     IntroGoItemTest ; ...password not required

; Move on to Password step (unless Password is not required)

IntroGoPwd:
        LDAA    #CodeStep.      ;Move on to the password ("code") step
        STAA    IoTestStep      ; User must enter valid password...

        CLR     PasswdStep      ;Start out on "init" phase of passwd entry...


        BRA     DoIntroDone


; Else skip Password (if not required) and move on to Item Programming step

IntroGoItemTest:

        GoItemTest              ; - advance IoTestStep to begin item testing
                                ;       (see macro above for details)

;opt    BRA     DoIntroDone

DoIntroDone:

        RTS


;-----------------------------------------------------------------------
; D o P a s s w d C h e c k  (Do Password Check)  Subroutine
;
; This macro takes care of having the user enter the password, then
; determining if the password is valid or not.  Depending on the
; success of the password entry, this routine may advance IoTestStep to
; "ItemTestStep" (item testing) or to "99" (exit special program).
;
; Note that the "good password", "bad password", etc. responses are included
; as part of this state, as defined in the "DoPasswdResult" routine.
;
; Input:
;
; Output:
;
; Routines Called:
; Exit State:           [A],[B],[X],CCR  -  indeterminate
;
;
;
;-----------------------------------------------------------------------

DoPasswdCheck:

; If we are still on PasswdStep 1 (Password Entry), the current value
; of PasswdStep should (must) be 0 (init),  1 (the entry steps),
; or in the range 2..5 -- the "post entry" result display steps.

        LDAA    PasswdStep      ;Steps 0 (init) & 1 are entry phase
        CMPA    #PwdInput.      ;Steps > 1 are post-entry result displays
        BHI     PwResult

PwEntry:
        JSR     DoPasswdEntry   ;Update displays, enter next key
        BRA     PwDispDone

PwResult:



        JSR     DoPasswdResult  ;Update "result" displays (invalid,timeout,etc)

PwDispDone:


; Now examine PasswdStep to see where we stand: are we done yet?

        LDAA    PasswdStep
        CMPA    #PwdGo.         ;If we get a "Go"...
        BEQ     GrantAccess     ; ...grant user proper access to programming

        CMPA    #PwdNoGo.       ;Else if we get a "No Go"...
        BEQ     DenyAccess      ; ...deny access to programming

        BRA     DoPwdDone       ;Else still on an Entry step, or Result display

GrantAccess:                    ;Complete, valid password entered:
        GoItemTest              ; - advance IoTestStep to begin item testing
                                ;       (see macro above for details)
        BRA     DoPwdDone

DenyAccess:                     ;Incomplete or invalid password:
        LDAA    #99             ; - request exit from I/O Test Mode
        STAA    IoTestStep

;opt    BRA     DoPwdDone


DoPwdDone:

        RTS



;-----------------------------------------------------------------------
; D o E x i t P e n d i n g  (Do Io Test mode Exit Pending)  Macro
;
; This routine handles the "Exit Pending" activity for exit from the
; I/O Test Mode.
;
; This routine is called in the main loop below ONLY if the
; "ExitPending" flag is currently true.  This flag is set to "true",
; and the corresponding clock is reset to 0, by the normal Io Test Mode
; key-handler routines when the SET key is first pressed.
;
; When already in Io Test Mode, the SET key is pressed and held for
; X seconds to exit Io Test Mode.  The individual key handlers will
; set the "Exit Pending" flag to SET, and reset the ExitPendClk to 0
; when the user presses the SET key.  This routine, then, will monitor the
; "hold" part of the press-and-hold requirement.  If the user is still
; holding the SET key when the ExitPendTmr hits X seconds, then this
; routine will signal a request to exit Io Test Mode by setting
; IoTestStep = 99.
;
; Under certain circumstance, pressing the SET key WILL NOT activate
```

```
;  Input:   KeyStat -- current bit status of key inputs
;           ExitPendClk -- 16-hz count-up clock; times how long SET key held
;  Output:
;
;  Routines Called:
;  Exit State:          [A],[B],[X],CCR  -  indeterminate
;
;
;
;  ------------------------------------------------------------------------

ChkExitPending:
        .macro


; E x i t P e n d i n g
;
; Do we have a "pending" SET key press & hold to take care of?
; (Yes we do, or the main loop below would not have called this routine)
;


; First of all, see if the user is still holding the SET key

ChkReleased:
        LDAA    #KeySet.            ;Need to see if the SET key
        JSR     ChkKeyPressed       ; is still being held down...
        BNE     KeyStillHeld        ;If still held down, see if held X seconds yet


; User has released the SET key -- cancel the "SET key press & hold" operation

KeyReleased:                        ;Else user has released SET in < X seconds:
        CLR     ExitPending         ; Reset the "SET key Pending" flag
                                    ;  -- he gave up too soon
        BRA     ExitPendDone


; If SET is held for >= 1 seconds, we need to exit Program mode.

KeyStillHeld:
        LDAA    ExitPendClk         ;Has the user held the key for 1 seconds yet?
        CMPA    #1*16
        BLO     ExitPendDone        ;(If not, we need to keep waiting...)

; "SET key Pending Timer" has hit 1 second: Request Special Program mode exit.

        LDAA    #99                 ;Request exit from Program Mode by
        STAA    IoTestStep          ; setting the Program Step = 99...

;opt    BRA     ExitPendDone


ExitPendDone:




        .endm


;  ------------------------------------------------------------------------
;  I n i t I o T e s t M o d e  (Initialize I/O Test Mode)  Macro
;
;  This routine initializes I/O Test Mode
;
;  Input:
;
;  Output:
;
;  Routines Called:
;  Exit State:          [A],[B],[X],CCR  -  indeterminate
;
;
;
;  ------------------------------------------------------------------------

InitIoTestMode:
        .macro

; Re-synchronize the blink timer, cancel any scrolling messages

        CLR     BlnTmr              ;This is a continuous-running countdown timer.
                                    ; (will be all 1's within 1/16th second)

        CLR     ScrollCode

; Clear the digit leds -- the two unused dots on the right side displays
;  are typically cycled ON in burn-in, not cleared automatically by the
;  message display routines (which only clear the colon bits).

        CLR     LDigLeds
        CLR     RDigLeds


; Make sure all the relay outputs are turned OFF

        JSR     SetAirHtOff
        JSR     SetRadHtOff
        JSR     SetMotorOff
        JSR     SetBlwrOff



; Make sure the "Exit Pending" flag is cleared to start with

        CLR     ExitPending


        .endm


;  ------------------------------------------------------------------------
;  E x i t I o T e s t M o d e  (Exit I/O Test Mode) Macro
;
;  Input:   none
;
;  Output:
;
;  Create Date:         16 Nov 98
;  Revision Record:     A - 16 Nov 98 - Original
;--------------------------------------------------------------------------

ExitIoTestMode:
        .macro

; Cancel the "Exit Pending" flag
; (no longer "pending" -- we're doing it now...)

        CLR     ExitPending


; Cancel any scrolling messages that may be in progress

        CLR     ScrollCode


        CLR     DspTmr

        .endm



;--------------------------------------------------------------------------
; D o I o T e s t U s e r I o  (Do I/O Test User I/O)  Subroutine
;
;
;  Input:   IoTestStep, etc
;
;  Output:
;
;  Routines Called:
;  Exit State:          [A],[B],[X],CCR  -  indeterminate
;
;
;
;--------------------------------------------------------------------------

DoIoTestUserIo:


; First, see if we need to initialize the I/O Test mode

ChkInit:
        LDAA    IoTestStep          ;If IoTestStep already > 0,
        BNE     ChkInitDone         ; we don't need to initialize...

        InitIoTestMode              ;Else we just got here -- initialize...

        INC     IoTestStep          ;Now move on to the Introduction step

; Sound the appropriate beep pattern, and set the duration of the
;  introduction message step.  If burn-in mode, we will considerably
;  shorten the message display and the buzzer pattern...




        LDAA    MiscFlags           ;Are we currently in burn-in mode?
        BITA    #BurnInMode.        ; If so, do the "nice and short" intro
        BNE     BurnInIntro

NormalIntro:
        LDAA    #32
        STAA    DspTmr              ;(DspTmr used to time the entry message)

        LDX     #%0001010100010101b ;Sound 3 triple-beeps to signal
        LDAB    #25                 ; normal entry into I/O Test mode
        JSR     StartBzr

        BRA     ChkInitDone

BurnInIntro:
        LDAA    #16
        STAA    DspTmr              ;(DspTmr used to time the entry message)

        LDX     #%0001010100000000  ;Sound 1 triple-beeps to signal
        LDAB    #12                 ; normal entry into I/O Test mode
        JSR     StartBzr

;opt    BRA     ChkInitDone


ChkInitDone:


; M a n u a l   E x i t ?
;
; See if we have an "Exit Pending" operation to monitor:
; (User must press and hold SET key to exit I/O Test mode)

ChkSetKeyHeld:
        LDAA    ExitPending         ;Do we have a "pending exit" to monitor?
        BEQ     ChkSetKeyDone       ; (ie user is holding SET key for exit...)

                                    ;If user holds SET key long enough, signal
        DoExitPending               ; "exit Test Mode" by setting IoTestStep = 99.
                                    ;If released too soon, reset ExitPending to 0.
ChkSetKeyDone:



; What Programming step are we on?
;  ..
;  0 = init (can't still be 0...)
;  1 = introduction
;  2 = password check
;  3 = item testing
;
; 99 = exit I/O Test mode requested (manual or automatic exit)
;
```

```
        CaseJMP IoTestStep,3

        .word   0               ; 0  (Don't be in step 0 still)
        .word   IoIoTestIntro   ; 1  Introduction (Entry message display)
        .word   IoPasswdChk     ; 2  Password check for access
      . .word   IoItemTest      ; 3  Item testing
                                ;(99 = program exit requested)


; IoTestStep = 99  ==>  exit from I/O Test Mode is requested,
;  due to automatic timeout exit, password failure, or user requested exit.

ChkExitRequest:

        LDAA    IoTestStep      ;Get the current step number
        CMPA    #99
        BLO     ChkExitDone     ; < 99  ==>  stay in Test mode

; IoTestStep = 99  ==>  Exit

        ExitIoTestMode          ;Finish up

        LDX     #$FFFF          ;Sound a short 1/2-second beep as we exit
        LDAB    #[illegible]    ;  [illegible]/16 = 1/2 second long
        JSR     StartBeep       ;  Go for it...

        LDAA    MiscFlags       ;Leave I/O Test mode by resetting flag to 0
        ANDA    #[illegible]IoTestMode.
        STAA    MiscFlags

ChkExitDone:


IoIoTestDone:

        RTS


        .END ;(end of file)
```

An example of a software routine for operating the speaker in a cooking appliance is as follows.

```
; ----- S P E A K E R   O P E R A T I O N ------

; S p e a k e r   R e q u e s t s
;
; These variables are used by the application program and lower level
; routines to manage the speaker "resource" -- that is, what tone, if any,
; should be generated on the speaker.
;
; We have 3 basic tasks that may ask for speaker output:
;
;    - The keyboard "beep" that sounds each time a key is pressed
;
;    - The "Song" routine, which automatically plays a scripted sequence
;      of notes (timing, volume, and tones defined by a script).
;
;    - The currently active UserIO routine, which may directly request a
;      tone and volume to be generated.
;
; The direct tone/volume requests are made via the SpkrReq, SpkrReqTone,
; and SpkrReqVol variables.  All three are cleared each time at the top
; of the Main loop.  If the currently active User I/O routine wants a
; tone to be generated, it sets SpkrReq to $FF, and may optionally set
; the values of SpkrReqTone and SpkrReqVol as well.
;
; After the appropriate State and UserIo routines have been called
; in the Main Loop, the code there checks to see if anyone has made
; a request via the SpkrReq flag.  If so, the main loop code will then
; see to it that the appropriate request is passed on to the lower-level
; speaker routines.  It will assign "default" tone and volume values
; wherever the UserIo routine has not assigned a specific tone or a volume.
; If the SpkrReq flag is still ON after the UserIo routines have been
; called, then none of the routines have actively requested it to be on,
; so the main loop code will NOT make any request of the speaker.
;
;
; NOTE:
; ----
; Most speaker operations specify frequency by a "Tone" number, which is
; basically a lookup index into a table of (freq) periods.  This allows
; a one-byte tone specifier, rather than a double-byte freq or period.
;
; Tones from $00..$7F refer to a tone from a ROM table (constants)
; Tones from $80..$FF refer to a tone from a RAM table (programmable tones)


; U s e r I o   S p e a k e r   R e q u e s t s
;

; These variables are used by the UserIo routines.  The Main Loop code
; clears them at the top of the main loop, then checks later to see if
; any requests have been made.  These variables are not required to
; be interrupt safe, and may be set and reset as needed.


SpkrReq         .byte           ;Cleared each time at top of main loop.
                                ; UserIo rtn sets to $FF to request spkr on.

SpkrReqVol      .byte           ;Cleared each time at top of main loop.
                                ; UserIo rtn optionally specifies volume.
                                ; If none specified, "default" volume used.

SpkrReqTone     .byte           ;Cleared each time at top of main loop.
                                ; UserIo rtn optionally specifies tone number.
                                ; If none specified, "default" tone used.

; These variables are used to inform the low-level speaker interface
; routines what Tone and Volume are actually required by the UserIo
; routines.  These are the two variables that the interrupt-driven
; speaker routine actually examines, so they must be updated with
; interrupt-safe precautions.  That is, we must assure that we can never
; get an interrupt when the value in either variable is invalid or
; mismatched to the other variable.

SpkrUlsVol      .byte

SpkrUlsTone     .byte


; S o n g   P l a y i n g   R o u t i n e s
;
; These variables are used by the "Song" routines, which provide background-
; mode playing of preprogrammed tone sequences.
;
; The "songs" are defined by a data structure which indicates countdown time
; values (at 50 Hz) where speaker changes (tone, volume) occur.  These
; songs may be set to automatically repeat.

                                ;50 Hz countdown timer.  This timer is used
SongTmr50       .byte           ; to generate the timing of the tone pattern.
                                ; 256/50 ==> song pattern up to 5 seconds long.
                                ;Normal countdown is X downto 0 ==> stop.
                                ;Autorepeat count is X downto 1, X downto 1,...
                                ;Clear to 0 to stop any song that is playing.

SongPtr$        .word           ;Points to beginning of the current "song"
                                ; data structure.

SongStepPtr$    .word           ;Points to current tone within the "song"
                                ; data structure.  This pointer steps through
                                ; the time/vol/tone list as song plays.


SongVol         .byte           ;These variables are updated by the Song rtn
SongTone        .byte           ; to indicate what it is currently doing.
SongVolTone$    .equ    SongVol ;Display routines can watch SongVol in order
                                ; to coordinate displays ON or OFF in synch
                                ; with the Spkr ON or OFF

; S p e a k e r   B o a r d   I n t e r f a c i n g

                                ;Latch update routine needs to know if we
NeedSpkrUpdate  .byte           ; want to send data to the speaker:
                                ;  0 ==> no update necessary
                                ;$FF ==> need to send data to speaker board

SpkrVol         .byte           ;Speaker volume level

SpkrTone        .byte           ;Current tone

SpkrPeriod$     .word           ;Frequency specified as period in usec
                                ;(Speaker board needs PERIOD, not freq)

PrevSpkrVol     .byte           ;These are the values sent to the speaker
                                ; board the last time it was updated.
PrevSpkrTone    .byte           ;We use these to optimize the speaker update
                                ; communications: if it is already doing
PrevSpkrPeriod$ .word           ; the tone and volume we want, we'll leave
                                ; it alone -- communication messes up sound.


; B u z z e r   P a t t e r n   R o u t i n e

; The following variables implement the automatic buzzer modulation,
; whereby the application can call for a 16-bit buzzer pattern of a
; duration from 1/16th of a second to almost 16 seconds, and the low-level
; routines will take care of actually producing the indicated buzzer pattern.
;

BzrCy$          .word           ;Buzzer "blink" mask -- for buzzer modulation.
                                ;16-bit repeating pattern, where each bit
                                ; represents 1/16th of a second, and a "1"
                                ; indicates the buzzer should be ON for that
                                ; 16th of a second, (else "0" ==> buzzer off).

BzrTmr          .byte           ;A non-zero value here causes the UpdLatch
                                ; routine to turn the buzzer output ON,
                                ; subject to the modulation of the BzrCy$ mask.
                                ;If non-zero, this byte is automatically
                                ; decremented every 1/16th of a second, until
                                ; it reaches 0.  See [illegible] for details.

                                ;The 16 Hz buzzer timer (BzrTmr above) is
                                ; actually run from the standard 50 Hz
BzrTmr50        .byte           ; speaker update timebase.  This time counts
                                ; 3/50ths of a second for each 1/16th second
                                ; of the pattern.  3/50ths actually gives us
                                ; 0.96/16ths of a second, but this is
                                ; close enough.

BzrVol          .byte           ;Speaker volume to be used for buzzer pattern.

BzrTone         .byte           ;Buzzer tone to be used for buzzer pattern.

BzrVolTone$     .equ    BzrVol  ;(Double byte access to BzrVol, BzrTone)
```

```
        .include G:WRStd.LIB

        .extern UserSpecVol, UserSpecPeriod$

        .extern page0 SpkrPort, SpkrClk., SpkrOut., SpkrIn., zSpkrOut.

        .extern page0 SpkrReq
        .extern page0 SpkrReqVol, page0 SpkrReqTone ;;; , SpkrReqVolTone$

        .extern page0 SpkrUlevel, page0 SpkrUleTone

        .extern page0 SongTmr16, page0 SongPtr$, page0 SongStopPtr$
        .extern page0 SongVol, page0 SongTone, page0 SongVolTone$

        .extern page0 BzrTmr, page0 BzrCy$, page0 BzrTmr50
        .extern page0 BzrVol, page0 BzrTone, page0 BzrVolTone$

        .extern page0 KeyBeepTmr50

        .extern page0 NeedSpkrUpdate
        .extern page0 SpkrVol, page0 SpkrTone, page0 SpkrPeriod$
        .extern page0 PrevSpkrVol, page0 PrevSpkrTone, page0 PrevSpkrPeriod$

        .extern page0 Math32, page0 Math16, page0 TempWord$

; External routines

        .extern Mult16By16, Div32By16

; Routines and Constants defined here

        .global IntroSong

        .global StdVol., StdTone.

        .global Tone.Good., Tone.Bad., Tone.Alert., Tone.KeyBeep.

        .global Tone.C1.,Tone.D1.,Tone.E1.,Tone.F1.,Tone.G1.
        .global Tone.A2.,Tone.B2.,Tone.C2.,Tone.D2.,Tone.E2.,Tone.F2.,Tone.G2.
        .global Tone.A3.,Tone.B3.,Tone.C3.,Tone.D3.,Tone.E3.,Tone.F3.,Tone.G3.
        .global Tone.A4.,Tone.B4.,Tone.C4.,Tone.D4.,Tone.E4.,Tone.F4.,Tone.G4.
        .global Tone.A5.,Tone.B5.,Tone.C5.

        .global InitSpkr, StartBzr, StartSong

        .global BadKeySound, GoodEntrySound, BadEntrySound

        .global CalcFreqPeriod

        .global DoSong50th, DoBzr50th

        .global GetSpkrUpdateData, SendSpkrUpdate

StdVol.         .equ    $FF     ;Vol = $FF ==>  substitute programmed volume

StdTone.        .equ    $FF     ;Tone = $FF ==>  use programmed osc period
```

```
;---------------------------------------------------------------------------
;  T o n e T b l    (Tone Table)    Data Table
;
;  This table lists the actual speaker oscillation periods, in usec, for
;  the predefined tone values referenced by the labels below.
;
;
;
;  Create Date:          8 Jan 93
;  Revision Record:      A - 8 Jan 93 - Original
;---------------------------------------------------------------------------

ToneTbl:

        .word   900             ;0  KeyBeep: 2 KHz
        .word   900             ;1  Good:    2 KHz
        .word   10000           ;2  Bad:     100 Hz
        .word   1000            ;3  Error:   1 KHz

        .word   1000            ;4  1 KHz tone
        .word   100             ;5  10 KHz tone

        .word   1030            ;6
        .word   1040            ;7
        .word   1050            ;8
        .word   1060            ;9
        .word   1070            ;10

; Musical notes:

        .word   7645            ;11  C1 = 130.810 HZ
        .word   6811            ;12  D1 = 146.830 HZ
        .word   6068            ;13  E1 = 164.810 HZ
        .word   5727            ;14  F1 = 174.610 HZ
        .word   5102            ;15  G1 = 196.000 HZ
        .word   4545            ;16  A2 = 220.000 HZ
        .word   4050            ;17  B2 = 246.940 HZ
        .word   3822            ;18  C2 = 261.630 HZ
        .word   3405            ;19  D2 = 293.660 HZ
        .word   3034            ;20  E2 = 329.630 HZ
        .word   2863            ;21  F2 = 349.230 HZ
        .word   2551            ;22  G2 = 392.000 HZ
        .word   2273            ;23  A3 = 440.000 HZ
        .word   2025            ;24  B3 = 493.880 HZ
        .word   1911            ;25  C3 = 523.250 HZ   (Middle C)
        .word   1703            ;26  D3 = 587.330 HZ
        .word   1517            ;27  E3 = 659.260 HZ
        .word   1432            ;28  F3 = 698.460 HZ
        .word   1276            ;29  G3 = 783.990 HZ
        .word   1136            ;30  A4 = 880.000 HZ
        .word   1012            ;31  B4 = 987.770 HZ
        .word   956             ;32  C4 = 1046.50 HZ
        .word   851             ;33  D4 = 1174.70 HZ
        .word   758             ;34  E4 = 1318.50 HZ
        .word   716             ;35  F4 = 1396.90 HZ

        .word   638             ;36  G4 = 1568.00 HZ
        .word   568             ;37  A5 = 1760.00 HZ
        .word   506             ;38  B5 = 1975.50 HZ
        .word   478             ;39  C5 = 2093.00 HZ

; "TONE" values -- indexes into the ToneTbl above

Tone.KeyBeep.   .equ    0       ;Index 0 used for key beep tone

Tone.Good.      .equ    1       ;used for "good" beeps

Tone.Bad.       .equ    2       ;used for "bad key"  or "bad entry"

Tone.Alert.     .equ    3       ;tone used for system error, bad password, etc
                                ; (E-5 ctrl bat, E-6 promo error, etc)

Tone.1000.      .equ    4       ;1 KHz tone

Tone.10000.     .equ    5       ;10 KHz tone

; Musical notes:

Tone.C1.        .equ    11
Tone.D1.        .equ    12
Tone.E1.        .equ    13
Tone.F1.        .equ    14
Tone.G1.        .equ    15
Tone.A2.        .equ    16
Tone.B2.        .equ    17
Tone.C2.        .equ    18
Tone.D2.        .equ    19
Tone.E2.        .equ    20
Tone.F2.        .equ    21
Tone.G2.        .equ    22
Tone.A3.        .equ    23
Tone.B3.        .equ    24
Tone.C3.        .equ    25
Tone.D3.        .equ    26
Tone.E3.        .equ    27
Tone.F3.        .equ    28
Tone.G3.        .equ    29
Tone.A4.        .equ    30
Tone.B4.        .equ    31
Tone.C4.        .equ    32
Tone.D4.        .equ    33
Tone.E4.        .equ    34
Tone.F4.        .equ    35
Tone.G4.        .equ    36
Tone.A5.        .equ    37
Tone.B5.        .equ    38
Tone.C5.        .equ    39
```

```
AlarmSong:      .byte   "N"             ;Non-repeating
                .byte   250, StdVol., Tone.1000.
                .byte   247, 0, 0
                .byte   244, StdVol., Tone.1000.
                .byte   241, 0, 0
                .byte   238, StdVol., Tone.1000.
                .byte   235, 0, 0
                .byte   232, StdVol., Tone.1000.
                .byte   229, 0, 0
                .byte   226, StdVol., Tone.1000.
                .byte   223, 0, 0
                .byte   200, StdVol., Tone.C3.
                .byte   150, StdVol., Tone.C4.
                .byte   100, StdVol., Tone.D4.
                .byte   75,  StdVol., Tone.E3.
                .byte   63,  StdVol., Tone.A4.
                .byte   50,  StdVol., Tone.B4.
                .byte   25,  StdVol., Tone.C4.
                .byte   0


;----------------------------------------------------------------------
;  I n i t S p k r   (Initialize Speaker)  Subroutine
;
;  This routine simply initializes the speaker system to make sure the
;  "song" timer is turned OFF when we start up, etc.  Also, speaker board
;  interface variables are initialize as appropriate.
;
;  Input:  none
;
;  Output: SongTmr50
;          SpkrUVolume
;          PrevSpkrVol
;          BzrTmr50, BzrTmr, BzrVol, BzrTone
;
;  Routines Called:
;  Exit State:          [A],[B],[X],CCR  -  indeterminate
;
;  Create Date:         8 Jan 93
;  Revision Record:     A - 8 Jan 93 - original
;----------------------------------------------------------------------

InitSpkr:

        CLR     SongTmr50       ;No "song" in progress

        CLR     BzrTmr          ;No "buzzer pattern" in progress

        LDAA    #StdVol.        ;Initialize the buzzer volume and tone
        LDAB    #StdTone.       ; to user-programmed values
        STD     BzrVolTone$

        CLR     SpkrUVolume     ;No volume requested yet from user to rtns

        CLR     PrevSpkrVol     ;Init PrevSpkrVol to 0 to assure our first
                                ; non-zero speaker tone will definitely

                                ; get sent out...

        RTS

;----------------------------------------------------------------------
;  S t a r t S o n g   (Start Song)  Subroutine
;
;  This routine starts the song pointed to by [X] by saving that pointer
;  value into SongPtr$, pointing the SongStepPtr$ to the first defined
;  Volume and Tone step in the definition, and loading the SongTmr with the
;  first time value in the song definition.
;
;  A "Song" data structure looks like this:
;
;  Song:        .byte   "N"     ;(non-repeating -- or "R" for repeating)
;               .byte   Time1, Vol1, Tone1      \
;               .byte   Time2, Vol2, Tone2       > varying number of these
;                 :       :      :     :        /
;               .byte   TimeN, VolN, ToneN     /
;               .byte   0       ;(terminator)
;
;  The very first byte must be an "R" (upper case) if the song is to
;  automatically repeat.  Otherwise, the song will self cancel the first
;  time the SongTmr counts down to 0.
;
;  The very last byte must be a "0", to terminate the script.
;
;  All lines in between must be "Time, Volume, Tone", each occupying
;  one byte of storage.
;
;  "Time" is the 50Hz countdown value where the indicated volume and tone
;  are to begin.  Since SongTmr this is a single-byte timer which counts
;  down at 50 Hz, the maximum song time is 255/50, or 5.1 seconds.
;
;  "Volume" is a volume level from 0 to 50.  Volume = 0 specifies that
;  the speaker should be off.  When Vol = 0 is specified, the Tone value
;  for that step is unimportant -- the speaker will be turned OFF.
;
;  "Tone" is the tone number for the current song step.  This basically is
;  a lookup index into a predefined table of speaker frequencies, which are
;  really stored and sent to the speaker as "periods", in microseconds.
;
;
;  EXAMPLE
;  -------
;
;  XSong:       .byte   "N"     ;(non-repeating song -- self-terminating)
;               .byte   3*50, MedVol., Tone.1A.  \
;               .byte   1*50, MedVol., Tone.1C.   > varying number of these
;               .byte   1*50, MedVol., Tone.1C.  /
;               .byte   0       ;(terminator)
;
;  XSong will last a total of 3 seconds, as indicated by 3*50 in first time.
;  It is self-terminating, since the very first byte is not "R".
;  Tone "1A" (middle A) will sound for 1 second, then "1C" (middle C) for
;  one second, and finally "1E" (middle E) for 1 second.
;

.  Input:  [X] -- 16-bit buzzer pattern (1's = on, 0's = off)
```

```
;  Routines Called:
;  Exit State:          [A],[B],[X],CCR -- indeterminate
;
;
;
;----------------------------------------------------------------------

StartSong:

        CLR     SongTmr50       ;Make sure song "not playing" while we
                                ; change these variables, in case interrupt
                                ; would occur before all were changed...

        STX     SongPtr$        ;Save pointer to the specified song script

        INX                     ;Advance pointer past the "N"/"R" character --
                                ; now pointing at the first song step.

        STX     SongStepPtr$    ;Save pointer to the "current" step.

        LDAB    0,X             ;Get the TIME value for the first step
        STAB    SongTmr50       ;Start the song Timer at the starting value


        RTS


;----------------------------------------------------------------------
;  S t a r t B z r   (Start Buzzer)  Subroutine
;
;  This routine starts a timed buzzer pulse.  The duration of the pulse --
;  up to 15-15/16 seconds (256/16ths) -- is passed in [B].  The buzzer
;  modulation pattern is passed in [X].
;
;  This routine installs the new modulation pattern, and effectively turns
;  the buzzer ON by starting the buzzer timer (in [B] saved into BzrTmr).
;
;  The speaker update routines will know to turn the buzzer ON whenever
;  the BzrTmr is running (and will modulate the actual output to the
;  buzzer according to the bit pattern in BzrCy$).
;
;  NOTE: The actual buzzer 16 Hz timebase is generated from a 50 HZ
;  timebase, so it actually works out to 0.96/16ths seconds per bit.
;
;  ALSO: BzrVol and BzrTone (volume and tone of the buzzer) are specifically
;  set to the standard StdVol and StdTone values
;
;  Input:  [B] -- buzzer pulse duration, in 1/100's of seconds (0..255)
;          [X] -- 16-bit buzzer pattern (1's = on, 0's = off)
;
;  Output: BzrTmr, BzrCy$, BzrTmr50, BzrVol, BzrTone
;
;  Routines Called:
;  Exit State:          [A],[X] -- unchanged
;                       [B],CCR -- indeterminate
;

;
;
;----------------------------------------------------------------------

StartBzr:

        SEI                     ;/// Disable interrupts until bzr stuff set

; [X] = 16-bit on/off pattern (each bit = 1/16 second)

        STX     BzrCy$          ;Save the new buzzer modulation pattern

        STAB    BzrTmr          ;Save duration value to BzrTmr (in 1/16ths)

        LDAA    #3              ;Load the 50Hz counter that is used
        STAA    BzrTmr50        ; to generate the approx 16 HZ bzr timebase
                                ; (3/50th = approx 1/16th second)

; Make sure the standard Volume and Tone values are in force

        LDAA    #StdVol.        ;All calls to "StartBzr" will set
        LDAB    #StdTone.       ; Volume and Tone to "standard" values
        STD     BzrVolTone$

        CLI                     ;/// Enable interrupts again

        RTS


;----------------------------------------------------------------------
;  B a d K e y S o u n d   (Bad Key Sound)  Subroutine
;
;  This routine generates the "bad key" buzzer tone, which is
;  used to signal that the user has pressed the wrong key.
;
;  Input:  none
;
;  Output: BzrTmr, BzrCy$, BzrTmr50, BzrVol, BzrTone
;
;  Routines Called:
;  Exit State:          [A],[B],[X],CCR  -  indeterminate
;
;
;
;----------------------------------------------------------------------

BadKeySound:

; This routine is like "StartBzr" except it uses special frequency
;  and a hardcoded pattern and duration values.

        SEI                     ;/// Disable interrupts until bzr stuff set

; Set the pattern and duration to hardcoded values

        LDX     #1101100000000000b      ;This pattern includes some OFF time
        LDAB    #0                      ; at the END of the buzzer tone.
```

```
        LDAA    #3                  ;Load the 50Hz counter that is used
        STAA    BzrTmr50            ; to generate the approx 16 Hz bzr timebase
                                    ; (3/50th = approx 1/16th second)

; Now set the volume and tone

        LDAA    #StdVol.            ;Use standard volume
        LDAB    #Tone.Bad.          ;Use special "Bad" tone
        STD     BzrVolTone

        CLI                         ;/// Enable interrupts again


        RTS

;------------------------------------------------------------------------------
;  G o o d E n t r y S o u n d   (Good Entry Sound)  Subroutine
;
;  This routine generates the triple-beep "good entry" tone, which is
;  typically used to signal that the user has entered a valid password
;
;  Input:  none
;
;  Output: BzrTmr, BzrCy$, BzrTmr50, BzrVol, BzrTone
;
;  Routines Called:
;  Exit State:          [A],[B],[X],CCR  -  indeterminate
;
;  Create Date:         11 Jan 92
;  Revision Record:     A - 11 Jan 92 - Original
;------------------------------------------------------------------------------

GoodEntrySound:

; This routine is like "StartBzr" except it uses special frequency
;  and a hardcoded pattern and duration values.

        SEI                         ;/// Disable interrupts until bzr stuff set

; Set the pattern and duration to hardcoded values

        LDX     #0000101010000000       ;This pattern includes some OFF time
        LDAB    #16                     ; at the BEGINNING of the buzzer tone.

        STX     BzrCy$              ;Save the new buzzer modulation pattern

        STAB    BzrTmr              ;Save duration value in BzrTmr (in 1/16ths)

        LDAA    #3                  ;Load the 50Hz counter that is used
        STAA    BzrTmr50            ; to generate the approx 16 Hz bzr timebase
                                    ; (3/50th = approx 1/16th second)

; Now set the volume and tone

        LDAA    #StdVol.            ;Use standard volume


        LDAB    #Tone.KeyBeep.  ;Use special "Key Beep" tone
        STD     BzrVolTone

        CLI                         ;/// Enable interrupts again


        RTS

;------------------------------------------------------------------------------
;  B a d E n t r y S o u n d   (Bad Entry Sound)  Subroutine
;
;  This routine generates the "bad entry" tone, which is typically used
;  to signal that the user has entered a bad value in programming, etc.
;
;  Input:  none
;
;  Output: BzrTmr, BzrCy$, BzrTmr50, BzrVol, BzrTone
;
;  Routines Called:
;  Exit State:          [A],[B],[X],CCR  -  indeterminate
;
;
;
;------------------------------------------------------------------------------

BadEntrySound:

; This routine is like "StartBzr" except it uses special frequency
;  and a hardcoded pattern and duration values.

        SEI                         ;/// Disable interrupts until bzr stuff set

; Set the pattern and duration to hardcoded values

        LDX     #0FFFF              ;This pattern is set for a continuous tone
        LDAB    #24                 ; 1-1/2 seconds long

        STX     BzrCy$              ;Save the new buzzer modulation pattern

        STAB    BzrTmr              ;Save duration value in BzrTmr (in 1/16ths)

        LDAA    #3                  ;Load the 50Hz counter that is used
        STAA    BzrTmr50            ; to generate the approx 16 Hz bzr timebase
                                    ; (3/50th = approx 1/16th second)

; Now set the volume and tone

        LDAA    #StdVol.            ;Use standard volume
        LDAB    #Tone.Bad.          ;Use special "Key Beep" tone
        STD     BzrVolTone

        CLI                         ;/// Enable interrupts again


        RTS
```

```
;  This routine calculates and returns the speaker period, in microseconds,
;  corresponding to the frequency value, in hertz, passed in [D].
;
;  The formula is:     Period = 1000000 * ( 1 / Frequency )
;
;                             = 1000000 / Frequency
;
;  Input:  [D] = Frequency (Hertz)
;
;  Output: [D] = Period (usec)
;
;  Routines Called:
;  Exit State:          [A],[B],[X],CCR  -  indeterminate
;
;
;
;------------------------------------------------------------------------------

CalcFreqPeriod:

        STD     TempWord$           ;Save the frequency value for a moment

        LDX     #1000               ;First, load up the "Math32" byte with
        LDD     #1000               ; 1000000   (ie 1000*1000)
        JSR     Mult16By16          ;Product is stored in Math32 (4 bytes)

        LDD     TempWord$           ;Retrieve the frequency value
        STD     Math16              ;Save into the "Math16" variable

        JSR     Div32By16           ;Math32 <- Math32 / Math16
                                    ;(ie result in Math32 is 1000000 / Freq)

        LDD     Math32+2            ;Answer should be in the 2 least sig bytes

                                    ;Return to caller with Period in [D]
        RTS



;******************************************************************************
;******************************************************************************
;
; The following routines are called from the Timer Interrupt routine to
; manage the speaker information and to send data to the speaker board.
;
; Since these routines are called from WITHIN interrupt routines, they
; must be VERY CAREFUL not to use any temporary variables.
;
;******************************************************************************
;******************************************************************************


;------------------------------------------------------------------------------
;  D o S o n g 5 0 t h   (Do Song 1/50th sec activity)  Subroutine
;
;  ---> This routine should only be called if SongTmr50 > 0...
;
;  This routine knocks another 1/50th second off of the SongTmr, then
;  checks to see if we have reached 0 or need to move on to the next
;  step of the song.  If we reach 0 and the Song script indicates it is
;  non-repeating, no further action is taken.  Else if we reach 0 and
;  the song IS repeating, we reset the SongStepPtr$ to the first step
;  of the song, and reload the SongTmr at the initial value.
;
;  Input:  SongTmr50, SongPtr$, SongStepPtr$
;
;  Output: SongTmr50, SongStepPtr$
;
;  Routines Called:
;  Exit State:          [A],[B],[X],CCR  -  indeterminate
;
;
;
;------------------------------  ----------------------------------------------

DoSong50th:


; We need to set SongVol to indicate speaker ON or OFF, so that display
; routines can coordinate display blinking with song pattern.


        LDX     SongPtr$            ;Get pointer to the current song


; First of all, knock another 1/50th second off the timer

        DEC     SongTmr50           ;Decrement 50 Hz timer by 1
        BEQ     SongTmrHit0

; If timer did not hit 0, see if we need to move on to the next step...
;
;   Each step in the song script = Time, Vol, Tone  (byte[0], [1], [2])
;

        LDX     SongStepPtr$        ;Get pointer to the CURRENT step
        LDAA    3,X                 ;Get time of the NEXT song step
        CMPA    SongTmr50           ;Compare to current 50 Hz countdown time

        BLO     Song50thDone        ;If not down to it yet, nothing to do...

        LDAB    #3                  ;Else time to move on:
        ABX                         ; Add "3" to step pointer in [X] (3 bytes/step)
        STX     SongStepPtr$        ; Update the current SongStepPtr$ variable

        BRA     Song50thDone


; Timer hit 0!  If non-repeating, we're done.  Else restart the song

SongTmrHit0:
```

```
        BNE     SongNotDone     ;  -- we're done -- exit

; If auto-repeating, restart the song...

RestartSong:
        INX                     ;Advance [X] to point to first tone step
        STX     SongStepPtr$

        LDAA    0,X             ;Get the time value for the first step,
        STAA    SongTmr50       ; and use it to reload the song timer

SongNotDone:

        RTS


;-------------------------------------------------------------------------
;  D o B z r 5 0 t h   (Do Buzzer 1/50th sec activity)  Subroutine
;
;  ---> This routine should only be called if BzrTmr > 0...
;
;  This routine knocks another 1/50th second off of the BzrTmr50, then
;  checks to see if it has reached 0.  If so, we knock another "1/16th"
;  second off the BzrTmr and rotate the Bzr cycle mask.
;
;  Note that the 1/16th second timing is approximate.  It actually is
;  3/50ths of a second, which amounts to 0.96/16ths of a second.
;
;  Input:  BzrTmr50, BzrTmr, BzrCy$
;
;  Output: BzrTmr50, BzrTmr, BzrCy$
;
;  Routines Called:
;  Exit State:          [A],[B],[X],CCR  -  Indeterminate
;
;
; .
;-------------------------------------------------------------------------

DoBzr50th:

; NOTE: This routine should only be called if BzrTmr > 0!

; First of all, knock another 1/50th second off the 50 Hz timer

        DEC     BzrTmr50        ;Decrement 50 Hz timer by 1
        BNE     Bzr50thDone     ;If not decr to 0 yet, nothing more to do

; If 50 Hz timer hits 0, reload with 3 (3/50 = approx 1/16 sec),
;  and then do buzzer 1/16th second stuff:
;       - decr BzrTmr
;       - rotate BzrCy$ bit pattern mask.

        LDAB    #3              ;Reload 50 Hz timer with 3/50ths seconds time
        STAB    BzrTmr50


; Decrement the 16-Hz buzzer timer

        DEC     BzrTmr          ;Decrement the "16 Hz" buzzer pattern timer
        BEQ     Bzr50thDone     ;(If we hit 0, the tone is done...)

; Rotate the 16-bit buzzer pattern bits (forms a 1-second buzzer pattern)

        LDD     BzrCy$          ;Get the current Buzzer cycle
        LSLD                    ;Shift left:  C <-- [D] <-- 0
        ADCB    #0              ;If we shifted a "1" into Carry, add it into B0
        STD     BzrCy$          ;Save the new Buzzer cycle mask

Bzr50thDone:

        RTS


;-------------------------------------------------------------------------
;  G e t S p k r U p d a t e D a t a   (Get Speaker Update Data)  Subroutine
;
;  This routine, called 50 times per second from within the timer interrupt
;  routine, is responsible for determining and arbitrating the current
;  speaker volume and frequency.
;
;  Once the current requirements have been determined, this routine decides
;  whether or not an update message should be sent to the speaker board.
;  Communication with the speaker board audibly disrupts any tone currently
;  in progress, so this routine will NOT send request an update message
;  when the speaker is already sounding the correct tone and volume (based
;  on values of PrevSpkrVol and PrevSpkrPeriod$).  The speaker will always
;  be updated, however, when it is supposed to be off.  This assures
;  that the speaker will be swiftly quieted if it happens to mistakenly
;  interpret noise on the communications lines for an "ON" command, and
;  consequently turn the speaker on when it is not supposed to be.
;
;
;  NOTE: this routine is called from within the timer interrupt routine,
;  so it is may not use any temporary variables or any other variables
;  which are not "interrupt safe".
;
;
;  Input:  SongTmr50, SongPtr$, SongStepPtr$
;
;  Output: SpkrVol, SpkrTone, SpkrPeriod
;          SpkrUpdReqd
;
;  Routines Called:
;  Exit State:          [A],[B],[X],CCR  -  Indeterminate
;
;
;
;------  --  ----------------     ----------------------------------------

GetSpkrUpdateData:

; We have 4 basic tasks that may ask for speaker output.  These four
; separate tasks, which contend for control of the speaker, are
; prioritized as follows:

;     - The "Song" routine, which automatically plays a scripted sequence
;       of notes (timing, volume, and tones defined by a script).
;
;     - The "Buzzer Pattern" routine, which generates a pattern of
;       beeps at 16 Hz intervals, at the defined BzrVol and BzrTone
;       frequency and volume levels.
;
;     - The currently active User16 routine, which may directly request a
;       tone and volume to be generated.
;


; First of all, keep track of current song Volume and Tone.
; Display routines may want to synchronize with song ON/OFF pattern.
; (Can't do this below because KeyBeep or BzrTmr may pre-empt song stuff.)

ChkSongStuff:
        LDD     #0000           ;We'll need vol = 0 if song timer not running

        TST     SongTmr50       ;If the "Song" timer is not running...
        BEQ     SaveSongVolTone ; save the "vol = 0" setting (already in [D])

        LDX     SongStepPtr$    ;Else get the pointer to the current step:
        LDD     1,X             ; byte[0] = time, [1] = vol, [2] = tone

SaveSongVolTone:                ;Save volume and tone for display synch --
        STD     SongVolTone$    ; display code can check for tone ON or OFF


; First of all, see if we have a Key Beep to sound.
; KeyBeepTmr50 started at a non-zero value each time a new key is pressed.
; If KeyBeepTmr50 is <> 0 now, we want to generate a short key beep.

ChkKeyBeep:
        LDAA    KeyBeepTmr50    ;If the "key beep" timer is running...
        BEQ     ChkBzrTmr       ; ...we need to sound the "key beep" tone

        LDAA    #StdVol.        ;Specify the "standard" volume
        LDAB    #Tone.KeyBeep.  ;Specify the "key beep" tone

        BRA     SetVolAndTone

ChkBzrTmr:
        LDAA    BzrTmr          ;Else if the "Bzr" timer is running...
        BEQ     ChkSongTmr      ; ...we need vol and tone of current step

        LDAA    BzrVol          ;Assume for the moment that we are
        LDAB    BzrTone         ; in an ON phase of the buzzer pattern

        TST     BzrCy$+0        ;If top bit of BzrCy$ pattern = 1
        BMI     SetVolAndTone   ;  then YES -- buzzer SHOULD BE ON...

        CLRA                    ;  else we are currently in an OFF phase...
        BRA     SetVolAndTone   ;   (so set Volume in [A] to 0...)


ChkSongTmr:
        LDAA    SongTmr50       ;Else if the "Song" timer is running...
        BEQ     GetUserToneReq  ; ...we need vol and tone of current step

        LDX     SongStepPtr$    ;Get the pointer to the current step:
        LDD     1,X             ; byte[0] = time, [1] = vol, [2] = tone

        BRA     SetVolAndTone

GetUserToneReq:
        LDAA    SpkrUIoVol      ;Else get the currently requested
        LDAB    SpkrUIoTone     ; "direct control" values (which may be "OFF")

;opt    BRA     SetVolAndTone


; [A] = Volume, [B] = Tone.
;
; If Volume is special value "StdVol", we need to substitute with current
;  value (0..10) from the programmed volume setting.
;
; If Tone is special value "StdTone", we need to get frequency value from
;  the programmed period setting.  Otherwise, we used Tone value as an
;  index into the table of standard frequencies.
;
; (Note: frequencies are actually specified as "periods", in usec's.)

SetVolAndTone:

; First, check out the volume we currently require

SetVol: CMPA    #StdVol.        ;If the volume value specified in [A]
        BNE     SaveSpkrVol     ; is special "Standard Volume" code...

UseStdVol:
        LDAA    UserSpecVol     ;  ...we need to use the "programmed" volume

SaveSpkrVol:
        STAA    SpkrVol         ;Save the actual speaker volume now needed

        BEQ     VolAndToneSet   ;If current volume = 0, tone doesn't matter...


; If Volume > 0, see what oscillating period we need

SetTone:
        STAB    SpkrTone        ;Save the current tone index

        CMPB    #StdTone.
        BNE     GetTblTone      ;If tone = special "Standard Tone" code...

UseStdTone:
        LDD     UserSpecPeriod$ ; ...then we need to fetch "programmed" freq

        BRA     SaveSpkrPeriod$

GetTblTone:                     ; ...else we need to look-up freq from table
        LDX     #ToneTbl
        ABX                     ;Get address of ToneTbl and add 2*index value
        ABX                     ; (two bytes per entry)
```

```
...->SpkrPeriodS:

        STD     SpkrPeriodS     ;Save the actual speaker freq (usec period)

VolAndToneSet:

; Now see if a speaker update transmission will be required, based on our
; current requirements and on what the speaker is currently doing.

        LDAA    #OFF            ;Assume that we WILL need to send update...

        LDAB    SpkrVol         ;If speaker should be off... YES!
        BEQ     SaveUpdateFlag  ; ...continually update it...

        CMPB    PrevSpkrVol     ;Else if volume has changed... YES!
        BNE     SaveUpdateFlag  ; ...be sure to update it

        LDX     SpkrPeriodS     ;Else if period (frequency) has changed... YES!
        CPX     PrevSpkrPeriodS ; ...be sure to update it
        BNE     SaveUpdateFlag

                                ;Else NO! -- don't mess up current tone
        CLRA                    ; in progress just to send speaker
                                ; vol and freq it is already using...
SaveUpdateFlag:
        STAA    NeedSpkrUpdate  ;This flag is needed by latch update routine
                                ; so it knows what kind of strobe to assert


        RTS



;-----------------------------------------------------------------------------
;  S n d T o S p k r   (Send to Speaker) Subroutine
;
;  This routine sends the byte passed in [B] to the PIC microprocessor
;  on the Speaker board.
;
;
;       Entry
;         |
;         |        +-------+      +-------+      +-------+      +-------+
; Clock   *        |       |      |       |      |       |      |       |
;         ---------+       +------+       +------+       +------+       +-- etc
;
;  Data   .........|b7............|b6............|b5............|b4....... etc
;  Out
;                      ^              ^              ^              ^
; Data read in:        |              |              |              |
;  by spkr PIC
;
;
;
;  NOTE: all timing values here assume 8 Mhz crystal on 6803
;
;  NOTE: this routine is called from within the timer interrupt routine,
;  so it is may not use any temporary variables or any other variables
;  which are not "interrupt safe".
;
;
;  Input:  [B] -- data to be sent to Speaker Board
;
;  Output: data sent to Speaker Board
;
;  Uses:
;
;  Routines Called:
;  Exit State:          [A],[B],[X],CCR  -  indeterminate
;
;  Create Date:         30 Dec 92
;  Revision Record:     A - 30 Dec 92 - Original
;-----------------------------------------------------------------------------

SndToSpkr:                              ;Transmit data in [B]...

; The transfer sequence for each bit is as follows:
;
;       - set output bit & set Clk High simultaneously
;       - execute "Minimum Clk High" delay
;       - set clock Low
;       - execute "Minimum Clk Low" delay
;       - repeat
;
; Appropriate delays are inserted where necessary to meet timing requirements.

; Method: we will use the [B] register itself to indicate how many times to
; repeat the "output" loop.  Before we start the loop, we will shift the first
; transfer bit into the Carry bit while shifting a "1" into [B].lsb.  At the
; bottom of the loop, we will shift the next data bit into the Carry while
; shifting a "0" into [B].lsb.  When we have shifted eight 0's into [B] we
; will exit this routine -- all 8 bits have been transferred.


        LDAA    SpkrPort        ;Load Port status into [B] for 1st iteration

        SEC                     ;Shift first data bit into Carry, 1 into lsb:
        ROLB                    ; C  <--  [B]  <--  1


SndLoop:                        ;Next output bit already in Carry,
                                ; & current SpkrPort value is in [A]

; Set the data out bit (in [A]) to the appropriate value

        ANDA    #~SpkrOut.      ;Set the data output low
        BCC     SndDataRdy      ;If data bit in C is 0, we're all set
        ORAA    #SpkrOut.       ;Else change the data output to high
SndDataRdy:                     ;   /// 2.5 usec min -- 5 or 6 clks
                                ;       (can count this as Clk Low time)

SndClkHi:                       ;Set the clock high
        ORAA    #SpkrClk.       ;   /// 1 usec -- 2 clks
                                ;       (can count 1 usec as Clk Low time)
                                ;       (can count 1 usec as Data Hold time)

        STAA    SpkrPort        ;Write clock and data bit to port

; Wait for required "clock high" time (minimum 6 usec)

        ABX                     ; ABX = 3 clks ([X] is don't care)
        ABX
        ABX
        ABX                     ;   /// 6 usec -- 12 clks

; Set clock back low (data output bit is still valid)

SndClkLo:
        EORA    #SpkrClk.       ;Toggle the clock low
                                ;   /// 1 usec -- 2 clks
                                ;       (can count as Clk High time)

        STAA    SpkrPort

; Wait for required "clock low" time (minimum 6 usec)

        ;(no delay required -- other instructions total 6.5 usec already)


; Shift next bit into Carry, repeat until we're done

        LSLB                    ;Rotate next data bit into Carry, 0 into lsb
                                ; C  <--  [B]  <--  0
        BNE     SndLoop         ;If preloaded "1" bit still in [B], repeat.
                                ;   /// 2.5 usec -- 5 clks (if loop back)
                                ;       (can count as Clk Low time)


        RTS


;-----------------------------------------------------------------------------
;  R c v F r o m S p k r   (Receive from Speaker) Subroutine
;
;  Clocks in a byte from the Speaker board PIC microprocessor
;
;  The Spkr board should already be presenting the first data bit when
;  we arrive here, and will put out the next data bit at each High to Low
;  transition on the clock.
;
;  We will set the clock High, read the current data bit, set the clock Low,
;  wait for a brief time for spkr board to set out the next data bit,
;  then repeat.
;
;
;       Entry
;         |
;         |        +-------+      +-------+      +-------+      +-------+
; Clock   *        |       |      |       |      |       |      |       |
;         ---------+       +------+       +------+       +------+       +-- etc
;
;  Data  ..|b7............|b6............|b5............|b4............|b3.. etc
;from Spkr
;
;   Data              ^              ^              ^              ^
; read in             |              |              |              |
;
;
;  NOTE: this routine is called from within the timer interrupt routine,
;  so it is may not use any temporary variables or any other variables
;  which are not "interrupt safe".
;
;
;  Input:  none
;
;  Output: [B] data received from Speaker board
;
;  Uses:
;
;  Routines Called:
;  Exit State:          [B] -- data clocked in from Speaker Board
;                       [A],[X],CCR  -  indeterminate
;
;
;
;-----------------------------------------------------------------------------

RcvFromSpkr:

; The transfer sequence for each bit is as follows:
;
;       - set clock high
;       - read input bit
;       - set clock low
;
; Appropriate delays are inserted where necessary to meet timing requirements.

; Method: we will use the [B] register itself to indicate how many times to
; repeat the "output" loop.  Before we start the loop, we will shift the first
; output bit into the Carry bit while shifting a "1" into [B].lsb.  At the
; bottom of the loop, we will shift the next data bit into the Carry while
; shifting a "0" into [B].lsb.  When we have shifted the initial "1" bit
; all the way through [B] and into the Carry bit, we will exit the input
; loop -- all 8 bits have been shifted in.

        LDAB    #01             ;When "1" bit gets shifted out of top end,
                                ; we're done -- 8 bits shifted in.

RcvLoop:


; Set clock high
```

```
        ORAA    #SpkrClk.          ;Set the clock high
        STAA    SpkrPort

; Read the next input bit, shift into [B].lsb
;
; (Note: data input from Spkr is changed on H-to-L clock transition, so
;  we don't really have to wait here after L-to-H clock before reading input)

RcvBitHi:
        LDAA    SpkrPort           ;Read the speaker port
        ANDA    #SpkrIn.           ;Mask just the input bit
        ADDA    #$FF               ;Add $FF -- C = 1 iff input bit was = 1
        ROLB                       ;   C  <--  [B]  <-- input

; Wait for remainder of minimum clock high time

;>>>    Delay   30                 ;DELAY MAY BE MET BY RcvBitIn INSTRUCTIONS...

; Set clock low, wait specified time (none of these instr's affect Carry bit)

RcvClkLo:
        LDAA    SpkrPort
        EORA    #SpkrClk.          ;Toggle the clock low
        STAA    SpkrPort           ;(Doesn't affect Carry bit)

; Wait for minimum "Clock Low" delay

;>>>    Delay   30                 ;(Does not affect Carry bit)

; Have we shifted the initial "1" bit into the Carry yet?
; If not, repeat and shift in another bit.

        BCC     RcvLoop

        RTS                        ;Return with received data in [B]

;------------------------------------------------------------------------
;  S e n d S p k r U p d a t e   (Send Speaker Update data)  Subroutine
;
;  This routine, called as needed (at 50 Hz intervals) from the timer
;  interrupt routine, transmits the currently requested speaker volume
;  and frequency to the speaker board.
;
;  NOTE: this routine is called from within the timer interrupt routine,
;  so it is may not use any temporary variables or any other variables
;  which are not "interrupt safe".
;
;  Input:  SpkrVol, SpkrPeriodS
;
;  Output: SpkrPrevVol, SpkrPrevPeriodS
;
;  Routines Called:
;  Exit State:          [A],[B],[X],CCR  -  indeterminate
;
;
;
;------------------------------------------------------------------------

VFCmd.          .equ    1          ;Command code "1" is the Volume/Freq command

SendSpkrUpdate:

; Since we did not have any more digital I/O's available for a "Chip
; Select" signal to the PIC on the speaker board, we warn the speaker
; board that we are going to send data by forcing the DataOut line HIGH
; during the Strobe pulse at the end of the 5001 I/O latch update.
;
; When we don't have speaker data to send, we must be careful to keep
; the DataOut line LOW when applying the 5001 Strobe signal.
;
; This routine requires that the correct "STROBE + DATA HIGH" signal has
; already been asserted at the end of the last I/O Latch update (5001),
; and that the PIC on the speaker board is ready to receive data.
;
; It is absolutely critical that no other use of the serial clock and data
; lines occurs between the time the strobe signal is asserted and the
; time that this routine is called to transfer the data.

; Send Volume, Period Hi, and Period Lo bytes to the speaker

; 1st byte = Command code (top 4 bits) and Volume (bottom 4 bits)

        LDAB    SpkrVol            ;Get the current requested volume (0..10)
        STAB    PrevSpkrVol        ;Save a copy for comparison next time

        ANDB    #$0F               ;Volume should only be in the low 4 bits
        ORAB    #(VFCmd.).shl.4    ;Put the "Volume & Frequency" command
                                   ; into the top 4 bits

        PSHB                       ; +[Start a new comm. chksum]

        JSR     SndToSpkr          ;Send Code:Vol to the PIC on the speaker board

        MUL                        ;(13 clock delay... ([A] & [B] don't cares))

; 2nd byte = Period High byte

        LDAB    SpkrPeriodS+0      ;Now send the period high byte
        STAB    PrevSpkrPeriodS+0

        PULA                       ; -[Get the comm. chksum byte]
        ABA                        ;Add the next byte we are transmitting
        PSHA                       ; +[Save chksum back on the stack again]

        MUL                        ;(13 clock delay... ([A] & [B] don't cares))

; 3rd byte = Period Low byte

        LDAB    SpkrPeriodS+1      ;Now send the period low byte
        STAB    PrevSpkrPeriodS+1

        PULA                       ; -[Get the comm. chksum byte]
        ABA                        ;Add the next byte we are transmitting
        PSHA                       ; +[Save chksum back on the stack again]

        JSR     SndToSpkr

        MUL                        ;(13 clock delay... ([A] & [B] don't cares))

; 4th byte = complement of checksum (bit complement of sum of 1st 3 bytes)

        PULB                       ; -[Retrieve the calculated checksum]

        COMB                       ;Perform bit complement on checksum byte

        JSR     SndToSpkr          ;Send the complemented checksum to spkr PIC

        RTS

        .end ; of file
```

According to another feature, the programmable parameters may be stored in a checksum-protected data area to check the integrity of the data. A second copy of this data is maintained as a back-up and is used to restore the primary data area whenever the primary data is corrupted, provided the secondary data is still valid and intact. The number of times that the secondary data is used to restore the primary data may be logged, for example, as described above to enable a technician to determine if there is a problem. An example of a subroutine for implementing this "data-fix" feature is as follows.

```
;--------------------------------------------------------------------------------
;
; CHECKSUM-PROTECTED DATA AREA
;
; Various programmable parameters are kept here with an accompanying
; checksum which can be used to check the integrity of the data.  The
; original declarations for these variables remain scattered throughout
; this file but are commented out.  For descriptions of these variables,
; consult their "logical" declarations.
;
; This data area should hold any information that must be retained through
; normal power-down, including programmed product information, degF/degC
; mode, etc.  Run-time data, such as oven state, a-to-d values, current
; product, etc, should not be stored here.
;
; All variables which appear here should be declared and described above,
; and commented out, with a second line indicating "in chksum data area":
;
;       ;VarName        .byte           ;Xxx x xx xx x xxxxx x
;       ;(in chksum data area)
;
; This indicates that the actual data storage location is within this
; checksum protected area.
;
; A second copy of this protected data area is maintained as a backup and
; is used to restore this primary data area whenever this area is corrupted
; (providing the second data area is still valid and intact).
;
```

```
DataArea1:

;--------------- Start of checksum-protected data area ----------------------

ProdArray       .blkb   (MaxProd.+1)*ProductSz.  ;Product array

DegCMode        .byte           ; <> 0 ==> User wants Celsius operation

DegSymb         .byte           ;Symbol for temp displays (elevated "F" or "C")

PrbCalibOfsFS   .word           ;Temperature calibration offset (Fahrenheit)

LanguageCode    .byte           ;Language select code (00 = US English)

AlmDuraLmtS     .word           ;SS,MM duration of alarms until self-cancel

KncDuraLmtS     .word           ;SS,MM duration of ssc's until self-cancel

RdyPlusLmtF     .byte           ;Ready range Plus and Minus limits
RdyMinusLmtF    .byte

PrgModePasswd   .blkb   PasswdSz.  ;Password key seq for entry to Prod Prog

SpPrgModePasswd .blkb   PasswdSz.  ;Password key seq for entry to Special Prog

IoTestPasswd    .blkb   PasswdSz.  ;Password key seq for entry to I/O Test Mode

UserSpecVol     .byte           ;User programmed speaker volume
UserSpecFreqS   .word           ; and frequency, plus corresponding
UserSpecPeriodS .word           ; "period" in usec.

;----------------- End of checksum-protected data area ----------------------

DataEnd1:


DataAreaSz.     .equ    DataEnd1-DataArea1      ;How many bytes in cksum area


; Offsets to individual products within the ProdArray

Product0        .equ    ProdArray+0*ProductSz.  ;(Placeholder -- not really used)

Product1        .equ    ProdArray+1*ProductSz.
Product2        .equ    ProdArray+1*ProductSz.
Product3        .equ    ProdArray+3*ProductSz.
Product4        .equ    ProdArray+4*ProductSz.  ;Access to individual products
Product5        .equ    ProdArray+5*ProductSz.
Product6        .equ    ProdArray+6*ProductSz.
Product7        .equ    ProdArray+7*ProductSz.
Product8        .equ    ProdArray+8*ProductSz.
Product9        .equ    ProdArray+9*ProductSz.
Product10       .equ    ProdArray+10*ProductSz.
```

```
;SECONDARY CHKSUM-PROTECTED DATA AREA
;
; This is basically the backup copy of the checksum-protected data area.
; The data stored here is used to restore the primary data area in the event
; it is corrupted.  This data must be updated each time the primary data
; area is changed.

ChksumS         .word           ;16-bit checksum of BYTES within DataArea2

DataArea2:      .blkb   DataAreaSz.

DataEnd2:

;DATA AREA 1 TO DATA AREA 2 OFFSET

; This offset indicates the difference between the start of the primary
; data area to the start of the secondary data area.  Since all variables
; in the secondary area are stored in the same order as in the primary area,
; we can determine the address of the "secondary" copy of any variable in
; DataArea1 simply by adding this "offset" to the primary address.
;
; For example:
;   address of DegCMode in secondary area = #(DegCMode+Data1Data2Ofs.)

Data1Data2Ofs.  .equ    DataArea2-DataArea1


;----- Ram test indicators -----
; This is the second copy of the "unrestored ram" indicators.
; We MUST guarantee that these "Y" indicators are not in the same
; N-byte test block as the "X" indicators (RamTstXFlagS/RamTstXPtrS).
; See the "Ram Test Variables" below for details.

RamTstYFlagS:   .word           ;"NN" ==> unrestored data held in RamTstSave
RamTstYPtrS:    .word           ;Indicates source address of unrestored data


; ------ INITIALIZATION INDICATOR ------

; When the system parameters have been initialized, the PgmID code will be
; copied into the InitID area below.  When the control is powered up, it will
; check the InitID area and the PgmID for a match.  If they do not match, the
; control assumes that either this is a brand new system (ie first power-up),
; or that a new (uninitialized) NOVRAM has been installed, or that the
; system was previously running a different software version.  Any of these
; circumstances call for a system initialization.

RAMInitID:      .blkb   6       ;6 bytes of initialization version info
```

```
[illegible]        .word

[illegible]        .word


; The system stack is located in the last 128 bytes of [illegible].

; We will also use this area for the RAM test save area, so we must assure
; that the "[illegible]" is less than or equal to the stack size.

        .ORG    [illegible]Start+[illegible]-128

SysStack:       .blkb   128     ;This is the system program stack.
                                ;80 (128) bytes for stack should be plenty.

SysStackTop     .EQU    $-1     ;Stack pointer must be initialized to
                                ; top memory address of stack area.



;----- R A M   T E S T   V A R I A B L E S -----
;
; The [illegible] variables are used in performing the Ram walking bit test at
; power-up.  Ram is tested in N-byte blocks, which are temporarily saved
; in the [illegible] block (which shares sytem stack space).
;
; Since the [illegible] area is the only area of RAM that is NOT preserved
; during the ram test, we need to make sure that the save area is not
; long enough to overwrite the stack locations required when we are
; actually executing the test.  That is, we need to make sure the [illegible]
; area does NOT overlay the top of the stack, where we have a few levels
; of return addresses while executing the power-up RAM test.
;
; The [illegible] and the [illegible] flags are set to "[illegible]" to indicate
; data is currently held in the [illegible] area which needs to be copied
; back to its original location, as pointed to by [illegible]/[illegible].
; We need two copies of the flags and pointers because if we had just one
; copy it might reside in the area under test and therefore would be
; obliterated by the test itself.

[illegible]:    .equ    SysStack ;overlay the ram test save area with the
                                 ; bottom of the stack area.


[illegible]     .equ    32      ;Size of ram test blocks.  This number must
                                ; be an even divisor of the memory areas
                                ; to be tested, and must be sufficiently
                                ; smaller than the stack space size to assure
                                ; that the ram test itself has enough stack
                                ; space to execute and return.




        .DB
```

As described above, access to various levels or modes may require entry of a code or password. By restricting access to these codes or passwords certain classes of individuals may be restricted from accessing certain features or groups of features. An example of a subroutine for implementing this access control in a cooking appliance is as follows.

```
                    -- Password routines

;----------------------------------------------------------------------
;
;       K R P A S S W D . S 0 0
;
; This file provides the standard routines to request or program the Password.
;
;----------------------------------------------------------------------


        .include 0:KRStd.L10


; External variables:

        .extern page0 BlkTmr, Tmr1msBit., Tmr2msBit., Tmr4msBit., Tmr8msBit.

        .extern page0 ErrTmr
        .extern page0 SpkrRem, page0 SpkrReqVol, page0 SpkrReqTone

        .extern page0 CurKey
        .extern page0 KeyHold100, page0 KeyHold55

        .extern KeySet.
        .extern KeyNbr1., KeyNbr2., KeyNbr3., KeyNbr4., KeyNbr5.
        .extern KeyNbr6., KeyNbr7., KeyNbr8., KeyNbr9., KeyNbr10.

        .extern page0 LDigits
        .extern page0 LDig1, page0 LDig2, page0 LDig3, page0 LDig4
        .extern page0 LDigLeds, DigBlnk.

        .extern page0 RDigits
        .extern page0 RDig1, page0 RDig2, page0 RDig3, page0 RDig4
        .extern page0 RDigLeds

        .extern NumDig1, NumDig2, NumDig3, NumDig4


        .extern page0 StpTmr

        .extern PassWdSz.

        .extern PassWdEntry, PassWdTargetPtrS

        .extern PassWdStep, PassWdTimeoutS, PassWdExPending, PassWdExClk


        .extern page0 TempByte, page0 TempWord0S, page0 TempWord2S
        .extern page0 BkMoveS, page0 Ptr1S, page0 Ptr2S


; Password Programming variables


;;;     .extern ItemStep, ItemSubStep
;;;     .extern ItemProcPtrS, ItemIdMsg, ItemMsgSeq
;;;
;;;     .extern PrgChanged, ExitPending, ExitPendClk
;;;
;;;
;;;     .extern PWdPrgEntry


;(From KRMsgs.S0R:)

        .extern MsgCode., MsgBad., MsgSet.
        .extern MsgBlanks.
        .extern MsgProdPrg., MsgSePrg., MsgRepeat.


; Songs and speaker tones:

        .extern Tone.Good., Tone.Alert.


; External Routines:

        .extern GetKey, ChkKeyPressed

        .extern StartErr, BadKeySound, GoodEntrySound, BadEntrySound

        .extern ShowMsg, ShowMsgSeq
        .extern BinToBcd2Dig
        .extern BlockCopyIToJ

        .extern DisplayBars


; Constants/Routines Defined Here:

        .global PWdInput., PWdValid., PWdInvalid., PWdCancel., PWdTimeout.
        .global PWdGo., PWdNoGo.

        .global CmpPassWdEntry, DoPassWdEntry, DoPassWdResult


;;;     .global DoPassWdItem


PWdInput.       .equ    1       ;User is entering the password
PWdCancel.      .equ    2       ;User wants to abort entry
PWdTimeout.     .equ    3       ;User took too long to enter password
PWdInvalid.     .equ    4       ;User entered an invalid password
PWdValid.       .equ    5       ;User entered a valid password

PWdGo.          .equ    6       ;Valid password -- proceed
PWdNoGo.        .equ    7       ;Invalid or incomplete password -- deny access
```

```
; This routine simply displays the "blind" echo of the password being
; entered.  That is, a small vertical bar is displayed for each key
; in the password, regardless of the actual key values entered.
;
;
; Input:  PassWdEntry -- byte[0] = number of keys entered, [1]..[N] = keys
;
; Output: LDig1..LDig4, LDigLeds
;         RDig1..RDig4, RDigLeds
;
;
; Routines Called:
; Exit State:           [A],[B],[X],CCR  -  Indeterminate
;
;
;
;----------------------------------------------------------------------

BlindEchoPassWd:


        LDX     #RDig1
        LDAB    PassWdEntry+0   ;Get the number of keys entered

        JSR     DisplayBars     ;Call the standard "bar graph" display

        RTS



;----------------------------------------------------------------------
; C m p P a s s W d E n t r y  (Compare Password Entry)  Subroutine
;
; This routine compares the 9 bytes of the password entry string to the
; 9 bytes pointed to by [X].  If all 9 bytes match exactly, this routine
; returns with the "Z" bit set to "1".  Otherwise, the "Z" bit is returned
; cleared to 0.
;
;   ( ie LDX #Password / JSR CmpPassWdEntry / BEQ Match / BNE Mismatch )
;
; Input:  PassWdEntry -- N+1 bytes (size + N keycodes) entered for password
;         PassWdTargetPtrS -- points to reference password we are comparing to
;
; Output: CCR.Z --  = 1 if exact match (all 9 bytes),  = 0 if not
;
;
; Routines Called:
; Exit State:           [A],[B],[X],CCR  -  Indeterminate
;
;
;
;----------------------------------------------------------------------

CmpPassWdEntry:


; Get the number of bytes "N" to be compared from byte[0] of the target
; password (pointed to by "PassWdTargetPtrS").  Then compare bytes 0..N
; of PassWdEntry to bytes 0..N of the target password.  Return the CCR.Z
; flag to indicate whether all bytes match or not.  NOTE that this comparison
; INCLUDES the number of bytes in the sequence, so if the number of keys
; entered does not match the number of keys in the target sequence, the
; comparison will not succeed.


; Do the copy loop:
;
;   B := Number of keys in target sequence
;
;   for B := N downto 0 do          ;Compare all N keys + "Size" byte,
;       if entry[B] <> target[B]    ; (from end to beginning for convenience)
;          then return(CCR.Z := 0);-> We can quit as soon as we see mismatch
;
;   return(CCR.Z := 1)              ;-> Else if we make it this far, all matched
;

        LDX     PassWdTargetPtrS ;Get pointer to the target password
        LDAB    0,X             ;Get the number of keys in the target sequence

PWdCmpLp:
        LDX     #PassWdEntry    ;Get the source pointer
        ABX                     ;Add the byte offset
        LDAA    0,X             ;Get the next byte of the entered value

        LDX     PassWdTargetPtrS ;Get the target pointer value
        ABX                     ;Add the byte offset
        CMPA    0,X             ;Compare to the entered byte in [A]
        BNE     CmpPWdDone      ;If mismatched, exit now with CCR.Z = 0...

        DECB                    ;Else decrement the byte offset value
        BPL     PWdCmpLp        ;Repeat til we've compared all bytes (ofs>=0)

        CLRA                    ;If we make it here, all bytes matched --
                                ; for CCR.Z = 1 by "CLRA" instruction

CmpPWdDone:                     ;When we exit here, we will have CCR.Z = 1
                                ; ONLY if all "N" bytes and byte[0] matched

        RTS



;----------------------------------------------------------------------
; I n i t P w d E n t r y  (Initialize Password Entry)  Subroutine
; -
; Input:
;
; Output: LDig1..LDig4, LDigLeds
;         RDig1..RDig4, RDigLeds
;
;
; Routines Called:
; Exit State:           [A],[B],[X],CCR  -  Indeterminate
;
```

```
InitPwdEntry:
        .macro

        LDX     #1800           ;Start the "maximum entry time" timer
        STX     PasswdTimer$

        CLR     PasswdEntry+0   ;Reset the "number of keys entered" byte
                                ;(ie byte[0] is string length)

        CLR     PasswdExPending ;Make sure the "Exit Pending" flag is reset
                                ; (Press and hold SET to exit p'word entry)

        .endm


;-------------------------------------------------------------------------
; D o P a s s w d E n t r y   (Do Password Entry)  Subroutine
;
;
; This routine should be called to handle entry steps 0..1.  Steps > 1 are
; "post-entry" steps, and the DoPasswdResult routine should be called to
; handle the displays and keys for those steps (ie PasswdStep > 1).
;
; Note: after the correct number of keys have been entered, as indicated
; by the length byte of the target password, this routine will compare the
; entered password to the target password, and decide which step to move
; on to.
;
; Password steps 2..5 are message display steps after entry of the password
; has either been completed by the user, or has been terminated by the
; controller due to expiration of the timer.  The caller may watch for
; codes 2..5 and handle directly as he sees appropriate, or may call the
; DoPasswdResult routine (below) to handle the displays and keys for a
; pre-defined period of time.
;
; Each of the steps 2..5 is of finite duration, and will automatically
; advance to the "Go" or "NoGo" steps (6, 7) after the appropriate delay
; time.  The caller MUST handle Go and NoGo values when PasswdStep reaches
; those values, as no display or key processing is defined for them here.
; In general, "Go" means a valid password was entered and the caller should
; proceed, while "NoGo" means no valid password WAS NOT entered and the user
; SHOULD NOT be granted access to whatever he is trying to do.  (Note that
; "No Go" could be the result of an invalid password, an entry timeout, or
; a user requested exit from password entry mode.)
;
;
;
; Typical sequence:
;
;
;  InitPrg:
;       PrgStep = 1;
;       PasswdStep = 0;
;
;
;  DoPrgmode:
;
;       case PrgStep
;
;        0: call InitPrg
;
;        1: begin
;           case PasswdStep
;            0,1:    call DoPasswdEntry  [let user enter a password]
;            2..5:   call DoPasswdResult [use std result displays]
;            PwdGo:  PrgStep = 2 [advance to programming]
;            PwdNoGo: goto ExitPrgMode
;           end;
;
;        2: begin
;           case ParmIndex
;            0:  call SetTmp
;            1:  call SetTime
;            etc...
;           end;
;
;       end;
;
;
;
; Input:  PasswdStep, PasswdEntry, PasswdTargetPtr$
;
;
; Output: LDigits, RDigits
;         PasswdStep
;
; Routines Called:
; Exit State:          [A],[B],[X],CCR  -  indeterminate
;
;
;
; -----------------------------------------------------------------------

DoPasswdEntry:

; NOTE: The value of PasswdStep indicates which phase of password entry we
; are currently on.  Caller should set PasswdStep to 0 and call this routine
; to begin password entry.  Steps 0 & 1 indicate that entry is in progress
; and we are currently waiting on key entry #1..N.  Once the entry has been
; completed -OR- the user has abandoned the password entry sequence -OR-
; -OR- the maximum entry time has expired, the PasswdStep will be set to
; an appropriate value > 1.  At this point, the password entry operation
; is finished -- the caller should interpret the result and take appropriate
; action.  (Basically, this routine should never be called with a
; PasswdStep value > 1...)


; First, see if we need to initialize the Password Entry operation

ChkInit:
        LDAA    PasswdStep      ;If PasswdStep already > 0,
        BNE     ChkInitDone     ; we don't need to initialize...
```

```
        STAA    PasswdStep      ;Now waiting for 1st key entry...

ChkInitDone:


;U p d a t e   D i s p l a y s

; Left-hand digits show Password entry identifier

        LDAB    #MsgCode.       ;Get the "code" message
        LDX     #LDigits
        JSR     ShowMsg

; Right-hand digit shows bar for each key entered

        JSR     BlindEchoPasswd


;C h e c k   T i m e o u t

; See if the maximum allowed entry time has expired.  If so, time
; to terminate the Password entry sequence...

ChkTimeOut:
        LDX     PasswdTimer$    ;Get the countdown timer
        BNE     TimeOutDone     ;If still > 0000, then not timed out...

        LDAA    #PwdTimeout.    ;Else timer counted down to 0000 -- signal
        STAA    PasswdStep      ; entry "timeout" via the PasswdStep variable

        LDX     #200            ;We will display the "timeout" message
        STX     PasswdTimer$    ; for 2 seconds...

        JMP     PwdEntryDone    ; exit this routine...

TimeOutDone:


;P r o c e s s   K e y   I n p u t

; See if any new keys have been pressed.  If so, add to the entry string
; (except the SET key initiates a "press and hold SET to exit" operation)

ChkKey: JSR     GetKey          ;See if any new keys have been pressed:
        BNE     WhatKey         ; If so, find out which one and respond
        JMP     KeyDone

; Got a new key press -- add the key code to the password entry string
;
WhatKey:


; - - -  "SET" key?  - - -

ChkSet: CMPA    #KeySet.        ;Is it the SET key?


        BNE     ChkNumberKey    ; If not, log it as the next sequence key

; SET key must be pressed and held to gracefully exit Password entry mode

ExitPendKey:
        LDAB    #$FF            ;Set the "Exit Pending" flag to true
        STAB    PasswdExPending

        CLR     PasswdExClk     ;Reset the "press and hold" clock to 0...

        BRA     KeyDone


; - - -  Number Key?  - - -
;
; Key code is in [A].  Save as the next value in the entry string.

ChkNumberKey:
        CMPA    #10             ;(Key codes 1..10 are numbers 1..9, & 0)
        BHI     KeyOther        ;Key code > 10  -->  not a number key

        BLO     AppendNewKey    ;Else Key Codes 1..9 are ready to save as is
        CLRA                    ;Key Code "10" must be converted to number "0"

; Now save the key number 0..9 (in [A]) into the next password position

AppendNewKey:
        LDX     #PasswdEntry    ;Get start address of string
        INC     0,X             ;Increment the number of keys in sequence
                                ; (Passwd[0] is number of keys)
        LDAB    0,X             ;Get the character count value (offset)
        ABX                     ;[X] now points to byte for next key code
        STAA    0,X             ;Save newest key code into entry string

; "PasswdTargetPtr$" points to the password we are trying to match.
; Byte[0] of any password indicates the number of keys in the sequence.
; See if the user has now entered enough keys for this password.

        LDX     PasswdTargetPtr$ ;Get pointer to our "target" password
        CMPB    0,X             ;Compare nbr of keys entered to nbr in target
        BLO     KeyDone         ; If number entered < number in target,
        BRA     EntryComplete   ;   we still have more keys to enter


; - - -  Else what other keys?  - - -

KeyOther:
        JSR     BadKeySound


KeyDone:


; E x i t   P e n d i n g
;
; Do we have a "pending" SET key press & hold to take care of?
;
; First of all, see if the user is still holding the SET key
```

```
KeyReleased:
        LDAB    #KeySet.        ;Need to see if the SET key
        JSR     ChkKeyPressed   ; is still being held down...
        BNE     KeyStillHeld    ;If still held down, see if held X seconds yet

; User has released the SET key -- cancel the "SET key press & hold" operation

KeyReleased:                    ;Else user has released SET in < X seconds:
        CLR     PassWdExPending ; Reset the "SET key Pending" flag
                                ;  -- he gave up too soon
        BRA     ExPendDone

; If SET is held for >= 1 seconds, we need to exit Password Entry mode.

KeyStillHeld:
        LDAA    PassWdExClk     ;Has the user held the key for 1 seconds yet?
        CMPA    #1*10
        BLO     ExPendDone      ;(If not, we need to keep waiting...)

; "SET Key Pending Timer" has hit 1 second: Request "password entry mode" exit.

QuitPwdEntry:                   ; If so, time to leave Password entry
        LDAB    #PwdCancel.     ;  (user has aborted entry)
        STAB    PassWdStep

        LDX     #50             ;We will display the "cancel" message
        STX     PassWd100mS     ; for 1/2 second...

;opt    BRA     PwdEntryDone


ExPendDone:

        BRA     PwdEntryDone



; Entry Complete
;
; All keys entered -- compare input to user-defined password

EntryComplete:
        LDX     PassWdTargetPtrS ;Get the "target" password address
        JSR     CmpPassWdEntry  ;Compare to the password just entered by user
        BEQ     ValidPwd


InvalidPwd:                     ;Set the password step variable to indicate
        LDAB    #PwdInvalid.    ; "invalid password entered"
        STAB    PassWdStep

        LDX     #1000           ;We will display the "bad code" message
        STX     PassWd100mS     ; for 10 seconds...

        CLR     BlnTmr          ;Synchronize the blink timer




        BRA     PwdEntryDone


ValidPwd:                       ;Set the password step variable to indicate
        LDAB    #PwdValid.      ; "valid password entered"
        STAB    PassWdStep

        LDX     #50             ;We will display the "valid entry" message
        STX     PassWd100mS     ; for 1/2 second...

;opt    BRA     PwdEntryDone



PwdEntryDone:

        RTS



;-------------------------------------------------------------------------
; DoPassWdResult   (Do Password Result)  Subroutine
;
;
; Password steps 2..5 are message display steps after entry of the password
; has either been completed by the user, or has been terminated by the
; controller due to expiration of the timer.  The caller may watch for
; codes 9..13 and handle directly as he sees appropriate, or may call the
; THIS ROUTINE to handle the displays and keys for a pre-defined period of
; time.
;
; The DoPassWdEntry routine above lets the user enter a password until
; the correct number of keys has been entered, an entry timeout has occured,
; or until the user cancels the entry (by holding the SET key for 1 second).
; At the conclusion of the entry portion of the password process, the
; DoPassWdEntry routines assigns a result value to PassWdStep and starts
; thePassWdTmr with a predefined value.  This routine may then be called
; to display the appropriate indication, until the PassWdTmr expires.  When
; the delay timer does expire, THIS routine will finally advance the
; PassWdStep variable to either "PwdOn" or "PwdOnOn".  The caller MUST
; take over again once we reach this point, as these routines have not
; defined display or key operations for steps > 5.
;
; (See DoPassWdEntry routine above for more details)
;
;
; Input:  PassWdStep, PassWdEntry
;
;
; Output: DspDigits, DspLeds
;         PassWdStep
;
; Routines Called:
; Exit State:        (A),(B),(X),CCR  -  Indeterminate
;
;
; .
; -------------------------------------------------------------------------
```

```
; Update the display according to the current display step

        LDAA    PassWdStep

        CMPA    #PwdInvalid.
        BEQ     ShowInvalid

        CMPA    #PwdTimeout.
        BEQ     ShowTimeout

        CMPA    #PwdCancel.
        BEQ     ShowCancel

;opt    CMPA    #PwdValid.
;opt    BEQ     ShowValid


;--- Valid password entered: continue normal display

ShowValid:

; Left-hand digits show Password entry identifier

        LDAB    #MsgCode.       ;Get the "code" message
        LDX     #LDigits
        JSR     ShowMsg

; Right-hand digit shows bar for each key entered

        JSR     BlindEchoPassWd

; Sound a "beep-beep-beep" as an audible "password accepted" cue

        LDAB    BzrTmr          ;Is the buzzer timer already running?
        BNE     ValidDone

        JSR     GoodEntrySound  ; (note: beep pattern starts out with an "off"
                                ;  phase for a while in order to separate the
ValidDone:                      ;  beep-beep-beep from the last key press)
        BRA     RsltDispDone


;--- Timeout or Password entry cancelled by user: "----" in entry characters

ShowTimeout:

ShowCancel:

; Left-hand digits show Password entry identifier

        LDAB    #MsgCode.       ;Get the "code" message
        LDX     #LDigits
        JSR     ShowMsg

; Right-hand digits show "----"

        LDAA    #Char.Minus.




        STAA    RDig1
        STAA    RDig2
        STAA    RDig3
        STAA    RDig4
        CLR     RDigLeds

        LDAA    #$FF            ;Request the speaker ON
        STAA    SpkrReq

        BRA     RsltDispDone



;--- Invalid password: blinking "bad code"

ShowInvalid:
        LDAA    BlnTmr
        BITA    #$04            ;Show "bad code" while 2 Hz bit = 1
        BEQ     InvBlanks       ;Else show blanks while 2 Hz bit = 0

InvBadCode:
        LDAB    #MsgBad.
        LDX     #LDigits
        JSR     ShowMsg

        LDAB    #MsgCode.
        LDX     #RDigits
        JSR     ShowMsg
        BRA     InvDispDone

InvBlanks:
        LDAB    #MsgBlanks.
        LDX     #LDigits
        JSR     ShowMsg

        LDAB    #MsgBlanks.
        LDX     #RDigits
        JSR     ShowMsg

InvDispDone:

        LDAA    #$FF            ;Request the speaker ON
        STAA    SpkrReq

        LDAA    #10             ;Request MAXIMUM volume
        STAA    SpkrReqVol

        LDAA    #Tone.Alert.    ;Use the ALERT tone (like system error)
        STAA    SpkrReqTone

;opt    BRA     RsltDispDone



RsltDispDone:


; Ignore all key presses here

        JSR     GetKey          ;If any key has been pressed,
```

```
; Check to see if timer has run out -- if so, advence to Go/Node

        LDX     PasswdGdNod$    ;Get the 100 hz countdown timer
        BNE     GoRmItDone      ;If still running ( > 0), stay on current step

        LDAB    #PwdGo.         ;Else assume correct password was entered...
        LDAA    PasswdStep
        CMPA    #PwdValid.      ;If currently doing "valid" step,
        BEQ     SaveNewStep     ; then next step IS the "Go" step

        LDAB    #PwdNoGo.       ;Otherwise, next step is "No Go"

SaveNewStep:
        STAB    PasswdStep      ;Save the Go/NoGo step


GoRmItDone:


        RTS


;>>> NOTE: ALL PASSWORD PROGRAMMING ROUTINES HAVE BEEN HIDDEN
;>>>
;>>>       BY PLACING THEM AFTER THE ".END" OF THIS FILE...


        .end ;(end of file)



;*****************************************************************************
;*****************************************************************************
;
;  P R O G R A M M I N G   R O U T I N E S :
;
;  The routines below are called in order to program a new value for the
;  password pointed to by ItemSrcPtrS.  The "DoPwdItem" routine can be
;  called from the normal DoItemProgram routine when the current item has
;  been identified as a "CustomItem" (ie not directly supported by the
;  normal item programming routines).  To this end, the CustPrgRtn$ pointer
;  should be set to the address of the "DoPwdItem".
;
;
;*****************************************************************************
;*****************************************************************************



ItemExistStep.  .equ    1
ItemEntryStep.  .equ    2
ItemRepeatStep. .equ    3
ItemGoodStep.   .equ    4
ItemBadStep.    .equ    5

;-----------------------------------------------------------------------------
;  I n i t E x i s t V a l u e  (Initialize "Existing" Value step)  Macro
;
;  This routine performs initialization for the "Existing Value" step of
;  password programming.  This basically consists of copying the existing
;  password, pointed to by ItemSrcPtrS, into the PwdPrgEntry password area,
;  and replacing all "unused" bytes at the end of the password with "_"
;  characters.  The "show existing value" routine basically displays all
;  12 bytes of the password sequence, showing leftover bytes as "_".
;
;  Input:  ItemSrcPtrS, ItemPrgDigPtrS
;
;  Output:
;
;  Routines Called:
;  Exit State:          [A],[B],[X],CCR -- indeterminate
;
;
;
;-----------------------------------------------------------------------------

InitExistValue:
        .macro

;Copy the source password into the "PwdPrgEntry" variable so that we
;can replace all unused bytes after the end of the password with "blank"
;characters, in order to simplify the password display routine.

        LDX     ItemSrcPtrS     ;Get pointer to the SOURCE password
        STX     PtrIS
        LDD     #PwdPrgEntry    ;Get pointer to the "Prg Entry" password area
        STD     PtrJS
        LDAB    #PasswdSz.      ;Copy the entire password area
        JSR     BlockCopyITeJ   ;(could get by copying just needed bytes...)

; Now "blank out" the bytes at the end of the password (set = "_")

        LDAB    PwdPrgEntry+0   ;Get the "length" of the source password
        INCB                    ;Advance to the NEXT byte (1st unused byte)
        LDAA    #$00+Seg.d.     ;We will set unused bytes to _'s

PwdBlankLp:
        CMPB    #PasswdSz.-1    ;Are we past the end of the PWD variable yet?
        BHI     BlankLpDone     ; If so, we are done blanking...

        LDX     #PwdPrgEntry    ;Else still have bytes left to blank...
        ABX                     ; Add byte offset to start of password area
        STAA    0,X             ; ...and "blank" the current byte

        INCB                    ;Advance to the next byte of the password area
        BRA     PwdBlankLp      ;And return to the top of the loop



;-----------------------------------------------------------------------------
;  S h o w E x i s t V a l u e  (Show the "Existing" Value)  Subroutine
;
;  This routine simply displays the existing password value -- as pointed
;  to by the ItemSrcPtrS -- to the displays pointed by ItemPrDigPtrS.
;  Leds and the "other" display digits are not affected.
;
;  Input:  ItemSrcPtrS -- points to existing password
;          ItemIdMsg -- message number for "Prod" or "SPCL", etc, which
;                       identified which password we are programming
;          ItemSubStep -- indicates which step of display sequence we are on
;          DspTmr -- used to time each step of the display sequence
;
; Output:
;
; Routines Called:
; Exit State:          [A],[B],[X],CCR -- indeterminate
;
;
;
;-----------------------------------------------------------------------------

PwdDspTimesTbl:    .byte      0,12,12,24,24,24,4

PwdDspOffsetsTbl:  .byte      0,$FF,$FF,1,5,9,$FF    ;($FF ==> blank digits)


ShowExistValue:

; SubSteps for the "Show Existing Value" step of password programming
;   0 -- init
;   1 -- "Prod"
;   2 -- "Code"
;   3 -- "Code"     [1]..[4]
;   4 -- "Code"     [5]..[8]
;   5 -- "Code"     [9]..[12]
;   6 -- "blank"    "blank"


; See if we just now started the "ShowExistValue" step of password program

ChkExistInit:
        LDAA    ItemSubStep     ;ItemSubStep = 0?
        BNE     ExistInitDone
                                ;If so, initialize the "display existing value"
        InitExistValue          ; step by copying value pointed to by the
                                ; ItemSrcPtrS into the PwdPrgEntry variable,
                                ; and changing trailing bytes to "_".

; Move on to display step #1; Start the timer for the first display step.

        INC     ItemSubStep     ;Move on to the first display step

        LDAA    PwdDspTimesTbl+1 ;Get the duration of the first step...



        STAA    DspTmr          ;Start the display timer

ExistInitDone:


; Check the display timer, to see if the current stage of the display
; sequence has been completed.

ChkSubStep:
        LDAA    DspTmr          ;Has the Display Timer counted down to 0 yet?
        BNE     ChkSubDone      ;If not, stay where we are...

        LDAB    ItemSubStep     ;Advance the display step indicator
        INCB
        CMPB    #6              ;Are we past the last step?
        BLS     StartNewSubStep ; If not, ready to go
        LDAB    #1              ; Else return to the first step of sequence

StartNewSubStep:
        STAB    ItemSubStep     ;Save the new substep number (1..4)
        LDX     #PwdDspTimesTbl ;Look up the display time for the new step
        ABX
        LDAB    0,X
        STAB    DspTmr          ;Start the timer for this step

ChkSubDone:


; Now update the displays for the current step of the display sequence

; First do the left-side displays.
; Step 1 = "prod" or "SPCL", etc, as indicated by the ItemIdMsg.
; Steps 2..5 = "code"
; Step 6 = "    " (blanks)

        LDAA    ItemSubStep     ;Get the current sub-step number

        LDAB    ItemIdMsg       ;Assume we'll need 1st step display...
        CMPA    #1              ;Are we on substep = 1?
        BEQ     SetLDigits      ; If so, ready to go

        LDAB    #MsgBlanks.     ;Else assume we'll need blanks (for last step)
        CMPA    #6              ;Are we on step 6?
        BEQ     SetLDigits      ; If so, we DO want the blanks

        LDAB    #MsgCode.       ;Else steps 2..5 need to display "code"

SetLDigits:
        LDX     #LDigits        ;Message number is already in [B]
        JSR     ShowMsg         ;Display the id message in the left digits


; Now display the proper 4 bytes (out of 12) of the available password area,
; or display blanks, in the right side digits:
;       Step 1 = (blanks)         Step 2 = (blanks)
;       Step 3 = bytes[1]..[4];   Step 5 = bytes[5]..[8];
;       Step 5 = bytes[9]..[12];  Step 6 = (blanks)
; Except: we briefly display blanks in between section of the password...
```

```
; "$FF" indicates we should display blanks for the current step...

        LDX     #PwdDspOffsetsTbl   ;(table of display starting byte offsets)
        LDAB    ItemSubStep         ;Get current substep number (1..6)
        ABX
        LDAB    0,X                 ;Get byte offset (to 1, 5, or 9) for this step

        BMI     BlankRDigits        ;Byte offset = $FF  ==>  need to blank digits

        LDAA    DspTmr              ;Else are we in the last little bit of the
        CMPA    #2                  ; current "show password section" step?
        BLS     BlankRDigits        ; If so, we need to briefly blank the displays

ShowPwdSection:                     ;Else display the current piece of the password
        LDX     #PwdPrgEntry        ;Get address of "copy" of existing value
        ABX                         ;Add offset to start of section we want to show

        LDD     0,X                 ;Get the 1st two bytes of section we want
        STD     RDig1               ; ...and save into RDig1 and RDig2
        LDD     2,X                 ;Get the next two bytes...
        STD     RDig3               ; ...and save into RDig3 and RDig4

        CLR     RDigLeds            ;(make sure the colons are turned off)

        BRA     ShowExistDone

BlankRDigits:                       ;Display blanks in the right side digits
        LDAB    #MsgBlanks.
        LDX     #RDigits
        JSR     ShowMsg

;opt    BRA     ShowExistDone


ShowExistDone:


        RTS

; -----------------------------------------------------------------------
;  G o P W d I t e m E n t r y   (Go to Password Item Entry)  Macro
;
;  This routine sets ItemStep to the "Entry" step of password programming,
;  and performs the initialization of the password item entry variables.
;  This action is basically a response to the user having pressed a number
;  key while on the "Existing Value" step, indicating that the user is
;  reprogramming the password value.  The number key pressed is passed
;  here in the [A] register, and therefor is saved as the first digit of
;  the new password value.
;
;  Input:  ItemStep, PwdPrgEntry
;
;
;  Output: LDigits, RDigits
;          PasswdStep
;
;  Routines Called:
;  Exit State:         [A],[B],[X],CCR  -  indeterminate
;
;
;
; -----------------------------------------------------------------------

GoPwdItemEntry: .macro

; First, save the new number key as the first digit entered for the new
; password.  (We must first convert KeyCode = 10 into the number "0".)

        CMPA    #10
        BNE     Save1stDig
        CLRA
Save1stDig:
        STAA    PwdPrgEntry+1       ;Save the number as the 1st digit in the
        LDAB    #1                  ; password programming area
        STAB    PwdPrgEntry+0       ;Set the password length to "1"...

        STAA    NumDig4             ;Also save the number key in the rightmost
        LDAB    #$00+Seg.d.         ; digit of the "calculator style" display
        STAB    NumDig1             ; digits, and set the leading 3 digits
        STAB    NumDig2             ; to the "_" character.
        STAB    NumDig3

; we use the DspTmr (Display Timer) to sequence "Prod", "Code", blanks, etc

        CLR     DspTmr              ;Clear the DspTmr, to force new display cycle

        LDX     #ProdCodeSeq        ;Assume we are doing the "Prod Prog" password

        LDAB    ItemIdMsg
        CMPB    #MsgProdPrg.        ;If we ARE doing Product password,
        BEQ     SaveEntrySeq        ; we're ready to go...

        LDX     #SpclCodeSeq        ;Else change that to the "Spcl Prog" password

SaveEntrySeq:
        STX     ItemMsgSeq

; now set the ItemStep to indicate we are now on the "Entry" step

        LDAB    #ItemEntryStep.
        STAB    ItemStep

        CLR     ItemSubStep

        .endm

; -----------------------------------------------------------------------
;  D o P W d E x i s t i n g I t e m  (Do Password Existing Item)  Subroutine
;
;  This routine displays the EXISTING value of the current item (in the
;  proper format, of course) and waits to see if the user wants to
;  change the value or simply move on.  If the user presses a number key,
;  this routine will activate "numeric entry mode" and pass the key on
;
;  Input:  ItemType, ItemSrcPtrS, ItemPrDigPtrS, ItemStep
;
;  Output:
;
;  Routines Called:
;  Exit State:         [A],[B],[X],CCR -- indeterminate
;
;
;
; -----------------------------------------------------------------------

DoPwdExistingItem:

; Update the display to show the current entry values...
; Note that we have several display formats to choose from.

        JSR     ShowExistValue      ;Display existing value in ItemPrDigPtrS digits


; Now handle the key inputs:
; Number keys 1..10 shift all entered numbers over one position (#10 = "0")
; The "Set" key terminates the current entry string (like a [Enter] key).

        JSR     GetKey              ;See if any keys have been pressed...
        BCS     ExKeyDone

; S E T   k e y . . .

ExChkSet:
        CMPA    #KeySet.            ;Is it the SET key?
        BNE     ExChkNbr

        LDAA    #00                 ; If so, signal "Done with this item"
        STAA    ItemStep            ;(ie user isn't going to change the password)

        LDAA    #$FF                ; Also, start the "Exit Pending" operation
        STAA    ExitPending         ; in case user is trying to exit Program mode.
        CLR     ExitPendClk         ;  (user must Press and Hold to do exit)

        BRA     ExKeyDone

; n u m b e r   K e y s   1 - 1 0 . . .

ExChkNbr:                           ;Else is it a number key 1..10?
        CMPA    #10
        BHI     ExKeyOther

        GoPwdItemEntry

        BRA     ExKeyDone

; o t h e r   k e y s . . .

ExKeyOther:                         ;Else what other key???
        JSR     BadKeySound

;opt    BRA     ExKeyDone


ExKeyDone:


        RTS


; -----------------------------------------------------------------------
;  G o P W d R e p e a t E n t r y  (Go to Password Repeat Entry)  Macro
;
;  This routine sets ItemStep to the "Repeat Entry" step of password
;  programming, copies the first entry into the "PasswdEntry" variable,
;  and performs the initialization of the password item repeat entry
;  variables.
;
;  This action is basically a response to the user having pressed the SET
;  key while on the "Item Entry" step, indicating that the user has
;  finished entering the new password value.
;
;  Input:  ItemStep, PwdPrgEntry
;
;
;  Output: LDigits, RDigits
;          PasswdStep
;
;  Routines Called:
;  Exit State:         [A],[B],[X],CCR  -  indeterminate
;
;
;
; -----------------------------------------------------------------------

GoPwdRepeatEntry: .macro

; Copy the first entry into the PasswdEntry variable...

        LDX     #PwdPrgEntry        ;Copy the new entry into the generic
        STX     PtrIS
        LDD     #PasswdEntry        ; "PasswdEntry" variable for safe keeping
        STD     PtrJS
        LDAB    #PasswdSz.
        JSR     BlockCopyIToJ

        CLR     PwdPrgEntry+0       ;Reset the string we do entry into

; Reset all 4 entry digits

        LDAB    #$00+Seg.d.         ;Clear out all 4 digits of the
        STAB    NumDig1             ; "calculator style" display digits.
```

```
; Prepare to display the "re-" "peat" message sequence

        LDX     #RepeatSeq          ;Set pointer to the "re-" "peat"
        STX     ItemMsgSeqS         ; message sequence defined below

        CLR     DspTmr              ;Clear DspTmr to force a new display cycle


; Now set the ItemStep to indicate we are now on the "Repeat Entry" step

        LDAA    #ItemRepeatStep.
        STAA    ItemStep

        CLR     ItemSubStep

        .endm


;-----------------------------------------------------------------------
; DoPwdItemEntry   (Do Password Item Entry)  Subroutine
;
; This routine performs the "numeric entry" task of the password programming
; operation.  The user is allowed to enter number keys into the password
; programming area until he presses the SET key.  If the maximum number
; of keys is entered without the SET key being pressed to terminate entry,
; then all subsequent number keys will simply be rejected with a "beep-beep"
; until the SET key is pressed.
;
; Input:  ItemStep, PwdPrgEntry
;
;
; Output: LDigits, RDigits
;         PasswdStep
;
; Routines Called:
; Exit State:          [A],[B],[X],CCR  -  indeterminate
;
; -
;
;-----------------------------------------------------------------------

;One of these message sequences is assigned to the ItemMsgSeqS variable

ProdCodeSeq:    .byte   'R', 36, MsgProdPrg., 20, MsgCode., 4, MsgBlanks., 0

SpclCodeSeq:    .byte   'R', 36, MsgSpPrg., 20, MsgCode., 4, MsgBlanks., 0

RepeatSeq:      .byte   'R', 36, MsgRepeat., 20, MsgRepeat.+1, 4, MsgBlanks., 0


DoPwdItemEntry:


;Update Displays

; Left-hand digits show Password entry identifier sequence

        LDD     #LDigits
        LDX     ItemMsgSeq          ;Message sequence already set appropriately

        JSR     ShowMsgSeq


; Right-hand digit shows the last four numbers entered... (blinking)

        LDAA    BlnkTmr
        BITA    #TwrdsmBit.
        BEQ     BlinkRDigits

ShowLast4Nbrs:

        LDD     NumDig1             ;Get digits 1 and 2...
        STD     RDig1               ; ...and display in right side digits 1 and 2
        LDD     NumDig3             ;Get digits 3 and 4...
        STD     RDig3               ; ...and display in right side digits 3 and 4

        CLR     RDigLeds            ;Make sure no colons on...

        BRA     RDigitsDone

BlinkRDigits:

        LDAA    #MsgBlanks.
        LDX     #RDigits
        JSR     ShowMsg

;opt    BRA     RDigitsDone


RDigitsDone:


;Process Key Input

; See if any new keys have been pressed.  If so, add to the entry string
; (except the SET key initiates a "press and hold SET to exit" operation)

xChkKey:
        JSR     GetKey              ;See if any new keys have been pressed:
        BNE     xWhatKey            ; If so, find out which one and respond
        JMP     xKeyDone

; Got a new key press -- add the key code to the password entry string
;
xWhatKey:


; - - -  "SET" key?  - - -

xChkSet:
```

```
; SET key must be pressed and held to exit Special Program mode

        LDAA    #$FF                ;Set the "SpPrg Exit Pending" flag to true
        STAA    ExitPending
        CLR     ExitPendClk         ;Reset the "press and hold" clock to 0...

; If currently doing 1st entry, move on to the repeat entry step:
; (1st time through, entry is terminated with the SET key.  Second
; time through, entry is terminated when same number of keys is entered.)

        LDAA    ItemStep
        CMPA    #ItemEntryStep.
        BNE     xSetDone

        GoPwdRepeatEntry

xSetDone:
        JMP     xKeyDone


; - - -  Number Key?  - - -
;
; Key code is in [A].  Save as the next value in the entry string.

xChkNumberKey:
        CMPA    #10                 ;(Key codes 1..10 are numbers 1..9, & 0)
        BHI     xKeyOther           ;Key code > 10  ==>  not a number key

        BLO     GotNumber           ;Else Key Codes 1..9 are ready to save as is
        CLRA                        ;Key Code "10" must be converted to number "0"

; Now save the key number 0..9 (in [A]) into the next password position

GotNumber:                          ;Do we have room to add another number?
        LDX     #PwdPrgEntry        ;Get start address of password entry string

        LDAB    0,X                 ;Get the number of keys already in password
        CMPB    #PasswdMax..-1      ;Are we already at maximum?
        BLO     AppendIt

TooManyKeys:
        JSR     BadKeySound         ;If too many keys, just beep...

        BRA     xKeyDone

AppendIt:
        INCB                        ;Increment the number of keys in sequence
        STAB    0,X                 ; (PasswdN(0) is number of keys)

        ABX                         ;[X] now points to byte for next key code
        STAA    0,X                 ;Save newest key code into entry string

        LDAB    NumDig2
        STAB    NumDig1
        LDAB    NumDig3
        STAB    NumDig2
        LDAB    NumDig4


        STAB    NumDig3
        STAA    NumDig4

; If this is second time through (repeat entry), see if we just finished
; entering the second password...

        LDAB    ItemStep            ;If this is the "repeat entry" step...
        CMPB    #ItemRepeatStep.
        BNE     xKeyDone

        LDAB    PwdPrgEntry+0       ;And the number of keys in the "repeat" entry
        CMPB    PasswdEntry+0       ; matches the number from the first time
        BEQ     RepeatEntryDone

        BRA     xKeyDone


; - - -  Else what other keys?  - - -

xKeyOther:
        JSR     BadKeySound


xKeyDone:

        BRA     PwdItemEntryDone


;Repeat Entry Done:
;
; After 2nd entry is complete, compare it to the first.
; If matched, go to the "good code" step;  Else go to the Bad Code step.

RepeatEntryDone:

; See if 2nd entry matches the first

        LDX     #PwdPrgEntry        ;Get pointer to the string just entered
        STX     PasswdTargetPtrS

        JSR     CmpPasswdEntry      ;Compare to the first entry (in PasswdEntry)
        BNE     GoToBadCode

GoToGoodCode:
        LDAB    #ItemGoodStep.      ;Go on to the "good entry" step -- update
        STAB    ItemStep            ; the source variable, sound triple-beep, etc

        CLR     ItemSubStep         ;Start out on the "init" substep

        BRA     PwdItemEntryDone

GoToBadCode:

        LDAB    #ItemBadStep.       ;Go on to the "bad entry" step -- turn the
        STAB    ItemStep            ; buzzer on and indicate bad entries...

        CLR     ItemSubStep         ;Start out on the "init" substep

;opt    BRA     PwdItemEntryDone
```

```
;GoodItemEntryDone:

        RTS


; ------------------------------------------------------------------
; C h k A l l 0 s E n t e r e d   (Check for All 0's Entered)  macro
;
; This macro simply checks all the keys entered for the new password entry
; (in PwdPrgEntry) to see if only 0's were entered.  If only 0's appear,
; the CCR.Z flag is returned set to "1".  If any non-zero digit is
; encountered, the CCR.Z flag is returned set to "0".
;
;            ChkAll0sEntered / BEQ YesAll0s / BNE NotAll0s
;
; Input:  DspTmr
;
;
; Output: LDigits, RDigits
;         ItemStep
;
; Routines Called:
; Exit State:          [A],[B],[X],CCR  -  indeterminate
;
;
;
;------------------------------------------------------------------

ChkAll0sEntered: .macro

        LDAB    PwdPrgEntry+0   ;Get the number of digits entered

        LDX     #PwdPrgEntry+1  ;Start [X] pointing to the first digit

Chk0sLp:
        LDAA    0,X             ;"Test" the current digit
        BNE     ChkAll0sDone    ;If <> 0, exit now with "Z" flag clear

        INX                     ;Else move pointer on to the next digit
        DECB                    ;Decrement the digit counter
        BNE     Chk0sLp         ;If any digits left to check, repeat loop

                                ;Else if we make it here, we checked all
;opt    CLRB                    ; digits and all ARE 0's -- exit now with
                                ; CCR.Z set to "1"
                                ;(opt: "Z" already = 1 due to DECB / BNE )

ChkAll0sDone:

        .endm


;------------------------------------------------------------------
; D o P w d G o o d E n t r y   (Do Password "Good" Item Entry)  Subroutine
;
;
; Input:  DspTmr
;
;
; Output: LDigits, RDigits
;         ItemStep
;
; Routines Called:
; Exit State:          [A],[B],[X],CCR  -  indeterminate
;
;
;
;----------------     ---------------------------------------------

DoPwdGoodEntry:

; See if we just now entered the "Good Entry" state:
; If so, we need to update the source password, sound a "beep-beep-beep", etc

ChkGoodInit:
        LDAB    ItemSubStep     ;SubStep = 0 ==> we just started this step
        BNE     GoodInitDone

; First, see if the user entered all 0's:
;  If so, we have a SPECIAL CASE --
;    set password length to 0 (no password needed).

ChkPwdZeroedNot:
        ChkAll0sEntered         ;Did user enter only 0's? ("0" or "0000", etc)
        BNE     PwdZeroedDone   ;(If ANY non-0 key, leave password as is)

        CLR     PwdPrgEntry+0   ;If so, we need to zero-out the password length
PwdZeroedDone:                  ;(byte[0] indicates length of the password)


; now update the SOURCE password from the program entry value

        LDX     #PwdPrgEntry    ;Copy the new password value back into the
        STX     Ptr1$
        LDD     ItemSrcPtr$     ; password pointed to by the ItemSrcPtr$
        STD     PtrJ$
        LDAB    #PassWdSz.      ;(copy entire password area)
        JSR     BlockCopyIToJ

                                ;Set the "Changed" flag, so the regular
        LDAB    #$FF            ; Special Programming code will take care
        STAB    PrgChanged      ; of updating the checksum and the secondary
                                ; data area and checksum...

        LDAB    #32             ;2 second "good entry" display here...
        STAB    DspTmr

; Sound a "beep-beep-beep" as an audible "password accepted" cue

        JSR     GoodEntrySound  ; (note: beep pattern starts out with an "off"
                                ;  phase for a while in order to separate the
                                ;  beep-beep-beep from the last key press)


        INC     ItemSubStep     ;Now advance past the "init" substep

; Just throw away any keys pressed while here...

        JSR     GetKey

; Now do the normal "good entry" display

        LDAB    DspTmr
        BEQ     GoodNoExist

        CMPB    #4
        BHI     ShowGoodMsg

ShowGoodBlanks:

        LDAB    #MsgBlanks.
        LDX     #LDigits
        JSR     ShowMsg

        LDAB    #MsgBlanks.
        LDX     #RDigits
        JSR     ShowMsg

        BRA     GoodEntryDone

ShowGoodMsg:

        LDAB    #MsgCode.
        LDX     #LDigits
        JSR     ShowMsg

        LDAB    #MsgGood.
        LDX     #RDigits
        JSR     ShowMsg

        BRA     GoodEntryDone


; When the "good entry" message display is over,
;  we return to the "show existing value" step.

GoodNoExist:

        CLR     ItemStep        ;Return to "existing value" step
        CLR     ItemSubStep     ;(actually, reinitialize entire prg item step)

;opt    BRA     GoodEntryDone


GoodEntryDone:

        RTS


;------------------------------------------------------------------
; D o P w d B a d E n t r y   (Do Password "Bad" Item Entry)  Subroutine
;
;
; Input:  DspTmr
;
;
; Output: LDigits, RDigits
;         ItemStep
;
; Routines Called:
; Exit State:          [A],[B],[X],CCR  -  indeterminate
;
;
;
;------------------------------------------------------------------

DoPwdBadEntry:

ChkBadInit:
        LDAB    ItemSubStep     ;SubStep = 0 ==> we just started this step
        BNE     BadInitDone

        LDAB    #32             ;we need a 2-second "bad" "code" display
        STAB    DspTmr

        JSR     BadEntrySound   ;Sound the standard "bad entry" song

        INC     ItemSubStep     ;Advance past the "init" substep

BadInitDone:


; Just throw away any keys pressed while here...

        JSR     GetKey


; Now do the normal "bad entry" display stuff

        LDAB    DspTmr
        BEQ     BadNoExist

        CMPB    #4
        BHI     ShowBadMsg


ShowBadBlanks:
        LDAB    #MsgBlanks.
        LDX     #LDigits
        JSR     ShowMsg

        LDAB    #MsgBlanks.
        LDX     #RDigits
        JSR     ShowMsg

        BRA     BadEntryDone

ShowBadMsg:
```

```
        JSR     ShowMsg

        LDAB    #MsgCode,
        LDX     #NDigits
        JSR     ShowMsg

        BRA     BadEntryDone

; When the "bad entry" message display is over,
;  we return to the "show existing value" step.

ToShowExist:
        CLR     ItemStep        ;Return to "existing value" step
        CLR     ItemSubStep     ;(Actually, reinitialize entire prg item step)

;opt    BRA     BadEntryDone

BadEntryDone:

        RTS


;---------------------------------------------------------------------------
;  D o P a s s W d I t e m   (Do Password Item programming)  Subroutine
;
;  This subroutine performs "Item Programming" user I/O for the currently
;  selected "Password" item.  All item parameters (ItemType, ItemPrePtrS,
;  ItemValPtS, etc) must already be set before this routine is called.
;
;
;  Input:
;
;
;  Output:
;
;  Routines Called:
;  Exit State:          [X] -- unchanged
;                       [A],[B],CCR -- indeterminate
;
;
;
;---------------------------------------------------------------------------

DoPassWdItem:

; First of all, see if we are on the "init" step of this item...

ChkItemInit:
        LDAB    ItemStep        ;Step 0 of current programming item?
        BNE     ItemInitDone

        CLR     ItemSubStep     ;Only thing to init is to reset substep
                                ; to 0 for the first item prg step




        INC     ItemStep        ;(Init step for this item now done...)

ItemInitDone:

        CaseJSR ItemStep,5

        .word   0                       ;0 -- can't be init still
        .word   DoPWExistingItem        ;1 -- Display existing password value
        .word   DoPWEditEntry           ;2 -- Entry of new password value
        .word   DoPWEditEntry           ;3 -- Repeat entry of password value
        .word   DoPWGoodEntry           ;4 -- Entries matched: "Code" "Set"
        .word   DoPWBadEntry            ;5 -- Mismatched entries: "Bad" "Code"

        RTS
```

Timing (e.g. of a cook cycle) may continue through a power down condition. For example, a routine for handling this feature is as follows.

```
;------   T I M I N G   T H R O U G H   P W R   L O S S   ------
;
; If the fryer loses power during a cook or a hold cycle, we want to be able
; to continue that cycle if the fryer is powered up again within a reasonable
; time.
;
; By comparing the temperature from the previous time we were powered up
; to the current fryer temperature, we will have an indication of whether
; or not a running Cook or Hold timer should be continued or discarded.
;
; Rather than simply saving the "old" value of PotTmpF$ at the instant we
; power up, we will continually save temperatures into a special variable
; while we are running (ie before we power down...). The reason we need to
; do it this way is that simply copying the PotTmpF$ value at power-up will
; tell us the temperature the last time the control was alive, rather than
; the last time we were actually alive long enough to do something useful,
; like cook or melt, etc. The PotTmpF$ variable is being updated continually,
; even during the "Intro" phase, whereas we will update PwrDnPotTmpF$ only
; AFTER we finish the Intro phase.
;
; The following example illustrates why we need to do it this way:
;
;
; Example:
; -------
;
; If we simply copy the pwr-up value of PotTmpF$ each time we power up,
; and then use that value at the end of Intro mode in deciding whether or
; not to cancel a cook cycle, we can run into the following problem.
;
; 1. Fryer is powered up and cooking normally, at 350 deg F.
;
; 2. Fryer loses power; PotTmpF$ = 350.
;
; 3. After a long power loss, the control powers up for just
;    a few seconds -- not long enough to get through Intro mode,
;    but long enough to update the value of PotTmpF$ to the
;    current pot temperature of 250 deg F.
;     --> PUPotTmpF$ = 350  (value copied from PotTmpF$ at pwr up)
;     --> PotTmpF$ = 250  (current pot temperature)
;
; 4. Fryer loses power after running just a few seconds.
;     --> PotTmpF$ = 250
;
; 5. Fryer powers up again almost immediately, stays powered.
;     --> PUPotTmpF$ = 250  (value copied from PotTmpF$ at pwr up)
;     --> Current temperature = 250
;
; 6. At the end of Intro mode, we see the current temperature (250)
;    is the same as the value in PUPotTmpF$ ("power up PotTmpF$"),
;    so the control thinks that NO temperature drop has occurred, and it
;    continues the cooking cycle in progress. We have actually had a
;    100 deg temperature drop that the control is unaware of.
;
; The solution to this problem is to set up a variable that is designed
```

```
; we simply need to make sure when we power up that we don't start saving NEW
; temperature values into PwrDnPotTmpF$ until we are sure we are done with the
; OLD value in there (from the last time we had power).
;
; Specifically, then, we will continually update PwrDnPotTmpF$ with the
; current PotTmpF$ value only AFTER we finish the Intro mode. By leaving this
; value alone DURING Intro, we can be assured the above scenario will not
; pose a problem. Referring to the above example, the last value saved into
; PwrDnPotTmpF$ during step 1 above (ie 350 deg F) will STILL be there by the
; time we get to step 6, and the 100 degree temperature drop will be apparent.
; The important difference here is that the PwrDnPotTmpF$ value WILL NOT
; be altered during the brief power resumption in step 3.

PwrDnAirTmpF$   .word           ;As outlined above, we will continually update
                                ; this variable with the current AirTmpF$
                                ; value once we get out of Intro mode...

BriefTmpDropF.  .equ    200     ;If we drop more than 200 degrees during a
                                ; power loss, we will cancel timers, etc.
```

In some instances, left and right are used to described displays and in other instances top and bottom. It is to be understood that this is merely a design preference and the left and top displays may be used interchangeably and the right and bottom displays may be used interchangeably, or vice versa.

The foregoing is a description of the preferred embodiments of the present invention. Various alternatives and modifications will be readily apparent to one of ordinary skill in the art. The invention is only limited by the claims appended hereto.

We claim:

1. A cooking device for automatically cooking food products throughout at least one cooking interval comprising:

a cavity;

a first heating element disposed within said cavity;

a second heating element disposed within said cavity, said first and second heating elements being separately controllable and simultaneously operable for at least a portion of said at least one cooking interval;

temperature selection means for enabling a user to input temperature setpoints for said cooking device;

temperature sensor means for providing temperature signals indicating a temperature in the cavity;

timing input means for enabling a user to select the duration of each cooking interval;

load compensation factor selection means for enabling a user to select a load compensation factor;

system control means responsive to said temperature selection means, said temperature sensor means, said load compensation factor selection means and said timing input means for determining an operation schedule for said first and second heating elements during each cooking interval and varying the duration of each cooking interval based on differences between temperature setpoint and the temperature of the cavity;

first heating element control means responsive to said system control means for changing said first heating element between an ON and an OFF mode according to the operation schedule; and second heating element control means responsive to said system control means for changing said second heating element between an ON and an OFF mode according to the operation schedule.

2. The cooking device of claim 1 herein said load compensation factor corresponds to a type of food product, said system control means calculating a compensated duration for at least one cooking interval based on said load compensation factor and at least one of said first or second heating element control means changing said first or second heating element, respectively, to the ON mode at the beginning of the compensated duration for each cooking interval and turning said first or second heating element, respectively, to the OFF mode at the end of the compensated duration for each cooking interval.

3. The cooking device of claim 1 wherein said first heating element comprises a radiant heat source.

4. The cooking device of claim 1 wherein said first heating element comprises at least one quartz heat bulb.

5. The cooking device of claim 1 wherein said second heating element comprises an air heat source.

6. The cooking device of claim 1 wherein the cooking intervals comprise a BROWN interval, a COOK interval and a FINISH interval.

7. The cooking device of claim 1 further comprising:

A/D conversion means for converting the analog temperature signals from said temperature sensor means to digital temperature signals;

nonvolatile memory means for storing an operating routine for operating said system control means, the temperature setpoints from said temperature selection means, the duration for each cooking interval from said timing input means and the load compensation factor from said load compensation factor selection means; and random access memory means for storing the digital temperature signals from said A/D conversion means, said system control means operable to access said nonvolatile memory means and said random access memory means to determine the operation schedule for the first and second heating elements during each cooking interval.

8. The cooking device of claim 7 wherein said nonvolatile memory comprises an EEPROM.

9. The cooking device of claim 1 wherein said temperature sensor means comprises a first temperature probe for measuring a first temperature near the base of the cavity and a second temperature probe for measuring a second temperature.

10. The cooking device of claim 1 wherein said timing input means enables a user to select a duration for each cooking interval to be from zero to fifteen minutes.

11. The cooking device of claim 1 wherein said control means determines a compensated duration for at least one cooking interval based on either said first or second temperature.

12. The cooking device of claim 1 wherein said load compensation factor selection means enables a user to select a load compensation factor to be from zero to ten.

13. The cooking device of claim 12 wherein each of the load compensation factors corresponds to a type of food product, said control means calculating a compensated duration for at least one cooking interval based on the type of food selected and at least one of said first or second heating element control means turning said first or second heating element, respectively, to the ON mode at the beginning of the compensated duration for each cooking interval and turning said first or second heating elements, respectively, to the OFF mode at the end of the compensated duration for each of the at least one cooking intervals.

14. A method of operating a cooking device having a cooking capacity, said cooking device operable during a plurality of cooking intervals, the method comprising the steps of:

a.) selecting a duration value and setpoint temperature value for each cooking interval;

b.) selecting a load compensation factor;

c.) activating at least one heating element at the beginning of each cooking interval;

d.) setting a counter to the selected duration value at the beginning of each cooking interval;

e.) decrementing the counter value according to a set rate;

f.) measuring the temperature within the cooking cavity;

g.) calculating the difference between the setpoint temperature value and the measured temperature;

h.) determining a rate adjustment value by multiplying the load compensation factor times the calculated difference;

i.) adjusting the set rate based upon the rate adjustment value;

j.) repeating steps e through i after a predetermined period of time; and k.) modifying the operation of at least one heating element when the counter value equals zero.

15. The method of claim 14 wherein said step of adjusting comprises adjusting the set rate by multiplying the set rate by a percentage of the rate adjustment value.

16. The method of claim 14 wherein the step of selecting a load compensation factor comprises selecting a type of food product, said type of food product corresponding to a load compensation factor.

17. The method of claim 14 further comprising the steps of:

selecting an air heat setpoint temperature and a radiant heat setpoint temperature for each cooking interval;

operating an air heat element during each cooking interval when the measured temperature is less than or equal to the air heat setpoint temperature; and operating a radiant heat element during each cooking interval when the measured temperature is less than or equal to the radiant heat setpoint temperature.

18. The method of claim 17 wherein said step of operating a radiant heat element comprises pulsatingly activating and deactivating the radiant heat element according to a predetermined duty cycle.

19. The method of claim 18 further comprising the step of selecting the predetermined duty cycle.

20. The method of claim 17 wherein the cooking device has a fan associated therewith, and further comprising the steps of:

selecting a mode of operation for the fan to be either in an ON mode or an OFF mode;

activating the fan during each cooking interval when the selected mode of operation is the ON mode; and activating the fan when the conducting heat element is activated and the mode of operation is the OFF mode.

21. The method of claim 20 wherein the cooking cavity has a door associated therewith and further comprising the step of:

deactivating the fan when the door of the cooking cavity is open.

22. The method of claim 14 wherein the cooking device comprises a rotisserie cooker having a rotor and further comprising the steps of:

rotating the rotor during at least one of the cooking intervals.

23. A cooking device comprising:

a control panel comprising a plurality of product switches, each product switch operable to permit a user to select a different food product to be cooked;

a ready display for indicating whether the cooking device is ready for the user to select a food product to be cooked;

a plurality of electronic program displays, each program display adjacent to one product switch, whereby a program display illuminates to prompt a user to select a food product to be cooked and whereby the program display adjacent to the product switch selected remains illuminated after the user selects the food product;

a plurality of menu card windows, each menu card window adjacent to one of the program displays, the menu card window indicating the food product with which the adjacent program display and product switch are associated;

cooking controller means for utilizing the selected food product and determining an operational program including at least one cooking cycle;

at least one heating element responsive to the cooking controller means for heating the food according to the determined operational program; and a cook display for indicating the duration of time remaining in each cooking cycle.

24. A method of operating a cooking device having a cavity for cooking food comprising the steps of:

prompting a user to select a food product to be cooked;

prompting the user to select a plurality of cooking intervals for the food product;

prompting the user to select input associated with each cooking stage for the food product selected, the input including a duration and a temperature setpoint;

cooking the food using at least two heating elements simultaneously during at least a portion of at least one of the cooking stages for the duration selected for the selected cooking stages according to the selected input associated with the cooking stage;

sensing the temperature in the cavity during the cooking step; and varying, in response to the sensing of the temperature in the cavity, the duration of the selected cooking stages based on differences between the temperature in the cavity and the temperature setpoints.

25. The method of claim 24 wherein the input comprises:

temperature at which the food is to be cooked during the cooking stage; and duration of the cooking stage.

* * * * *

UNITED STATES PATENT AND TRADEMARK OFFICE

CERTIFICATE OF CORRECTION

PATENT NO. : 5,528,018

DATED : February 22, 1993

INVENTOR(S) : Douglas A. BURKETT et al.

It is certified that error appears in the above-indentified patent and that said Letters Patent is hereby corrected as shown below:

IN THE DRAWINGS:

Sheets 6 and 7 of the drawings, consisting of Figs. 5 and 6, should be deleted to be replaced with the sheets of drawings consisting of the corrected Figs. 5 and 6, as shown on the attached pages.

Signed and Sealed this

Ninth Day of December, 1997

Attest:

Bruce Lehman

BRUCE LEHMAN

*Attesting Officer*

*Commissioner of Patents and Trademarks*